(12) United States Patent
Kawai et al.

(10) Patent No.: US 11,190,808 B2
(45) Date of Patent: Nov. 30, 2021

(54) IMAGE PROCESSING APPARATUS AND IMAGE PROCESSING METHOD

(71) Applicant: SONY CORPORATION, Tokyo (JP)

(72) Inventors: Takuro Kawai, Tokyo (JP); Kenichiro Hosokawa, Kanagawa (JP); Ohji Nakagami, Tokyo (JP); Masaru Ikeda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/468,486

(22) PCT Filed: Dec. 28, 2017

(86) PCT No.: PCT/JP2017/047374
§ 371 (c)(1),
(2) Date: Jun. 11, 2019

(87) PCT Pub. No.: WO2018/131524
PCT Pub. Date: Jul. 19, 2018

(65) Prior Publication Data
US 2020/0077120 A1    Mar. 5, 2020

(30) Foreign Application Priority Data
Jan. 12, 2017   (JP) .............................. JP2017-003467

(51) Int. Cl.
    *H04B 1/66*      (2006.01)
    *H04N 19/82*     (2014.01)
    (Continued)

(52) U.S. Cl.
    CPC ........... *H04N 19/82* (2014.11); *H04N 19/117* (2014.11); *H04N 19/182* (2014.11)

(58) Field of Classification Search
    CPC .. H04N 19/117; H04N 19/136; H04N 19/182; H04N 19/46; H04N 19/82;
    (Continued)

(56) References Cited

U.S. PATENT DOCUMENTS

| 2005/0226529 | A1* | 10/2005 | Kondo | ................... H04N 19/59 |
| | | | | 382/276 |
| 2007/0159661 | A1* | 7/2007 | Kondo | ................ H04N 7/0145 |
| | | | | 358/302 |
| 2009/0161947 | A1* | 6/2009 | Choki | .................... H04N 19/14 |
| | | | | 382/155 |

FOREIGN PATENT DOCUMENTS

| CN | 1997112 A | 7/2007 |
| CN | 101616324 A | 12/2009 |

(Continued)

OTHER PUBLICATIONS

Nov. 26, 2019, European Search Report issued for related EP Application No. 17891477.6.

(Continued)

*Primary Examiner* — Masum Billah
(74) *Attorney, Agent, or Firm* — Paratus Law Group, PLLC

(57) ABSTRACT

There is provided an image processing apparatus and an image processing method in which S/N can be improved. A class tap selection unit configures a class tap by selecting a pixel that is a class tap used in class classification of classifying a pixel to be processed of a first image obtained by adding a residual error of prediction encoding and a prediction image together, into any one class of a plurality of classes, from the first image. A class classification unit performs the class classification of the pixel to be processed by using the class tap, and a filter processing unit performs filter processing corresponding to class of the pixel to be processed, with respect to the first image, to generate a (Continued)

second image used in prediction of the prediction image. The class tap selection unit updates a tap structure of the class tap to a selected tap structure.

20 Claims, 55 Drawing Sheets

(51) Int. Cl.
*H04N 19/117* (2014.01)
*H04N 19/182* (2014.01)

(58) Field of Classification Search
CPC .. H04N 19/86; H04N 7/0145; H04N 21/4854; H04N 5/91; H04N 7/0125; H04N 7/0137; H04N 9/8205; H04N 21/426; H04N 21/44222; H04N 21/4532; G09G 2340/0407
USPC .......................................................... 375/240
See application file for complete search history.

(56) References Cited

FOREIGN PATENT DOCUMENTS

| | | |
|---|---|---|
| CN | 102780887 A | 11/2012 |
| CN | 102804781 A | 11/2012 |
| CN | 104079801 A | 10/2014 |
| EP | 1324607 A2 | 7/2003 |
| EP | 2767087 A1 | 8/2014 |
| JP | 2001-285881 A | 10/2001 |
| JP | 4552261 B2 | 9/2010 |
| JP | 2012-235407 A | 11/2012 |
| JP | 5485983 B2 | 5/2014 |
| JP | 2014-523183 A | 9/2014 |
| WO | WO 2010/146771 A1 | 12/2010 |
| WO | WO 2012/152174 A1 | 11/2012 |
| WO | WO 2013/055923 A1 | 4/2013 |

OTHER PUBLICATIONS

Kim et al., HM7: High Efficiency Video Coding (HEVC) Test Model 7 Encoder Description, Joint Collaborative Team on Video Coding (JCT-VC) of ITU-T SG16 WP3 and ISO/IEC JTC1/SC29/WG11, Apr. 27-May 7, 2012, pp. 1-42, $9^{th}$ Meeting: Geneva, CH.

Chen et al., Algorithm Description of Joint Exploration Test Model 4, Joint Video Exploration Team (JVET) of ITU-T SG 16 WP 3 and ISO/IEC JTC 1/SC 29/WG 11, Oct. 15-21, 2016, pp. 1-36, 4th Meeting: Chengdu, CN.

* cited by examiner

| Tap structure | Cross | | × | | Horizontal one line | | Vertical one line | | Oblique one line | | Rhombus shape | | Square shape | | Rectangle shape (vertical) | | Rectangle shape (horizontal) | | Time direction | |
|---|---|---|---|---|---|---|---|---|---|---|---|---|---|---|---|---|---|---|---|---|
| | Dense | Sparse | Dense | Sparse | Dense | Sparse | Dense | Sparse | Dense | Sparse | Dense | Sparse | Dense | Sparse | Dense | Sparse | Dense | Sparse | Dense | Sparse |

FIG. 14

| Determination method of candidate of tap structure of class tap | |
|---|---|
| In range identical to that of prediction tap shape | Allow class tap shape to be coincident with prediction tap shape (same range, same shape) |
| | Match maximum ranges in both of horizontal/vertical directions (same range, arbitrary shape) |
| Not in range identical to that of prediction tap shape | Match maximum ranges in any one of horizontal/vertical directions (partially same range, arbitrary shape) |
| | Do not match maximum ranges in both of horizontal/vertical directions (different ranges, arbitrary shape) |

FIG.15

| Image feature amount | | Calculation method |
|---|---|---|
| Waveform pattern | ADRC | (In one-bit ADRC code) divide luminance into binary pixel values in accordance with threshold value using DR. Exhaustively classify waveform pattern in tap (edge, texture, and others, including direction) Optimal restoration effect for each pattern |
| Amplitude | DR | Difference between maximum luminance and minimum luminance within reference range. Small: reduction in noise of flat portion, and others Large: restoration of edge |
| Gradient | DiffMax | Set index of how many pixels to climb up amplitude within reference range, in maximum value DiffMax/DR of difference absolute values of adjacent pixels in horizontal direction, vertical direction, and oblique direction, and two-axis expression of DiffMax and DR. Small: reduction in false contour of gradation Large: restoration of precipitous edge (step) |
| | Stationarity | Difference between direction in which difference absolute value sum of adjacent pixels in each direction is maximized and direction in which difference absolute value sum of adjacent pixels in each direction is minimized. Small: restoration of texture (noise) Large: restoration of edge (structure line) |
| Structure | Activity | Difference absolute value sum of adjacent pixels in horizontal direction and vertical direction. Small: step edge (simple pattern) Large: texture (complicated pattern) |
| | Secondary differentiation sum | Secondary differentiation absolute value sum of adjacent pixels in horizontal direction and vertical direction. Small: step edge (simple pattern) Large: texture (complicated pattern) |
| Direction | Maximum direction difference | Direction in which difference absolute value sum of adjacent pixels in horizontal direction, vertical direction, and oblique direction is maximized. Classify direction such as amplitude, gradient, and structure. Optimal restoration effect for each direction |
| | Filter bank | Plurality of bandpass filters having directionality. Classification accuracy is high compared to maximum direction difference. However, calculation cost is large |

FIG.16

| Acquirable information used in selection of tap structure | Specific example | Scene having improved result |
|---|---|---|
| Image feature amount of entire picture | Activity of entire screen (Difference absolute value sums of adjacent pixels in horizontal direction and vertical direction) →Entire screen band | Stretch class tap densely in case where band is high →Scene including lot of texture-like details Stretch class tap sparsely in case where band is low →Scene in which details are lost and edge is blurred |
| | Direction difference absolute value sum of entire screen →Main structure | Stretch tap to have main structure line, and orthogonal direction thereof →Scene including lot of (structure lines) edges in horizontal direction, vertical direction, oblique direction, and others |
| | Inter-frame difference absolute value sum of entire screen →Mutual relationship in time direction | Scene in which same patterns are consecutive in time direction (Same setting as before can be applied) |
| Local image feature amount | Local activity→Local band | (Identical to image feature amount of entire picture) |
| | Local direction difference absolute value sum →Local structure | (Identical to image feature amount of entire picture) |
| | Local inter-frame difference absolute value sum →Local mutual relationship in time direction | (Identical to image feature amount of entire picture) |
| Encoding information | Refer to result of I picture (in processing of P and B pictures) | Scene in which same patterns are consecutive in time direction (Same setting as before can be applied) |
| | Use MV | Same object when seen in time direction (Same setting as before can be applied) |
| | Use Intra prediction result Use direction information transmitted to each block, in statistical processing and others, and acquire spatial direction information of target image | Stretch tap to have main structure line, and orthogonal direction thereof Effect identical to that of direction difference described above, but pixel level processing may be performed by using encoding information |

FIG.30

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2017/047374 (filed on Dec. 28, 2017) under 35 U.S.C. § 371, which claims priority to Japanese Patent Application No. 2017-003467 (filed on Jan. 12, 2017), which are all hereby incorporated by reference in their entirety.

TECHNICAL FIELD

The present technology relates an image processing apparatus and an image processing method, in particular, for example, relates to an image processing apparatus and an image processing method in which S/N of an image can be greatly improved.

BACKGROUND ART

For example, in high efficiency video coding (HEVC) that is one of prediction encoding systems, an in loop filter (ILF) is proposed. In addition, in post HEVC (a prediction encoding system of the next generation of the HEVC), it is expected that the ILF is adopted.

There are a deblocking filter (DF) for reducing a block-noise, a sample adaptive offset (SAO) for reducing ringing, and an adaptive loop filter (ALF) for minimizing an encoding error (an error of a decoding image with respect to the original image), as the ILF.

The ALF is described in Patent Literature 1, and the SAO is described in Patent Literature 2.

CITATION LIST

Patent Literature

Patent Literature 1: Japanese Patent No. 5485983
Patent Literature 2: Translation of PCT International Application Publication No. 2014-523183

DISCLOSURE OF INVENTION

Technical Problem

The currently proposed DF, SAO, or ALF, as the ILF, has a low freedom degree, and it is difficult to perform fine control with respect to the filter, and thus, it is difficult to greatly improve a signal to noise ratio (S/N) of an image.

The present technology has been made in consideration of such circumstances, and an object thereof is to greatly improve S/N of the image.

Solution to Problem

An image processing apparatus of the present technology, is an image processing apparatus, including: a class tap selection unit configuring a class tap by selecting a pixel that is the class tap used in class classification of classifying a pixel to be processed of a first image obtained by adding a residual error of prediction encoding and a prediction image together, into any one class of a plurality of classes, from the first image; a class classification unit performing the class classification of the pixel to be processed by using the class tap; and a filter processing unit performing filter processing corresponding to a class of the pixel to be processed, with respect to the first image, to generate a second image used in prediction of the prediction image, in which the class tap selection unit updates a tap structure of the class tap to a tap structure selected from a plurality of tap structures.

An image processing method of the present technology, is an image processing method, including: configuring a class tap by selecting a pixel that is the class tap used in class classification of classifying a pixel to be processed of a first image obtained adding a residual error of prediction encoding and a prediction image together, into any one class of a plurality of classes, from the first image; performing the class classification of the pixel to be processed by using the class tap; and performing filter processing corresponding to a class of the pixel to be processed, with respect to the first image, to generate a second image used in prediction of the prediction image, in which a tap structure of the class tap is updated to a tap structure selected from a plurality of tap structures.

In the image processing apparatus and the image processing method of the present technology, the class tap is configured by selecting the pixel that is the class tap used in the class classification of classifying the pixel to be processed of the first image obtained by adding the residual error of the prediction encoding and the prediction image together, into any one class of the plurality of classes, from the first image. Then, the class classification of the pixel to be processed is performed with respect to the first image by using the class tap, and the filter processing corresponding to the class of the pixel to be processed, is performed, and thus, the second image used in the prediction of the prediction image, is generated. In this case, the tap structure of the class tap is updated to the tap structure selected from the plurality of tap structures.

Note that, the image processing apparatus may be an independent apparatus, or may be an internal block configuring one apparatus.

In addition, the image processing apparatus can be realized by allowing a computer to execute a program. The program can be provided by being transmitted through a transmission medium, or by being recorded in a recording medium.

Advantageous Effects of Invention

According to the present technology, it is possible to greatly improve S/N of an image.

Note that, the effects described here are not necessarily limited, and may be any one of the effects described in the present disclosure.

BRIEF DESCRIPTION OF DRAWINGS

FIG. 14 is a diagram illustrating an example of a variation of the tap structure of the class tap.

FIG. 15 is a diagram illustrating an example of a determination method of a plurality of tap structures of the class tap, stored in a tap structure selection unit 151.

FIG. 16 is a diagram illustrating an example of an image feature amount of the class tap, used in class classification by a class classification unit 163.

FIG. 30 is a diagram illustrating an example of acquirable information used in selection of the tap structure of the class tap.

MODE(S) FOR CARRYING OUT THE INVENTION

<Image Processing System to which Present Technology is Applied>

Figure 1:
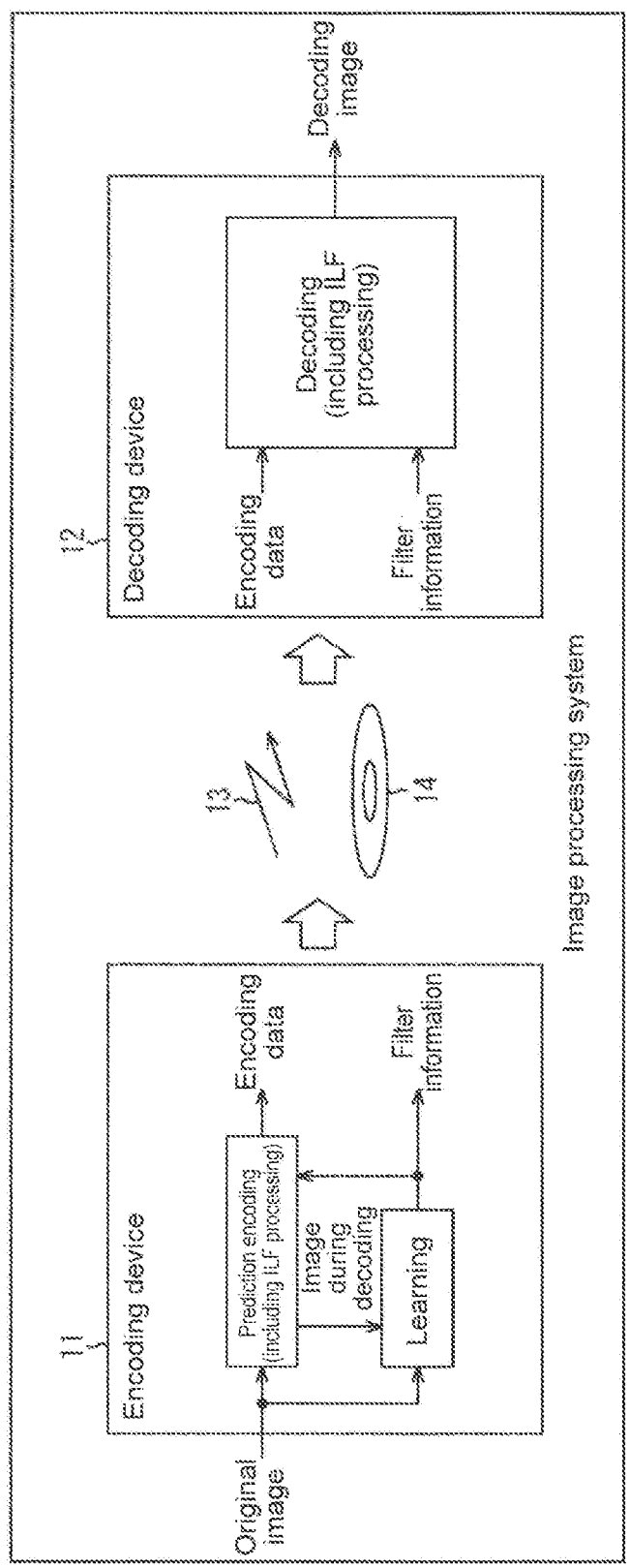
FIG. 1 is a diagram illustrating a configuration example of one embodiment of an image processing system to which the present technology is applied.

FIG. 1 is a diagram illustrating a configuration example of one embodiment of an image processing system to which the present technology is applied.

In FIG. 1, the image processing system includes an encoding device 11 and a decoding device 12.

An original image that is an encoding target, is supplied to the encoding device 11.

The encoding device 11, for example, encodes the original image according to prediction encoding such as HEVC or advanced video coding (AVC).

In the prediction encoding of the encoding device 11, a prediction image of the original image is generated, and a residual error between the original image and the prediction image is encoded.

Further, in the prediction encoding of the encoding device 11, ILF processing using an ILF is performed with respect to an image during decoding, obtained by adding the residual error of the prediction encoding and the prediction image together, and thus, a reference image used in prediction of the prediction image, is generated.

Here, the image obtained by performing filter processing (filtering) as the ILF processing, with respect to the image during decoding, will also be referred to as a filtered image.

The encoding device 11 performs the prediction encoding, and as necessary, performs learning or the like by using the image during decoding and the original image, and thus, it is possible to obtain information relevant to the filter processing as the ILF processing, indicating that the filtered image is maximally close to the original image, as filter information.

The ILF processing of the encoding device 11 can be performed by using the filter information obtained by the learning.

Here, the learning of obtaining the filter information, for example, can be performed for one or a plurality of sequences of the original image, for one or a plurality of scenes of the original image (a frame from the scene change to the next scene change), for one or a plurality of frames (pictures) of the original image, for one or a plurality of slices of the original image, for one or a plurality of lines of a block of encoding unit of a picture, and in the other arbitrary unit. In addition, the learning of obtaining the filter information, for example, can be performed in a case where the residual error is greater than or equal to a threshold value.

The encoding device 11 transmits encoding data obtained by the prediction encoding of the original image, through a transmission medium 13, or transmits the encoding data to a recording medium 14 to be recorded.

In addition, the encoding device 11 is capable of transmitting the filter information obtained by the learning, through the transmission medium 13, or is capable of transmitting the filter information to the recording medium 14 to be recorded.

Note that, the learning of obtaining the filter information, can be performed by a device different from the encoding device 11.

In addition, the filter information can be transmitted separately from the encoding data, or can be transmitted by being included is the encoding data.

Further, the learning of obtaining the filter information can be performed by using the original image itself (and the image during decoding obtained from the original image), and can also be performed by using an image different from the original image, the image having an image feature amount similar to that of the original image.

The decoding device 12 accepts (receives) (acquires) the encoding data and necessary filter information, transmitted from the encoding device 11, through the transmission medium 13 or the recording medium 14, and decodes the encoding data in a system corresponding to the prediction encoding of the encoding device 11.

That is, the decoding device 12 obtains the residual error of the prediction encoding by processing the encoding data from the encoding device 11. Further, the decoding device 12 obtains the image during decoding identical to that obtained by the encoding device 11, by adding the residual error and the prediction image together. Then, the decoding device 12 performs the filter processing as the ILF processing, in which the filter information from the encoding device 11 is used as necessary, with respect to the image during decoding, and thus, obtains a filtered image.

In the decoding device 12, the filtered image is output as a decoding image of the original image, and as necessary, is temporarily stored as a reference image used in the prediction of the prediction image.

The filter processing as the ILF processing, of the encoding device 11 and the decoding device 12, can be performed by an arbitrary filter.

In addition, the filter processing of the encoding device 11 and the decoding device 12 can be performed by (prediction operation of) class classification adaptive processing. Hereinafter, the class classification adaptive processing will be described.

<Class Classification Adaptive Processing>

Figure 2:
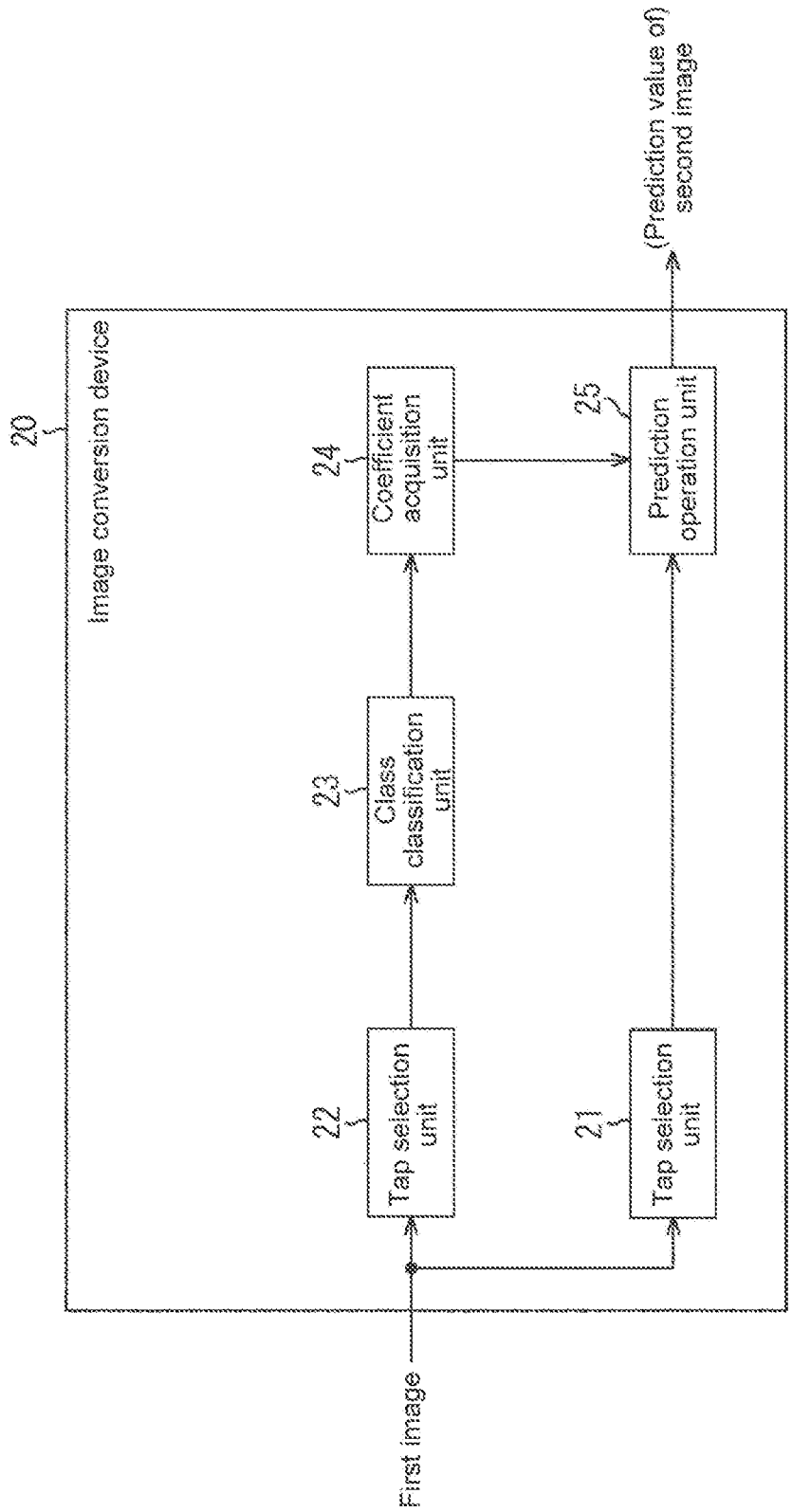
FIG. 2 is a block diagram illustrating a first configuration example of an image conversion device performing class classification adaptive processing.

FIG. 2 is a block diagram illustrating first configuration example of an image conversion device performing class classification adaptive processing.

Here, the class classification adaptive processing, for example, can be considered as image conversion processing of converting a first image into a second image.

The image conversion processing of converting the first image into the second image, is various signal processings according to the definition of the first image and the second image.

That is, for example, in a case where the first image is set as an image having a low spatial resolution, and the second image is set as an image having a high spatial resolution, the image conversion processing can be referred to as spatial resolution creation (improvement) processing of improving a spatial resolution.

In addition, for example, in a case where the first image is set as an image having low S/N, and the second image is set as an image having high S/N, the image conversion processing can be referred to as noise removal processing of removing a noise.

Further, for example, in a case where the first image is set as an image having a predetermined number of pixels (a predetermined size), and the second image is set as an image of which the number of pixels is greater than or less than the number of pixels of the first image, the image conversion processing can be referred to as resize processing of resizing (enlarging or reducing) an image.

In addition, for example, in a case where the first image is set as a decoding image obtained by decoding an image encoded in block unit of the HEVC or the like, and the second image is set as an original image before encoding, the image conversion processing can be referred to as distortion removal processing of removing block distortion that occurs by encoding and decoding in block unit.

Note that, the class classification adaptive processing, for example, is capable of processing a sound in addition to an image. The class classification adaptive processing of processing a sound can be considered as sound conversion processing of converting a first sound (for example, a sound having low S/N, or the like) into a second sound (for example, a sound having high S/N, or the like).

In the class classification adaptive processing, a pixel value of a target pixel is obtained in accordance with prediction operation using a tap coefficient of a class obtained by class classification of classifying the pixel value of the target pixel (a pixel to be processed that is a processing target) in the first images, into any one class of a plurality of classes, and a pixel value of the same number of pixels as the tap coefficient, of the first image selected with respect to the target pixel.

FIG. 2 illustrates a configuration example of the image conversion device performing the image conversion processing according to the class classification adaptive processing.

In FIG. 2, an image conversion device 20 includes tap selection units 21 and 22, a class classification unit 23, a coefficient acquisition unit 24, and a prediction operation unit 25.

The first image is supplied to the image conversion device 20. The first image supplied to the image conversion device 20, is supplied to the tap selection units 21 and 22.

The tap selection unit 21 sequentially selects pixels configuring the first image, as the target pixel. Further, the tap selection unit 21 selects (the pixel values of) several pixels configuring the first image used for predicting (a pixel value of) the corresponding pixel of the second image that corresponds to the target pixel, as a prediction tap.

Specifically, the tap selection unit 21 selects a plurality of pixels of the first image, in a position spatially or temporally close to the temporal-spatial position of the target pixel, as the prediction tap.

The tap selection unit 22 selects (the pixel values of) several pixels configuring the first image used for performing the class classification of classifying the target pixel into any one class of several classes, as a class tap. That is, the tap selection unit 22 selects a class tap, as the tap selection unit 21 selects the prediction tap.

Note that, the prediction tap and the class tap may have the same tap structure, or may have different tap structures.

The prediction tap obtained by the tap selection unit 21, is supplied to the prediction operation unit 25, and the class tap obtained by the tap selection unit 22, is supplied to the class classification unit 23.

The class classification unit 23 performs the class classification with respect to the target pixel in accordance with a certain rule, and supplies a class code corresponding to a class obtained as a result thereof, to the coefficient acquisition unit 24.

That is, the class classification unit 23, for example, performs the class classification with respect to the target pixel by using the class tap from the tap selection unit 22, and supplies a class code corresponding to a class as a result thereof, to the coefficient acquisition unit 24.

For example, the class classification unit 23 obtains an image feature amount of the target pixel by using the class tap. Further, the class classification unit 23 performs class classification with respect to the target pixel in accordance with the image feature amount of the target pixel, and supplies a class code corresponding to a class obtained as a result thereof, to the coefficient acquisition unit 24.

Here, for example, adaptive dynamic range coding (ADRC) or the like can be adopted as a method of performing the class classification.

In a method using the ADRC, (pixel values of) pixels configuring the class tap, are subjected to ADRC processing, and in accordance with an ADRC code (an ADRC value) obtained as a result thereof, the class of the target pixel is determined. The ADRC code indicates a waveform pattern as an image feature amount of a small region including the target pixel.

Note that, in L bit ADRC, for example, a maximum value MAX and a minimum value MIN of the pixel values of the pixels configuring the class tap are detected, DR=MAX−MIN is set to a local dynamic range of a class, and the pixel values of each of the pixels configuring the class tap are requantized to an L bit, on the basis of a dynamic range DR. That is, the minimum value MIN is subtracted from the pixel values of each of the pixels configuring the class tap, and the subtracted value is divided by $DR/2^L$ (requantized). Then, a bit sequence in which the pixel values of each of the pixels of the L bit configuring the class tap, obtained as described above, are arranged in a predetermined order, is output as the ADRC code. Therefore, in a case where the class tap, for example, is subjected to 1 bit ADRC processing, the pixel values of each of the pixels configuring the class tap, are divided by the average value between the maximum value MAX and the minimum value MIN (rounding down the decimal point), and thus, the pixel values of each of the pixels are set to 1 bit (binarized). Then, a bit sequence in which the pixel values of 1 bit are arranged in a predetermined order, is output as the ADRC code.

Note that, for example, a pattern of a level distribution of the pixel values of the pixels configuring the class tap can also be output to the class classification unit 23 as the class code, as it is. However, in this case, in a case where the class tap is configured of the pixel values of N pixels, and an A bit is assigned to the pixel values of each of the pixels, the number of class codes output by the class classification unit 23 is $(2^N)^A$, and is a vast number exponentially proportional to the number A of bits of the pixel values of the pixels.

Therefore, in the class classification unit 23, it is desirable that an information amount of the class tap is subjected to the class classification by being compressed in accordance with the ADRC processing described above, or vector quantization or the like, and thus.

The coefficient acquisition unit 24 stores the tap coefficients for each of the classes, obtained by the learning described below, and acquires the tap coefficient of the class indicated by the class code supplied from the class classification unit 23, that is the tap coefficient of the class of the target pixel, in the stored tap coefficients. Further, the coefficient acquisition unit 24 supplies the tap coefficient of the class of the target pixel to the prediction operation unit 25.

Here, the tap coefficient is a coefficient corresponding to a coefficient to be multiplied with input data in a so-called tap, in a digital filter.

The prediction operation unit 25 performs predetermined prediction operation of obtaining a prediction value of a true value of pixel values of the pixels of the second image (the corresponding pixels) corresponding to the target pixel, by using the prediction tap output by the tap selection unit 21, and the tap coefficient supplied by the coefficient acquisition unit 24. Accordingly, the prediction operation unit 25 obtains (the prediction values of) the pixel values of the corresponding pixels, that is, the pixel values of the pixels configuring the second image, and outputs the pixel values.

Figure 3:
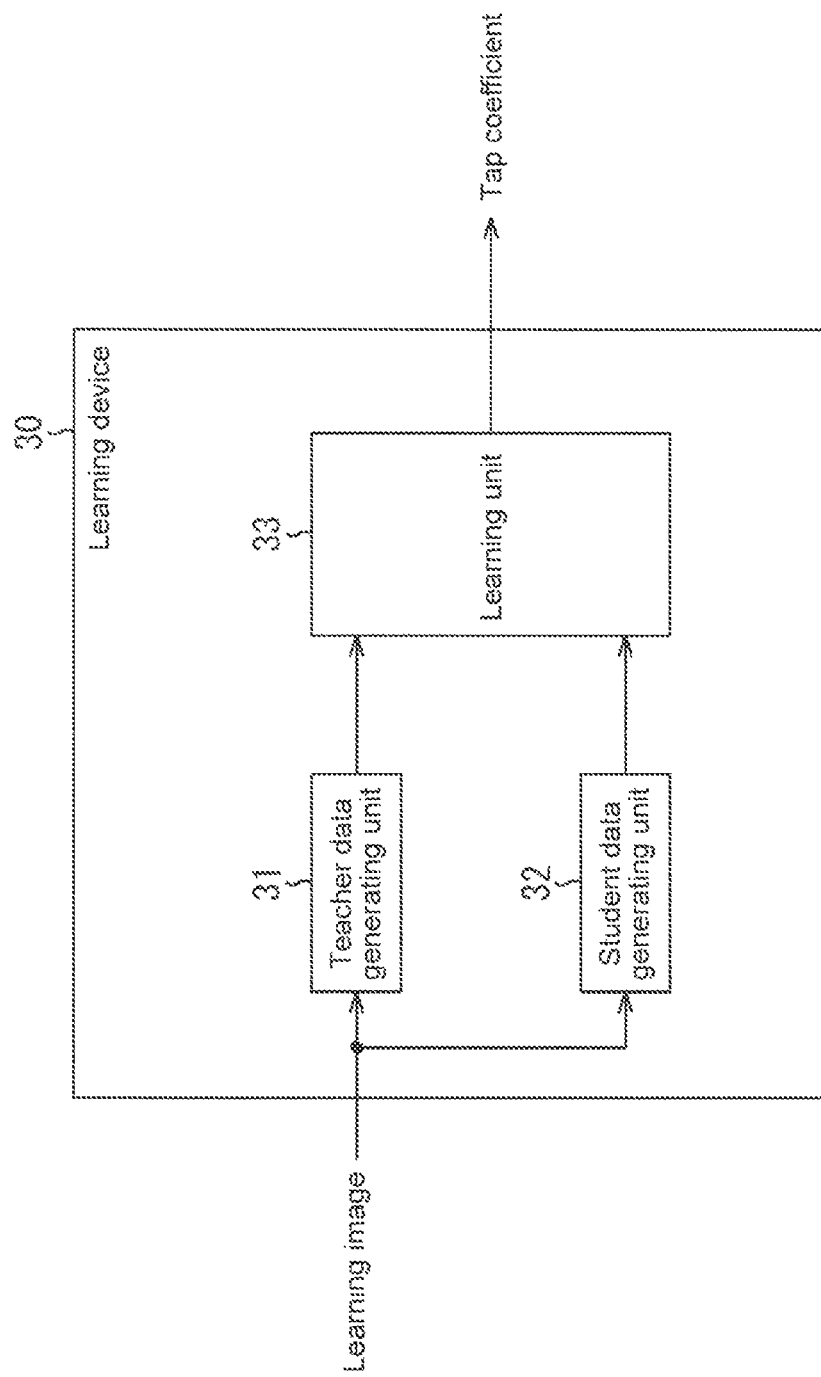
FIG. 3 is a block diagram illustrating a configuration example of a learning device performing learning of a tap coefficient stored in a coefficient acquisition unit 24.

FIG. 3 is a block diagram illustrating a configuration example of a learning device performing learning of the tap coefficient stored in the coefficient acquisition unit 24.

Here, for example, it is considered that an image having high image quality (a high quality image) is set as the second image, and an image having low image quality low quality image) in which the image quality (the resolution) of the high quality image decreases by filtering of a low pass filter (LPF) or the like, is set as the first image, the prediction tap is selected from the low quality image, and pixel values of pixels of the high quality image (high image quality pixels), are obtained (predicted) in accordance with the predetermined prediction operation, by using the prediction tap and the tap coefficient.

For example, in a case where a linear primary prediction operation is adopted as the predetermined prediction operation, a pixel value y of the high image quality pixel is obtained by the following linear primary expression.

[Expression 1]

$$y = \sum_{n=1}^{N} w_n x_n \quad (1)$$

Here, in Expression (1), $x_n$ represents a pixel value of a pixel of the n-th low quality image (hereinafter, suitably referred to as a low image quality pixel), configuring a prediction tap with respect to a high image quality pixel y as the corresponding pixel, and $w_n$ represents the n-th tap coefficient to be multiplied with (the pixel value of) the n-th low image quality pixel. Note that, in Expression (1), the prediction tap is configured of N low image quality pixels $x_1, x_2, \ldots, x_N$.

Here, the pixel value y of the high image quality pixel can also be obtained by not only the linear primary expression represented by Expression (1), but also a second or higher order expression.

Here, in a case where a true value of a pixel value of a high image quality pixel of the k-th sample is represented by $y_k$, and a prediction value of the true value $y_k$ obtained by Expression (1), is represented by $y_k'$, a prediction error $e_k$ thereof is represented by the following expression.

[Expression 2]

$$e_k = y_k - y_k' \quad (2)$$

Here, the prediction value $y_k'$ in Expression (2) is obtained in accordance with Expression (1), and thus, in a case where $y_k'$ in Expression (2) is substituted in accordance with Expression (1), the following expression is obtained.

[Expression 3]

$$e_k = y_k - \left( \sum_{n=1}^{N} w_n x_{n,k} \right) \quad (3)$$

Here, in Expression (3), $x_{n,k}$ represents the n-th low image quality pixel configuring the prediction tap with respect to the high image quality pixel of the k-th sample as the corresponding pixel.

The tap coefficient $w_n$ that makes the prediction error $e_k$ in Expression (3) (or Expression (2)) 0, is optimal for predicting the high image quality pixel, but in general, it is difficult to obtain such a tap coefficient $w_n$ with respect to all of the high image quality pixels.

Therefore, for example, in a case where a least square method is adopted as the norm indicating that the tap coefficient $w_n$ is optimal, the optimal tap coefficient $w_n$ can be obtained by minimizing a sum E of square errors (a statistical error) represented by the following expression.

[Expression 4]

$$E = \sum_{k=1}^{K} e_k^2 \quad (4)$$

Here, in Expression (4), K represents the number of samples (the number of samples for learning) of a set of the high image quality pixel $y_k$ as the corresponding pixel, and the low image quality pixels $x_{1,k}, x_{2,k}, \ldots, x_{N,k}$ configuring the prediction tap with respect to the high image quality pixel $y_k$.

The minimum value (the minima) of the sum E of the square errors in Expression (4), is applied by $w_n$ that makes a value obtained by performing partial differentiation with respect to the sum E with the tap coefficient $w_n$ 0, as represented in Expression (5).

[Expression 5]

$$\frac{\partial E}{\partial w_n} = e_1 \frac{\partial e_1}{\partial w_n} + e_2 \frac{\partial e_2}{\partial w_n} + \ldots + e_k \frac{\partial e_k}{\partial w_n} = 0 \; (n = 1, 2, \ldots, N). \quad (5)$$

Therefore, in a case where Expression (3) described above is subjected to the partial differentiation with the tap coefficient $w_n$, the following expression is obtained.

[Expression 6]

$$\frac{\partial e_k}{\partial w_1} = -x_{1,k}, \; \frac{\partial e_k}{\partial w_2} = -x_{2,k}, \ldots, \; \frac{\partial e_k}{\partial w_N} = -x_{N,k}, \; (k = 1, 2, \ldots, K). \quad (6)$$

From Expressions (5) and (6), the following expression is obtained.

[Expression 7]

$$\sum_{k=1}^{K} e_k X_{1,k} = 0, \; \sum_{k=1}^{K} e_k X_{2,k} = 0, \ldots \sum_{k=1}^{K} e_k X_{N,k} = 0 \quad (7)$$

Expression (7) can be represented by a normal equation in Expression (8) by assigning Expression (3) to $e_k$ in Expression (7).

[Expression 8]

$$\begin{bmatrix} \left(\sum_{k=1}^{K} X_{1,k} X_{1,k}\right) & \left(\sum_{k=1}^{K} X_{1,k} X_{2,k}\right) & \cdots & \left(\sum_{k=1}^{K} X_{1,k} X_{N,k}\right) \\ \left(\sum_{k=1}^{K} X_{2,k} X_{1,k}\right) & \left(\sum_{k=1}^{K} X_{2,k} X_{2,k}\right) & \cdots & \left(\sum_{k=1}^{K} X_{2,k} X_{N,k}\right) \\ \vdots & \vdots & \ddots & \vdots \\ \left(\sum_{k=1}^{K} X_{N,k} X_{1,k}\right) & \left(\sum_{k=1}^{K} X_{N,k} X_{2,k}\right) & \cdots & \left(\sum_{k=1}^{K} X_{N,k} X_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix}. \quad (8)$$

The normal equation in Expression (8), for example, can be solved with respect to the tap coefficient $w_n$, by using a discharge calculation (a Gauss-Jordan elimination method) or the like.

The normal equation in Expression (8) is solved for each of the classes, and thus, the optimal tap coefficient (here, a tap coefficient that minimizes the sum E of the square errors) $w_n$ can be obtained for each of the classes.

FIG. 3 illustrates a configuration example of the learning device performing learning of obtaining tap coefficient $w_n$ by solving the normal equation in Expression (8).

In FIG. 3, a learning device 30 includes a teacher data generating unit 31, a student data generating unit 32, and a learning unit 33.

A learning image used in the learning of the tap coefficient $w_n$, is supplied to the teacher data generating unit 31 and the student data generating unit 32. For example, high quality image having a high resolution can be used as the learning image.

The teacher data generating unit 31 generates a teacher image that is a mapping destination of mapping as the prediction operation according to Expression (1), from the learning image, as teacher data that is a teacher (a true value) of the learning of the tap coefficient, that is, teacher data to be obtained by the class classification adaptive processing, and supplies the teacher image to the learning unit 33. Here, the teacher data generating unit 31, for example, supplies a high quality image as the learning image, to the learning unit 33 as the teacher image, as it is.

The student data generating unit 32 generates a student image that is a conversion target of the mapping as the prediction operation according to Expression (1), from the learning image, as student data that is a student of the learning of the tap coefficient, that is, student data that is a target of the prediction operation of the tap coefficient in the class classification adaptive processing, and supplies the student image to the learning unit 33. Here, the student data generating unit 32, for example, decreases a resolution of a high quality image as the learning image, by performing filtering with respect to the high quality image with a low pass filter (LPF), and thus, generates a low quality image, sets the low quality image as the student image, and supplies the low quality image to the learning unit 33.

The learning unit 33 sequentially sets pixels configuring the student image as the student data from the student data generating unit 32, as the target pixel, and selects the pixel of the tap structure, identical to that selected by the tap selection unit 21 of FIG. 2, as a prediction tap from the student image, with respect to the target pixel. Further, the learning unit 33 solves the normal equation in Expression (8) for each of the classes, by using the corresponding pixel configuring the teacher image that corresponds to the target pixel, and the prediction tap of the target pixel, and thus, obtains the tap coefficients for each of the classes.

Figure 4:
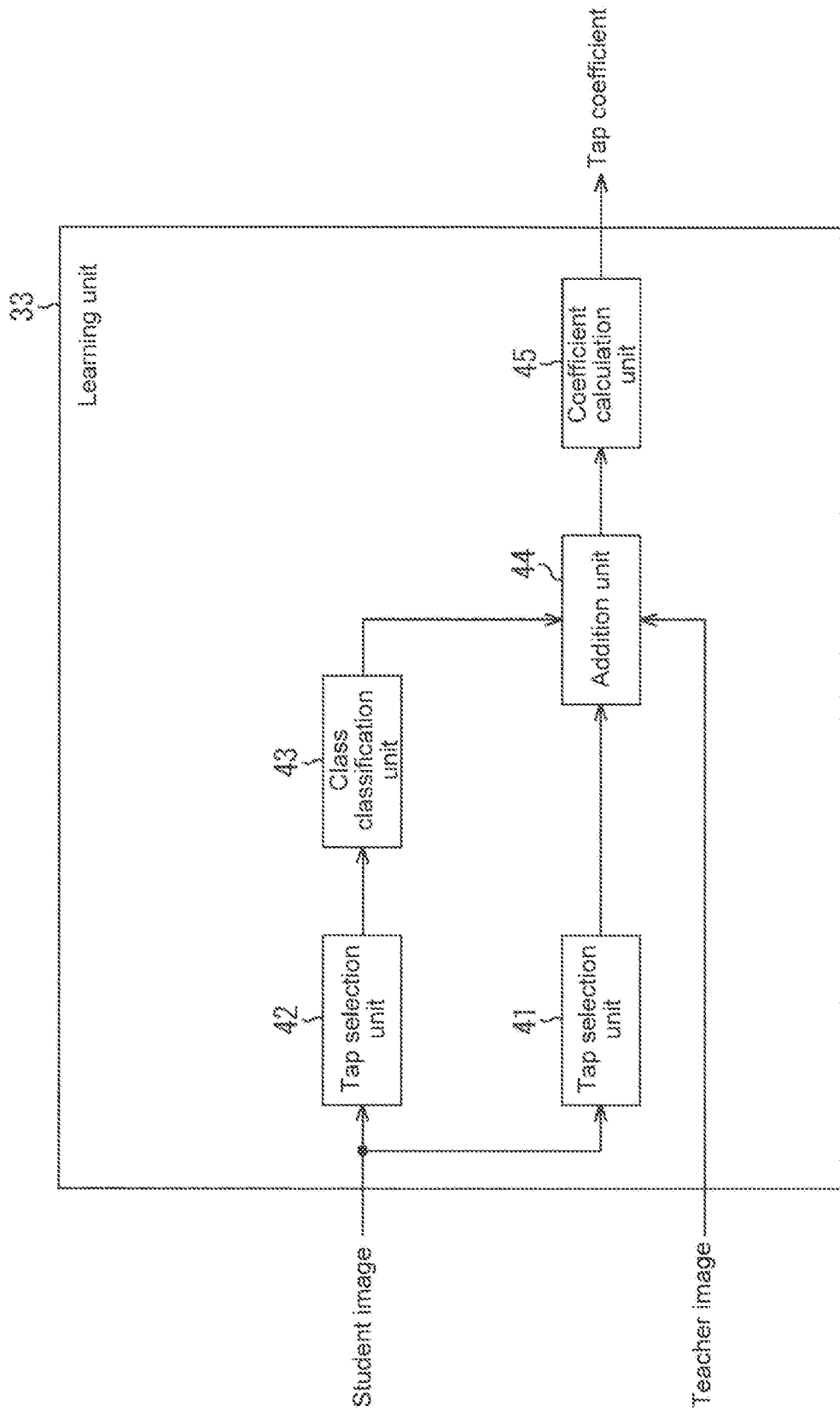
FIG. 4 is a block diagram illustrating a configuration example of a learning unit 33.

FIG. 4 is a block diagram illustrating a configuration example of the learning unit 33 of FIG. 3.

In FIG. 4, the learning unit 33 includes tap selection units 41 and 42, a class classification unit 43, an addition unit 44, and a coefficient calculation unit 45.

The student image is supplied to the tap selection units 41 and 42, and the teacher image is supplied to the addition unit 44.

The tap selection unit 41 sequentially selects pixels configuring the student image, as the target pixel, and supplies information indicating the target pixel, to a necessary block.

Further, the tap selection unit 41 selects the pixel identical to that selected by the tap selection unit 21 of FIG. 2, as the prediction tap from the pixels configuring the student image, with respect to the target pixel, and thus, obtains the prediction tap of the tap structure, identical to that obtained by the tap selection unit 21, and supplies the prediction tap to the addition unit 44.

The tap selection unit 42 selects the pixel identical to that selected by the tap selection unit 22 of FIG. 2 from the pixels configuring the student image, as the class tap, with respect to the target pixel, and thus, obtains the class tap of the tap structure, identical to that obtained by the tap selection unit 22, and supplies the class tap to the class classification unit 43.

The class classification unit 43 performs the class classification identical to that performed by the class classification unit 23 of FIG. 2, by using the class tap from the tap selection unit 42, and outputs a class code corresponding to the class of the target pixel obtained as a result thereof, to the addition unit 44.

The addition unit 44 acquires (the pixel value of) the corresponding pixel corresponding to the target pixel, from the pixels configuring the teacher image, and performs addition with respect to the corresponding pixel, and (the pixel value of) the pixel of the student image configuring the prediction tap with respect to the target pixel supplied from the tap selection unit 41, for each of the class codes supplied from the class classification unit 43.

That is, the class code indicating the corresponding pixel $y_k$ of the teacher image as the teacher data, the prediction tap $x_{n,k}$ of the target pixel as the student data, and the class of the target pixel, is supplied to the addition unit 44.

The addition unit 44 performs multiplication ($x_{n,k}x_{n',k}$) of student data items of a matrix on a left-hand side in Expression (8), and operation corresponding to summation ($\Sigma$), for each of the classes of the target pixel, by using the prediction tap (student data) $x_{n,k}$.

Further, the addition unit 44 also performs multiplication ($x_{n,k}y_k$) of the student data $x_{n,k}$ and the teacher data $y_k$ of a vector on a right-hand side in Expression (8), and operation corresponding to summation ($\Sigma$), for each of the classes of the target pixel, by using the prediction tap (the student data) $x_{n,k}$ and the teacher data $y_k$.

That is, the addition unit 44 stores a component ($\Sigma x_{n,k} x_{n',k}$) of the matrix on the left-hand side and a component ($\Sigma x_{n,k} y_k$) of the vector on the right-hand side in Expression (8) which are previously obtained with respect to the corresponding pixel corresponding to the target pixel, as the teacher data, in a built-in memory (not illustrated), and adds the corresponding component $x_{n,k+1}x_{n',k+1}$ or $x_{n,k+1}y_{k+1}$ (performs addition represented by the summation in Expression (8)) which is calculated by using the teacher data $y_{k+1}$ and the student data $x_{n,k+1}$ with respect to the teacher data that is the corresponding pixel corresponding to a new target pixel, with respect to the component ($\Sigma x_{n,k} x_{n',k}$) of the matrix or the component ($\Sigma x_{n,k} y_k$) of the vector.

Then, the addition unit 44, for example, performs the addition described above by using all of the pixels of the student image as the target pixel, and thus, establishes the normal equation represented Expression (8) with respect to each of the classes, and supplies the normal equation to the coefficient calculation unit 45.

The coefficient calculation unit 45 solves the normal equation with respect to each of the classes supplied from the addition unit 44, and thus, obtains the optimal tap coefficient $w_n$ with respect to each of the classes, and outputs the optimal tap coefficient $w_n$.

The tap coefficient $w_n$ for each of the classes, obtained as described above, can be stored in the coefficient acquisition unit 24 of the image conversion device 20 of FIG. 2.

Figure 5:
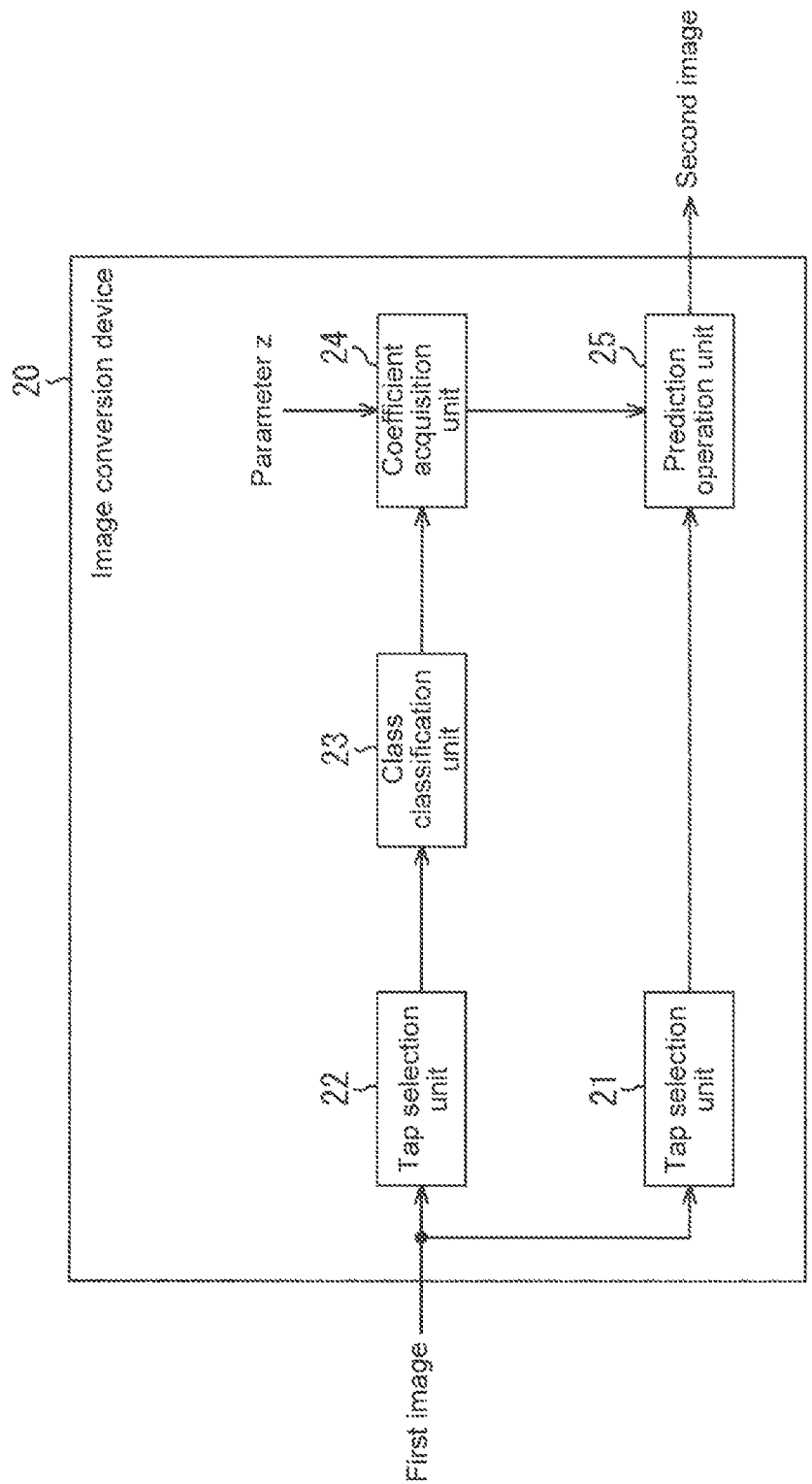
FIG. 5 is a block diagram illustrating a second configuration example of the image conversion device performing the class classification adaptive processing.

FIG. 5 is a block diagram illustrating a second configuration example of the image conversion device performing the class classification adaptive processing.

Note that, in the drawings, the same reference numerals will be applied to portions corresponding to those of FIG. 2, and hereinafter, the description thereof will be suitably omitted.

In FIG. 5, the image conversion device 20 includes the tap selection units 21 and 22, the class classification unit 23, the coefficient acquisition unit 24, and the prediction operation unit 25.

Therefore, the image conversion device 20 of FIG. 5 has the configuration identical to that of FIG. 2.

Here, in FIG. 5, the coefficient acquisition unit 24 stores a type coefficient described below. Further, in FIG. 5, a parameter z is supplied to the coefficient acquisition unit 24 from the outside.

The coefficient acquisition unit 24 generates the tap coefficients for each of the classes, corresponding to the parameter z from the type coefficient, acquires the tap coefficient of the class from the class classification unit 23, from the tap coefficients for each of the classes, and supplies the tap coefficient to the prediction operation unit 25.

Here, in FIG. 2, the coefficient acquisition unit 24 stores the tap coefficient itself, but in FIG. 5, the coefficient acquisition unit 24 stores the type coefficient. The type coefficient is capable of generating the tap coefficient by applying (determining) the parameter z, and from such a viewpoint, the type coefficient can be considered as information equivalent to the tap coefficient. Herein, the tap coefficient includes the tap coefficient itself, but also the type coefficient capable of generating the tap coefficient, as necessary.

Figure 6:
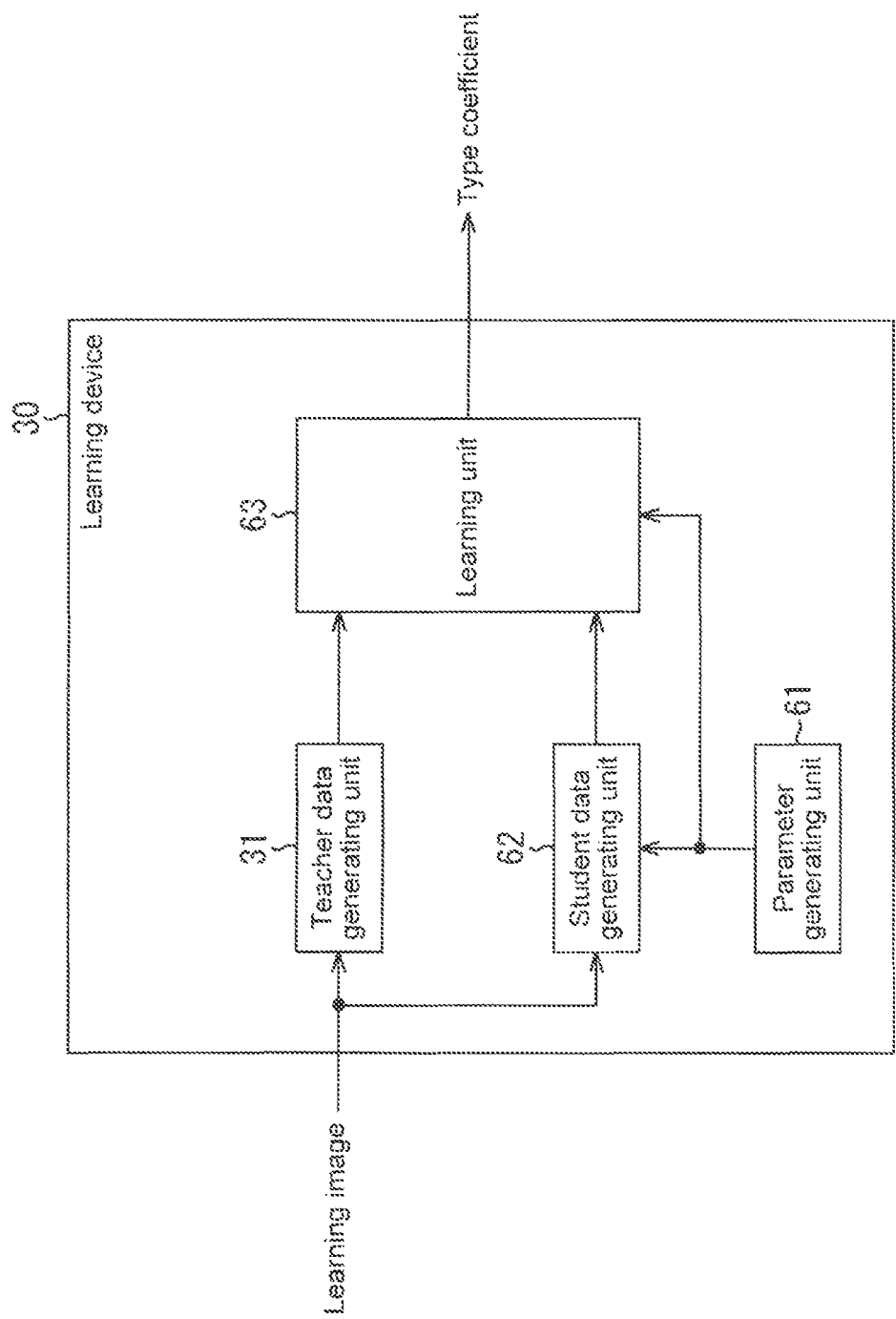
FIG. 6 is a block diagram illustrating a configuration example of the learning device performing learning of a type coefficient stored in the coefficient acquisition unit 24.

FIG. 6 is a block diagram illustrating a configuration example of the learning device performing the learning of the type coefficient stored in the coefficient acquisition unit 24.

Here, for example, as with FIG. 3, it is considered that the image having high image quality (the high quality image) is set as the second image, the image having low image quality (the low quality image) in which the spatial resolution of the high quality image decreases, is set as the first image, the prediction tap is selected from the low quality image, and the pixel value of the high image quality pixel that is the pixel of the high quality image, for example, is obtained (predicted) by the linear primary prediction operation in Expression (1), by using the prediction tap and the tap coefficient.

Here, the tap coefficient $w_n$ is generated by the following expression using the type coefficient and the parameter z.

[Expression 9]

$$W_n = \sum_{m=1}^{M} \beta_{m,n} z^{m-1} \qquad (9)$$

Here, in Expression (9), $\beta_{m,n}$ represents the m-th type coefficient used for obtaining the n-th tap coefficient $w_n$. Note that, in Expression (9), the tap coefficient $w_n$ is obtained by using N type coefficients $\beta_{1,n}, \beta_{2,n}, \ldots, \beta_{M,n}$.

Here, an expression of obtaining the tap coefficient $w_n$ the type coefficient $\beta_{m,n}$ and the parameter z, is not limited to Expression (9).

Here, a value $z^{m-1}$ determined by the parameter z in Expression (9), is defined by the following expression, by introducing a new variable $t_m$.

[Expression 10]

$$t_m = z^{m-1} (m=1,2,\ldots,M) \qquad (10)$$

Expression (10) is assigned to Expression (9), and thus, the following expression is obtained.

[Expression 11]

$$W_n = \sum_{m=1}^{M} \beta_{m,n} t_m \qquad (11)$$

According to Expression (11), the tap coefficient $w_n$ is obtained by a linear primary expression of the type coefficient $\beta_{m,n}$ and the variable $t_m$.

However, here, in a case where the true value of the pixel value of the high image quality pixel of the k-th sample is represented by $y_k$, and the prediction value of the true value $y_k$ obtained by Expression (1) is represented by $y_k'$, the prediction error $e_k$ is represented by the following expression.

[Expression 12]

$$e_k = y_k - y_k' \qquad (12)$$

Here, the prediction value $y_k'$ in Expression (12) is obtained in accordance with Expression (1), and thus, in a case where $y_k'$ in Expression (12) is substituted in accordance with Expression (1), the following expression is obtained.

[Expression 13]

$$e_k = y_k - \left( \sum_{n=1}^{N} W_n X_{n,k} \right) \qquad (13)$$

Here, in Expression (13), $x_{n,k}$ represents the n-th low image quality pixel configuring the prediction tap with respect to the high image quality pixel of the k-th sample as the corresponding pixel.

Expression (11) is assigned to $w_n$ in Expression (13), and thus, the following expression is obtained.

[Expression 14]

$$e_k = y_k - \left( \sum_{n=1}^{N} \left( \sum_{m=1}^{M} \beta_{m,n} t_m \right) x_{n,k} \right) \qquad (14)$$

The type coefficient $\beta_{m,n}$ that makes the prediction error $e_k$ in Expression (14) 0, is optimal for predicting the high image quality pixel, but in general, it is difficult to obtain such a type coefficient $\beta_{m,n}$ with respect to all of the high image quality pixels.

Therefore, for example, in a case where a least square method is adopted as the norm indicating that the type coefficient $\beta_{m,n}$ is optimal, the optimal type coefficient $\beta_{m,n}$ can be obtained by minimizing the sum E of square errors represented by the following expression.

[Expression 15]

$$E = \sum_{k=1}^{K} e_k^2 \quad (15)$$

Here, in Expression (15), K represents the number of samples (the number of samples for learning) of a set of the high image quality pixel $y_k$ as the corresponding pixel, and the low image quality pixels $x_{1,k}, y_{2,k}, \ldots, x_{N,k}$ configuring the prediction tap with respect to the high image quality pixel $y_k$.

The minimum value (the minima) of the sum E of the square errors in Expression (15), is applied by $\beta_{m,n}$ that makes a value obtained by performing partial differentiation with respect to the sum E with the type coefficient $\beta_{m,n}$ 0, as represented by Expression (16).

[Expression 16]

$$\frac{\partial E}{\partial \beta_{m,n}} = \sum_{k=1}^{K} 2 \cdot \frac{\partial e_k}{\partial \beta_{m,n}} \cdot e_k = 0 \quad (16)$$

Expression (13) is assigned to Expression (16), and thus, the following expression is obtained.

[Expression 17]

$$\sum_{k=1}^{K} t_m x_{n,k} e_k = \sum_{k=1}^{K} t_m x_{n,k} \left( y_k - \left( \sum_{n=1}^{N} \left( \sum_{m=1}^{M} \beta_{m,n} t_m \right) x_{n,k} \right) \right) = 0. \quad (17)$$

Here, $X_{i,p,j,q}$ and $Y_{i,p}$ are defined as represented in Expressions (18) and (19).

[Expression 18]

$$X_{i,p,j,q} = \sum_{k=1}^{K} x_{i,k} t_p x_{j,k} t_q \quad (18)$$

$(i = 1, 2, \ldots, N : j = 1, 2, \ldots, N : p = 1, 2, \ldots,$ $M : q = 1, 2, \ldots, M).$

[Expression 19]

$$Y_{i,p} = \sum_{k=1}^{K} x_{i,k} t_p y_k \quad (19)$$

In this case, Expression (17) can be represented by a normal equation represented in Expression (20) using $x_{i,p,j,q}$ and $Y_{i,p}$.

[Expression 20]

$$\begin{bmatrix} X_{1,1,1,1} & X_{1,1,1,2} & \ldots & X_{1,1,1,M} & X_{1,1,2,1} & \ldots & X_{1,1,N,M} \\ X_{1,2,1,1} & X_{1,2,1,2} & \ldots & X_{1,2,1,M} & X_{1,2,2,1} & \ldots & X_{1,2,N,M} \\ \vdots & \vdots & \ddots & \vdots & \vdots & \ddots & \vdots \\ X_{1,M,1,1} & X_{1,M,1,2} & \ldots & X_{1,M,1,M} & X_{1,M,2,1} & \ldots & X_{1,M,N,M} \\ X_{2,1,1,1} & X_{2,1,1,2} & \ldots & X_{2,M,1,M} & X_{2,M,2,1} & \ldots & X_{2,M,N,M} \\ \vdots & \vdots & & \vdots & \vdots & \ddots & \vdots \\ X_{N,M,1,1} & X_{N,M,1,2} & \ldots & X_{N,M,1,M} & X_{N,M,2,M} & \ldots & X_{N,M,N,M} \end{bmatrix} \quad (20)$$

$$\begin{bmatrix} \beta_{1,1} \\ \beta_{2,1} \\ \vdots \\ \beta_{M,1} \\ \beta_{1,2} \\ \vdots \\ \beta_{M,N} \end{bmatrix} = \begin{bmatrix} Y_{1,1} \\ Y_{1,2} \\ \vdots \\ Y_{1,M} \\ Y_{2,1} \\ \vdots \\ Y_{N,M} \end{bmatrix}.$$

The normal equation in Expression (20), for example, can be solved with respect to the type coefficient $\beta_{m,n}$, by using a discharge calculation (a Gauss-Jordan elimination method) or the like.

In the image conversion device 20 of FIG. 5, a plurality of high image quality pixels $y_1, y_2, \ldots, y_K$ is set as the teacher data, and the low image quality pixels $x_{1,k}, x_{2,k}, \ldots, x_{N,k}$ configuring the prediction tap with respect to each of the high image quality pixels $y_k$, are set as the student data, and the type coefficients $\beta_{m,n}$ for each of the classes, obtained by performing the learning of solving the normal equation in Expression (20) for each of the classes, are stored in the coefficient acquisition unit 24. Then, in the coefficient acquisition unit 24, the tap coefficients $w_n$, for each of the classes are generated from the type coefficient $\beta_{m,n}$, and the parameter z applied from the outside, in accordance with Expression (9), and in the prediction operation unit 25, Expression (1) is calculated by using the tap coefficient $w_n$, and the low image quality pixels (the pixels of the first image) configuring the prediction tap with respect to the target pixel, and thus, (the prediction value close to) the pixel value of the high image quality pixel (the corresponding pixel of the second image) is obtained.

FIG. 6 illustrates a configuration example of the learning device performing the learning of obtaining the type coefficients $\beta_{m,n}$ for each of the classes, by solving the normal equation in Expression (20) for each of the classes.

Note that, in the drawings, the same reference numerals will be applied to portions corresponding to those of FIG. 3, and hereinafter, the description thereof will be suitably omitted.

In FIG. 6, the learning device 30 includes the teacher data generating unit 31, a parameter generating unit 61, a student data generating unit 62, and a learning unit 63.

Therefore, the learning device 30 of FIG. 6 is common to that of FIG. 3, in that the teacher data generating unit 31 is provided.

Here, the learning device 30 of FIG. 6 is different from that of FIG. 3, in that the parameter generating unit 61 is newly provided. Further, the learning device 30 of FIG. 6 is different from that of FIG. 3, in that the student data generating unit 62 and the learning unit 63 are respectively provided instead of the student data generating unit 32 and the learning unit 33.

The parameter generating unit 61 generates several values in a possible range of the parameter z, and supplies the values to the student data generating unit 62 and the learning unit 63.

For example, in a case where a possible value of the parameter z, is set to a real number in a range of 0 to Z, the parameter generating unit 61, for example, generates the parameter z of a value of z=0, 1, 2, . . . , Z, and supplies the parameter z to the student data generating unit 62 and the learning unit 63.

The learning image identical to that supplied to the teacher data generating unit 31, is supplied to the student data generating unit 62.

The student data generating unit 62 generates the student image from the learning image, and supplies the student image to the learning unit 63, as the student data, as with the student data generating unit 32 of FIG. 3.

Here, not only the learning image, but also the several values in the possible range of the parameter z, are supplied to the student data generating unit 62 from the parameter generating unit 61.

The student data generating unit 62 performs the filtering with respect to the high quality image as the learning image, for example, with an LPF of a cutoff frequency corresponding to the parameter z to be supplied thereto, and thus, generates the low quality image as the student image, with respect to each of the several values of the parameter z.

That is, in the student data generating unit 62, Z+1 types of low quality images having different spatial resolutions, as the student image, are generated with respect to the high quality image as the learning image.

Note that, here, for example, the high quality image is filtered by using an LPF having a high cutoff frequency, as the value of the parameter z increases, and the low quality image as the student image, is generated. In this case, the low quality image as the student image, with respect to the parameter z of a large value, has a high spatial resolution.

In addition, in the student data generating unit 62, the low quality image as the student image in which a spatial resolution in one or both directions of a horizontal direction and a vertical direction of the high quality image as the learning image, decreases, can be generated in accordance with parameter z.

Further, in a case where the low quality image as the student image in which the spatial resolution in both directions of the horizontal direction and the vertical direction of the high quality image as the learning image, decreases, is generated, it is possible to separately decrease the spatial resolution in the horizontal direction and the vertical direction of the high quality image as the learning image, in accordance with a separate parameter, that is, two parameters z and z'.

In this case, in the coefficient acquisition unit 24 of FIG. 5, two parameters z and z' are applied from the outside, and the tap coefficient is generated by using two parameters z and z' and the type coefficient.

As described above, it is possible to obtain the type coefficient capable of generating the tap coefficient by using two parameters z and z', and three or more parameters, in addition to one parameter z, as the type coefficient. Here, herein, in order to simplify the description, an example of the type coefficient generating the tap coefficient, will be described by using one parameter z.

The learning unit 63 obtains the type coefficients for each of the classes by using the teacher image as the teacher data from the teacher data generating unit 31, the parameter z from the parameter generating unit 61, and the student image as the student data from the student data generating unit 62, and outputs the type coefficients.

Figure 7:
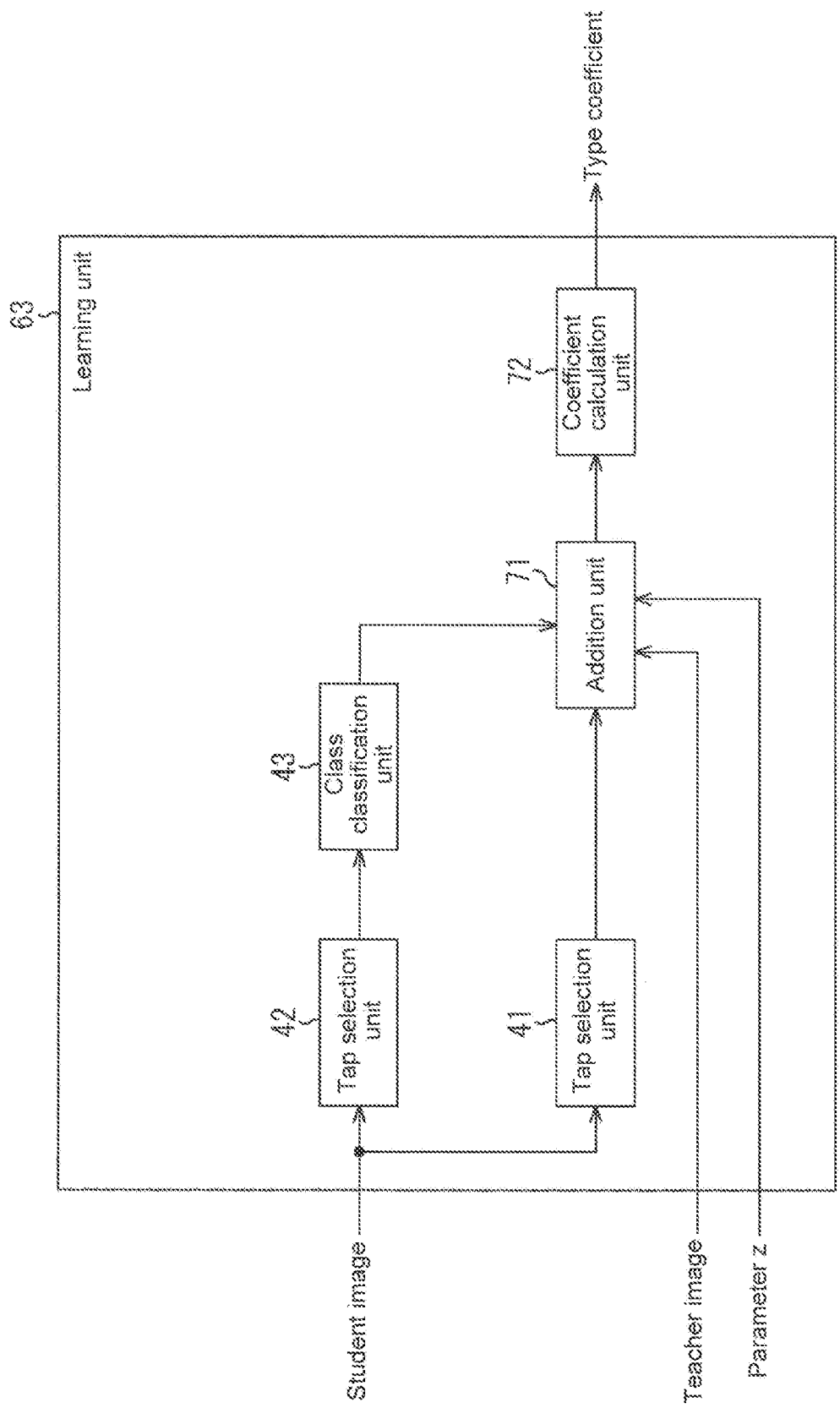
FIG. 7 is a block diagram illustrating a configuration example of a learning unit 63.

FIG. 7 is a block diagram illustrating a configuration example of the learning unit 63 of FIG. 6.

Note that, in the drawings, the same reference numerals will be applied to portions corresponding to the learning unit 33 of FIG. 4, and hereinafter, the description thereof will be suitably omitted.

In FIG. 7, the learning unit 63 includes the tap selection units 41 and 42, the class classification unit 43, an addition unit 71, and a coefficient calculation unit 72.

Therefore, the learning unit 63 of FIG. 7 is common to the learning unit 33 of FIG. 4 in that the tap selection units 41 and 42, and the class classification unit 43 are provided.

Here, the learning unit 63 is different from the learning unit 33, in that the addition unit 71 and the coefficient calculation unit 72 are respectively provided instead of the addition unit 44 and the coefficient calculation unit 45.

In FIG. 7, the tap selection units 41 and 42 respectively select the prediction tap and the class tap, from the student image generated corresponding to the parameter z generated by the parameter generating unit 61 (here, the low quality image as the student data generated by using the LPF of the cutoff frequency corresponding to the parameter z).

The addition unit 71 acquires the corresponding pixel corresponding to the target pixel, from the teacher image from the teacher data generating unit 31 of FIG. 6, and performs addition with respect to the corresponding pixel, the student data (the pixels of the student image) configuring the prediction tap configured with respect to the target pixel supplied from the tap selection unit 41, and the parameter z at the time of generating the student data, for each of the classes supplied from the class classification unit 43.

That is, the teacher data $y_k$ as the corresponding pixel corresponding to the target pixel, the prediction tap $x_{i,k}(x_{j,k})$ with respect to the target pixel output from the tap selection unit 41, and the class of the target pixel output by the class classification unit 43, are supplied to the addition unit 71, and the parameter z at the time of generating the student data configuring the prediction tap with respect to the target pixel, is supplied from the parameter generating unit 61.

Then, the addition unit 71 performs multiplication $(x_{i,k}t_p x_{j,k}t_q)$ of the student data and the parameter z for obtaining a component $x_{i,p,j,q}$ defined by Expression (18), of a matrix on a left-hand side in Expression (20), and operation corresponding to summation ($\Sigma$), for each of the classes supplied from the class classification unit 43, by using the prediction tap (the student data) $x_{i,k}(x_{j,k})$ and the parameter z. Note that, $t_p$ in Expression (18) is calculated from the parameter z, in accordance with Expression (10). The same applies to $t_q$ in Expression (18).

Further, the addition unit 71 also performs multiplication $(x_{i,k}t_p y_k)$ of the student data $x_{i,k}$, the teacher data $y_k$, and the parameter z for obtaining a component $Y_{i,p}$ defined by Expression (19), of a vector on a right-hand side in Expression (20), and operation corresponding to summation ($\Sigma$), for each of the classes supplied from the class classification unit 43, by using the prediction tap (the student data) $x_{i,k}$, the teacher data $y_k$, and the parameter z. Note that, $t_p$ in Expression (19) is calculated from the parameter z, in accordance with Expression (10).

That is, the addition unit 71 stores a component $X_{i,p,j,q}$ of the matrix on the left-hand side and a component $Y_{i,p}$ of the vector on the right-hand side in Expression (20) which is previously obtained with respect to the corresponding pixel corresponding to the target pixel, as the teacher data, in a built-in memory (not, illustrated), and adds the corresponding component $x_{j,k}t_p x_{j,k}t_q$ or $x_{i,k}t_p y_k$ (perform addition represented by the summation of the component $X_{i,p,j,q}$ in Expression (18) or the component $Y_{i,p}$ in Expression (19)) which is calculated by using the teacher data $y_k$, the student data $x_{i,k}$ ($X_{j,k}$, and the parameter z with respect to the teacher data that is the corresponding pixel corresponding to a new target pixel, with respect to the component $X_{i,p,j,q}$ of the matrix or the component of the vector.

Then, the addition unit 71 performs the addition described above with respect to the parameter z of all of the values of 0, 1, ..., Z, by using all of the pixels of the student image as the target pixel, and thus, establishes the normal equation represented in Expression (20) with respect to each of the classes, and supplies the normal equation to the coefficient calculation unit 72.

The coefficient calculation unit 72 solves the normal equation for each of the classes supplied from the addition unit 71, and thus, obtains the type coefficients $\beta_{m,n}$ for each of the classes, and outputs the type coefficients $\beta_{m,n}$.

However, in the learning device 30 of FIG. 6, the high quality image as the learning image is set as the teacher data, the low quality image in which the spatial resolution of the high quality image is degraded corresponding to the parameter z, is set as the student data, and the learning of obtaining the type coefficient $\beta_{m,n}$ that directly minimizes the sum of the square errors of the prediction value y of the teacher data predicted by the linear primary expression in Expression (1) from the tap coefficient $w_n$ and the student data $x_n$, is performed, but learning of obtaining the type coefficient $\beta_{m,n}$ that indirectly minimizes the sum of the square errors of the prediction value y of the teacher data, can be performed, as the learning of the type coefficient $\beta_{m,n}$.

That is, the high quality image as the learning image is set as the teacher data, the low quality image in which a horizontal resolution and a vertical resolution decrease by filtering the high quality image with the LPF of the cutoff frequency corresponding to the parameter z, is set as the student data, and first, the tap coefficient $w_n$ that minimizes the sum of the square errors of the prediction value y of the teacher data predicted by the linear primary prediction expression in Expression (1), is obtained for each of the values of the parameter z (here, z=0, 1, ..., Z), by using the tap coefficient $w_n$ and the student data $x_n$. Then, the tap coefficient $w_n$ obtained for each of the values of the parameter z, is set as the teacher data, the parameter z is set as the student data, and the type coefficient $\beta_{m,n}$ that minimizes the sum of the square errors of the prediction value of the tap coefficient $w_n$ as the teacher data predicted from the type coefficient $\beta_{m,n}$, and the variable $t_m$ corresponding to the parameter z that is the student data, is obtained in accordance with Expression (11).

Here, the tap coefficient $w_n$ that minimizes (miniaturizes) the sum E of the square errors of the prediction value y of the teacher data predicted by the linear primary prediction expression in Expression (1), as with the learning device 30 of FIG. 3, can be obtained with respect to each of the classes, for each of the values of the parameter z (z=0, 1, ..., Z), by solving the normal equation in Expression (8).

However, as represented by Expression (11), the tap coefficient is obtained from the type coefficient $\beta_{m,n}$ and the variable $t_m$ corresponding to the parameter z. Then, here, in a case where the tap coefficient obtained by Expression (11) is represented by $w_n'$, the type coefficient $\beta_{m,n}$ that makes an error $e_n$ between the optimal tap coefficient $w_n$ and the tap coefficient $w_n'$ obtained by Expression (11) 0, represented by Expression (21) described below, is the optimal type coefficient for obtaining the optimal tap coefficient $w_n$, but in general, it is difficult to obtain such a type coefficient $\beta_{m,n}$ with respect to all of the tap coefficient $w_n$.

[Expression 21]
$$e_n = w_n - w_n' \quad (21)$$

Note that, Expression (21) can be modified as the following expression, in accordance with Expression (11).

[Expression 22]
$$e_n = w_n - \left(\sum_{m=1}^{M} \beta_{m,n} t_m\right) \quad (22)$$

Therefore, for example, in a case where a least square method is also adopted as the norm indicating that the type coefficient $\beta_{m,n}$ is optimal, the optimal type coefficient $\beta_{m,n}$ can be obtained by minimizing the sum E of the square errors represented by the following expression.

[Expression 23]
$$E = \sum_{n=1}^{N} e_n^2 \quad (23)$$

The minimum value (the minima) of the sum E of the square errors in Expression (23), is applied by $\beta_{m,n}$ that makes a value obtained by performing partial differentiation with respect to the sum E with the type coefficient $\beta_{m,n}$ 0, as represented in Expression (24).

[Expression 24]
$$\frac{\partial E}{\partial \beta_{m,n}} = \sum_{m=1}^{M} 2 \frac{\partial e_n}{\partial \beta_{m,n}} \cdot e_n = 0 \quad (24)$$

Expression (22) is assigned to Expression (24), and thus, the following expression is obtained.

[Expression 25]
$$\sum_{m=1}^{M} t_m \left( w_n - \left(\sum_{m=1}^{M} \beta_{m,n} t_m\right)\right) = 0 \quad (25)$$

Here, $X_{i,j}$ and $Y_i$ are defined as represented in Expressions (26) and (27).

[Expression 26]
$$X_{i,j} = \sum_{z=0}^{Z} t_i t_j \quad (i = 1, 2, \ldots, M : j = 1, 2, \ldots, M) \quad (26)$$

[Expression 27]
$$Y_i = \sum_{z=0}^{Z} t_i w_n \quad (27)$$

In this case, Expression (25) can be represented by a normal equation represented in Expression (28) using $X_{i,j}$ and $Y_i$.

[Expression 28]

$$\begin{bmatrix} X_{1,1} & X_{1,2} & \cdots & X_{1,M} \\ X_{2,1} & X_{2,1} & \cdots & X_{2,2} \\ \vdots & \vdots & \ddots & \vdots \\ X_{M,1} & X_{M,2} & \cdots & X_{M,M} \end{bmatrix} \begin{bmatrix} \beta_{1,n} \\ \beta_{2,n} \\ \vdots \\ \beta_{M,n} \end{bmatrix} = \begin{bmatrix} Y_1 \\ Y_2 \\ \vdots \\ Y_M \end{bmatrix} \quad (28)$$

The normal equation in Expression (28), for example, can also be solved with respect to the type coefficient $\beta_{m,n}$, by using a discharge calculation or the like.

Figure 8:
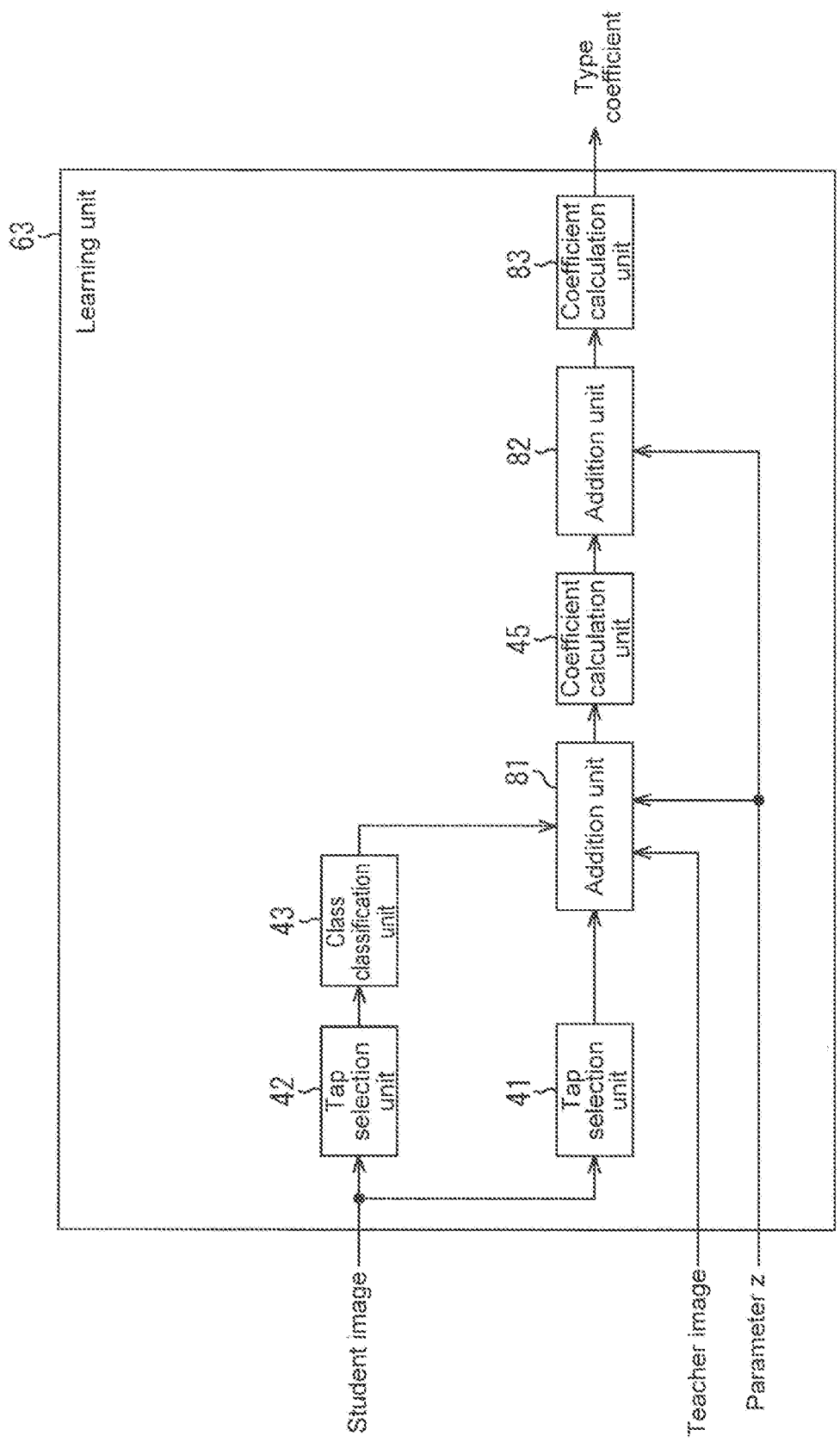
FIG. 8 is a block diagram illustrating another configuration example of the learning unit 63.

FIG. 8 is a block diagram illustrating another configuration example of the learning unit 63 of FIG. 6.

That is, FIG. 8 illustrates a configuration example of the learning unit 63 performing the learning of obtaining the type coefficient $\beta_{m,n}$ by solving the normal equation in Expression (28).

Rote that, in the drawings, the same reference numerals will be applied to portions corresponding to those of FIG. 4 or FIG. 7, and hereinafter, the description thereof will be suitably omitted.

The learning unit 63 of FIG. 8 includes the tap selection units 41 and 42, the class classification unit 43, the coefficient calculation unit 45, addition units 81 and 82, and a coefficient calculation unit 83.

Therefore, the learning unit 63 of FIG. 8 is common to the learning unit 33 of FIG. 4, in that the tap selection units 41 and 42, the class classification unit 43, and the coefficient calculation unit 45 are provided.

Here, the learning unit 63 of FIG. 8 is different from the learning unit 33 of FIG. 4, in that the addition unit 81 is provided instead of the addition unit 44, and the addition unit 82 and the coefficient calculation unit 83 are newly provided.

The class of the target pixel output by the class classification unit 43, and the parameter z output by the parameter generating unit 61 are supplied to the addition unit 81. The addition unit 81 performs addition with respect to the teacher data as the corresponding pixel corresponding to the target pixel in the teacher images from the teacher data generating unit 31, and the student data configuring the prediction tap with respect to the target pixel supplied from the tap selection unit 41, for each of the classes supplied from the class classification unit 43 and for each of the values of the parameter z output by the parameter generating unit 61.

That is, the teacher data $y_k$, the prediction tap $x_{n,k}$, the class of the target pixel, and the parameter z at the time of generating the student image configuring the prediction tap $x_{n,k}$ are supplied to the addition unit 81.

The addition unit 81 performs multiplication $(x_{n,k}x_{n',k})$ of the student data items of the matrix on the left-hand side in Expression (8), and operation of corresponding to summation ($\Sigma$), for each of the classes of the target pixel and for each of the values of the parameter z, by using the prediction tap (the student data) $x_{n,k}$.

Further, the addition unit 81 performs multiplication $(x_{n,k}y_k)$ of the student data $x_{n,k}$ and the teacher data $y_k$ of the vector on the right-hand side in Expression (8), and operation corresponding to summation ($\Sigma$), for each of the classes of the target pixel and for each of the values of the parameter z, by using the prediction tap (student data) $x_{n,k}$ and the teacher data $y_k$.

That is, the addition unit 81 stores a component ($\Sigma x_{n,k} x_{n',k}$) of the matrix on the left-hand side and a component ($\Sigma x_{n,k} y_k$) of the vector on the right-hand side in Expression (8) which are previously obtained with respect to the corresponding pixel corresponding to the target pixel, as the teacher data, in a built-in memory (not illustrated), and adds the corresponding component $x_{n,k+1}x_{n',k+1}$ or $x_{n,k+1}y_{k+1}$ (performs addition represented by the summation in Expression (8)) which is calculated by using the teacher data $y_{k+1}$ and the student data $x_{n,k+1}$ with respect to teacher data that is the corresponding pixel corresponding to a new target pixel, with respect to the component ($\Sigma x_{n,k} x_{n',k}$) of the matrix or the component ($\Sigma x_{n,k} y_k$) of the vector.

Then, the addition unit 81 performs the addition described above by using all of the pixels of the student image as the target pixel, and thus, establishes the normal equation represented in Expression (8) with respect to each of the classes, for each of the values of the parameter z, and supplies the normal equation to the coefficient calculation unit 45.

Therefore, as with the addition unit 44 of FIG. 4, the addition unit 81 establishes the normal equation in Expression (8) with respect to each of the classes. Here, the addition unit 81 is further different from the addition unit 44 of FIG. 4, in that the normal equation in Expression (8) is also established for each of the values of the parameter z.

The coefficient calculation unit 45 solves the normal equation for each of the values of the parameter z, with respect to each of the classes supplied from the addition unit 81, and thus, obtains the optimal tap coefficient $w_n$ for each of the values of the parameter z, with respect to each of the classes, and supplies the optimal tap coefficient $w_n$ to the addition unit 82.

The addition unit 82 performs addition with respect to (the variable $t_m$ corresponding to) the parameter z supplied from the parameter generating unit 61 (FIG. 6), and the optimal tap coefficient $w_n$ supplied from the coefficient calculation unit 45, for each of the classes.

That is, the addition unit 82 performs multiplication $(t_i t_j)$ of variables $t_i$ ($t_j$) corresponding to the parameter z for obtaining a component $X_{i,j}$ defined by Expression (26), of a matrix on a left-hand side in Expression (28), and operation corresponding to summation ($\Sigma$), of the for each of the classes, by using a variable $t_i$ ($t_j$) obtained by Expression (10) from the parameter z supplied from the parameter generating unit 61.

Here, the component $X_{i,j}$ is determined only by the parameter z, and has no relationship with the class, and thus, in practice, it is not necessary to calculate the component $X_{i,j}$ for each of the classes, and it is sufficient to calculate the component $X_{i,j}$ only once.

Further, the addition unit 82 performs multiplication $(t_i w_n)$ of the variable $t_i$ corresponding to the parameter z and the optimal tap coefficient $w_n$ for obtaining the component $Y_i$ defined by Expression (27), of a vector on a right-hand side in Expression (28), and operation corresponding to summation ($\Sigma$), for each of the classes, by using the variable $t_i$ obtained by Expression (10) from the parameter z supplied from the parameter generating unit 61, and the optimal tap coefficient $w_n$ supplied from the coefficient calculation unit 45.

The addition unit 82 obtains the component $X_{i,j}$ represented by Expression (26), and the component $Y_i$ represented by Expression (27), for each of the classes, and thus, establishes the normal equation in Expression (28) with respect to each of the classes, and supplies the normal equation to the coefficient calculation unit 83.

The coefficient calculation unit 83 solves the normal equation in Expression (28) for each of the classes supplied from the addition unit 82, and thus, obtains the type coefficients $\beta_{m,n}$ for each of the classes, and outputs the type coefficients $\beta_{m,n}$.

The type coefficients $\beta_{m,n}$ for each of the classes, obtained as described above, can be stored in the coefficient acquisition unit 24 of FIG. 5.

Note that, as with the learning of the tap coefficient, in the learning of the type coefficient, the type coefficient that performs various image conversion processings, can be obtained as the type coefficient, in accordance with a method of selecting an image to be the student data corresponding to the first image and the teacher data corresponding to the second image.

That is, in the above description, the learning image is set as the teacher data corresponding to the second image as it is, and the low quality image in which the spatial resolution of the learning image is degraded, is set as the student data corresponding to the first image, and the learning of the type coefficient is performed, and thus, the type coefficient that performs the image conversion processing as spatial resolution creation processing of converting the first image into the second image of which the spatial resolution is improved, can be obtained as the type coefficient.

In this case, in the image conversion device 20 of FIG. 5, the horizontal resolution and the vertical resolution of the image can be improved to a resolution corresponding to the parameter z.

In addition, for example, the high quality image is set as the teacher data, an image in which a noise of a level corresponding to the parameter z is superimposed on the high quality image as the teacher data, is set as the student data, and the learning of the type coefficient is performed, and thus, the type coefficient that performs the image conversion processing as the noise removal processing of converting the first image into the second image from which the included noise is removed (reduced), as the type coefficient. In this case, in the image conversion device 20 of FIG. 5, an image of S/N corresponding to the parameter z (an image of an intensity corresponding to the parameter z which is subjected to noise removal) can be obtained.

Note that, in the above description, the tap coefficient $w_n$ is defined by $\beta_{1,n}z^0 + \beta_{2,n}z^1 + \ldots + \beta_{M,n}z^{M-1}$, as represented in Expression (9), and the tap coefficient $w_n$ for improving both of the spatial resolutions in the horizontal direction and the vertical direction, corresponding to parameter z, is obtained in accordance with Expression (9), but the tap coefficient $w_n$ can also be obtained such that the horizontal resolution and the vertical resolution are each independently improved corresponding to independent parameters $z_x$ and $z_y$, as the tap coefficient $w_n$.

That is, the tap coefficient $w_n$, for example, is defined by a cubic expression of $\beta_{1,n}z_x^0 z_y^0 + \beta_{2,n}z_x^1 z_y^0 + \beta_{3,n}z_x^2 z_y^0 + \beta_{4,n}z_x^3 z_y^0 + \beta_{5,n}z_x^0 z_y^1 + \beta_{6,n}z_x^0 z_y^2 + \beta_{7,n}z_x^0 z_y^3 + \beta_{8,n}z_x^1 z_y^1 + \beta_{9,n}z_x^2 z_y^1 + \beta_{10,n}z_x^1 z_y^2$, instead of Expression (9), and the variable $t_m$ defined by Expression (10), for example, is defined by $t_1 = z_x^0 z_y^0$, $t_2 = z_x^1 z_y^0$, $t_3 = z_x^2 z_y^0$, $t_4 = z_x^3 z_y^0$, $t_5 = z_x^0 z_y^1$, $t_6 = z_x^0 z_y^2$, $t_7 = z_x^0 z_y^3$, $t_8 = z_x^1 z_y^1$, $t_9 = z_x^2 z_y^1$, and $t_{10} = z_x^1 z_y^2$, instead of Expression (10). In this case, the tap coefficient $w_n$ can be finally represented by Expression (11), and thus, in the learning device 30 of FIG. 6, the learning is performed by using an image in which the horizontal resolution and the vertical resolution of the teacher data are respectively degraded corresponding to the parameters $z_x$ and $z_y$, as the student data, and the type coefficient $\beta_{m,n}$ is obtained, and thus, it is possible to obtain the tap coefficient $w_n$ that independently improves each of the horizontal resolution and the vertical resolution corresponding to independent parameters $z_x$ and $z_y$.

In addition, for example, a parameter $z_t$ corresponding to a resolution in a time direction, is further introduced in addition to the parameters $z_x$ and $z_y$ corresponding to the horizontal resolution and the vertical resolution, and thus, it is possible to obtain the tap coefficient $w_n$ that independently improves each of the horizontal resolution, the vertical resolution, and a temporal resolution corresponding to independent parameters $z_x$, $z_y$, and $z_t$.

Further, in the learning device 30 of FIG. 6, the learning is performed by using an image in which the horizontal resolution and the vertical resolution of the teacher data are degraded corresponding to the parameter $z_x$, and a noise is applied to the teacher data corresponding to the parameter $z_y$, as the student data, and the type coefficient $\beta_{m,n}$ is obtained, and thus, it is possible to obtain the tap coefficient $w_n$ that improves the horizontal resolution and the vertical resolution corresponding to the parameter $z_x$, and performs noise removal corresponding to the parameter $z_y$.

<First Configuration Example of Encoding Device 11>

Figure 9:
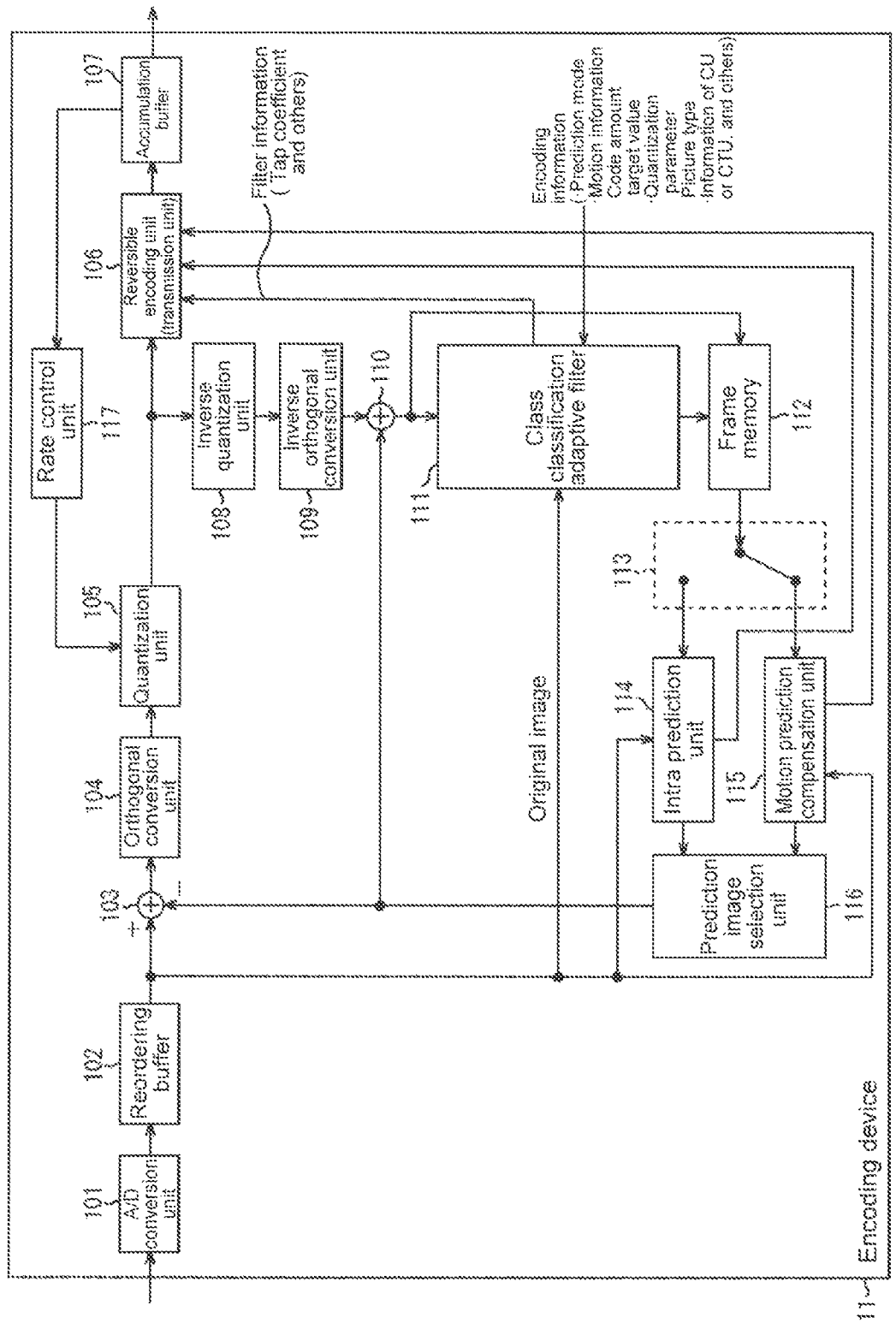
FIG. 9 is a block diagram illustrating a first configuration example of an encoding device 11.

FIG. 9 is a block diagram illustrating a first configuration example of the encoding device 11 of FIG. 1.

In FIG. 9, the encoding device 11 includes an A/D conversion unit 101, a reordering buffer 102, an operation unit 103, an orthogonal conversion unit 104, a quantization unit 105, a reversible encoding unit 106, and an accumulation buffer 107. Further, the encoding device 11 includes an inverse quantization unit 108, an inverse orthogonal conversion unit 109, an operation unit 110, a class classification adaptive filter 111, a frame memory 112, a selection unit 113, an intra prediction unit 114, a motion prediction compensation unit 115, a prediction image selection unit 116, and a rate control unit 117.

The A/D conversion unit 101 performs A/D conversion of converting an original image of an analog signal into an original image of a digital signal, and supplies the original image of the digital signal to the reordering buffer 102 to be stored.

The reordering buffer 102 reorders the frame of the original image from a display order to an encoding (decoding) order, in accordance with a group of picture (GOP), and supplies the frame of the original image to the operation unit 103, the intra prediction unit 114, the motion prediction compensation unit 115, and the class classification adaptive filter 111.

The operation unit 103 subtracts a prediction image supplied from the intra prediction unit 114 or the motion prediction compensation unit 115 through the prediction image selection unit 116, from the original image from the reordering buffer 102, and supplies a residual error (a prediction residual error) obtained by the subtraction, to the orthogonal conversion unit 104.

For example, in a case of an image subjected to inter encoding, the operation unit 103 subtracts the prediction image supplied from the motion prediction compensation unit 115, from the original image read out from the reordering buffer 102.

The orthogonal conversion unit 104 performs orthogonal conversion such as discrete cosine conversion or Karhunen-Loeve conversion, with respect to the residual error supplied from the operation unit 103. Note that, an orthogonal conversion method is arbitrary. The orthogonal conversion unit 104 supplies a conversion coefficient obtained by orthogonal exchange, to the quantization unit 105.

The quantization unit 105 quantizes the conversion coefficient supplied from the orthogonal conversion unit 104. The quantization unit 105 sets a quantization parameter QP on the basis of a target value of a code amount (a code amount target value) supplied from the rate control unit 117, and quantizes the conversion coefficient. Note that, a quantization method is arbitrary. The quantization unit 105 supplies the quantized conversion coefficient to the reversible encoding unit 106.

The reversible encoding unit 106 encodes the conversion coefficient quantized in the quantization unit 105, in a predetermined reversible encoding system. The conversion coefficient is quantized under the control of the rate control unit 117, and thus, a code amount of encoding data obtained by reversible encoding of the reversible encoding unit 106, is the code amount target value set by the rate control unit 117 (or approximates to the code amount target value).

In addition, the reversible encoding unit 106 acquires necessary encoding information in encoding information relevant to the prediction encoding of the encoding device 11, from each block.

Here, examples of the encoding information include a prediction mode of intra prediction or inter prediction, motion information of a motion vector or the like, the code amount target value, the quantization parameter QP, a picture type (I, P, and B), information of coding unit (CU) or coding tree unit (CTU), and the like.

For example, the prediction mode can be acquired from the intra prediction unit 114 or the motion prediction compensation unit 115. In addition, for example, the motion information can be acquired from the motion prediction compensation unit 115.

The reversible encoding unit 106 acquires the encoding information, and acquires filter information relevant to class classification adaptive processing of the class classification adaptive filter 111, from the class classification adaptive filter 111. In FIG. 9, the filter information includes the tap coefficients for each of the classes, as necessary.

The reversible encoding unit 106 encodes the encoding information and the filter information, in an arbitrary reversible encoding system, and sets the encoding information and the filter information as a part of header information of the encoding data (multiplexing).

The reversible encoding unit 106 transmits the encoding data through the accumulation buffer 107. Therefore, the reversible encoding unit 106 functions as a transmission unit transmitting the encoding data, and the encoding information or the filter information included in the encoding data.

For example, variable length encoding, arithmetic encoding, or the like can be adopted as a reversible encoding system of the reversible encoding unit 106. Examples of the variable length encoding include context-adaptive variable length coding (CAVLC) determined by an H.264/AVC system, and the like. Examples of the arithmetic encoding include context-adaptive binary arithmetic coding (CABAC) or the like.

The accumulation buffer 107 temporarily accumulates the encoding data supplied from the reversible encoding unit 106. The encoding data accumulated in the accumulation buffer 107 is read out and transmitted at a predetermined timing.

The conversion coefficient quantized in the quantization unit 105, is supplied to the reversible encoding unit 106, and is also supplied to the inverse quantization unit 108. The inverse quantization unit 108 performs inverse quantization with respect to the quantized conversion coefficient, by a method corresponding to the quantization of the quantization unit 105. An inverse quantization method may be any method insofar as being a method corresponding to quantization processing of the quantization unit 105. The inverse quantization unit 108 supplies the conversion coefficient obtained by the inverse quantization, to the inverse orthogonal conversion unit 109.

The inverse orthogonal conversion unit 109 performs inverse orthogonal conversion with respect to the conversion coefficient supplied from the inverse quantization unit 108, by a method corresponding to orthogonal conversion processing of the orthogonal conversion unit 104. An inverse orthogonal conversion method may be any method insofar as being a method corresponding to the orthogonal conversion processing of the orthogonal conversion unit 104. An output subjected to the inverse orthogonal conversion (the restored residual error) is supplied to the operation unit 110.

The operation unit 110 adds the prediction image supplied from the intra prediction unit 114 or the motion predict on compensation unit 115 through the prediction image selection unit 116, to an inverse orthogonal conversion result supplied from the inverse orthogonal conversion unit 109, that is, the restored residual error, and outputs an addition result as an image during decoding in the middle of decoding.

The image during decoding output by the operation unit 110, is supplied to the class classification adaptive filter 111 or the frame memory 112.

The class classification adaptive filter 111 performs the ILF processing with an ILF, that is, a filter that functions as all of a DF, an SAO, and an in accordance with the class classification adaptive processing.

The image during decoding is supplied to the class classification adaptive filter 111 from the operation unit 110, an original image corresponding to the image during decoding is supplied to the class classification adaptive filter 111 from the reordering buffer 102, and necessary encoding information is supplied to the class classification adaptive filter 111 from each block of the encoding device 11.

The class classification adaptive filter 111 performs the learning of obtaining the tap coefficients for each of the classes by using the student image corresponding to the image during decoding from the operation unit 110, and the teacher image corresponding to the original image from the reordering buffer 102, and as necessary, by using the encoding information.

That is, the class classification adaptive filter 111, for example, sets the image during decoding itself from the operation unit 110, as the student image, sets the original image itself from the reordering buffer 102, as the teacher image, and as necessary, performs the learning of obtaining the tap coefficients for each of the classes, by using the encoding information. The tap coefficients for each of the classes are supplied to the reversible encoding unit 106 from the class classification adaptive filter as the filter information.

Further, the class classification adaptive filter 111 sets the image during decoding from the operation unit 110, as the first image, and performs (image conversion according to) the class classification adaptive processing using the tap coefficients for each of the classes, by using the encoding information as necessary, and thus, converts the image during decoding as the first image, into a filtered image as the second image corresponding to the original image (generates the filtered image) to be output.

The filtered image output by the class classification adaptive filter 111, is supplied to the frame memory 112.

Here, in the class classification adaptive filter 111, as described above, the image during decoding is set as the student image, the original image is set as the teacher image, and the learning is performed, and thus, the class classification adaptive processing of converting the image during decoding into the filtered image, is performed by using tap coefficient obtained by the learning. Therefore, the filtered image obtained by the class classification adaptive filter 111, is an image extremely close to the original image.

The frame memory 112 temporarily stores the image during decoding supplied from the operation unit 110 or the filtered image supplied from the class classification adaptive filter 111, as a decoding image subjected to local decoding. The decoding image stored in the frame memory 112 is supplied to the selection unit 113 at a necessary timing, as a reference image used for generating the prediction image.

The selection unit 113 selects a supply destination of the reference image supplied from the frame memory 112. For example, in a case where the intra prediction is performed by the intra prediction unit 114, the selection unit 113 supplies the reference image supplied from the frame memory 112, to the intra prediction unit 114. In addition, for example, in a case where the inter prediction is performed by the motion prediction compensation unit 115, the selection unit 113 supplies the reference image supplied from the frame memory 112, to the motion prediction compensation unit 115.

The intra prediction unit 114 performs the intra prediction (in-screen prediction) by using the original image supplied from the reordering buffer 102, and the reference image supplied from the frame memory 112 through the selection unit 113, and by basically setting prediction unit (PU) as processing unit. The intra prediction unit 114 selects an optimal intra prediction mode, on the basis of a predetermined cost function (for example, a rate-distortion (RD) cost), and supplies a prediction image generated in the optimal intra prediction mode, to the prediction image selection unit 116. In addition, as described above, the intra prediction unit 114 suitably supplies a prediction mode indicating the intra prediction mode selected on the basis of the cost function, to the reversible encoding unit 106 or the like.

The motion prediction compensation unit 115 performs motion prediction (the inter prediction) by using the original image supplied from the reordering buffer 102, and the reference image supplied from the frame memory 112 through the selection unit 113, and by basically setting PU as processing unit. Further, the motion prediction compensation unit 115 performs motion compensation according to a motion vector detected by the motion prediction, and generates the prediction image. The motion prediction compensation unit 115 performs the inter prediction in a plurality of inter prediction modes prepared in advance, and generates the prediction image.

The motion prediction compensation unit 115 selects an optimal inter prediction mode, on the basis of a predetermined cost function of the prediction images obtained with respect to each of the plurality of inter prediction modes. Further, the motion prediction compensation unit 115 supplies the prediction image generated in the optimal inter prediction mode, to the prediction image selection unit 116.

In addition, the motion prediction compensation unit 115 supplies the prediction mode indicating the inter prediction mode selected on the basis of the cost function, the motion information of the motion vector or the like, necessary at the time of decoding the encoding data encoded in the inter prediction mode, and the like, to the reversible encoding unit 106.

The prediction image selection unit 116 selects a supply source of the prediction image supplied to the operation units 103 and 110 (the intra prediction unit 114 or the motion prediction compensation unit 115), and supplies the prediction image supplied from the supply source of the selected operation unit, to the operation units 103 and 110.

The rate control unit 117 controls the rate of a quantization operation of the quantization unit 105 such that the overflow or the underflow does not occur, on the basis of the code amount of the encoding data accumulated in the accumulation buffer 107. That is, the rate control unit 117 sets a target code amount of the encoding data such that the overflow and the underflow of the accumulation buffer 107 do not occur, and supplies the target code amount to the quantization unit 105.

<Configuration Example of Class Classification Adaptive Filter 111>

Figure 10:
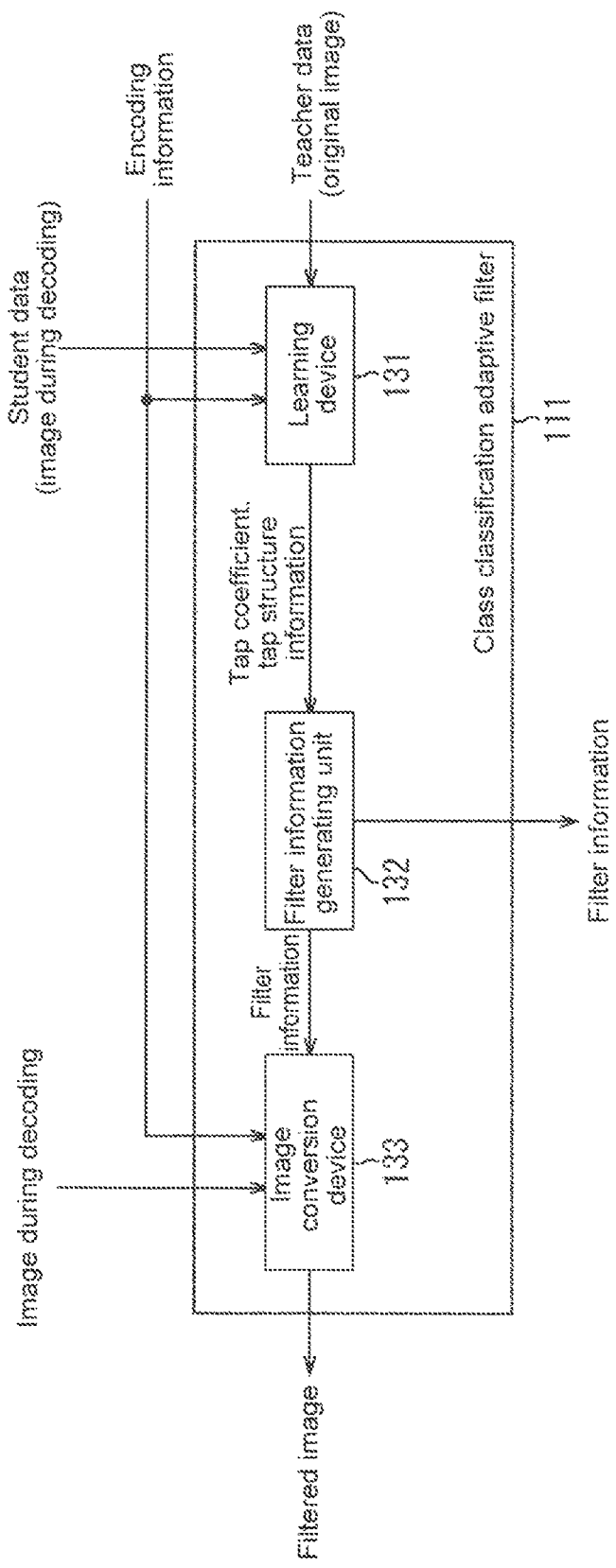
FIG. 10 is a block diagram illustrating a configuration example of a class classification adaptive filter 111.

FIG. 10 is a block diagram illustrating a configuration example of the class classification adaptive filter 111 of FIG. 9.

In FIG. 10, the class classification adaptive filter 111 includes a learning device 131, a filter information generating unit 132, and an image conversion device 133.

The original image is supplied to the learning device 131 from the reordering buffer 102 (FIG. 9), and the image during decoding supplied to the learning device 131 from the operation unit 110 (FIG. 9). Further, the encoding information is supplied to the learning device 131.

The learning device 131 sets the image during decoding as the student data, sets the original image as the teacher data, and performs the learning of obtaining the tap coefficients for each of the classes (hereinafter, also referred to as tap coefficient learning).

Further, the learning device 131 supplies tap structure information indicating the tap coefficients for each of the classes, obtained by the tap coefficient learning, and the tap structure of the class tap used for obtaining the tap coefficients for each of the classes, to the filter information generating unit 132.

Note that, in the tap coefficient learning, the learning device 131 is capable of performing the class classification, by using the encoding information as necessary.

The filter information generating unit 132 generates the filter information including the tap coefficients for each of the classes from the learning device 131, and the tap structure information as necessary, and supplies the filter information to the image conversion device 133 and the reversible encoding unit 106 (FIG. 9).

the filter information is supplied to the image conversion device 133 from the filter information generating unit 132, the image during decoding supplied to the image conversion device 133 from the operation unit 110 (FIG. 9), and the encoding information is supplied to the image conversion device 133.

The image conversion device 133, for example, sets the image during decoding as the first image, and performs the image conversion according to the class classification adaptive processing using the tap coefficients for each of the classes included in the filter information from the filter information generating unit 132, and thus, converts the image during decoding as the first image into the filtered image as the second image corresponding to the original image (generates the filtered image), and supplies the filtered image to the frame memory 112 (FIG. 9).

Note that, in the class classification adaptive processing, the image conversion device 133 is capable of performing the class classification, by using the encoding information as necessary.

Here, in a general ALF, the class classification using an edge intensity and a direction difference of the class tap, is performed, but the tap structure of the class tap is fixed, but is not updated (switched).

In a case where the tap structure of the class tap is fixed, there is a case where it is difficult to suitably classify the image during decoding, due to a difference in the spatial resolution or the temporal resolution of the image during decoding, and a difference in the other (local) features of the image during decoding. In this case, even in a case where the filter processing corresponding to the class of the image during decoding, is performed with respect to the image during decoding, it is difficult to sufficiently obtain an image quality improvement effect with respect to the filtered image obtained by the filter processing.

Therefore, in the image processing system of FIG. 1, the image during decoding is suitably subjected to the class classification, in accordance with a difference is the feature of the image during decoding, the filter processing suitable for the feature of the image during decoding is performed as the filter processing corresponding to the class of the image during decoding, the tap structure of the class tap is adaptively updated (switched) for each predetermined picture sequence of the image during decoding, in order to greatly improve S/N of the filtered image obtained by the filter processing, and the image during decoding is classified to a class suitable for the feature of the image during decoding.

Further, in the image processing system of FIG. 1, for example, the filter processing the tap coefficients for each of the classes, obtained by the tap coefficient learning using the class tap of the tap structure after being updated, is performed with respect to the image during decoding, and thus, the filter processing suitable for the feature of the image during decoding, is performed, and S/N of the filtered image obtained by the filter processing, is greatly improved.

That is, in a case where the class classification of the image during decoding is performed, and the filter processing corresponding to the class of the image during decoding, is performed with respect to the image during decoding, and thus, the filtered image is obtained, in the class classification, the images during decoding of which the features are similar to each other (identical to each other), are classified to the same class, and the images during decoding of which the features are not similar to each other, are classified to different classes, and thus, it is possible to increase the image quality improvement effect of the filtered image.

The feature of the image (an edge, a texture, or the like), includes various features, and in a case where the class classification of the image during decoding that is capable of having such various features, is performed by using the class tap of the fixed tap structure, there is a case where the image during decoding is not classified to a suitable class. That is, in the class classification, there is a case where the image during decoding is classified to a class identical to a class to which another image during decoding of which the feature is not considerably similar to the feature of the image during decoding.

Thus, in a case where a plurality of images during decoding of which the features are not considerably similar to each other, is classified to the same class, the image quality improvement effect of the filtered image obtained by the filter processing corresponding to the class, decreases, compared to a case where a plurality of images during decoding of which the features are similar to each other, is classified to the same class.

In the image processing system of FIG. 1, the tap structure of the class tap is adaptively updated, and thus, in the class classification, the plurality of images during decoding of which the features are not considerably similar to each other, is prevented from being classified to the same class, and the image during decoding is classified to a class suitable for the feature of the image during decoding.

Therefore, in the image processing system of FIG. 1, it is possible to increase the image quality improvement effect of the filtered image, that is, to greatly improve S/N of the filtered image, compared to a case where the class classification is performed by using the class tap of the fixed tap structure.

Further, in the image processing system of FIG. 1, the tap structure of the class tap is adaptively updated, and thus, even in a case of performing the class classification of the same number of classes as that of the class classification using the class tap of the fixed tap structure (the number of classes that can be subjected to the classification according to the class classification), it is possible to greatly improve S/N of the filtered image. In this case, the residual error obtained by using the filtered image as the reference image, decreases, and thus, it is possible to improve a compression efficiency.

Note that, a plurality of classes is prepared as the class that can be subjected to the classification according to the class classification, and thus, it is possible to classify the image during decoding into a suitable class according to the feature of the image during decoding.

However, in a case of adopting the class classification in which the classification can be performed with respect to the plurality of classes, a data amount of the tap coefficients for each of the classes, increases, and thus, in a case where the tap coefficients for each of the classes, and the like are transmitted to the decoding device 12 from the encoding device 11, the overhead increases, and the compression efficiency is degraded.

Therefore, it is desirable that the number of classes (the number of classes that can be subjected to the classification according to the class classification), is not large, from the viewpoint of practicality.

In the image processing system of FIG. 1, the tap structure of the class tap is adaptively updated, and thus, even in a case of adopting the class classification in which the number of classes is not considerably large, the image during decoding is classified to a suitable class according to the feature of the image during decoding, S/N of the filtered image obtained by the filter processing, can be greatly improved, and the degradation of the compression efficiency can be suppressed.

Here, in a case where the tap structure of the class tap is adaptively updated, the tap coefficients for each of the classes, obtained by the tap coefficient learning using the class tap of the tap structure after being updated, and the like are transmitted to the decoding device 12 from the encoding device 11, the overhead increases, and the compression efficiency is degraded, as the frequency of the transmission increases.

However, in a case where a mutual relationship in the time direction of the image during decoding (and the original image) is high, it is possible to maintain S/N of the filtered image even in a case where the class classification using the tap structure identical to that at the time of updating the last-minute tap structure, as the tap structure of the class tap, is performed, and the filter processing using the tap coefficients for each of the classes, identical to those at the time of updating the last-minute tap structure, is performed.

Further, in a case where the class classification using the tap structure identical to that at the time of updating the last-minute tap structure, as the tap structure of the class tap, is performed, and the filter processing using the tap coefficients for each of the classes, identical to those at the time of updating the last-minute tap structure, is performed, in the decoding device 12, it is possible to continuously use the tap coefficients for each of the classes which have been used until immediately before. Therefore, it is not necessary to transmit new tap coefficients for each of the classes, and the like to the decoding device 12 from the encoding device 11, and the compression efficiency can be improved.

On the other hand, in a case where the mutual relationship in the time direction of the image during decoding is low, that is, for example, in a case where the sequence of the image during decoding includes a scene of a complicated motion or a scene change, the image quality improvement effect of the filtered image decreases, and the compression efficiency is degraded by the decrease in a case where the class classification using the tap structure identical to that at the time of updating the last-minute tap structure, as the tap structure of the class tap, is performed, and the filter processing using the tap coefficients for each of the classes, identical to those at the time of updating the last-minute tap structure, is performed, with respect to the image during decoding of which the scene is greatly changed due to the scene change or the like.

Therefore, in the image processing system of FIG. 1, the image during decoding of which the mutual relationship in the time direction is low, is (directly or indirectly) detected, and the tap structure of the class tap is updated, and using the tap coefficients for each of the classes, and the filter processing obtained by the tap coefficient learning using the class tap of the tap structure after being updated, is performed, with respect to the image during decoding (the subsequence), and thus, it is possible to prevent the compression efficiency from being degraded.

Here, in a case where the image during decoding of which the mutual relationship in the time direction is low, is detected, the tap structure of the class tap is updated, and the filter processing using the tap coefficients for each of the classes, obtained by the tap coefficient learning using the class tap of the tap structure, is performed, tap structure of the class tap can be frequently updated, and the tap coefficients for each of the classes, obtained by the tap coefficient learning using the class tap of the tap structure after being updated, and the like can be frequently transmitted (to the decoding device 12 from encoding device 11), with respect to the sequence of the image during decoding in which a scene having a low mutual relationship in the time direction, continues. In a case where the tap coefficients for each of the classes and the like are frequently transmitted, the compression efficiency is degraded.

Therefore, in the image processing system of FIG. 1, it is possible to prepare the tap structure of the class tap in which the average image quality improvement effect can be expected (hereinafter, also referred to as the average structure), and tap coefficients for each of the classes, obtained by the tap coefficient learning using the class tap of the tap structure (hereinafter, also referred to as the average tap coefficient).

The class classification using the class tap of the average structure, and the filter processing using the average tap coefficient are applied to the scene of the image during decoding in which the scene having a low mutual relationship in the time direction, continues, and thus, it is possible to prevent the compression efficiency from being degraded due to the frequent transmission of the tap coefficients for each of the classes, and the like.

As described above, in order to greatly improve S/N of the filtered image, and to prevent the compression efficiency from being degraded, in the class classification adaptive filter 111 of FIG. 10, the learning device 131 adopts a plurality of tap structures as the tap structure of the class tap, and performs the tap coefficient learning with respect to the plurality of tap structures, and thus, obtains the tap coefficients for each of the classes.

Further, the learning device 131 obtains a tap structure evaluation value indicating adequateness of using the class tap of the tap structure in the class classification, with respect to each of the plurality of tap structures, and selects a tap structure having the most excellent tap structure evaluation value in the plurality of tap structures, as an optimal tap structure.

Then, the learning device 131 supplies the tap structure information indicating the optimal tap structure, and the tap coefficients for each of the classes with respect to the optimal tap structure (the tap coefficients for each of the classes, obtained by the tap coefficient learning using the class tap of the optimal tap structure), to the filter information generating unit 132.

Here, for example, S/N of the corresponding image corresponding to the original image as the teacher data, obtained by performing the filter processing using the tap coefficients for each of the classes with respect to the tap structure (here, for example, the class classification adaptive processing), with respect to a result image during decoding as the student data, and the like can be adopted as the tap structure evaluation value of each of the plurality of tap structures.

In addition, for example, an RD cost in a case of encoding the original image as the teacher data by adopting the filter processing using the tap coefficients for each of the classes with respect to the tap structure, and the like can be adopted as the tap structure evaluation value of each of the plurality of tap structures.

The filter information generating unit 132 generates the filter information including the tap coefficients for each of the classes and the tap structure information from the learning device 131, as necessary.

In the filter information, a flag as copy information indicating whether or not to use the tap structure and the tap coefficients for each of the classes, identical to those at the time of updating the last-minute tap structure and the tap coefficient, as the tap structure of the class tap and the tap coefficients for each of the classes, and the like can be included instead of the tap coefficients for each of the classes and the tap structure information, or along with the tap coefficients for each of the classes and the tap structure information.

In the filter information, the copy information is included without including the tap coefficients for each of the classes and the tap structure information, and thus, it is possible to greatly reduce the data amount of the filter information, and to improve the compression efficiency, compared to a case of including the tap coefficients for each of the classes and the tap structure information.

In the filter information generating unit 132, the copy information indicating that the tap structure and the tap coefficients for each of the classes, identical to those at the time of updating the last-minute tap structure and the tap coefficient, are used as the tap structure of the class tap and the tap coefficients for each of the classes, for example, can be included in the filter information in a case where the most recent tap structure information supplied from the learning device 131 is coincident with the previous tap structure information supplied from the learning device 131, in a case where the mutual relationship in the time direction between the sequence of the original image used in the current tap coefficient learning and the sequence of the original image used in the previous tap coefficient learning, is high, and the like.

For example, an arbitrary picture sequence such as a plurality of frames (pictures), one frame, CU, or a block, is adopted as tap structure update unit for updating the tap structure of the class tap (and the tap coefficient), and thus, it is possible to update the tap structure of the class tap at a timing when the tap structure update unit is the minimum unit.

For example, in a case where the present technology is applied to the HEVC an encoding system equivalent to the HEVC), the filter information, for example, can be included in the encoding data, as a sequence parameter set syntax, when the plurality of frames is adopted as the tap structure update unit.

In addition, the filter information, for example, can be included in the encoding data, as a picture parameter set syntax, when one frame is adopted as the tap structure update unit.

Further, in a case where the block such as CU, is adopted as the tap structure update unit, the filter information, for example, can be included in encoding data, as a slice data syntax.

In addition, the filter information can be included in a plurality of arbitrary layers such as the sequence parameter set syntax, the picture parameter set syntax, and the slice data syntax.

In this case, filter information of a layer having a finer granularity in the filter information items included in the plurality of layers, can be preferentially applied a certain block. For example, when the filter information is included in both of the sequence parameter set syntax and the slice data syntax with respect to a certain block, the filter information included in the slice data syntax, can be preferentially applied to the block.

The tap structure of the class tap, for example, can be represented by a position relationship of each of the pixels to be the class tap, with respect to the target pixel (including both of a spatial position relationship and a temporal position relationship).

Therefore, in a case where the number of pixels to be the class tap is different, or in a case where a shape formed by the pixels to be the class tap (hereinafter, also referred to as a class tap shape) is different, the tap structure is different.

Further, even in a case where the number of the pixels to be the class tap is the same, and the class tap shape is the same (congruent), the tap structure is different in a case where the position of the class tap shape with respect to the target pixel is different. The class tap in which the position of the class tap shape with respect to the target pixel, for example, indicates a class tap in which the class tap shape is centered on the position of the target pixel, and a class tap in which the class tap shape is centered on a position shifted from the target pixel.

In addition, even in a case where the number of pixels to be the class tap is the same, the tap structure is different in a case where the density of the pixels to be the class tap is different, and thus, the class tap shape is homothetic. This is because in a case where the class tap shape is homothetic, the position relationships of all of the pixels to be the class tap with respect to the target pixel are not coincident with each other.

Position information of the pixels to be the class tap of the tap structure with respect to the target pixel, can be adopted as the tap structure information indicating the tap structure of the class tap.

In a case where the position information of the pixels to be the class tap, is adopted as the tap structure information, the data amount of the tap structure information increases, but the tap structure of the class tap can be flexibly controlled.

In addition, for example, it is premised that a unique identification (ID) assigned to each of the plurality of tap structures, can be adopted as the tap structure information. In this case, the plurality of tap structures is determined in advance, the ID is assigned to each of the plurality of tap structures, and each of the tap structures and the ID assigned to the tap structure are shared between the encoding device 11 and the decoding device 12, as previous knowledge.

In a case where the unique ID assigned to the tap structure, is adopted as the tap structure information, the flexibility of the tap structure of the class tap decreases, but the data amount of the tap structure information can be reduced.

Further, for example, it is premised that a set of position information items of a predetermined point such as the unique ID assigned to each of a plurality of class tap shapes (hereinafter, also referred to as a shape ID), the number of pixels to be the class tap, and the center of the class tap shape, with respect to the target pixel, can be adopted as the tap structure information. In this case, it is premised that the plurality of class tap shapes are determined in advance, the shape ID is assigned to each of the plurality of class tap shapes, and each of the class tap shapes and the shape ID assigned to the class tap shape are shared between the encoding device 11 and the decoding device 12, as previous knowledge.

In a case where the set of the position information items of the predetermined point such as the shape ID, the number of pixels to be the class tap, and the center of the class tap shape, is adopted as the tap structure information, the flexibility of the tap structure of the class tap can be ensured to a certain degree, and the data amount of the tap structure information can be reduced to a certain degree.

<Configuration Example of Learning Device 131>

Figure 11:
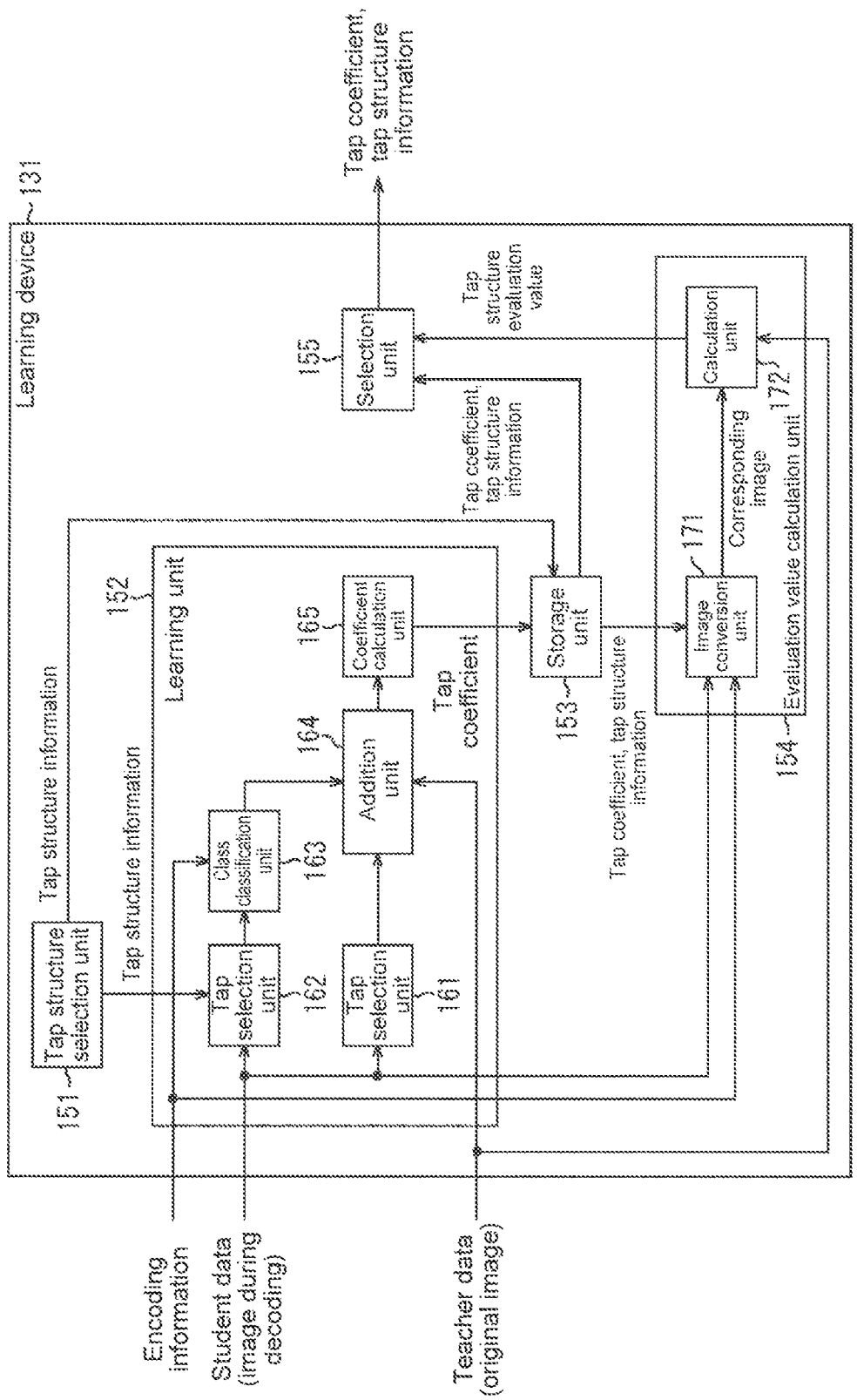
FIG. 11 is a block diagram illustrating a configuration example of a learning device 131.

FIG. 11 is a block diagram illustrating a configuration example of the learning device 131 of FIG. 10.

In FIG. 11, the learning device 131 includes a tap structure selection unit 151, a learning unit 152, a storage unit 153, an evaluation value calculation unit 154, and a selection unit 155.

The tap structure selection unit 151, for example, stores (information of) candidates of the plurality of tap structures, determined in advance, and sequentially selects the candidates of the plurality of tap structures, as the target tap structure. Then, the tap structure selection unit 151 supplies the tap structure information indicating the target tap structure to (a tap selection unit 162 of) the learning unit 152, and the storage unit 153.

The learning unit 152 includes tap selection units 161 and 162, a class classification unit 163, an addition unit 164, and a coefficient calculation unit 165.

Each of the tap selection unit 161 to the coefficient calculation unit 165 performs the processing identical to that of each of the tap selection unit 41 to the coefficient calculation unit 45 configuring the learning unit 33 of FIG. 4.

The image during decoding as the student data, the original image as the teacher data, and the encoding information are supplied to the learning unit 152. Then, in the learning unit 152, the tap coefficient learning identical to that of the learning unit 33 of FIG. 4, is performed by using the image during decoding as the student data and the original image as the teacher data, and by using the encoding information as necessary, and thus, the tap coefficients for each of the classes are obtained.

Here, in the learning unit 152, the tap structure information is supplied to the tap selection unit 162 from the tap structure selection unit 151.

As with the tap selection unit 42 of FIG. 4, the tap selection unit 162 selects the pixels to be the class tap from the pixels of the image during decoding, with respect to the target pixel, and thus, configures the class tap with the pixels, and at this time, the class tap of the tap structure indicated by the tap structure information is configured in accordance with the tap structure information from the tap structure selection unit 151.

Then, the class classification unit 163 performs the class classification of the target pixel, by using the class tap configured by the tap selection unit 162.

Note that, in the class classification unit 163, the class classification of the target pixel can be performed by using the class tap of the target pixel, and by using the encoding information of the target pixel.

For example, a block phase indicating the position of the target pixel in the block such as CU or PU including the target pixel, a picture type of a picture including the target pixel, a quantization parameter QP of PU including the target pixel, and the like can be adopted as the encoding information of the target pixel used in the class classification.

In a case where the block phase is adopted as the encoding information of the target pixel used in the class classification, for example, it is possible to perform the class classification of the target pixel according to whether or not the target pixel is a pixel on a block boundary.

In addition, in a case where the picture type is adopted as the encoding information of the target pixel used in the class classification, for example, it is possible to perform the class classification of the target pixel according to whether the picture including the target pixel, is an I picture, a P picture, or a B picture.

Further, in a case where the quantization parameter QP is adopted as the encoding information of the target pixel used in the class classification, for example, it is possible to perform the class classification of the target pixel according to the roughness (fineness) of the quantization.

In the class classification using the class tap and the encoding information of the target pixel, the target pixel is classified to a first subclass by using the class tap, and is classified to a second subclass by using the encoding information, and thus, it is possible to obtain the (final) class of the target pixel from the first subclass and the second subclass class. For example, it is possible to obtain a value in which a bit sequence indicating the first subclass and a bit sequence indicating the second subclass are arranged in one bit sequence, as (a class code indicating) the class of the target pixel.

In the learning unit 152, the tap coefficient learning is performed with respect to each of (the candidates of) the plurality of tap structures stored in the tap structure selection unit 151, and the tap coefficients for each of the classes are obtained.

Then, the learning unit 152 supplies the tap coefficients for each of the classes, obtained by performing the tap coefficient learning with respect to each of the plurality of tap structures, to the storage unit 153.

The storage unit 153 stores the tap structure information indicating the target tap structure, supplied from the tap structure selection unit 151, and the tap coefficients for each of the classes with respect to the target tap structure supplied from the learning unit 152 to be associated with each other.

The evaluation value calculation unit 154 obtains the tap structure evaluation value indicating the adequateness of using the class tap of the tap structure in the class classification, with respect to (the candidates of) the plurality of tap structures stored in the tap structure selection unit 151, and supplies the tap structure evaluation value to the selection unit 155.

The image during decoding as the student data, identical to that supplied to the learning unit 152, the original image as the teacher data, and the encoding information are supplied to the evaluation value calculation unit 154.

The evaluation value calculation unit 154 includes an image conversion unit 171 and a calculation unit 172.

The image conversion unit 171 sets the image during decoding supplied to the evaluation value calculation unit 154, as the first image, and performs the class classification adaptive processing, and thus, converts the image during decoding as the first image into the corresponding image corresponding to the original image as the second image, and supplies the corresponding image to the calculation unit 172.

That is, the image conversion unit 171 performs the class classification adaptive processing with respect to each of a plurality of tap structures information items stored in the storage unit 153 (the tap structure information with respect to each of the plurality of tap structures stored in the tap structure selection unit 151), by using the tap structure information, and the tap coefficients for each of the classes, associated with the tap structure information.

Specifically, the image conversion unit 171 configures the class tap of the tap structure indicated by the tap structure information, and performs the class classification adaptive processing of performing the filter processing using the tap coefficients for each of the classes, associated with the tap structure information (here, for example, the prediction operation in Expression (1)), with respect to each of the plurality of tap structures information items stored in the storage unit 153.

Then, the image conversion unit 171 supplies the corresponding image obtained with respect to each of the plurality of tap structures information items, to the calculation unit 172.

The calculation unit 172, for example, obtains a value corresponding to S/N of the corresponding image, as the tap structure evaluation value, by using the corresponding image obtained with respect to each of the plurality of tap structures information items from the image conversion unit 171, and the original image as the teacher data, and supplies the value to the selection unit 155.

The selection unit 155 selects the tap structure information having the most excellent tap structure evaluation value supplied from (the calculation unit 172 of) the evaluation value calculation unit 154, in the tap structure information items stored in the storage unit 153, as the tap structure information indicating the optimal tap structure. Further, the selection unit 155 selects the tap coefficients for each of the classes, associated with the tap structure information indicating the optimal tap structure (hereinafter, also referred to as the tap coefficients for each of the classes with respect to the optimal tap structure), in the tap coefficients for each of the classes, stored in the storage unit 153.

Then, the selection unit 155 supplies the tap structure information indicating the optimal tap structure and the tap coefficients for each of the classes with respect to the optimal tap structure, to the filter information generating unit 132 (FIG. 10).

Note that, in the learning device 131, processing of obtaining the tap structure information indicating the optimal tap structure and the tap coefficients for each of the classes with respect to the optimal tap structure, for example, can be performed in unit (at a timing) identical to the tap structure update unit described in FIG. 10.

<Example of Plurality of Tap Structures>

Figure 12:
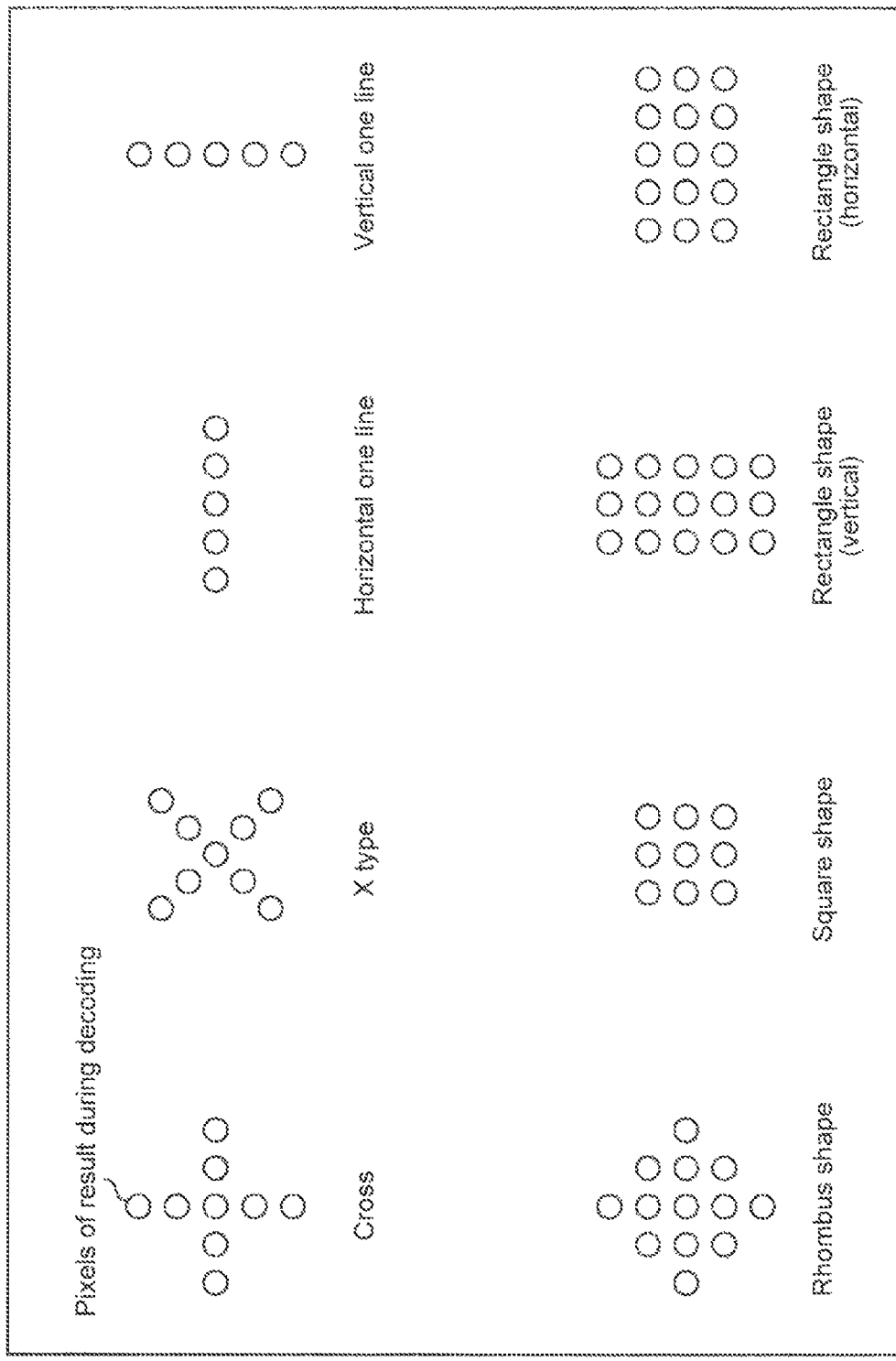
FIG. 12 is a diagram illustrating an example of a class tap shape as a tap structure of a class tap.

FIG. 12 is a diagram illustrating an example of the class tap shape the tap structure of the class tap.

Examples of the class tap shape formed by the pixels to be the class tap, include a cross type or an X type, a horizontal one line type, a vertical one line type, an oblique one line type, a rhombus shape, a square shape, a vertical rectangle shape, a horizontal rectangle shape, and the like, as illustrated in FIG. 12.

According to a simulation performed by the present inventors, in the class classification adaptive processing using the tap coefficients for each of the classes, obtained by the tap coefficient learning using a class tap of a cross type tap structure in which pixels arranged in the horizontal direction into the shape of one line and pixels arranged in the vertical direction into the shape of one line are crossed with each other, it is confirmed that an edge in the horizontal direction or an edge in the vertical direction is accurately reproduced in the second image obtained by the class classification adaptive processing.

Further, in accordance with the simulation, in the class classification adaptive processing using the tap coefficients for each of the classes, obtained by the tap coefficient learning using a class tap of an X type tap structure in which pixels arranged in an oblique upper right direction into the shape of one line and pixels arranged in an oblique upper left direction into the shape of one line are crossed with each other, it is confirmed that a peak signal-to-noise ratio (PSNR) of the second image obtained by the class classification adaptive processing, with respect to an image including a plurality of edges in an oblique direction, is improved compared to the class classification adaptive processing using the tap coefficients for each of the classes, obtained by the tap coefficient learning using the class tap of the cross type tap structure.

Therefore, it is confirmed that the tap structure of the class tap is changed in accordance with the feature of the image (here, the direction of the edge), and thus, the PSNR of the second image obtained by the class classification adaptive processing, is improved.

The class tap shape of FIG. 12 is formed by the pixels of one frame, and the class tap can be configured of pixels of one frame, and can be configured of pixels of a plurality of frames.

Figure 13:
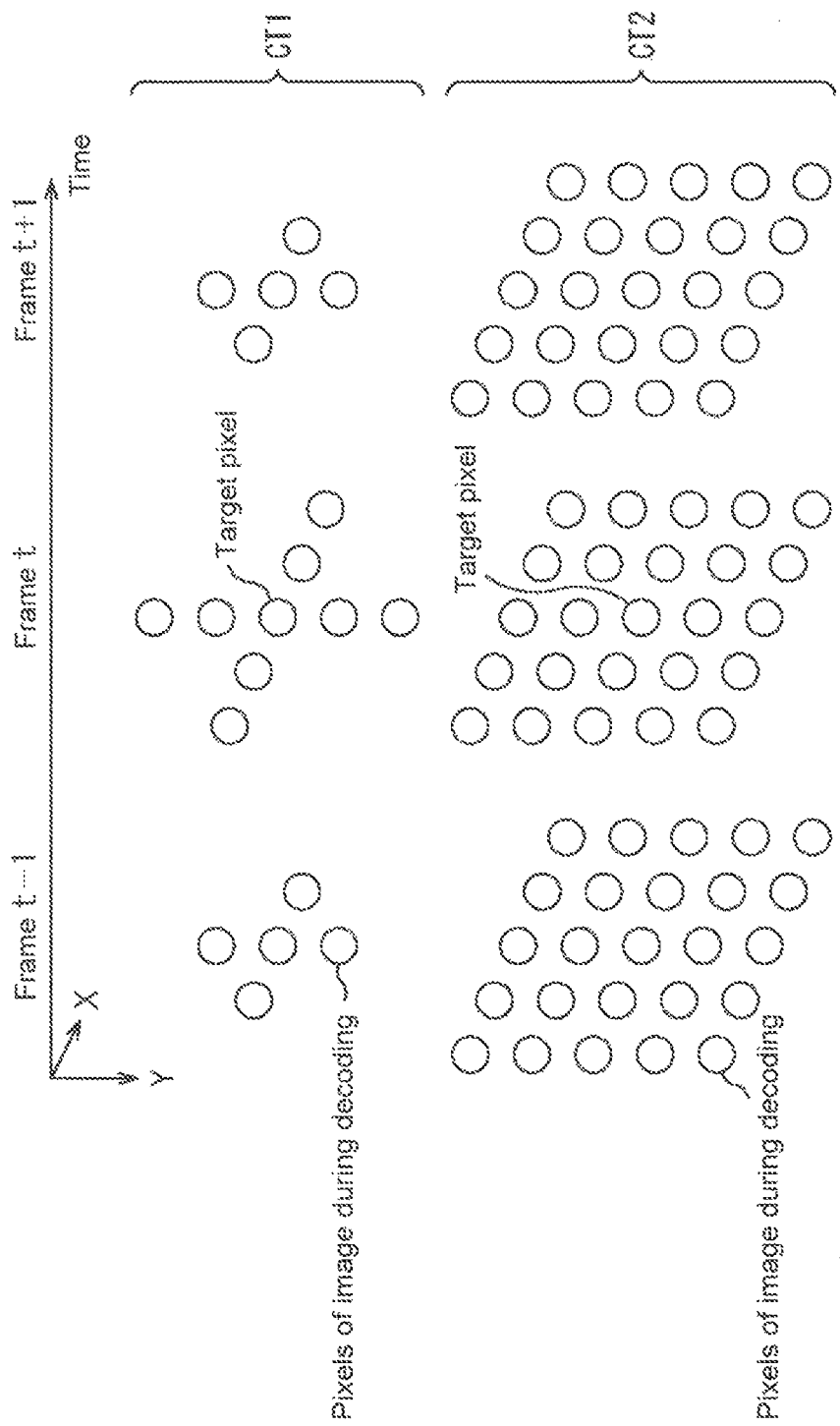
FIG. 13 is a diagram illustrating an example of the tap structure of the class tap configured of pixels of a plurality of frames.

FIG. 13 is a diagram illustrating an example of the tap structure of the class tap configured of the pixels of the plurality of frames.

In FIG. 13, the class tap is configured by using not only pixels in a space direction of the target pixel but also pixels in a time direction of the target pixel. That is, in FIG. 13, the class tap is configured by using not only pixels of a frame t of the target pixel but also pixels of a frame t−1 of one frame before the frame t, and pixels of a frame t+1 of one frame after the frame t.

For example, in the frames t−1 and t+1, pixels in a position identical to the position of the target pixel, and pixels in the vicinity of the pixel, can be selected as the pixel to be the class tap.

In addition, for example, in the frames t−1 and t+1, pixels reflecting a subject identical to that of the target pixel, moved from the position of the target pixel by a motion vector, and pixels in the vicinity of the pixel, can be selected as the pixel to be the class tap.

As described above, in a case where the class tap is configured by using not only the pixels in the space direction of the target pixel but also the pixels in the time direction of the target pixel, it is possible to improve degradation in image quality of the second image obtained by the class classification adaptive processing, caused by a motion, such as motion blur.

Note that, in the class classification using the class tap, the target pixel is classified in accordance with the image feature amount (a local image feature amount) of the target pixel, obtained from the pixels configuring the class tap.

The ADRC code described in FIG. 2 and the like, DiffMax described below, and the like can be adopted as the image feature amount.

Here, in a case where the ADRC code is adopted as the image feature amount used in the class classification, in the ADRC code, the number of classes exponentially increases with respect to the number of pixels configuring the class tap, from the nature thereof.

Therefore, in a case where the ADRC code is adopted as the image feature amount used in the class classification, it is desirable that a tap structure having a small number of pixels, is adopted as the tap structure of the class tap, from the viewpoint of the compression efficiency.

FIG. 13 illustrates a class tap CT1 configured by selecting pixels forming a cross type class tap shape from each of the frames t−1 to t+1, and a class tap CT2 configured by selecting pixels forming a square class tap shape from each of the frames t−1 to t+1. The class tap CT1 is configured of 19 pixels, and the class tap CT2 is configured of 75 pixels.

In a case where the ADRC code is adopted as the image feature amount used in the class classification, it is desirable that the class tap CT1 of the tap structure having a small number of pixels, in the class taps CT1 and CT2, is adopted from the viewpoint of the compression efficiency.

In addition, in a case where an image feature amount in which the number of pixels configuring the class tap does not affect the number of classes, such as DiffMax, is adopted as the image feature amount used in the class classification, a change in the compression efficiency caused by a change in the number of classes, does not occur even in a case of adopting the class tap CT1 of the tap structure having a small number of pixels, or even in a case of adopting the class tap CT2 of the tap structure having a large number of pixels.

On the other hand, in many cases, the image feature amount of the target pixel is accurately obtained as the number of pixels configuring the class tap increases. Therefore, in a case where the image feature amount in which the number of pixels configuring the class tap does not affect the number of classes, such as DiffMax, is adopted as the image feature amount used in the class classification, the class tap CT2 of the tap structure having a large number of pixels is adopted, and thus, it is possible to accurately obtain the image feature amount of the target pixel.

Here, as illustrated in FIG. 13, the class tap shape of the class tap configured by using the pixels in the time direction of the target pixel, hereinafter, will also be referred to as a time direction type.

FIG. 14 is a diagram illustrating an example of a variation of the tap structure of the class tap.

For example, as illustrated in FIG. 14, a class tap in which the pixels configuring the class tap are dense, or a class tap in which the pixels configuring the class tap are sparse, is exemplified as a variation of the (class tap shape) class tap in the cross type or the X type, the horizontal one line type, the vertical one line type, the oblique one line type, the rhombus shape, the square shape, the vertical rectangle shape, the horizontal rectangle shape, and the time direction type, illustrated in FIG. 12 and FIG. 13.

The class tap in which the pixels are dense, for example, is a class tap in which the adjacent pixels are the pixels configuring the class tap, and a class tap in which the pixels are sparse, for example, is a class tap in which pixels at intervals of one or a plurality of pixels, are the pixels configuring the class tap.

Note that, hereinafter, in order to simplify the description, the class tap is configured of the pixels positioned in the space direction of the target pixel, and the pixels positioned in the time direction are not considered.

FIG. 15 is a diagram illustrating an example of a determination method of (the candidates of) the plurality of tap structures of the class tap stored in the tap structure selection unit 151 (FIG. 11).

For example, a method of setting the class tap shape to be in a range identical to that of the prediction tap shape, and a method of setting the class tap shape not to be in the range identical to that of the prediction tap shape are exemplified as the determination method of the plurality of tap structures of the class tap.

Here, the prediction tap shape indicates a shape formed by the pixels configuring the prediction tap.

For example, a method of allowing the class tap shape to be coincident with the prediction tap shape (setting the class tap shape to be a shape congruent with that of the prediction tap shape), and a method of allowing the maximum range of the class tap shape in each of the horizontal direction and the vertical direction, to be coincident with the maximum range of the prediction tap shape in each of the horizontal direction and the vertical direction are exemplified as the method of setting the class tap shape to be in the range identical to that of the prediction tap shape.

Allowing the maximum range of the class tap shape in each of the horizontal direction and the vertical direction to be coincident with the maximum range of the prediction tap shape in each of the horizontal direction and the vertical direction, indicates that the minimum rectangle surrounding the class tap shape is coincident with the minimum rectangle surrounding the prediction tap shape.

In a case where the maximum range of the class tap shape in each of the horizontal direction and the vertical direction is coincident with the maximum range of the prediction tap shape in each of the horizontal direction and the vertical direction, the pixels configuring the class tap are distributed in the minimum rectangle surrounding the prediction tap shape. Here, the class tap shape is not limited to be coincident with the prediction tap shape.

For example, a method of allowing the maximum ranges of the class tap shape and the prediction tap shape to be coincident with each other in only one direction of the horizontal direction and the vertical direction, and a method of allowing the maximum ranges of the class tap shape and the prediction tap shape not to be coincident with each other in both of the horizontal direction and the vertical direction are exemplified as the method of setting the class tap shape not to be in the range identical to that of the prediction tap shape.

In a case where the maximum ranges of the class tap shape and the prediction tap shape are coincident with each other in only one direction of the horizontal direction and the vertical direction, the ranges of the pixels configuring the class tap and the pixels configuring the prediction tap to be distributed in the horizontal direction or the vertical direction, are coincident with each other, but the class tap shape is not coincident with the prediction tap shape.

In addition, in a case where the maximum ranges of the class tap shape and the prediction tap shape are not coincident with each other in both of the horizontal direction and the vertical direction, the range of the pixels configuring the class tap to be distributed is not coincident with the range of the pixels configuring the prediction tap to be distributed, not only when the class tap shape is not coincident with the prediction tap shape, but also when the class tap shape is coincident (congruent) with the prediction tap shape. Here, the range of the pixels configuring the class tap and the range of the pixels configuring the prediction tap are capable of overlapping with each other.

FIG. 16 is a diagram illustrating the image feature amount of the class tap used in the class classification by the class classification unit 163 of FIG. 11.

For example, the ADRC code, the DR, DiffMax, stationarity, activity, the secondary differentiation sum, the maximum direction difference, a filter bank output, and the like can be adopted as the image feature amount of the class tap used in the class classification.

The ADRC code can be obtained as described in FIG. 2 and the like. That is, for example, an one-bit ADRC code can be obtained by dividing the pixel value of the pixels configuring the class tap, such as a luminance, into binary pixel values in accordance with a threshold value, and by arranging the binary pixel values.

According to the class classification using the ADRC code, a waveform pattern (the edge or the texture (including a direction)) of (a pixel group configuring) the class tap is exhaustively classified, and in the class classification adaptive processing, an optimal restoration effect of an image can be obtained for each of the waveform patterns of the class tap.

The DR is a difference between the maximum value and the minimum value of the pixel values of the pixels configuring the class tap, such as a luminance. In the class classification adaptive processing, in a case where the DR is small, the class classification using the DR contributes to a reduction in a noise of a flat portion, or the like, and in a case where the DR is large, the class classification using the DR contributes to the restoration of the edge.

In the class tap, DiffMax is the maximum value of a difference absolute values of the pixel values of the adjacent pixels in the horizontal direction, the vertical direction, and the oblique direction. In the class classification adaptive processing, in a case where DiffMax is small, the class classification using DiffMax contributes to a reduction in a false contour of a gradation, and in a case where DiffMax is large, the class classification using DiffMax contributes to the restoration of a precipitous edge (step).

Note that, a combination of DiffMax and the DR, that is, for example, DiffMax/DR, or two-axis expression (DiffMax, DR) of DiffMax and the DR, can be set to an index of how many pixels to climb up the amplitude of the DR in the class tap, as an image feature amount different from only DiffMax or only the DR.

In the class tap, the stationarity, for example, can be represented by a value indicating a difference in a difference absolute value sum between a direction in which the difference absolute value sum of the pixel values of the adjacent pixels in each direction is maximized and a direction in which the difference absolute value sum of the pixel values of the adjacent pixels in each direction is minimized. In the class classification adaptive processing, in a case where the stationarity is small, the class classification using the stationarity contributes to the restoration of the texture (or a fine pattern such as a noise), and in a case where the stationarity is large, the class classification using the stationarity contributes to the restoration of the edge (a structure line).

In the class tap, the activity, for example, can be represented by the difference absolute value sum of the pixel values of the adjacent pixels in the horizontal direction and the vertical direction. In the class classification adaptive processing, in a case where the activity is small, the class classification using the activity contributes to the restoration of a step edge (a simple pattern), and in a case where the activity is large, the class classification using the activity contributes to the restoration of the texture (a complicated pattern).

In the class tap, the secondary differentiation sum, for example, is an absolute value sum of secondary differentiation of the pixel values of the adjacent pixels in the horizontal direction and the vertical direction. In a case where the secondary differentiation sum is small, the class classification using the secondary differentiation sum contributes to the restoration of the step edge, and in a case where the secondary differentiation sum is large, the class classification using the secondary differentiation sum contributes to the restoration of the texture.

In the class tap, the maximum direction difference, for example, is a value indicating a direction in which the difference absolute value sum of the pixel values of the adjacent pixels in the horizontal direction, the vertical direction, and the oblique direction is maximized. In the class classification using the maximum direction difference, a direction such as an amplitude, a gradient, or a structure in the vicinity of the target pixel, is classified, and thus, in the class classification adaptive processing, the optimal restoration effect of the image can be obtained for each direction such as the amplitude, the gradient, or the structure in the vicinity of the target pixel.

The filter bank output is a value obtained by inputting the pixel values of the pixels configuring the class tap, with respect to a plurality of bandpass filters (bandpass filters outputting a value indicating the direction such as the amplitude, the gradient, or the structure of the image) having directionality. In the class classification using the filter bank output, a calculation cost is large, but a classification accuracy is high, compared to the class classification using the maximum direction difference.

In the class classification using the class tap ADRC code, for example, (a value indicated by) the ADRC code can be adopted as (a class code indicating) the class of the target pixel.

An arbitrary image feature amount in addition to the ADRC code, the DR, DiffMax, the stationarity, the activity, the secondary differentiation sum, the maximum direction difference, or the filter bank output, as described above, can be adopted as the image feature amount of the class tap used in the class classification.

In the class classification using the image feature amount such as the DR, DiffMax (DiffMax/DR), the stationarity, the activity, the secondary differentiation sum, the maximum direction difference, or the filter bank output or the class tap, for example, the image feature amount is compared with one or more threshold values in addition to the value of the image feature amount itself, and thus, a value indicating a magnitude relationship between the image feature amount and the threshold value, can be adopted as the class of the target pixel.

In addition, the class classification can be performed by using a type of image feature amount of the class tap, and can also be performed by using a plurality of types of image feature amounts of the class tap.

Figure 17:
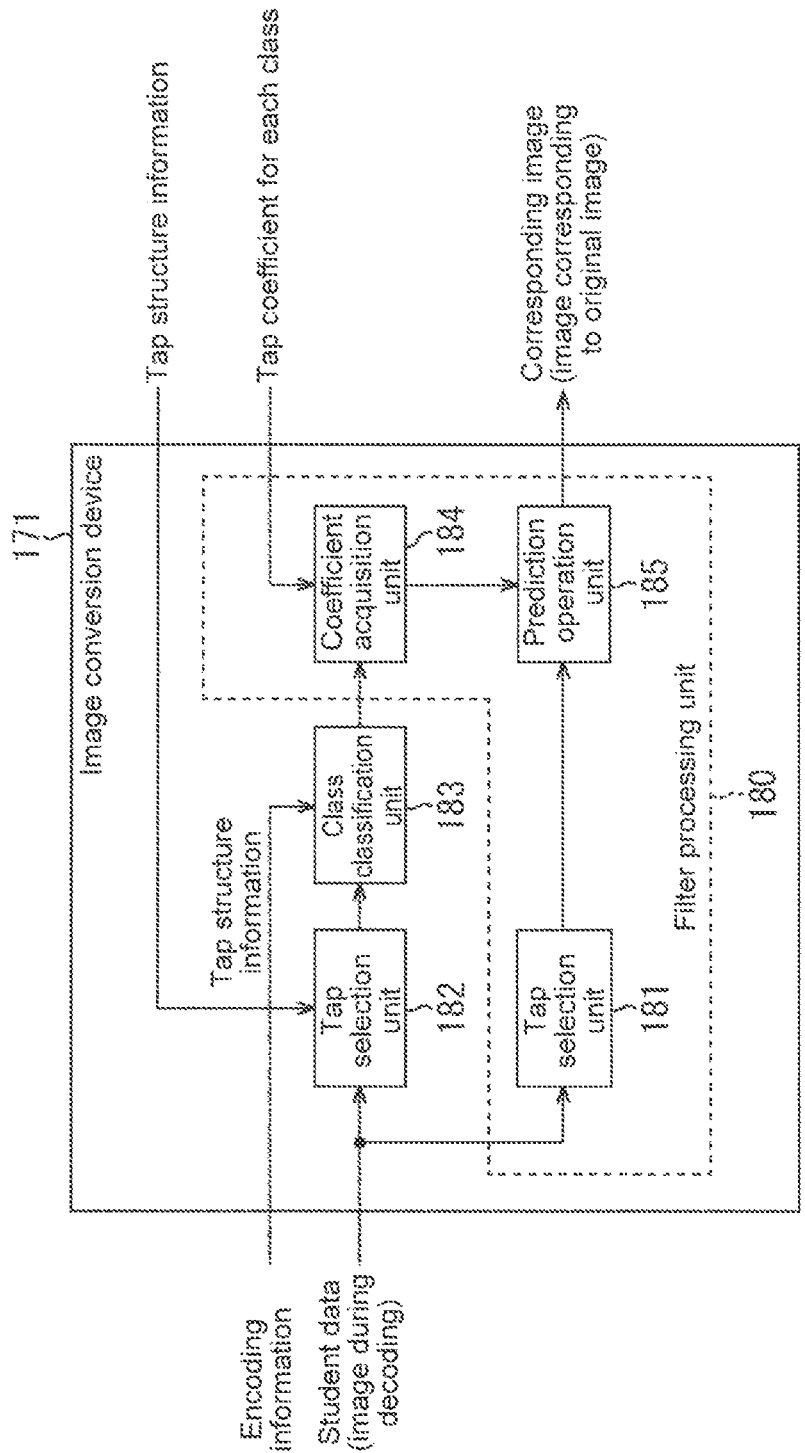
FIG. 17 is a block diagram illustrating a configuration example of an image conversion unit 171.

FIG. 17 is a block diagram illustrating a configuration example of the image conversion unit 171 of FIG. 11.

In FIG. 17, the image conversion unit 171 includes tap selection units 181 and 182, a class classification unit 183, a coefficient acquisition unit 184, and a prediction operation unit 185.

Each of the tap selection unit 181 to the prediction operation unit 185 performs the processing identical to that of each of the tap selection unit 21 to the prediction operation unit 25 of the image conversion device 20 of FIG. 2.

The image during decoding as the student data and the encoding information, identical to those supplied to the learning unit 152 (FIG. 11), are supplied to the image conversion unit 171. In the image conversion unit 171, the class classification adaptive processing identical to that of the image conversion device 20 of FIG. 2, is performed by using the image during decoding as the student data, and by using the encoding information as necessary, and the corresponding image corresponding to the original image as the teacher data, is obtained.

Here, in the image conversion unit 171, the tap structure information stored in the storage unit 153 (FIG. 11), and the tap coefficients for each of the classes, associated with the tap structure information, are respectively supplied to the tap selection unit 182 and the coefficient acquisition unit 184.

As with the tap selection unit 22 of FIG. 2, the tap selection unit 182 selects the pixel to be the class tap from the pixels of the image during decoding, with respect to the target pixel, and configures the class tap with the pixels, and at this time, the class tap of the tap structure indicated by the tap structure information is configured in accordance with the tap structure information from the storage unit 153.

Then, the class classification unit 183 performs the class classification of the target pixel, by using the class tap configured by the tap selection unit 182.

Note that, the class classification unit 183 performs the class classification identical to that of the class classification unit 163 of FIG. 11. Therefore, in a case where the class classification unit 163 of FIG. 11 performs the class classification of the target pixel by using the class tap of the target pixel, and by using the encoding information of the target pixel, the class classification unit 183 also performs the class classification of the target pixel of the by using the class tap and the encoding information of the target pixel.

As with the coefficient acquisition unit 24 of FIG. 2, the coefficient acquisition unit 184 stores the tap coefficients for each of the classes, acquires the tap coefficient of the class of the target pixel from the class classification unit 183, from the tap coefficients for each of the classes, and supplies the tap coefficient to the prediction operation unit 185.

Here, the coefficient acquisition unit 184 stores the tap coefficients for each of the classes from the storage unit 153 (FIG. 11), and acquires the tap coefficient of the class of the target pixel from the tap coefficients for each of the classes.

The tap coefficients for each of the classes stored in the coefficient acquisition unit 184, are the tap coefficients for each of the classes, associated with the tap structure information supplied to the tap selection unit 182 from the storage unit 153, and are the tap coefficients with respect to the classes, obtained by the class classification using the class tap of the tap structure indicated by the tap structure information.

Note that, in the image conversion unit 171 of FIG. 17, the prediction operation unit 185 performs the prediction operation by using the prediction tap of the target pixel configured by the tap selection unit 181, and the tap coefficient of the class of the target pixel acquired by the coefficient acquisition unit 184, and obtains the prediction value of the pixel value of the corresponding pixel corresponding to the original image that corresponds to the target pixel.

It can be described that the prediction operation performed by the prediction operation unit 185, is a type of filter processing with respect to the prediction tap of the target pixel, and thus, it can be described that the tap selection unit 181 configuring the prediction tap to be subjected to the filter processing, the coefficient acquisition unit 184 acquiring the tap coefficient used in the filter processing, and the prediction operation unit 185 performing the prediction operation as the type of filter processing, configure a filter processing unit 180 performing the filter processing.

In the filter processing unit 180, the prediction operation as the filter processing, performed by the prediction operation unit 185, is the filter processing that is different in a manner that depends on the tap coefficient of the class of the target pixel, acquired by the coefficient acquisition unit 184. Therefore, it can be described that the filter processing of the filter processing unit 180 is the filter processing corresponding to the class of the target pixel.

<Processing of Learning Device 131>

Figure 18:
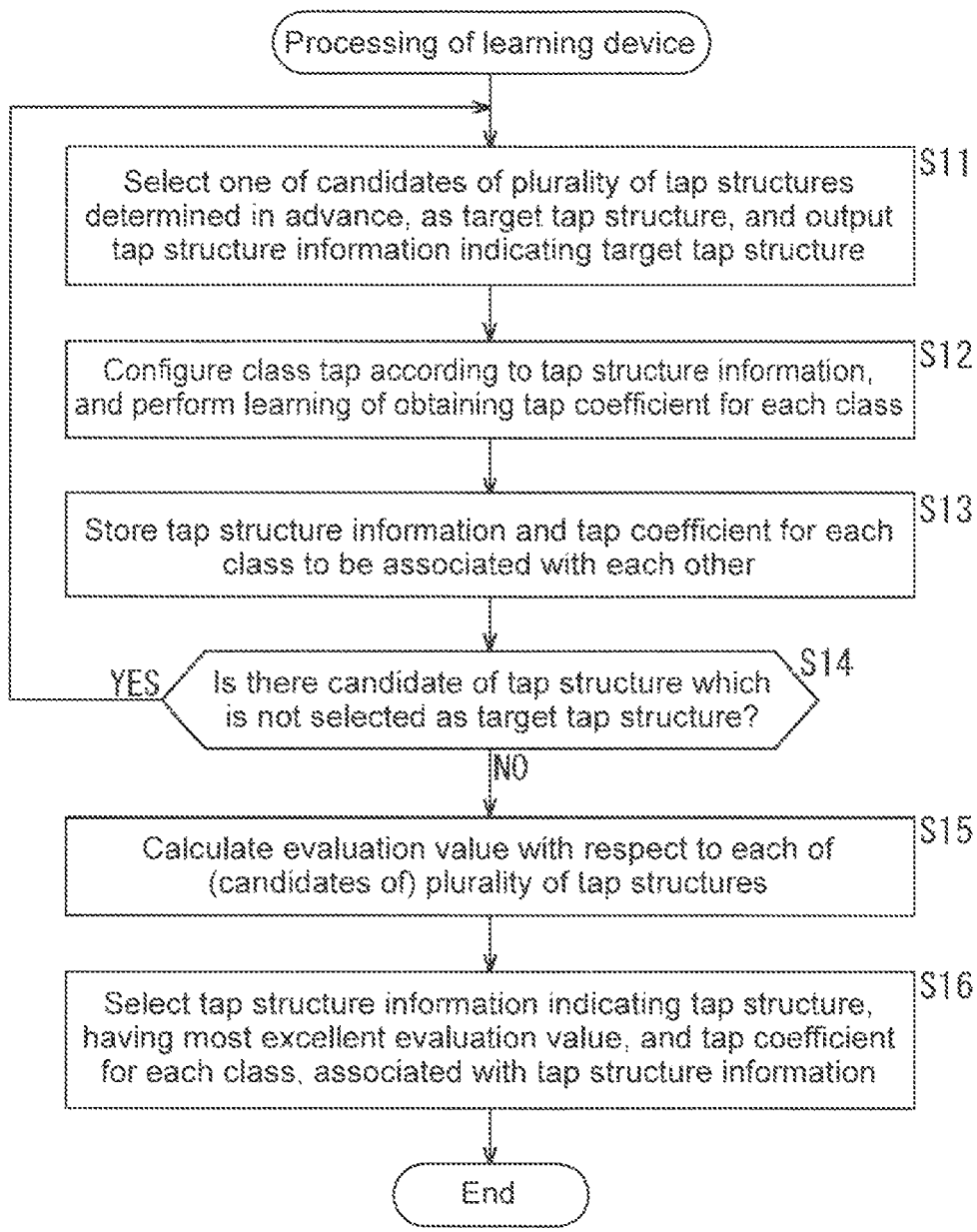
FIG. 18 is a flowchart illustrating an example of processing of the learning device 131.

FIG. 18 is a flowchart illustrating an example of the processing of the learning device 131 of FIG. 11.

In Step S11, the tap structure selection unit 151 selects one of the candidates of the tap structures which is not yet set as the target tap structure, in the candidates of the plurality of tap structures determined in advance, as the target tap structure. Then, the tap structure selection unit 151 supplies (outputs) the tap structure information indicating the target tap structure, to the tap selection unit 162 of the learning unit 152 and the storage unit 153, and the processing proceeds to Step S12 from Step S11.

In Step S12, the learning unit 152 performs the tap coefficient learning by using the image during decoding as the student data, the original image as the teacher data, and by using the encoding information as necessary, and obtains the tap coefficients for each of the classes.

In the tap coefficient learning of the learning unit 152, the class classification is performed by using the class tap of the target tap structure indicated by the tap structure information supplied to the tap selection unit 162 from the tap structure selection unit 151, the tap coefficients with respect to the classes, obtained by the class classification, are obtained.

The learning unit 152 supplies the tap coefficients for each of the classes, obtained by the class classification using the class tap of the target tap structure, to the storage unit 153, and the processing proceeds to Step S13 from Step S12.

In Step S13, the storage unit 153 stores the tap structure information indicating the target tap structure from the tap structure selection unit 151, and the tap coefficients for each of the classes, obtained by the class classification using the class tap of the target tap structure from the learning unit 152, to be associated with each other, and the processing proceeds to Step S14.

In Step S14, the tap structure selection unit 151, for example, determines whether or not there is a candidate of the tap structure which is not yet set as the target tap structure, in the candidates of the plurality of tap structures determined in advance.

In Step S14, in a case where it is determined that there is a candidate of the tap structure which is not yet set as the target tap structure, in the candidates of the plurality of tap structures determined in advance, the processing returns to Step S11, and hereinafter, the same processing will be repeated.

In addition, in Step S14, in a case where it is determined that there is no candidate of the tap structure which is not yet set as the target tap structure, in the candidates of the plurality of tap structures determined in advance, that is, in a case where the tap structure information of the tap structure, and the tap coefficients for each of the classes, obtained by the class classification using the class tap indicated by the tap structure information are stored in the storage unit 153 by being associated with each other, with respect to each of (the candidates of) the plurality of tap structures determined in advance, the processing proceeds to Step S15.

In Step S16, in the evaluation value calculation unit 154, the image conversion unit 171 performs the class classification adaptive processing with respect to the image during decoding as the student data, by using the tap structure information, and the tap coefficients for each of the classes, associated with the tap structure information, and obtains the corresponding image corresponding to the original image as the teacher data, with respect to each of the plurality of tap structures information items stored in the storage unit 153 (the tap structure information with respect to each of the plurality of tap structures stored in the tap structure selection unit 151).

Further, in the evaluation value calculation unit 154, the calculation unit 172 obtains a value correspond to S/N of the corresponding image, or the like, obtained by the class classification adaptive processing using the tap coefficients for each of the classes, associated with the tap structure information, with respect to each of the plurality of tap structures information items, as the tap structure evaluation value, and supplies the value to the selection unit 155.

Then, the processing proceeds to Step S16 from Step S15, and the selection unit 155 selects the tap structure information having the most excellent tap structure evaluation value supplied from the calculation unit 172 of the evaluation value calculation unit 154, from the tap structure information stored in the storage unit 153, as the tap structure information indicating the optimal tap structure. Further, the selection unit 155 selects the tap coefficients for each of the classes with respect to the optimal tap structure (the tap coefficients for each of the classes, associated with the tap structure information indicating the optimal tap structure), from the tap coefficients for each of the classes stored in the storage unit 153.

The selection unit 155 supplies the tap structure information indicating the optimal tap structure, and the tap coefficients for each of the classes with respect to the optimal tap structure, to the filter information generating unit 132, and the processing is ended.

<Configuration Example of Image Conversion Device 133>

Figure 19:
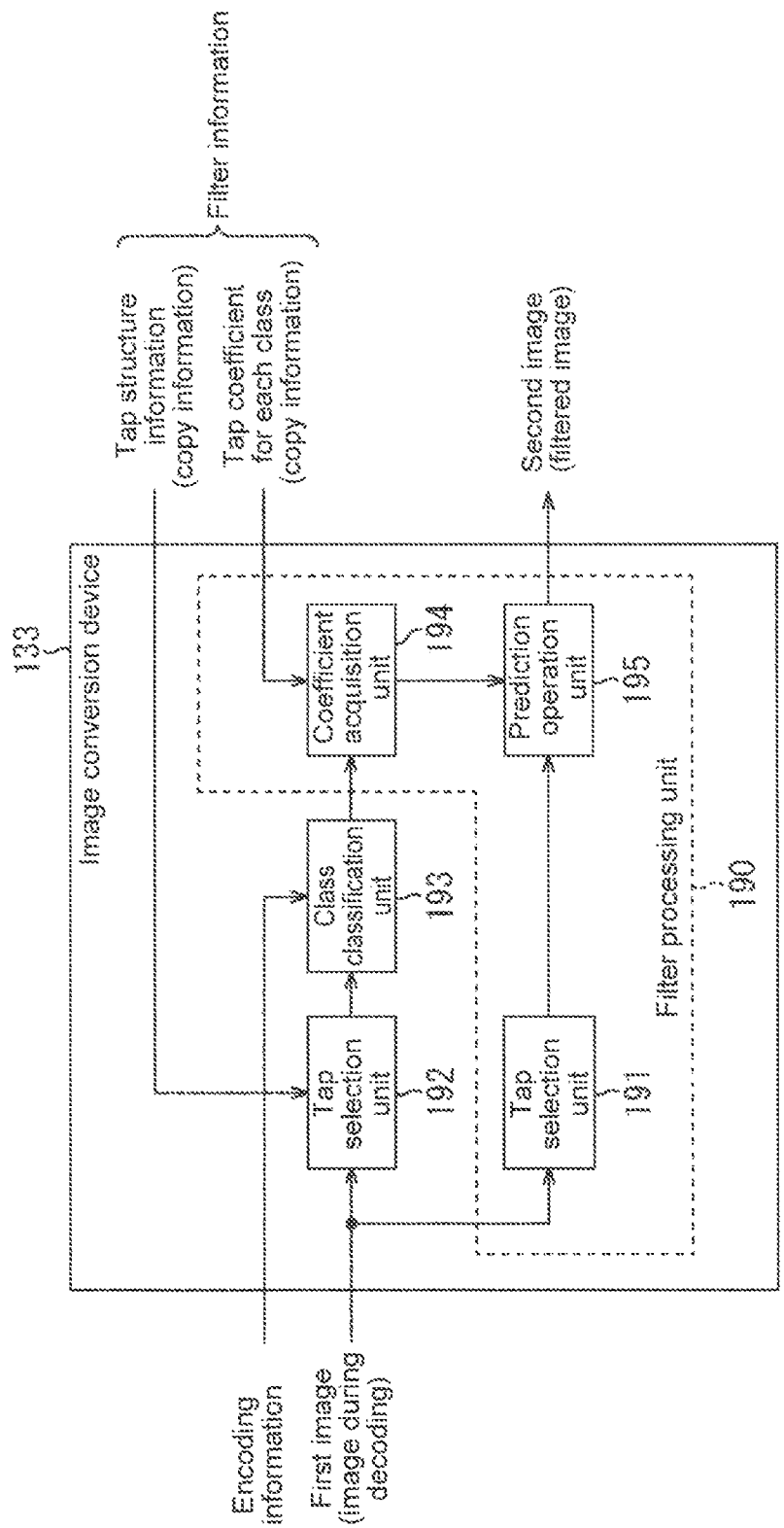
FIG. 19 is a block diagram illustrating a configuration example of an image conversion device 133.

FIG. 19 is a block diagram illustrating a configuration example of the image conversion device 133 of FIG. 10.

In FIG. 19, the image conversion device 133 includes tap selection units 191 and 192, a class classification unit 193, a coefficient acquisition unit 194, and a prediction operation unit 195.

Each of the tap selection unit 191 to the prediction operation unit 195 performs the processing identical to that of each of the tap selection unit 181 to the prediction operation unit 185 of the image conversion unit 171 of FIG. 17.

The image during decoding as the first image, and the encoding information are supplied to the image conversion device 133. In the image conversion device 133, the class classification adaptive processing identical to that of the image conversion unit 171 of FIG. 17, is performed by using the image during decoding as the first image, and by using the encoding information as necessary, and the filtered image as the second image corresponding to the original image is obtained.

Note that, in the image conversion device 133, the filter information from the filter information generating unit 132 (FIG. 10) is supplied to the tap selection unit 192 and the coefficient acquisition unit 194.

As with the tap selection unit 182 of FIG. 17, the tap selection unit 192 selects the pixel to be the class tap from the pixels of the image during decoding, with respect to the target pixel, and configures the class tap with the pixels.

That is, the tap selection unit 192 configures the class tap of the optimal tap structure indicating the tap structure information, in accordance with the tap structure information included in the filter information from the filter information generating unit 132.

Then, the class classification unit 193 performs the class classification identical to that of the class classification unit 183 of FIG. 17 with respect to the target pixel, by using the class tap configured by the tap selection unit 192.

Therefore, in a case where the class classification unit 183 of FIG. 17 performs the class classification of the target pixel by using the class tap and the encoding information of the target pixel, the class classification unit 193 also performs the class classification of the target pixel by using the class tap and the encoding information of the target pixel.

As with the coefficient acquisition unit 184 of FIG. 17, the coefficient acquisition unit 194 stores the tap coefficients for each of the classes, acquires the tap coefficient of the class of the target pixel from the class classification unit 193, from the tap coefficients for each of the classes, and supplies the tap coefficient to the prediction operation unit 195.

That is, the coefficient acquisition unit 194 stores the tap coefficients for each of the classes included filter information from the filter information generating unit 132 (FIG. 10), and acquires the tap coefficient of the class of the target pixel, from the tap coefficients for each of the classes.

The tap coefficients for each of the classes included in the filter information from the filter information generating unit 132, are the tap coefficients for each of the classes, obtained by the class classification using the class tap of the optimal tap structure, obtained by the learning device 131 (FIG. 11).

Here, in the image conversion device 133 of FIG. 19, it can be described that the tap selection unit 191, the coefficient acquisition unit 194, and the prediction operation unit 195 configure a filter processing unit 190 performing the filter processing corresponding to the class of the target pixel, as with the tap selection unit 181, the coefficient acquisition unit 184, and the prediction operation unit 185 of FIG. 17.

Note that, in the filter information supplied to the image conversion device 133 from the filter information generating unit 132, as described in FIG. 10, the copy information indicating whether or not to use the tap structure and the tap coefficients for each of the classes, identical to those at the time of updating the last-minute tap structure and the tap coefficient, as the tap structure of the class tap and the tap coefficients for each of the classes, can be included.

Here, using the tap structure and the tap coefficients for each of the classes, identical to those at the time of updating the last-minute tap structure and the tap coefficient, as the tap structure of the class tap and the tap coefficients for each of the classes, is set to a copy mode.

In a case where the copy information included in the most recent filter information supplied to the image conversion device 133 from the filter information generating unit 132, does not indicate the copy mode, the tap selection unit 192 adopts the tap structure indicated by the tap structure information included in the most recent filter information, as the tap structure of the class tap, instead of the tap structure indicated by the tap structure information included in the previous filter information supplied to the image conversion device 133 from the filter information generating unit 132.

Further, the coefficient acquisition unit 194 stores the tap coefficients for each of the classes included in the most recent filter information in the format of being overwritten on the tap coefficients for each of the classes included in the previous filter information.

On the other hand, in a case where the copy information included in the most recent filter information (the most recent filter information does not include the tap structure information and the tap coefficients for each of the classes) indicates the copy mode, the tap selection unit 192 adopts the tap structure included in the previous filter information, as the tap structure of the class tap, as it is.

Further, the coefficient acquisition unit 194 maintains the storage of the tap coefficients for each of the classes included in the previous filter information, as it is.

Therefore, in a case where the copy information included in the most recent filter information, indicates the copy mode, the last-minute tap structure of the class tap and the tap coefficients for each of the classes are maintained.

<Encoding Processing>

Figure 20:
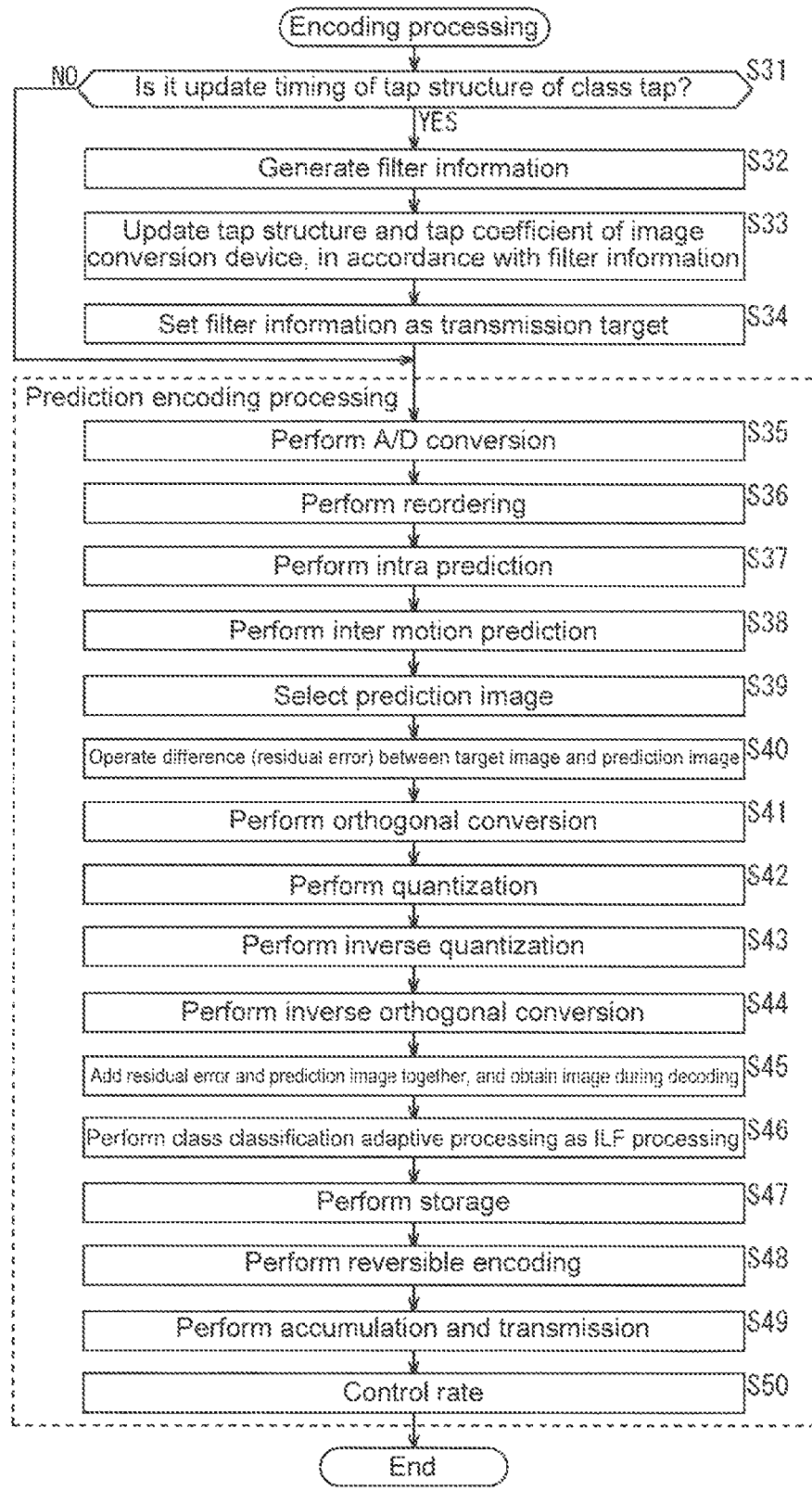
FIG. 20 is a flowchart illustrating an example of encoding processing of the encoding device 11.

FIG. 20 is a flowchart illustrating an example of the encoding processing of the encoding device 11 of FIG. 9.

Note that, the order of each of the steps of the encoding processing illustrated in FIG. 20, is an order for the convenience of the description, and the respective steps of the actual encoding processing are suitably performed in parallel, in a necessary order. The same applies to the encoding processing described below.

In the encoding device 11, the learning device 131 (FIG. 10) of the class classification adaptive filter 111, for example, sets the image during decoding in the tap structure update unit such as a plurality of frames, one frame, and a block, as the student data, in the images during decoding to be supplied thereto, sets the original image corresponding to the image during decoding, as the teacher data, and continually performs the tap coefficient learning. Then, in Step S31, the learning device 131 determines whether or not it is an update timing of the tap structure of the class tap (a predetermined timing for updating the tap structure of the class tap), that is, for example, whether or not it is a timing of an end point or a start point of the tap structure update unit such as a plurality of frames, one frame, and a block.

In Step S31, in a case where it is determined that it is not the update timing of the tap structure of the class tap, the processing proceeds to Step S35 by skipping Steps S32 to S34.

In addition, in Step S31, in a case where it is determined that it as the update timing of the tap structure of the class tap, the processing proceeds to Step S32.

In Step S32, the filter information generating unit 132 (FIG. 10) generates the filter information including the tap structure information and the tap coefficients for each of the classes (or the copy information), generated by the learning device 131 in accordance with the most recent tap coefficient learning, that is, the tap structure information indicating the optimal tap structure, and the tap coefficients for each of the classes with respect to the optimal tap structure, and supplies the information to the image conversion device 133 (FIG. 10) and the reversible encoding unit 106 (FIG. 9), and the processing proceeds to Step S33.

Note that, in the encoding device 11, only in a case where the mutual relationship in the time direction of the original image is detected, and the mutual relationship is low (in a case of being less than or equal to a threshold value), the filter information can be generated at the update timing, and the processings of Steps S33 and S34 described below, can be performed.

In Step S33, the image conversion device 133 updates the tap structure of the class tap configured by the tap selection unit 192 (FIG. 19), and the tap coefficients for each of the classes, stored in the coefficient acquisition unit 194 (FIG. 19), in accordance with the filter information from the filter information generating unit 132, and the processing proceeds to Step S34.

In Step S34, the reversible encoding unit 106 sets the filter information supplied from the filter information generating unit 132, as a transmission target, and the processing proceeds to Step S35. The filter information set as the transmission target, is transmitted by being included in the encoding data, in Step S48 described below.

Subsequent to Step S35, the prediction encoding processing of the original image is performed.

That is, in Step S35, the A/D conversion unit 101 performs A/D conversion with respect to the original image, and supplies the original image to the reordering buffer 102, and the processing proceeds to Step S36.

In Step S36, the reordering buffer 102 stores the original image from the A/D conversion unit 101, and reorders the original image in an encoding order to be output, and the processing proceeds to Step S37.

In Step S37, the intra prediction unit 114 performs the intra prediction processing in the intra prediction mode, and the processing proceeds to Step S38. In Step S38, the motion prediction compensation unit 115 performs the inter motion prediction processing of performing the motion prediction or the motion compensation in the inter prediction mode, and the processing proceeds to Step S39.

In the intra prediction processing of the intra prediction unit 114 and the inter motion prediction processing of the motion prediction compensation unit 115, the cost functions of various prediction modes are operated, and the prediction image is generated.

In Step S39, the prediction image selection unit 116 determines an optimal prediction mode, on the basis of each of the cost functions obtained by the intra prediction unit 114 and the motion prediction compensation unit 115. Then, the prediction image selection unit 116 selects the prediction image generated by the intra prediction unit 114, and the prediction image in the optimal prediction mode, in the prediction images generated by the motion prediction compensation unit 115, to be output, and the processing proceeds to Step S40 from Step S39.

In Step S40, the operation unit 103 operates a residual error between an encoding target image which is the original image output by the reordering buffer 102, and the prediction image output by the prediction image selection unit 116, and supplies the residual error to the orthogonal conversion unit 104, and the processing proceeds to Step S41.

In Step S41, the orthogonal conversion unit 104 performs orthogonal conversion with respect to the residual error from the operation unit 103, and supplies a conversion coefficient obtained as a result thereof, to the quantization unit 105, and the processing proceeds to Step S42.

In Step S42, the quantization unit 105 performs quantization with respect to the conversion coefficient from the orthogonal conversion unit 104, and supplies a quantization coefficient obtained by the quantization, to the reversible encoding unit 106 and the inverse quantization unit 108, and the processing proceeds to Step S43.

In Step S43, the inverse quantization unit 108 performs inverse quantization with respect to the quantization coefficient from the quantization unit 105, and supplies a conversion coefficient obtained as a result thereof, to the inverse orthogonal conversion unit 109, and the processing proceeds to Step S44. In Step S44, the inverse orthogonal conversion unit 109 performs inverse orthogonal conversion with respect to the conversion coefficient from the inverse quantization unit 108, and supplies a residual error obtained as a result thereof, to the operation unit 110, and the processing proceeds to Step S45.

In Step S45, the operation unit 110 adds the residual error from the inverse orthogonal conversion unit 109, and the prediction image output by the prediction image selection unit 116, together, and generates the image during decoding corresponding to the original image to be subjected to the operation of the residual error in the operation unit 103. The operation unit 110 supplies the image during decoding to the class classification adaptive filter 111 or the frame memory 112, and the processing proceeds to Step S46 from Step S45.

In a case where the image during decoding is supplied to the class classification adaptive filter 111 from the operation unit 110, in Step S46, the class classification adaptive filter 111 performs the class classification adaptive processing (class classification adaptive filter processing) as the ILF processing, with respect to the image during decoding from the operation unit 110. The class classification adaptive processing is performed with respect to the image during decoding, and thus, the filtered image close to the original image is obtained, compared to a case where the image during decoding is filtered by a general ILF.

The class classification adaptive filter 111 supplies the filtered image obtained by the class classification adaptive processing, to the frame memory 112, and the processing proceeds to Step S47 from Step S46.

In Step S47, the frame memory 112 stores the image during decoding supplied from the operation unit 110, or the filtered image supplied from the class classification adaptive filter 111, as the decoding image, and the processing proceeds to Step S48. The decoding image stored in the frame memory 112, is used as the reference image that is a source for generating the prediction image, in Step S38 or S39.

In Step S48, the reversible encoding unit 106 encodes the quantization coefficient from the quantization unit 105. Further, the reversible encoding unit 106 encodes the quantization parameter QP used in the quantization of the quantization unit 105, and the encoding information such as the prediction mode obtained in the intra prediction processing of the intra prediction unit 114, the predict on mode obtained in the inter motion prediction processing of the motion prediction compensation unit 115, or the motion information, as necessary, to be included in the encoding data.

In addition, the reversible encoding unit 106 encodes the filter information set as the transmission target in Step S34 to be included in the encoding data. Then, the reversible encoding unit 106 supplies the encoding data to the accumulation buffer 107, and the processing proceeds to Step S49 from Step S48.

In Step S49, the accumulation buffer 107 accumulates the encoding data from the reversible encoding unit 106, and the processing proceeds to Step S50. The encoding data accumulated in the accumulation buffer 107 is suitably read out and transmitted.

In Step S50, the rate control unit 117 controls the rate of the quantization operation of the quantization unit 105 such that the overflow or the underflow does not occur, on the basis of a code amount (a generated code amount) of the encoding data accumulated in the accumulation buffer 107, and the encoding processing is ended.

Figure 21:
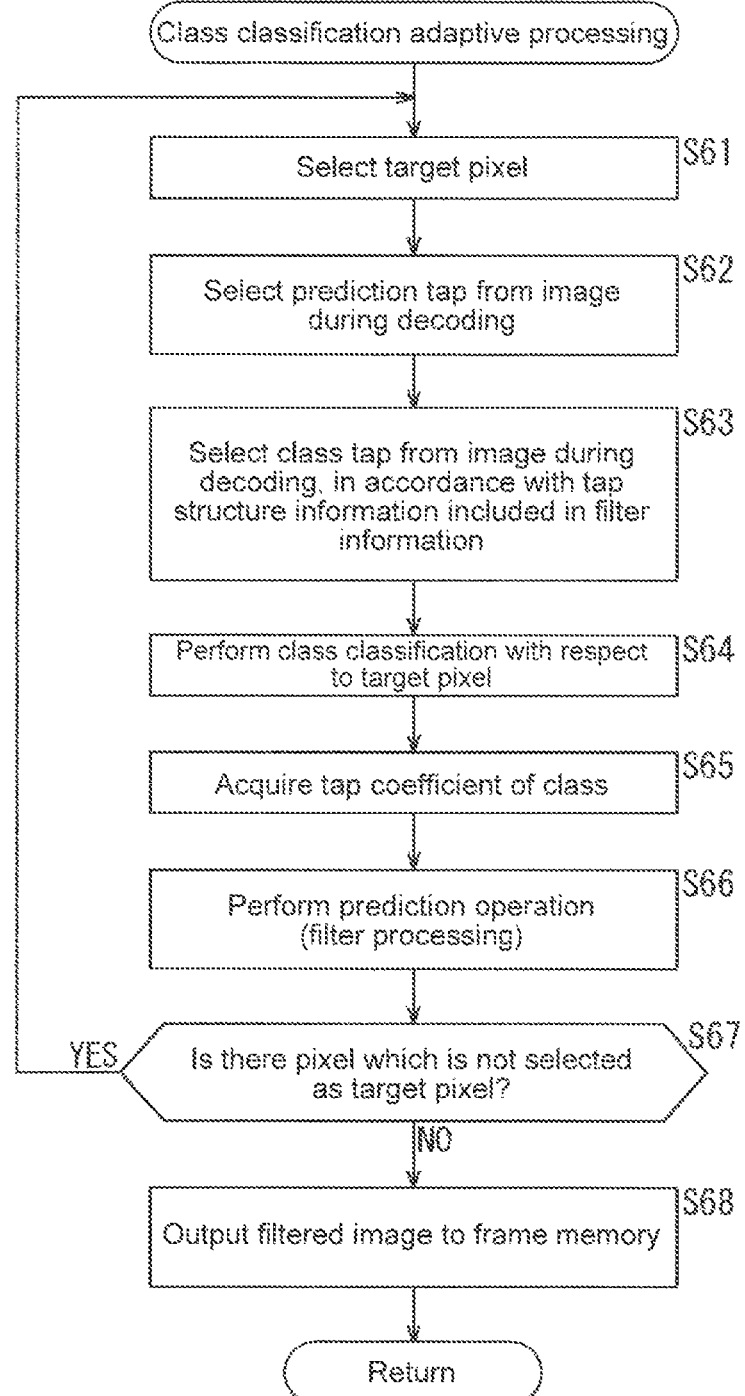
FIG. 21 is a flowchart illustrating an example of the class classification adaptive processing performed in Step S46.

FIG. 21 is a flowchart illustrating an example of the class classification adaptive processing performed in Step S46 of FIG. 20.

In the image conversion device 133 (FIG. 19) of the class classification adaptive filter 111, in Step S61, the tap selection unit 191 selects one of the pixels which is not yet set as the target pixel, in the pixels (of a block as) the image during decoding supplied from the operation unit 110, as the target pixel, and the processing proceeds to Step S62.

In Step S62, the tap selection unit 191 selects the pixel to be the prediction tap with respect to the target pixel, from the image during decoding supplied form the operation unit 110, and configures the prediction tap. Then, the tap selection unit 191 supplies the prediction tap to the prediction operation unit 195, and the processing proceeds to Step S63.

In Step S63, the tap selection unit 192 selects the pixel to be the class tap with respect to the target pixel, from the image during decoding supplied from the operation unit 110, in accordance with the tap structure information included in the filter information from the filter information generating unit 132 (FIG. 10), and thus, configures the class tap of the optimal tap structure, indicated by the tap structure information included in the filter information. Then, the tap selection unit 192 supplies the class tap to the class classification unit 193.

That is, the tap structure of the class tap configured by the tap selection unit 192, is updated in accordance with the update of the tap structure of the class tap in Step S33 of FIG. 20, performed immediately before, and the tap selection unit 192 configures the class tap of the tap structure after being updated, and supplies the class tap to the class classification unit 193.

After that, the processing proceeds to Step S64 from Step S63, and the class classification unit 193 performs the class classification of the target pixel, by using the class tap with respect to the target pixel, and by using the encoding information with respect to the target pixel as necessary. Then, the class classification unit 193 supplies the class of the target pixel, obtained by the class classification, to the coefficient acquisition unit 194, and the processing proceeds to Step S65 from Step S64.

The coefficient acquisition unit 194 stores the tap coefficients for each of the classes included in filter information supplied from the filter information generating unit 132, that is, the tap coefficients for each of the classes with respect to the optimal tap structure of the class tap configured by the tap selection unit 192, in accordance with the update of the tap coefficient in Step S33 of FIG. 20, performed immediately before. In Step S65, the coefficient acquisition unit 914 acquires the tap coefficient of the class of the target pixel supplied from the class classification unit 193, from the stored tap coefficients for each of the classes with respect to the optimal tap structure, and supplies the tap coefficient to the prediction operation unit 195, and the processing proceeds to Step S66.

In Step S66, the prediction operation unit 195 performs prediction operation in Expression (1) as the filter processing, by using the prediction tap from the tap selection unit 191 and the tap coefficient from the coefficient acquisition unit 194. Accordingly, the prediction operation unit 195 obtains the prediction value of the pixel value of the corresponding pixel of the original image that corresponds to the target pixel, as the pixel value of the filtered image, and the processing proceeds to Step S67.

In Step S67, the tap selection unit 191 determines whether or not there is a pixel which is not yet set as the target in the pixels (of the block as) the image during decoding from the operation unit 110. In Step S67, in a case where it is determined that there is a pixel which is not yet set as the target pixel, the processing returns to Step S61, and hereinafter, the same processing will be repeated.

In addition, in Step S67, in a case where it is determined that there is no pixel which is not yet set as the target pixel, the processing proceeds to Step S68, and the prediction operation unit 195 supplies the filtered image configured of the pixel value obtained with respect to (the block as) the image during decoding from the operation unit 110, to the frame memory 112 (FIG. 9). Then, the class classification adaptive processing is ended, and the processing proceeds to Return.

<First Configuration Example of Decoding Device 12>

Figure 22:
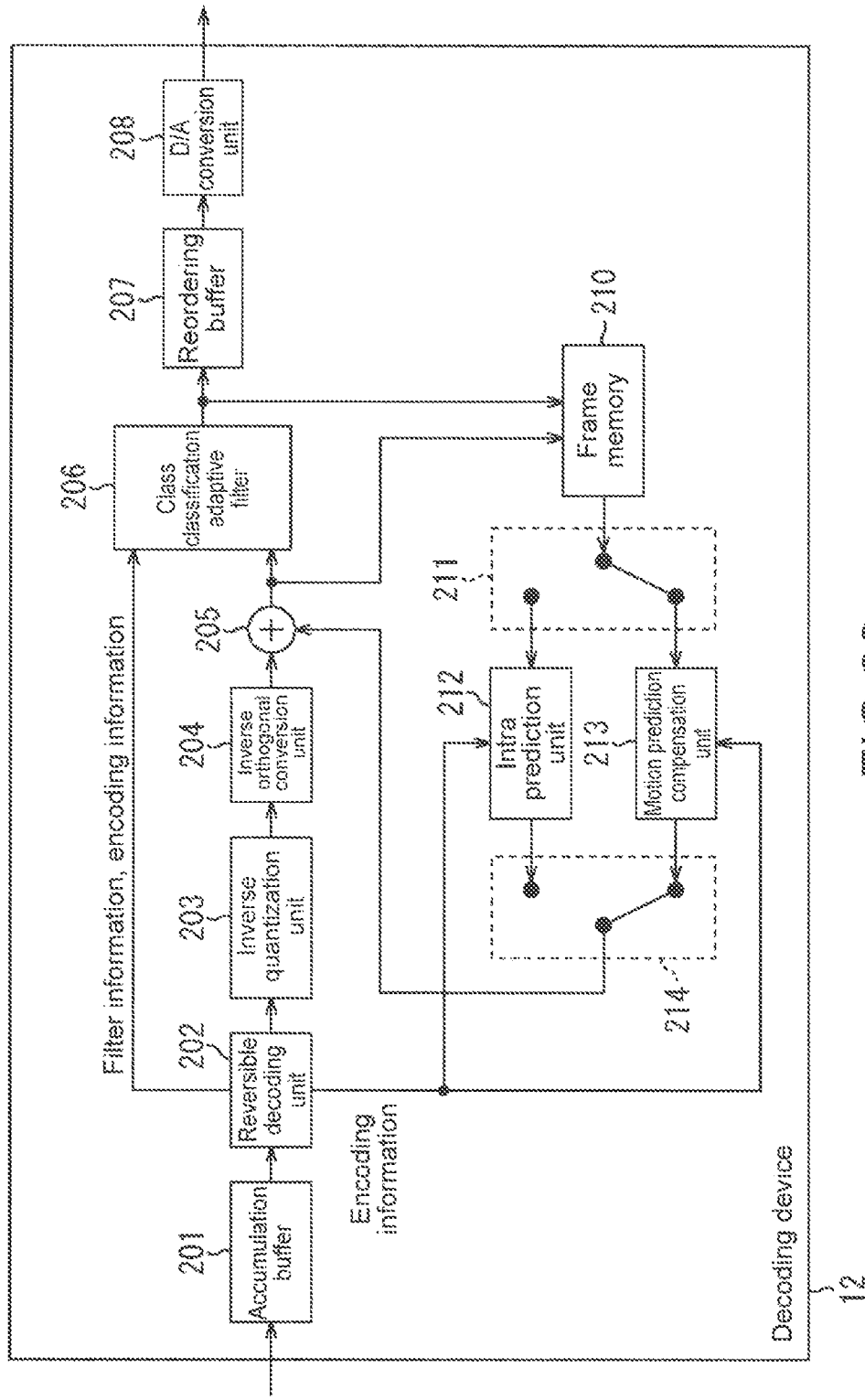
FIG. 22 is a block diagram illustrating a first configuration example of a decoding device 12.

FIG. 22 is a block diagram illustrating a first configuration example of the decoding device 12 of FIG. 1.

In FIG. 22, the decoding device 12 includes an accumulation buffer 201, a reversible decoding unit 202, an inverse quantization unit 203, an inverse orthogonal conversion unit 204, an operation unit 205, a class classification adaptive filter 206, a reordering buffer 207, and a D/A conversion unit 208. In addition, the decoding device 12 includes a frame memory 210, a selection unit 211, an intra prediction unit 212, a motion prediction compensation unit 213, and a selection unit 214.

The accumulation buffer 201 temporarily accumulates the encoding data that is transmitted from the encoding device 11, and supplies the encoding data to the reversible decoding unit 202 at a predetermined timing.

The reversible decoding unit 202 acquires the encoding data from the accumulation buffer 201. Therefore, the reversible decoding unit 202 functions as an exception unit accepting the encoding data that is transmitted from the encoding device 11, and the encoding information or the filter information included in the encoding data.

The reversible decoding unit 202 decodes the encoding data acquired from the accumulation buffer 201, in a system corresponding to an encoding system of the reversible encoding unit 106 of FIG. 9.

Then, the reversible decoding unit 202 supplies the quantization coefficient obtained by the decoding of the encoding data, to the inverse quantization unit 203.

In addition, in a case where the encoding information or the filter information is obtained by the decoding of the encoding data, the reversible decoding unit 202 supplies necessary encoding information to the intra prediction unit 212, the motion prediction compensation unit 213, or other necessary blocks.

Further, the reversible decoding unit 202 supplies the encoding information and the filter information to the class classification adaptive filter 206.

The inverse quantization unit 203 performs inverse quantization with respect to the quantization coefficient from the reversible decoding unit 202, in a system corresponding to a quantization system of the quantization unit 105 of FIG. 9, and supplies the conversion coefficient obtained by the inverse quantitation, to the inverse orthogonal conversion unit 204.

The inverse orthogonal conversion unit 204 performs inverse orthogonal conversion with respect to the conversion coefficient supplied from the inverse quantization unit 203, in a system corresponding to an orthogonal conversion system of the orthogonal conversion unit 104 of FIG. 9, and supplies a residual error obtained as a result thereof, to the operation unit 205.

The residual error is supplied to the operation unit 205 from the inverse orthogonal conversion unit 204, and a prediction image is supplied to the operation unit 205 from the intra prediction unit 212 or the motion prediction compensation unit 213 through the selection unit 214.

The operation unit 205 adds the residual error from the inverse orthogonal conversion unit 204, and the prediction image from the selection unit 214 together, generates the image during decoding, and supplies the image during decoding to the class classification adaptive filter 206, or the reordering buffer 207 and the frame memory 210. For example, in the images during decoding, the image during decoding that is the reference image used in the intra prediction, is supplied to the reordering buffer 207 and the frame memory 210, and the other images during decoding are supplied to the class classification adaptive filter 206.

As with the class classification adaptive filter 111, the class classification adaptive filter 206 performs the ILF processing according to the class classification adaptive processing with a filter functioning as the ILF, that is, all of the DF, the SAO, and the ALF.

That is, the class classification adaptive filter 206 sets the image during decoding from the operation unit 205, as the first image, and performs (the image conversion according to) the class classification adaptive processing using the tap coefficients for each of the classes included in the filter information from the reversible decoding unit 202, by using the encoding information of the reversible decoding unit 202 as necessary, and thus, converts the image during decoding as the first image into the filtered image as the second image corresponding to the original image (generates the filtered image) to be output.

Note that, in the class classification adaptive processing, the class classification adaptive filter 206 uses the class tap of the optimal tap structure indicated by the tap structure information included in the filter information from the reversible decoding unit 202, as the class tap used in the class classification.

The filtered image output by the class classification adaptive filter 206 is an image identical to the filtered image output by the class classification adaptive filter 111, and is supplied to the reordering buffer 207 and the frame memory 210.

The reordering buffer 207 temporarily stores the image during decoding supplied from the operation unit 205, and the filtered image supplied from the class classification adaptive filter 206, as the decoding image, reorders the frame (picture) of the decoding image from the encoding (decoding) order to the display order, and supplies the frame to the D/A conversion unit 208.

The D/A conversion unit 208 performs D/A conversion with respect to the decoding image supplied from the reordering buffer 207, and outputs the decoding image to a display (not illustrated) to be displayed.

The frame memory 210 temporarily stores the image during decoding from the operation unit 205, and the filtered image from the class classification adaptive filter 206, as the decoding image. Further, the frame memory 210 supplies the decoding image to the selection unit 211, as the reference image used for generating the prediction image, at a predetermined timing, or on the basis of a request from the outside such as the intra prediction unit 212 or the motion prediction compensation unit 213.

The selection unit 211 selects the supply destination of the reference image supplied from the frame memory 210. In a case where the image subjected to the intra encoding is decoded, the selection unit 211 supplies the reference image supplied from the frame memory 210, to the intra prediction unit 212. In addition, in a case where the image subjected to the inter encoding is decoded, the selection unit 211 supplies the reference image supplied from the frame memory 210, to the motion prediction compensation unit 213.

The intra prediction unit 212 performs the intra prediction by using the reference image supplied from the frame memory 210 through the selection unit 211, in accordance with the prediction mode included in the encoding information supplied from the reversible decoding unit 202, in the intra prediction mode used in the intra prediction unit 114 of FIG. 9. Then, the intra prediction unit 212 supplies the prediction image obtained by the intra prediction, to the selection unit 214.

The motion prediction compensation unit 213 performs the inter prediction by using the reference image supplied from the frame memory 210 through the selection unit 211, in accordance with the prediction mode included in the encoding information supplied from the reversible decoding unit 202, in the inter prediction mode used in the motion prediction compensation unit 115 of FIG. 9. The inter prediction is performed by using the motion information or the like included in the encoding information supplied from the reversible decoding unit 202, as necessary.

The motion prediction compensation unit 213 supplies the prediction image obtained by the inter prediction, to the selection unit 214.

The selection unit 214 selects the prediction image supplied from the intra prediction unit 212, or the prediction image supplied from the motion prediction compensation unit 213, and supplies the selected image to the operation unit 205.

<Configuration Example of Class Classification Adaptive Filter 206>

Figure 23:
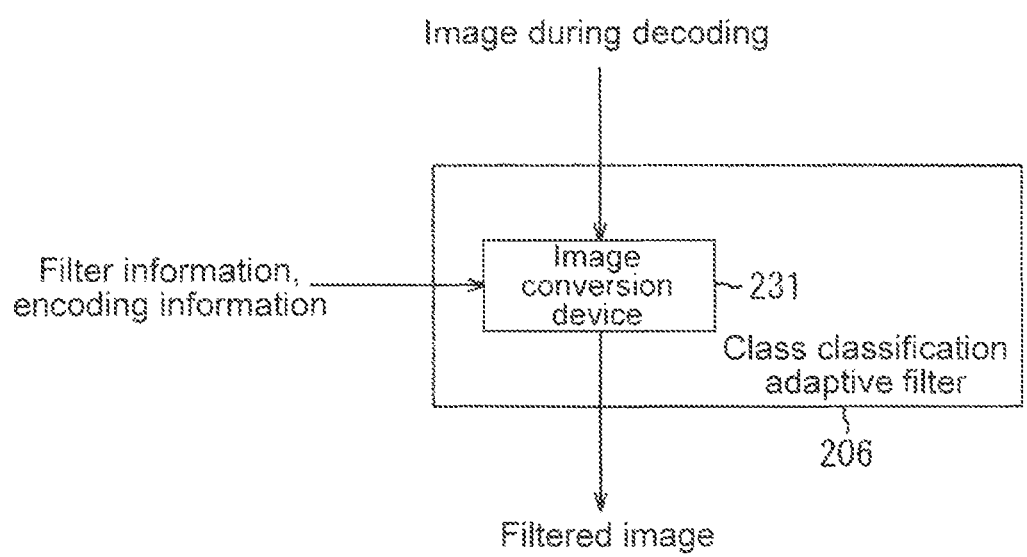
FIG. 23 is a block diagram illustrating a configuration example of a class classification adaptive filter 206.

FIG. 23 is a block diagram illustrating a configuration example of the class classification adaptive filter 206 of FIG. 22.

In FIG. 23, the class classification adaptive filter 206 includes an image conversion device 231.

The image during decoding is supplied to the image conversion device 231 from the operation unit 205 (FIG.

22), and the filter information and the encoding information are supplied to the image conversion device 231 from the reversible decoding unit 202.

As with the image conversion device 133 of FIG. 10, the image conversion device 231 sets the image during decoding as the first image, performs the class classification using the class tap of the optimal tap structure, indicated by the tap structure information included in the filter information, and performs the image conversion according to the class classification adaptive processing of performing the prediction operation as the filter processing using the tap coefficients for each of the classes, with respect to the optimal tap structure included in the filter information, and thus, converts the image during decoding as the first image into the filtered image as the second image corresponding to the original image (generates the filtered image), and supplies the image to the reordering buffer 207 and the frame memory 210 (FIG. 22).

Note that, as with the image conversion device 133 of FIG. 10, in the class classification adaptive processing, the image conversion device 231 performs the class classification, by using the encoding information as necessary.

<Configuration Example of Image Conversion Device 231>

Figure 24:
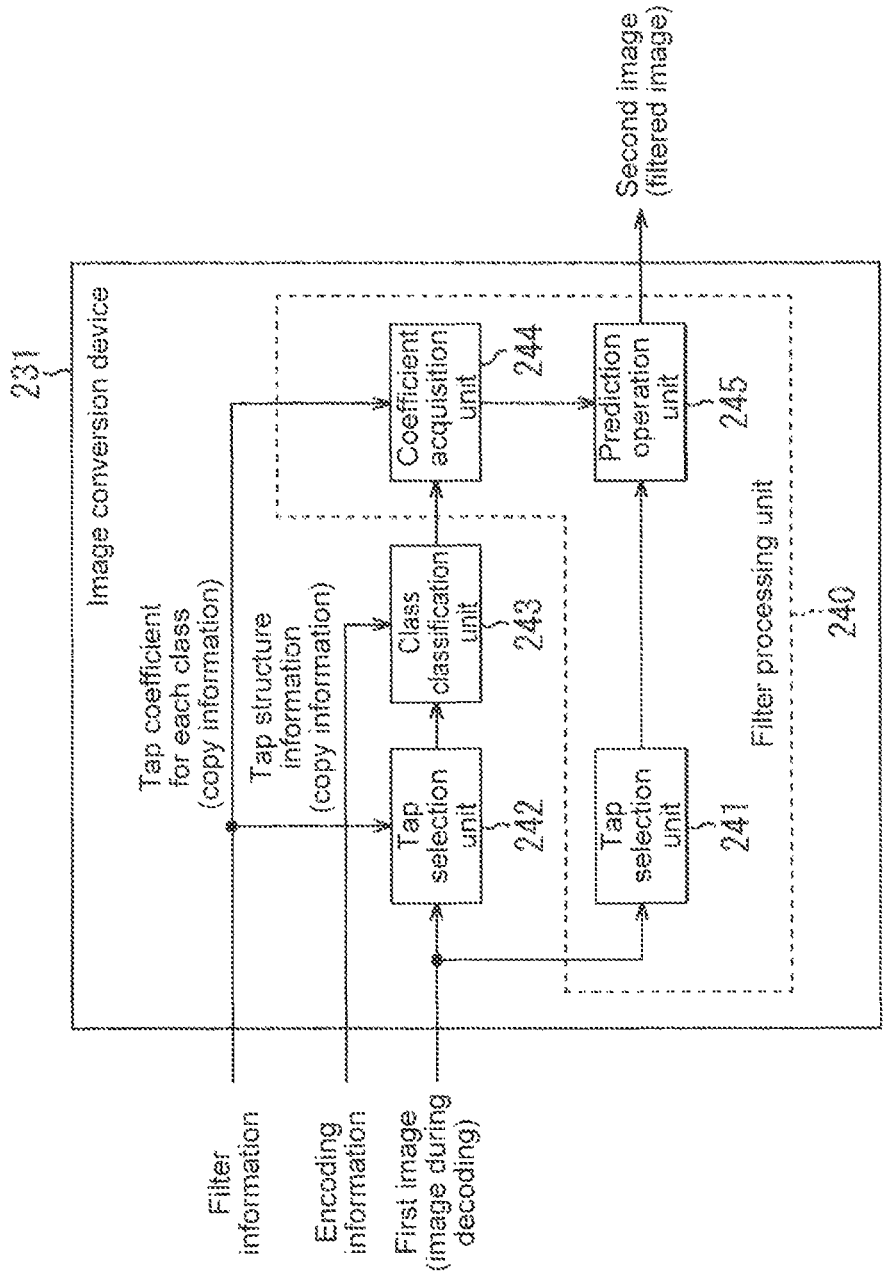
FIG. 24 is a block diagram illustrating a configuration example of an image conversion device 231.

FIG. 24 is a block diagram illustrating a configuration example of the image conversion device 231 of FIG. 23.

In FIG. 24, the image conversion device 231 includes tap selection units 241 242, a class classification unit 243, a coefficient acquisition unit 244, and a prediction operation unit 245.

Each of the tap selection unit 241 to the prediction operation unit 245 has configurations identical to those of the tap selection unit 191 to the prediction operation unit 195 configuring the image conversion device 133 (FIG. 19).

That is, the image during decoding is supplied to the tap selection units 241 and 242 from the operation unit 205 (FIG. 22).

The tap selection unit 241 sets the image during decoding from the operation unit 205 as the first image, and sequentially selects the pixels of the image during decoding as the target pixel.

Further, the tap selection unit 241 selects the prediction tap having a structure identical to that of the prediction tap that is selected by the tap selection unit 191 of FIG. 19, from the image during decoding, with respect to the target pixel, and supplies the prediction tap to the prediction operation unit 245.

The image during decoding is supplied to the tap selection unit 242 from the operation unit 205 (FIG. 22), and the filter information is supplied to the tap selection unit 242 from the reversible decoding unit 202.

The tap selection unit 242 sets the image during decoding from the operation unit 205 as the first image, with respect to the target pixel, and selects the pixel to be the class tap from the pixels of the image during decoding, in accordance with the tap structure information included in the filter information from the reversible decoding unit 202, and thus, selects the class tap of the optimal tap structure, indicated by the tap structure information included in the filter information, that is, the class tap having a configuration identical to that of the class tap configured by the tap selection unit 192 of FIG. 19, and supplies the class tap to the class classification unit 243.

The class tap is supplied to the class classification unit 243 from the tap selection unit 242, and the encoding information is supplied to the class classification unit 243 from the reversible decoding unit 202 (FIG. 22).

The class classification unit 243 performs the class classification identical to that of the class classification unit 193 of FIG. 19, by using the class tap from the tap selection unit 242, and by using the encoding information from the reversible decoding unit 202, as necessary, and supplies (the class code indicating) the class of the target pixel to the coefficient acquisition unit 244.

The class of the target pixel is supplied to the coefficient acquisition unit 244 from the class classification unit 243, and the filter information is supplied to the coefficient acquisition unit 244 from the reversible decoding unit 202.

The coefficient acquisition unit 244 stores the tap coefficients for each of the classes with respect to the optimal tap structure included in the filter information from the reversible decoding unit 202, acquires the tap coefficient of the class of the target pixel from the class classification unit 243, from the tap coefficients for each of the classes, and supplies the tap coefficient to the prediction operation unit 245.

The prediction operation unit 245 performs the prediction operation in Expression (1) as the filter processing, by using the prediction tap from the tap selection unit 241, and the tap coefficient from the coefficient acquisition unit 244, and obtains the prediction value of the pixel value of the corresponding pixel of the original image corresponding to the target pixel of the image during decoding, as the pixel value of the pixel of the filtered image as the second image, to be output.

Here, as with the tap selection unit 191, the coefficient acquisition unit 194, and the prediction operation unit 195 of the image conversion device 133 of FIG. 19, in the image conversion device 231 of FIG. 24, it can be described that the tap selection unit 241, the coefficient acquisition unit 244, and the prediction operation unit 245 configure a filter processing unit 240 performing the filter processing corresponding to the class of the target pixel.

Note that, in the filter information supplied to the image conversion device 231 from the reversible decoding unit 202, as described in FIG. 10, the copy information indicating whether or not to use the tap structure and the tap coefficients for each of the classes, identical to those at the time of updating the last-minute tap structure and the tap coefficient, as the tap structure of the class tap and the tap coefficients for each of the classes, can be included.

In a case where the copy information included in the most recent filter information supplied to the image conversion device 231 from the reversible decoding unit 202, does not indicate the copy mode, the tap selection unit 242 adopts the optimal tap structure indicated by the tap structure information included in the most recent filter information, as the tap structure of the class tap, instead of the optimal tap structure indicated by the tap structure information included in the previous filter information supplied to the image conversion device 231 from the reversible decoding unit 202.

Further, the coefficient acquisition unit 244 stores the tap coefficients for each of the classes included in the most recent filter information in the format of being overwritten on the tap coefficients for each of the classes included in the previous filter information.

On the other hand, in a case where the copy information included in the most recent filter information indicates the copy mode, the tap selection unit 242 adopts the optimal tap structure included in the previous filter information, as the tap structure of the class tap, as it is.

Further, the coefficient acquisition unit 244 maintains the storage of the tap coefficients for each of the classes included in the previous filter information.

Therefore, as with the image conversion device 133 (FIG. 10) (FIG. 19), in the image conversion device 231, in a case where the copy information included in the most recent filter information, indicates the copy mode, the last-minute tap structure of the class tap and the tap coefficients for each of the classes are maintained.

<Decoding Processing>

Figure 25:
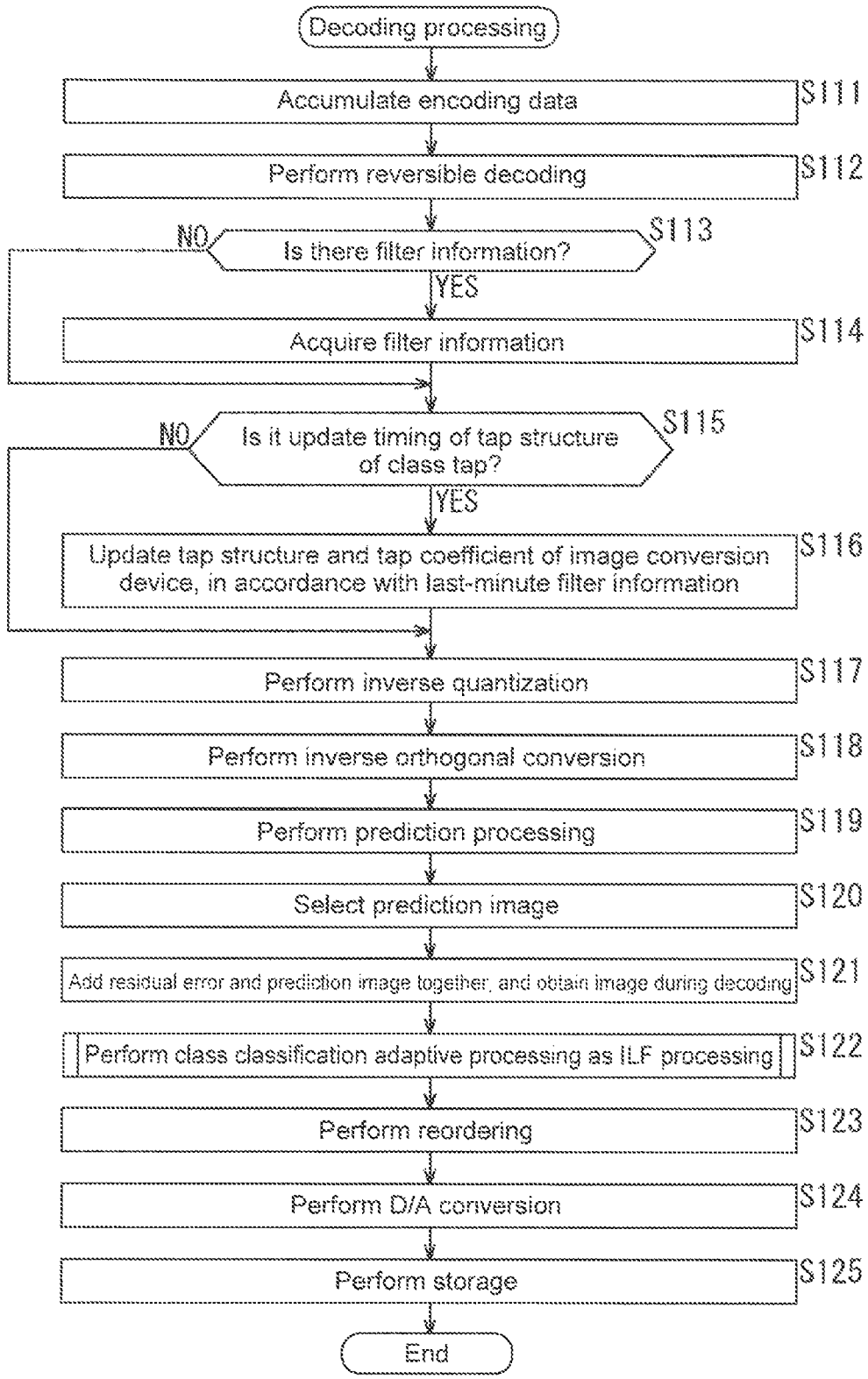
FIG. 25 is a flowchart illustrating an example of decoding processing of the decoding device 12.

FIG. 25 is a flowchart illustrating an example of the decoding processing of the decoding device 12 of FIG. 22.

Note that, the order of each of the steps of the decoding processing illustrated in FIG. 25 is an order for the convenience of the description, and the respective steps of the actual decoding processing are suitably performed in parallel, in a necessary order. The same applies to the decoding processing described below.

In the decoding processing, in Step S111, the accumulation buffer 201 temporarily accumulates the encoding data that is transmitted from the encoding device 11, and suitably supplies the encoding data to the reversible decoding unit 202, and the processing proceeds to Step S112.

In Step S112, the reversible decoding unit 202 accepts the encoding data supplied from the accumulation buffer 201 to be decoded, and supplies the quantization coefficient obtained by the decoding, to the inverse quantization unit 203.

In addition, in a case where the encoding information or the filter information is obtained by decoding the encoding data, the reversible decoding unit 202 supplies necessary encoding information to the intra prediction unit 212, the motion prediction compensation unit 213, or other necessary blocks.

Further, the reversible decoding unit 202 supplies the encoding information and the filter information to the class classification adaptive filter 206.

After that, the processing proceeds to Step S113 from Step S112, and the class classification adaptive filter 206 determines whether or not the filter information is supplied from the reversible decoding unit 202.

In Step S113, in a case where it is determined that the filter information is not supplied, the processing proceeds to Step S115 by skipping Step S114.

In addition, in Step S113, in a case where it is determined that the filter information is supplied, the processing proceeds to Step S114, and the image conversion device 231 (FIG. 24) of the class classification adaptive filter 206 acquires the filter information from the reversible decoding unit 202, and the processing proceeds to Step S115.

In Step S115, the image conversion device 231 determines whether or not it is the update timing of the tap structure of the class tap, that is, for example, whether or not it is the timing of the end point or the start point of the tap structure update unit such as a plurality of frames, one frame, and a block.

Here, the tap structure update unit, for example, can be recognized from the layers of the encoding data (for example, a sequence parameter set syntax, a picture parameter set syntax, a slice data syntax, or the like) in which the filter information is arranged (included).

For example, in a case where the filter information is arranged as the picture parameter set syntax of the encoding data, the tap structure update unit is recognized as one frame.

In Step S115, in a case where it is determined that it is not the update timing of the tap structure of the class tap, and the processing proceeds to Step S117 by skipping Step S116.

In addition, in Step S115, in a case where it is determined that it is the update timing of the tap structure of the class tap, the processing proceeds to Step S116.

In Step S116, the image conversion device 231 updates the tap structure of the class tap configured by the tap selection unit 242 (FIG. 24), and the tap coefficients for each of the classes stored in the coefficient acquisition unit 244 (FIG. 24), in accordance with the filter information acquired in Step S114 it before, and the processing proceeds to Step S117.

In Step S117, the inverse quantization unit 203 performs inverse quantization with respect to the quantization coefficient from the reversible decoding unit 202, and supplies the conversion coefficient obtained as a result thereof, to the inverse orthogonal conversion unit 204, and the processing proceeds to Step S118.

In Step S118, the inverse orthogonal conversion unit 204 performs inverse orthogonal conversion with respect to the conversion coefficient from the inverse quantization unit 203, and supplies the residual error obtained as a result thereof, to the operation unit 205, and the processing proceeds to Step S119.

In Step S119, the intra prediction unit 212 or the motion prediction compensation unit 213 performs the prediction processing of generating the prediction image, by using the reference image supplied from the frame memory 210 through the selection unit 211, and the encoding information supplied from the reversible decoding unit 202. Then, the intra prediction unit 212 or the motion prediction compensation unit 213 supplies the prediction image obtained by the prediction processing, to the selection unit 214, and the processing proceeds to Step S120 from Step S110.

In Step S120, the selection unit 214 selects the prediction image supplied from the intra prediction unit 212 or the motion prediction compensation unit 213, and supplies the prediction image to the operation unit 205, and the processing proceeds to Step S121.

In Step S121, the operation unit 205 adds the residual error from the inverse orthogonal conversion unit 204 and the prediction image from the selection unit 214 together, and thus, generates the image during decoding. Then, the operation unit 205 supplies the image during decoding to the class classification adaptive filter 206 or the reordering buffer 207, and the frame memory 210, and the processing proceeds to Step S122 from Step S121.

In a case where the image during decoding is supplied to the class classification adaptive filter 206 from the operation unit 205, in Step S122, the class classification adaptive filter 206 performs the class classification adaptive processing as the ILF processing, with respect to the image during decoding from the operation unit 205. The class classification adaptive processing is performed with respect to the image during decoding, and thus, as with a case of the encoding device 11, the filtered image close to the original image is obtained, compared to a case where the image during decoding filtered by an ILF.

The class classification adaptive filter 206 supplies the filtered image obtained by the class classification adaptive processing, to the reordering buffer 207 and the frame memory 210, and the processing proceeds to Step S123 from Step S122.

In Step S123, the reordering buffer 207 temporarily stores the image during decoding supplied from the operation unit 205, or the filtered image supplied from the class classification adaptive filter 206, as the decoding image. Further, the reordering buffer 207 reorders the stored decoding image to the display order, and supplies the decoding image to the D/A conversion unit 208, and the processing proceeds to Step S124 from Step S123.

In Step S124, the D/A conversion unit 208 performs D/A conversion with respect to the decoding image from the reordering buffer 207, and the processing proceeds to Step S125. The decoding image after the D/A conversion is output to the display (not illustrated) to be displayed.

In Step S125, the frame memory 210 stores the image during decoding supplied from the operation unit 205, or the filtered image supplied from the class classification adaptive filter 206, as the decoding image, and ends the decoding processing. The decoding image stored in the frame memory 210 is used in the prediction processing of Step S119, as the reference image that is a source for generating the prediction image.

Figure 26:
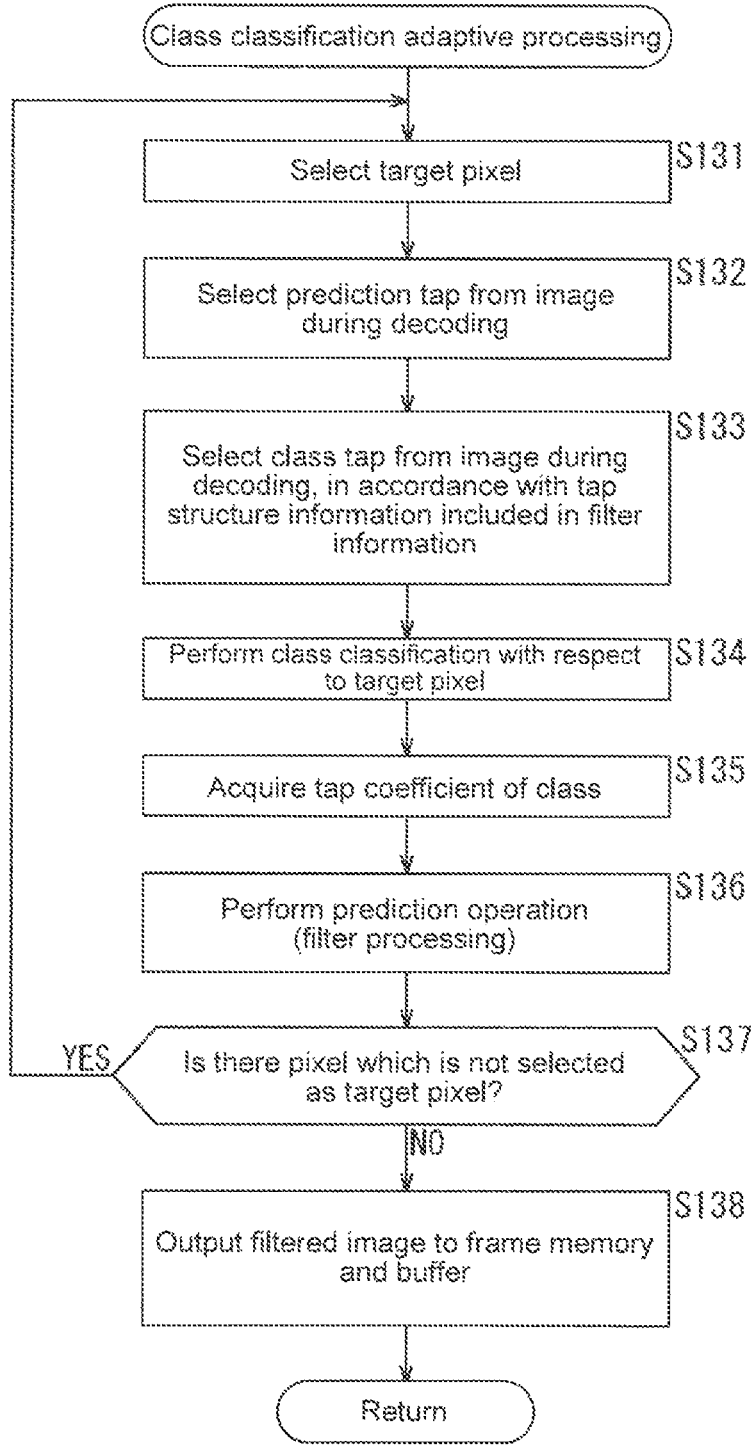
FIG. 26 is a flowchart illustrating an example of the class classification adaptive processing performed in Step S122.

FIG. 26 is a flowchart illustrating an example of the class classification adaptive processing performed in Step S122 of FIG. 25.

In the image conversion device 231 (FIG. 24) of the class classification adaptive filter 206, in Step S131, the tap selection unit 241 selects one of the pixels which is not yet set as the target pixel, in the pixels of (a block as) the image during decoding supplied from the operation unit 205 (FIG. 22), as the target pixel, and the processing proceeds to Step S132.

In Step S132, the tap selection unit 241 selects the pixel to be the prediction tap with respect to the target pixel, from the image during decoding supplied from the operation unit 205, and configures the prediction tap. Then, the tap selection unit 241 supplies the prediction tap to the prediction operation unit 245, and the processing proceeds to Step S133 from Step S132.

In Step S133, the tap selection unit 242 selects the pixel to be the class tap with respect to the target pixel, from the image during decoding supplied from the operation unit 205, in accordance with the tap structure information included in the filter information from the reversible decoding unit 202 (FIG. 22), and thus, configures the class tap of the optimal tap structure indicated by the tap structure information included in the filter information. Then, the tap selection unit 242 supplies the class tap to the class classification unit 243.

That is, the tap structure of the class tap configured by the tap selection unit 242, is updated in accordance with the update of the tap structure of the class tap in Step S116 of FIG. 25, performed immediately before, and the tap selection unit 192 configures the class tap of the tap structure after being updated, and supplies the class tap to the class classification unit 243.

After that, the processing proceeds to Step S134 from Step S133, and the class classification unit 243 performs the class classification of the target pixel, by using the class tap with respect to the target pixel, and by using the encoding information with respect to the target pixel, as necessary. Then, the class classification unit 243 supplies the class of the target pixel obtained by the class classification, to the coefficient acquisition unit 244, and the processing proceeds to Step S135 from Step S134.

The coefficient acquisition unit 244 stores the tap coefficients for each of the classes included in the filter information supplied from the reversible decoding unit 202, that is, the tap coefficients for each of the classes with respect to the optimal tap structure of the class tap configured by the tap selection unit 242, in accordance with the update of the tap coefficient in Step S116 of FIG. 25, performed immediately before. In Step S135, the coefficient acquisition unit 244 acquires the tap coefficient of the class of the target pixel supplied from the class classification unit 243, from the tap coefficients for each of the classes with respect to the stored optimal tap structure, and supplies the tap coefficient to the prediction operation unit 245, and the processing proceeds to Step S136.

In Step S136, the prediction operation unit 245 performs the prediction operation in Expression (1) as the filter processing, by using the prediction tap from the tap selection unit 241 and the tap coefficient from the coefficient acquisition unit 244. Accordingly, the prediction operation unit 245 obtains the prediction value of the pixel value of the corresponding pixel of the original image corresponding to the target pixel, as the pixel value of the filtered image, and the processing proceeds to Step S137.

In Step S137, the tap selection unit 241 determines whether or not there is a pixel which is not yet set as the target pixel, in the pixels of (the block as) the image during decoding from the operation unit 205. In Step S137, in a case where is determined that there is a pixel which is not yet set as the target pixel, and the processing returns to Step S131, and hereinafter, the same processing will be repeated.

In addition, in Step S137, in a case where it is determined that there is no pixel which is not yet set as the target pixel, the processing proceeds to Step S138, and the prediction operation unit 245 supplies the filtered image configured of the pixel value obtained with respect to (the block as) the image during decoding from the operation unit 205, to the reordering buffer 207 and the frame memory 210 (FIG. 22). Then, the class classification adaptive processing is ended, and the processing proceeds to Return.

As described above, in the encoding device 11 and the decoding device 12, the ILF processing is performed by the class classification adaptive processing, and thus, it is possible to obtain the filtered image close to the original image, compared to a ILF processing result. As a result thereof, it is possible to greatly improve S/N of the decoding image. Further, it is possible to obtain the filtered image close to the original image, and thus, the residual error decreases, and even in a case where the tap coefficient is included in the encoding data as the overhead, in particular, it is possible to greatly improve the compression efficiency with respect to the original image having a large data amount and a high resolution referred to as 4 k, 8 k, or the like.

Further, in the encoding device 11 and the decoding device 12, the tap structure of the class tap is updated to the tap structure selected from the plurality of tap structures, at a timing when the tap structure update unit is the minimum unit. Therefore, the tap structure of the class tap is updated to classify the target pixel into a suitable class, and thus, it is possible to obtain the filtered image closer to the original image, and as a result thereof, it is possible to more greatly improve S/N of the decoding image.

Note that, in the first configuration example of the encoding device 11 of FIG. 9, all of the processings of the ILF, that is, the DF, the SAO, and the ALF are performed by the class classification adaptive processing, but in the class classification adaptive processing, not only all of the processings of the ILF, but also one or two processings of the DF, the SAO, and the ALF can be performed. The same applies to the first configuration example of the decoding device 12 of FIG. 22, and another configuration example of the encoding device 11 and the decoding device 12 described below.

<Reduction in Tap Coefficient>

Figure 27:
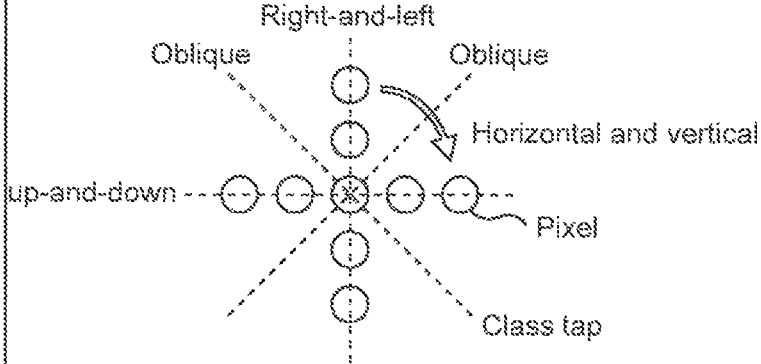
FIG. 27 is a diagram illustrating an example of a reduction method of reducing a tap coefficient for each class.

FIG. 27 is a diagram illustrating an example of a reduction method of reducing the tap coefficients for each of the classes obtained by the tap coefficient learning.

The tap coefficient becomes the overhead of the encoding data, and thus, even in a case of obtaining a tap coefficient in which the filtered image is an image extremely close to the original image, the improvement of the compression efficiency is hindered as the data amount of the tap coefficient increases.

Therefore, the (number of) tap coefficients obtained by the tap coefficient learning, can be reduced as necessary.

For example, as illustrated in FIG. 27, in a case where a cross type class tap configured of nine pixels in total of the target pixel, and two pixels adjacent to each of an upper side, a lower side, a right side, and a left side of the target pixel, centered on the target pixel, is configured, and the class classification according to the one-bit ADRC processing is performed, for example, the most significant bit (an ADRC result of the target pixel) inverts each bit with respect to one ADRC code, and thus, the number of classes can be degenerated to $256=2^8$ classes from $512=2^9$ classes. In 256 classes after the class is degenerated, the data amount of the tap coefficient is reduced to ½, compared to a case where the ADRC code of (the one-bit ADRC processing of) of the class tap of the nine pixels is set as the class code, as it is.

Further, the class is degenerated such that the classes having the same ADRC result of the pixels in a line-symmetric position relationship in an up-and-down direction, a right-and-left direction, or an oblique direction, in nine pixels of a cross type configuring the class tap, fall within one class, and thus, the number of classes can be set to 100 classes. In this case, the data amount of the tap coefficients of 100 classes is approximately 39% of the data amount of the tap coefficients of 256 classes.

In addition, the class is degenerated such that the classes having the same ADRC result of the pixels in a point-symmetric position relationship, in nine pixels of the cross type configuring the class tap, fail within one class, and thus, the number of classes can be set to 55 classes. In this case, the data amount of the tap coefficients of 55 classes is approximately 21% of the data amount of the tap coefficients of 256 classes.

In addition, the class can be degenerated, for example, by calculating an integrated index of integrating the classes, and by integrating a plurality of classes into one class, on the basis of the integrated index.

For example, a square sum of differences between each of the tap coefficients of one class C1, and each of the tap coefficients of the other class C2, or the like, is defined as a distance between tap coefficients, and the distance between the coefficients is used as the integrated index, and thus, classes C1 and C2 of less than or equal to a threshold value, can be integrated into one class C by the distance between the coefficients as the integrated index. In a case where the classes are integrated, the tap coefficient of the class C1 before being integrated or the tap coefficient of the class C2 before being integrated can be adopted as the tap coefficient of the class after being integrated. In addition, the tap coefficient of the class after being integrated can be obtained again by the tap coefficient learning.

Further, for example, in a case where the RD cost is used as the integrated index, and the RD cost after the class C1 and the class C2 are integrated, is improved compared to a case of the RD cost before one class C1 and the other class C2 are integrated, the classes C1 and C2 can be integrated into one class C.

Note that, as described above, in a case where a plurality of classes is integrated into one class on the basis of the integrated index, the tap coefficients for each of the classes after being integrated, are transmitted to the decoding device 12 from the encoding device 11, as the filter information, but it is also necessary that information indicating a corresponding relationship between the class before being integrated and the class after being integrated (information that is capable of recognizing the corresponding relationship on the decoding device 12 side) to the decoding device 12 from the encoding device 11, as the filter information.

As described above, the reduction of the tap coefficient can be performed by reducing the tap coefficient itself, in addition to degenerating the class.

That is, for example, in a case where the prediction tap and the encoding block are configured of the same pixel, it is possible to reduce the tap coefficient itself on the basis of the block phase.

For example, as illustrated in FIG. 27, in a case where the prediction tap and the encoding block are configured of 4×4 pixels, a tap coefficient in which the tap coefficients of each of 2×2 pixels on the upper left side are arranged again in accordance with the position relationship, can be adopted as the tap coefficients of 2×2 pixels on an upper left side of the prediction tap, 2×2 pixels on an upper right side which are in the line-symmetric position relationship in the right-and-left direction, 2×2 pixels on a lower left side which are in the line-symmetric position relationship in the up-and-down direction, and 2×2 pixels on a lower right side which are in the point-symmetric position relationship. In this case, 16 tap coefficients with respect to 4×4 pixels configuring the prediction tap, can be reduced to four tap coefficients with respect to 2×2 pixels on the upper left side.

In addition, a tap coefficient in which the tap coefficients of each of 4×2 pixels of the upper half are arranged again in accordance with the position relationship, can be adopted as the tap coefficients of 4×2 pixels of the upper half of the prediction tap, and 4×2 pixels of the lower half, which are in the line-symmetric position relationship in the up-and-down direction. In this case, 16 tap coefficients with respect to 4×4 pixels configuring the prediction tap, can be reduced to eight tap coefficients with respect to 4×2 pixels of the upper half.

In addition, the same tap coefficient is adopted as the tap coefficients of the pixels of the prediction tap in the line-symmetric position relationship in the right-and-left direction, or the pixels in the line-symmetric position relationship in the oblique direction, and thus, it is possible to reduce the tap coefficient.

<Second Configuration Example of Encoding Device 11>

Figure 28:
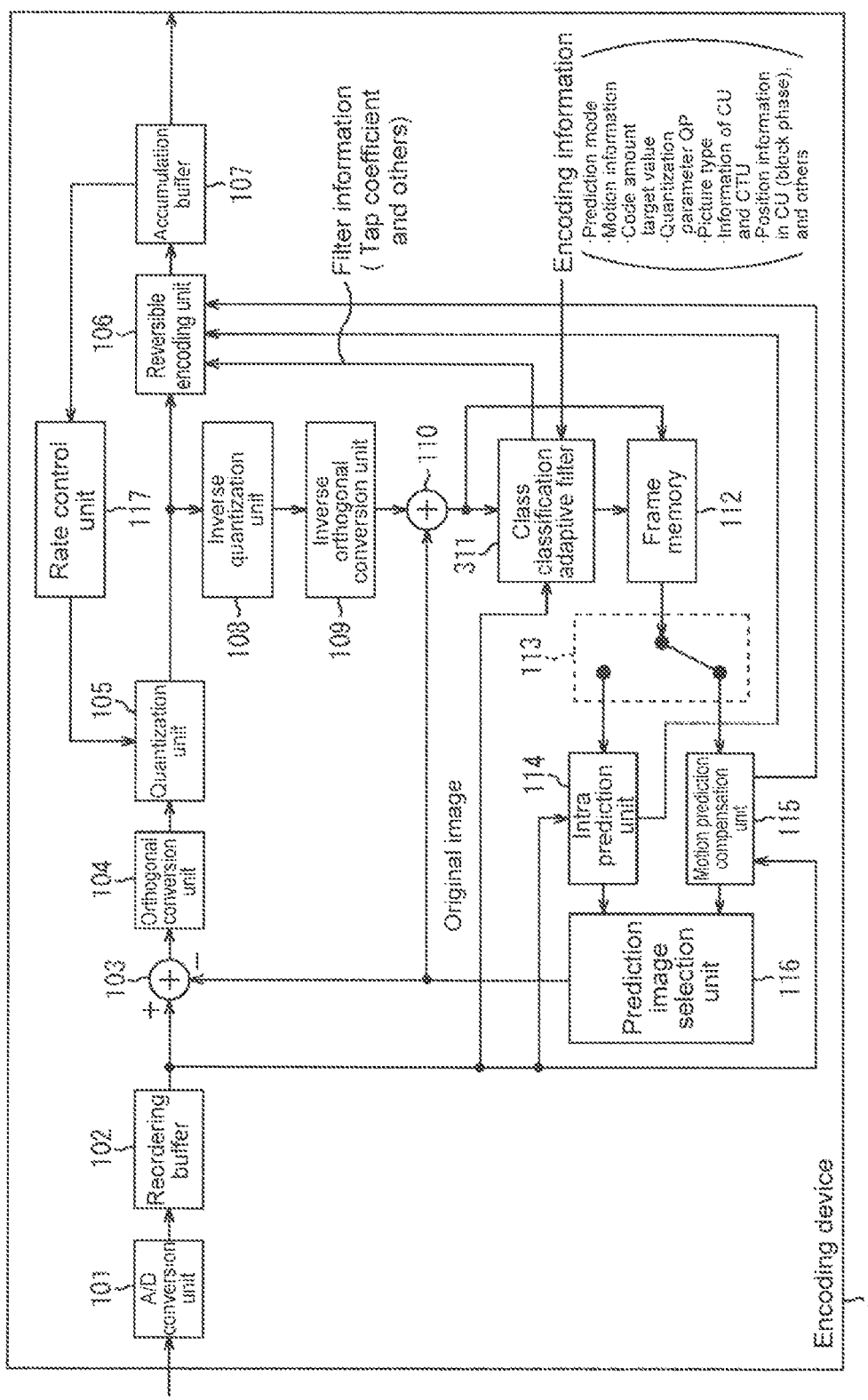
FIG. 28 is a block diagram illustrating a second configuration example of the encoding device 11.

FIG. 28 is a block diagram illustrating a second configuration example of the encoding device 11 of FIG. 1.

Note that, in the drawings, the same reference numerals will be applied to portions corresponding to those of FIG. 9, and hereinafter, the description thereof will be suitably omitted.

In FIG. 28, the encoding device 11 includes the A/D conversion unit 101 to the operation unit 110, the frame memory 112 to the rate control unit 117, and a class classification adaptive filter 311.

Therefore, the encoding device 11 of FIG. 28 is common to that of FIG. 9, in that the A/D conversion unit 101 to the operation unit 110, and the frame memory 112 to the rate control unit 117 are provided.

Here, the encoding device 11 of FIG. 28 is different from that of FIG. 9, in that the class classification adaptive filter 311 is provided instead of the class classification adaptive filter 111.

As with the class classification adaptive filter 111 of FIG. 9, the class classification adaptive filter 311 performs the ILF processing according to the class classification adaptive processing with a filter functioning as the ILF, that is, ail of the DF, the SAO, and the ALF.

<Configuration Example of Class Classification Adaptive Filter 311>

Figure 29:
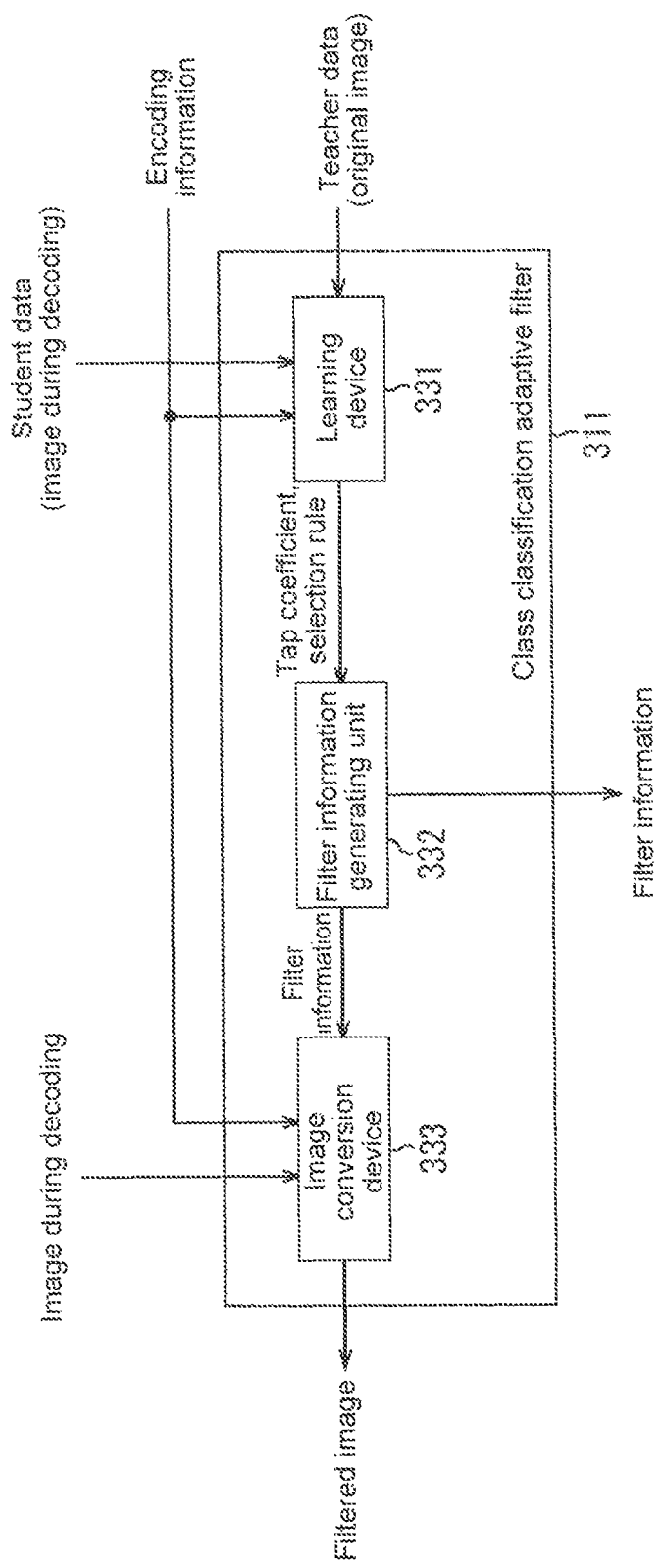
FIG. 29 is a block diagram illustrating a configuration example of a class classification adaptive filter 311.

FIG. 29 is a block diagram illustrating a configuration example of the class classification adaptive filter 311 of FIG. 28.

In FIG. 29, the class classification adaptive filter 311 includes a learning device 331, a filter information generating unit 332, and an image conversion device 333.

The original image is supplied to the learning device 331 from the reordering buffer 102 (FIG. 28), and the image during decoding is supplied to the learning device 331 from the operation unit 110 (FIG. 28). Further, the encoding information is supplied to the learning device 331.

The learning device 331 sets the image during decoding as the student data, sets the original image as the teacher, and performs the tap coefficient learning of obtaining the tap coefficients for each of the classes.

Further, the learning device 331 supplies the tap coefficients for each of the classes obtained by the tap coefficient learning, and a selection rule of selecting the tap structure of the class tap used for obtaining the tap coefficients for each of the classes, to the filter information generating unit 332.

Note that, in the tap coefficient learning, the learning device 331 is capable of performing the class classification by using the encoding information as necessary.

The filter information generating unit 332 generates the filter information including the tap coefficients for each of the classes, and the selection rule as necessary, from the learning device 331, and supplies the filter information to the image conversion device 333 and the reversible encoding unit 106 (FIG. 28).

The filter information is supplied to the image conversion device 333 from the filter information generating unit 332, the image during decoding is supplied to the image conversion device 333 from the operation unit 110 (FIG. 28), and the encoding information is supplied to the image conversion device 333.

The image conversion device 333, for example, sets the image during decoding as the first image, and performs the image conversion according to the class classification adaptive processing using the tap coefficients for each of the classes included in the filter information from the filter information generating unit 332, and thus, converts the image during decoding as the first image into the filtered image as the second image corresponding to the original image (generates the filtered image), and supplies the filtered image to the frame memory 112 (FIG. 28).

Note that, in the class classification adaptive processing, the image conversion device 333 is capable of performing the class classification by using the encoding information as necessary.

In order to greatly improve S/N of the filtered image, and to prevent the compression efficiency from being degraded, in the class classification adaptive filter 311 of FIG. 29, the learning device 331 selects the tap structure of the class tap from the plurality of tap structures, in accordance with each of a plurality of selection rules, and performs the tap coefficient learning with respect to each of the plurality of selection rules, and thus, obtains the tap coefficients for each of the classes.

Further, the learning device 331 obtains the tap structure evaluation value indicating the adequateness of using the class tap of the tap structure selected in accordance with the selection rule, in the class classification, with respect to each of the plurality of selection rules, and selects a selection rule having the most excellent tap structure evaluation value, as an optimal selection rule.

Then, the learning device 331 supplies the optimal selection rule, and the tap coefficients for each of the classes with respect to the optimal tap structure that is the tap structure selected in accordance with the optimal selection rule (the tap coefficients for each of the classes obtained by the tap coefficient learning using the class tap of the optimal tap structure), to the filter information generating unit 332.

Here, for example, S/N of the corresponding image corresponding to the original image as the teacher data, obtained by performing the filter processing using the tap coefficients for each of the classes with respect to the tap structure selected in accordance with each of the selection rules (here, for example, the class classification adaptive processing), with respect to the result image during decoding as the student data, and the like can be adopted as the tap structure evaluation value with respect to each of the plurality of selection rules.

In addition, for example, the RD cost or the like in a case of encoding the original image as the teacher data by adopting the filter processing using the tap coefficients for each of the classes with respect to the tap structure selected in accordance with each of the selection rules, and the like can be adopted as the tap structure evaluation value with respect to each of the plurality of selection rules.

The selection rule is a rule of defining a method of selecting a tap structure in accordance with acquirable information that can be acquired by the decoding device 12 from the encoding data from the encoding device 11. In the selection rule, for example, it is defined that what kind of tap structure is selected in what kind of case of what kind of acquirable information.

A rule itself of specifically defining that what kind of tap structure is selection in what kind of case of what kind of acquirable information, can be adopted as the selection rule supplied to the filter information generating unit 332 by the learning device 331.

In addition, a plurality of rules of specifically defining that what kind of tap structure is selection in what kind of case of what kind of acquirable information, can be prepared, an unique ID can be assigned to each of the plurality of rules, and the ID can be adopted as the selection rule supplied to the filter information generating unit 332 by the learning device 331.

In the selection rule, for example, the tap structure selected as the tap structure of the class tap, can be defined from the plurality of tap structures determined in advance.

For example, the image during decoding, the encoding information, or the like, obtained from the encoding data, can be adopted as the acquirable information defined in the selection rule.

The filter information generating unit 332 generates the filter information including the tap coefficients for each of the classes, and the selection rule as necessary, from the learning device 331.

The copy information described in FIG. 10 can be included in the filter information.

The filter information includes the copy information without including the tap coefficients for each of the classes and the selection rule, and thus, it is possible to greatly reduce the data amount of the filter information, and to improve the compression efficiency, compared to a case of including the tap coefficients for each of the classes and the selection rule.

In addition, as with a case described in FIG. 10, an arbitrary picture sequence such as a plurality of frames, one frame, CU, or a block, can be adopted as the tap structure update unit for updating the tap structure of the class tap (and the tap coefficient).

Then, the filter information, for example, can be included in the encoding data as a sequence parameter set syntax, a picture parameter set syntax, or a slice data syntax.

<Example of Acquirable Information>

FIG. 30 is a diagram illustrating an example of the acquirable information used in the selection of the tap structure of the class tap.

The image feature amount of the image during decoding or the encoding information (including information that can be recognized from the image feature amount or the encoding information) can be adopted as the acquirable information.

That is, in the image during decoding, image feature amount of the entire picture (frame) of the target pixel, the local image feature amount target in the vicinity of the pixel, the encoding information of the target pixel, and the like can be adopted as the acquirable information used in the selection of the tap structure of the class tap.

For example, the activity of the entire screen (the entire picture) (for example, a sum of the difference absolute value sums of the adjacent pixels in the horizontal direction and the vertical direction, or the like), a direction difference absolute value sum of the entire screen (difference absolute value sums of the adjacent pixels in each of a plurality of directions such as the horizontal direction, the vertical direction, and the oblique direction), an inter-frame difference absolute value sum of the entire screen (the difference absolute value sums of the pixels in the same position between the frame of the target pixel and the previous frame of the frame), and the like can be adopted as the image feature amount of the entire picture of the target pixel.

According to the activity of the entire screen, it is possible to recognize a frequency band (the entire screen band) of the entire screen.

In a case where the entire screen band is high, (it is assumed that) a scene including texture-like details is reflected in the picture of the target pixel, and thus, it is possible to suitably classify the target pixel by densely stretching the class tap (being configured of dense pixels). Therefore, in the selection rule, in a case where the entire screen band as the acquirable information is high, that is, in a case where the entire screen band is greater than or equal to a threshold value, it is possible to define that the tap structure of the dense pixel is selected as the tap structure of the class tap specific threshold value or the tap structure can be included in the selection rule.

In a case where the entire screen band is low, a scene in which the details are lost and the edge is blurred, is reflected in the picture of the target pixel, and thus, it is possible to suitably classify the target pixel by sparsely stretching the class tap (being configured of sparse pixels). Therefore, in the selection rule, in a case where the entire screen band as the acquirable information is low, that is, in a case where the entire screen band is less than the threshold value, it is possible to define that the tap structure of the sparse pixel is selected as the tap structure of the class tap.

The direction difference absolute value sum of the entire screen is large in a scene including a lot of edges in the horizontal direction, the vertical direction, and the oblique direction, and in accordance with such a direction difference absolute value sum of the entire screen, it is possible to recognize a main structure of the picture of the target pixel, that is, a main edge (the structure line) existing in the picture of the target pixel.

The class tap is stretched in the direction of the edge and in a direction orthogonal to the edge (configured of the pixels in the direction of the edge, and the direction orthogonal to the edge), and thus, it is possible to suitably classify the target pixel. Therefore, in the selection rule, it is possible to define that the tap structure configured of the pixels in one or both of the direction of the main edge existing in the picture as the acquirable information, and the direction orthogonal to such an edge, is selected as the tap structure of the class tap. That is, in the selection rule, for example, it is possible to define that the tap structure configured of the pixels in a direction in which the direction difference absolute value sum of the entire screen is maximized, in the horizontal direction, the vertical direction, and the oblique direction, and a direct on orthogonal to the direction, is selected as the tap structure of the class tap.

The inter-frame difference absolute value sum of the entire screen is small in a scene in which the same patterns are consecutive in the time direction, and in accordance with the inter-frame difference absolute value sum of the entire screen, at is possible to recognize a mutual relationship in the time direction of the picture of the target pixel.

In a case where the mutual relationship in the time direction of the picture of the target pixel is large, a tap structure identical to the tap structure used in the previous picture as the tap structure of the class tap, is used as the tap structure of the class tap (the same setting as before is applied), and thus, as with the previous picture, it is possible to suitably classify the target pixel. Therefore, in the selection rule, in a case where the mutual relationship in the time direction of the picture of the target pixel as the acquirable information is large (in a case where the mutual relationship is greater than or equal to a threshold value), it is possible to define that the tap structure identical to the tap structure used in the previous picture, is selected as the tap structure of the class tap.

For example, local activity in the vicinity of the target pixel, a local direction difference absolute value sum, a local inter-frame difference absolute value sum, and the like can be adopted as the local image feature amount in the vicinity of the target pixel.

According to the local activity, it is possible to recognize a local frequency band (a local band) in the vicinity of the target pixel.

As with the selection rule using the entire screen band, in the selection rule using the local band, it is possible to define that in a case where the local band is high, the tap structure of the dense pixel is selected as the tap structure of the class tap, and in a case where the local band is low, the tap structure of the sparse pixel is selected as the tap structure of the class tap.

According to the local direction difference absolute value sum, it is possible to recognize a local (main) edge in the vicinity of the target pixel.

As with the selection rule using the main edge existing in the picture, in the selection rule using the local edge, it is possible to define that a tap structure configured of the pixels in one or both of the direction of the local edge, and a direction orthogonal to such an edge, is selected as the tap structure of the class tap.

According to the local inter-frame difference absolute value sum, it is possible to recognize a local mutual relationship in the time direction in the vicinity of the target pixel.

As with the selection rule using the mutual relationship in the time direction of the picture, in the selection rule using the local mutual relationship in the time direction, in a case where the local mutual relationship in the time direction is large, it is possible to define that the tap structure identical to the tap structure used in the previous picture, is selected as the tap structure of the class tap.

For example, the picture type of (the block of) the target pixel, the motion vector (MV), the information of the intra prediction, and the like can be used in the selection rule, as the encoding information of the target pixel.

For example, in the selection rule, in a case where the picture type of the target pixel is the P picture or the B picture, it is possible to define that a tap structure identical to the tap structure used in the I picture that is referred to in the inter prediction of the P picture or the B picture, is selected as the tap structure of the class tap (the same setting as before is applied).

In the scene in which the same patterns are consecutive in the time direction, the tap structure identical to the tap structure used in the I picture that is referred to in the inter prediction of the P picture or the B picture, is selected as the tap structure of the class tap, and thus, it is possible to prevent the compression efficiency from being degraded, and to suitably classify the target pixel.

In addition, for example, in the selection rule, it is defined that a tap structure identical to a tap structure used in the pixels of the previous picture in which (it is assumed that) an object identical to an object reflected in the target pixel is reflected, is selected as the tap structure of the class tap (the same setting as before is applied), in accordance with the motion vector of the target pixel.

In a scene in which the same objects exist consecutively in the time direction, the tap structure identical to the tap structure used in the pixel of the previous picture in which the object identical to the object reflected in the target pixel is reflected, is selected as the tap structure of the class tap, and thus, it is possible to prevent the compression efficiency from being degraded, and to suitably classify the target pixel.

Further, for example, in the selection rule, it is possible to define that tap structure configured of the pixels in the direction of the edge, and the direction orthogonal to the edge, is selected as the tap structure of the class tap, in accordance with the direction of the local (main) edge in the vicinity of the target pixel, obtained from the information of the intra prediction.

Here, for example, in the AVC or the HEVC, direction information indicating a direction in which the pixels used in the intra prediction, exist, is transmitted for each block, as the information of the intra prediction. The direction of the local edge in the vicinity of the target pixel (spatial direction information) can be acquired by performing statistical processing of the direction information, or the like.

Note that, in the direction difference absolute value sum or the local direction difference absolute value sum of the entire screen, described above, it is possible to recognize the direction of the edge, but it is necessary that the direction difference absolute value sum is obtained by performing pixel level processing using the pixel value. In contrast, in accordance with the direction information as the information of the intra prediction, it is possible to acquire (recognize) the direction of the edge without performing the pixel level processing.

<Configuration Example of Learning Device 331>

Figure 31:
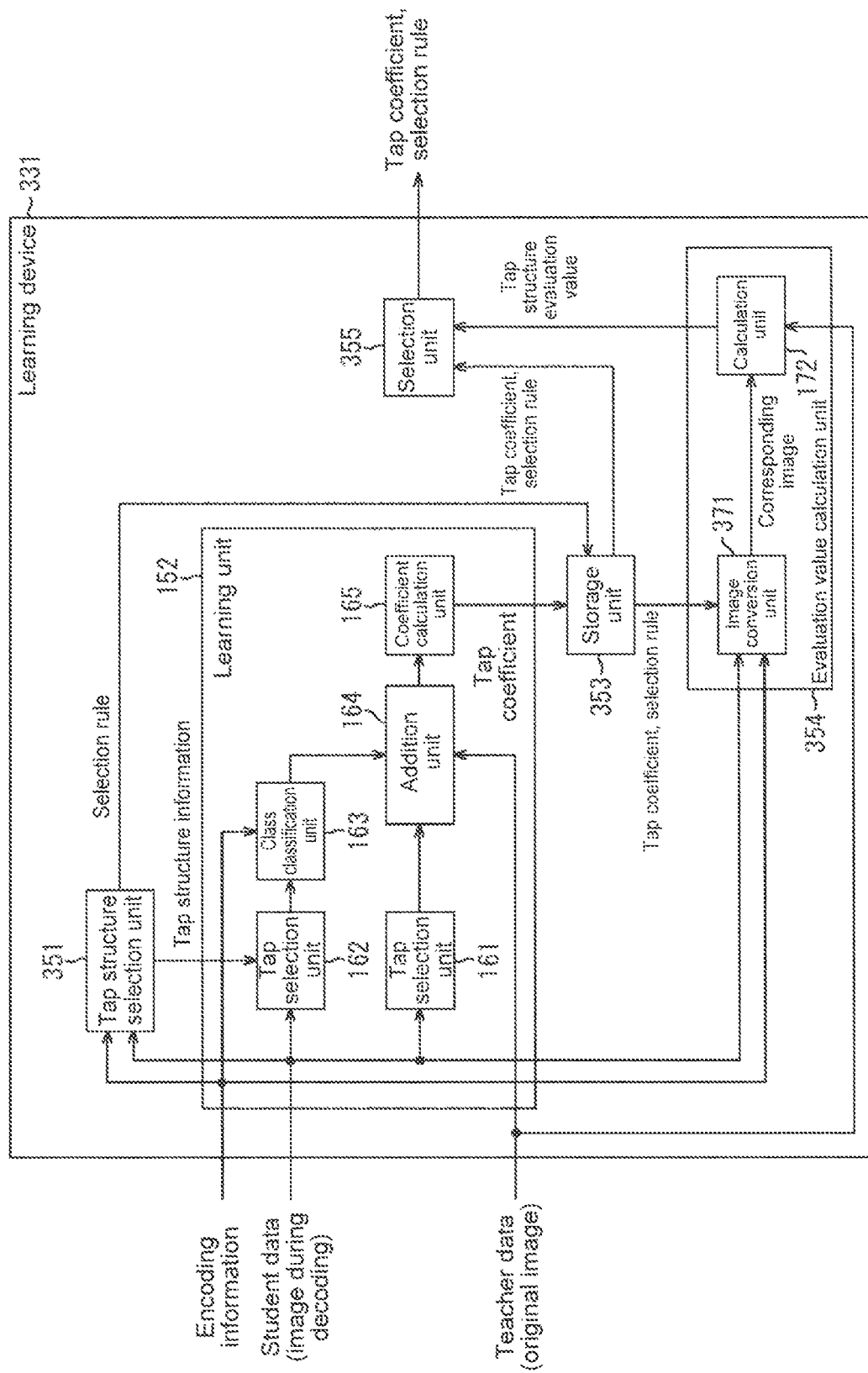
FIG. 31 is a block diagram illustrating a configuration example of a learning device 331.

FIG. 31 is a block diagram of a configuration example of the learning device 331 of FIG. 29.

Note that, in the drawings, the same reference numerals will be applied to portions corresponding to the learning device 131 of FIG. 11, and hereinafter, the description thereof will be suitably omitted.

In FIG. 31, the learning device 331 includes the learning unit 152, a tap structure selection unit 351, a storage unit 353, an evaluation value calculation unit 354, and a selection unit 355.

Therefore, the learning device 331 is common to the learning device 131 of FIG. 11, in that the learning unit 152 is provided.

Here, the learning device 331 is different from the learning device 131 of FIG. 11, in that the tap structure selection unit 351, the storage unit 353, the evaluation value calculation unit 354, and the selection unit 355 are provided instead of the tap structure selection unit 151, the storage unit 153, the evaluation value calculation unit 154, and the selection unit 155.

The tap structure selection unit 351, for example, stores (information of) candidates of the plurality of selection rules determined in advance, and selects sequentially the candidates of the plurality of selection rules, as a target selection rule. Then, the tap structure selection unit 351 supplies a selection rule indicating the target selection rule, to the storage unit 353.

In addition, the image during decoding as the student data, and the encoding information are supplied to the tap structure selection unit 351.

The tap structure selection unit 351 selects one tap structure from the plurality of tap structures determined in advance, as the target tap structure, in accordance with the target selection rule, by using one or both of the image during decoding and the encoding information, as the acquirable information. Then, the tap structure selection unit 351 supplies the tap structure information indicating the target tap structure, to (the tap selection unit 162 of) the learning unit 152.

In the learning unit 152, the tap coefficient learning using the class tap of the target tap structure indicated by the tap structure information from the tap structure selection unit 351, is performed as described in FIG. 11, and the tap coefficients for each of the classes are obtained.

Therefore, in FIG. 31, in the learning unit 152, the tap coefficient learning is performed with respect to each of the tap structures selected in accordance with the plurality of selection rules stored in the tap structure selection unit 351, and the tap coefficients for each of the classes are obtained.

Then, the tap coefficients for each of the classes obtained by performing the tap coefficient learning with respect to each of the plurality of selection rules in the learning unit 152, are supplied to the storage unit 353.

The storage unit 353 stores the selection rule selected as the target selection rule, supplied from the tap structure selection unit 351, and the tap coefficients for each of the classes with respect to target selection rule supplied from the learning unit 152 to be associated with each other.

The evaluation value calculation unit 354 obtains the tap structure evaluation value indicating the adequateness of using the class tap of the tap structure selected in accordance with the selection rule in the class classification, with respect to the plurality of selection rules stored in the tap structure selection unit 351, and supplies the tap structure evaluation value to the selection unit 355.

The image during decoding as the student data, identical to that supplied to the learning unit 152, the original image as the teacher data, and the encoding information are supplied to the evaluation value calculation unit 354.

The evaluation value calculation unit 354 includes the calculation unit 172 and an image conversion unit 371.

Therefore, the evaluation value calculation unit 354 has a configuration identical to that of the evaluation value calculation unit 154 of FIG. 11, in that the calculation unit 172 is provided.

Here, the evaluation value calculation unit 354 is different from the evaluation value calculation unit 154 of FIG. 11, in that the image conversion unit 371 is provided instead of the image conversion unit 171.

The image conversion unit 371 sets the image during decoding supplied to the evaluation value calculation unit 354, as the first image, and performs the class classification adaptive processing, and thus, converts the image during decoding as the first image into the corresponding image corresponding to the original image as the second image, and supplies the image to the calculation unit 172.

That is, the image conversion unit 371 performs the class classification adaptive processing with respect to each of the plurality of selection rules stored in the storage unit 353, by using the selection rule, and the tap coefficients for each of the classes associated with the selection rule.

Specifically, the image conversion unit 371 selects the tap structure of the class tap with respect to each of the plurality of selection rules stored in the storage unit 353, in accordance with the selection rule, by using the image during decoding or the encoding information. Further, the image conversion unit 371 configures the class tap of the tap structure selected in accordance with the selection rule, and performs the class classification adaptive processing of performing the filter processing (here, for example, the prediction operation in Expression (1)) using the tap coefficients for each of the classes associated with the selection rule.

Then, the image conversion unit 371 supplies the corresponding image obtained with respect to each of the plurality of selection rules, to the calculation unit 172.

In the calculation unit 172, the tap structure evaluation value is obtained as described in FIG. 11, by using from the corresponding image obtained by using the class tap of the tap structure selected in accordance with the selection rule, and the original image as the teacher data, with respect to each of the plurality of selection rules from the image conversion unit 371, and is supplied to the selection unit 355.

The selection unit 355 selects the selection rule having the most excellent tap structure evaluation value supplied from (the calculation unit 172 of) the evaluation value calculation unit 354, from the selection rules stored in the storage unit 353, as the optimal selection rule. Further, the selection unit 355 selects the tap coefficients for each of the classes associated with the optimal selection rule, from the tap coefficients for each of the classes stored in the storage unit 353.

Then, the selection unit 355 supplies the optimal selection rule, and the tap coefficients for each of the classes associated with the optimal selection rule, to the filter information generating unit 332.

Note that, in the learning device 331, processing of obtaining the optimal selection rule, and the tap coefficients for each of the classes associated with the optimal selection rule, for example, can be performed in unit at a timing) identical to the tap structure update unit described in FIG. 29.

Figure 32:
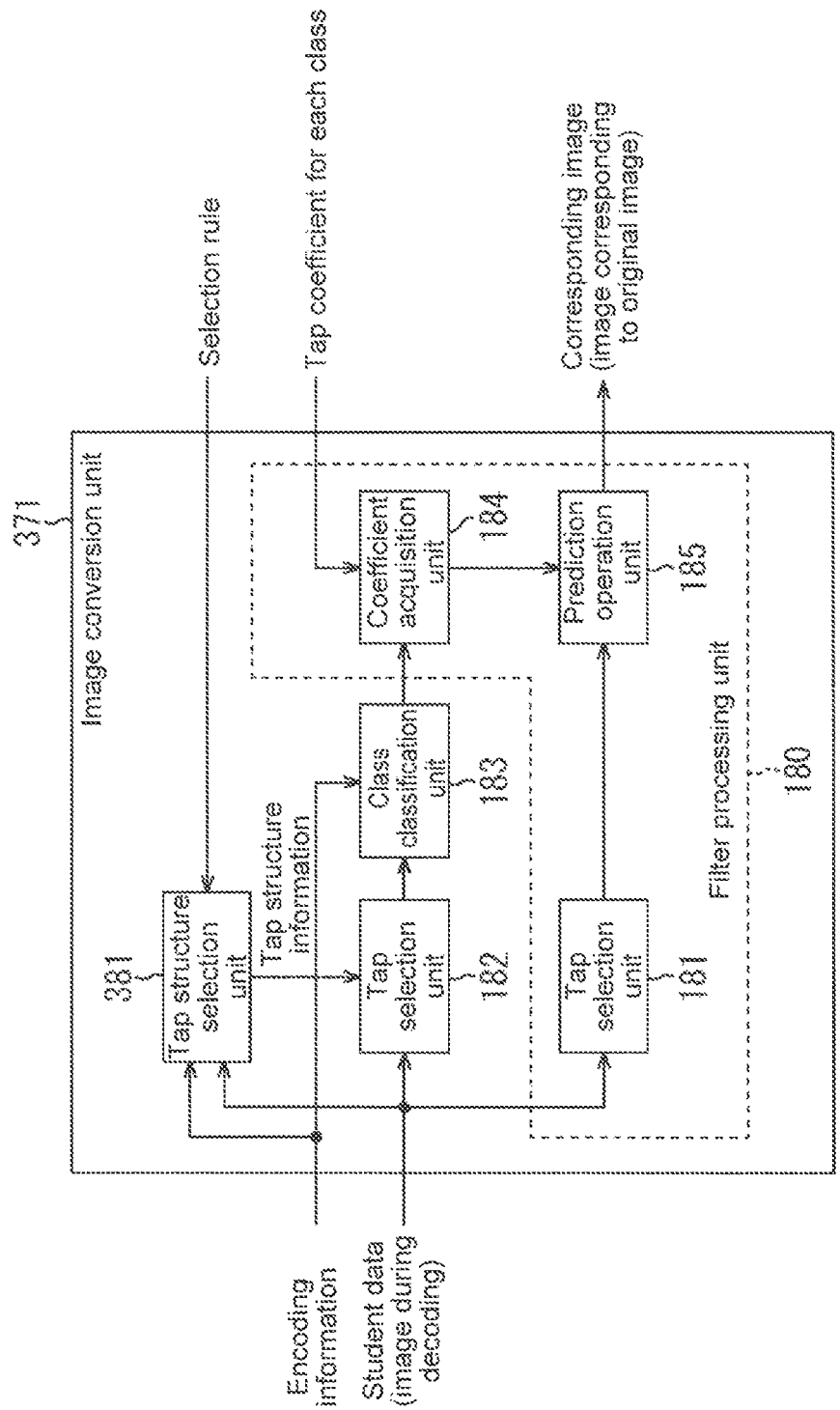
FIG. 32 is a block diagram illustrating a configuration example of an image conversion unit 371.

FIG. 32 is a block diagram illustrating a configuration example of the image conversion unit 371 of FIG. 31.

Note that, in the drawings, the same reference numerals will be applied to portions corresponding to the image conversion unit 171 of FIG. 17, and hereinafter, the description thereof will be suitably omitted.

In FIG. 32, the image conversion unit 371 includes the tap selection unit 181 to the prediction operation unit 185, and a tap structure selection unit 381.

Therefore, the image conversion unit 371 is common to the image conversion unit 171 of FIG. 17, in that the tap selection unit 181 to the prediction operation unit 185 are provided.

Here, the image conversion unit 371 is different from the image conversion unit 171 of FIG. 17, in that the tap structure selection unit 381 is newly provided.

The image during decoding as the student data, identical to that supplied to learning unit 152 (FIG. 31), and the encoding information are supplied to the image conversion unit 371. In the image conversion unit 371, the class classification adaptive processing is performed by using the image during decoding as the student data, and by using the encoding information as necessary, and the corresponding image corresponding to the original image as the teacher data, is obtained.

Here, in the image conversion unit 371, the selection rule stored in the storage unit 353 (FIG. 31), and the tap coefficients for each of the classes associated with the selection rule, are respectively supplied to the tap structure selection unit 381 and the coefficient acquisition unit 184.

As with the tap structure selection unit 351 of FIG. 31, the tap structure selection unit 381 selects the tap structure of the class tap, in accordance with the selection rule from the storage unit 353, by using one or both of the image during decoding and the encoding information, as the acquirable information, and supplies the tap structure information indicating the tap structure, to the tap selection unit 182.

The tap selection unit 182 configures the class tap of the tap structure indicating the tap structure information from the tap structure selection unit 381.

The coefficient acquisition unit 184 stores the tap coefficients for each of the classes from the storage unit 353 (FIG. 31), acquires the tap coefficient of the class of the target pixel from the tap coefficients for each of the classes, and supplies the tap coefficient to the prediction operation unit 185.

<Processing of Learning Device 331>

Figure 33:
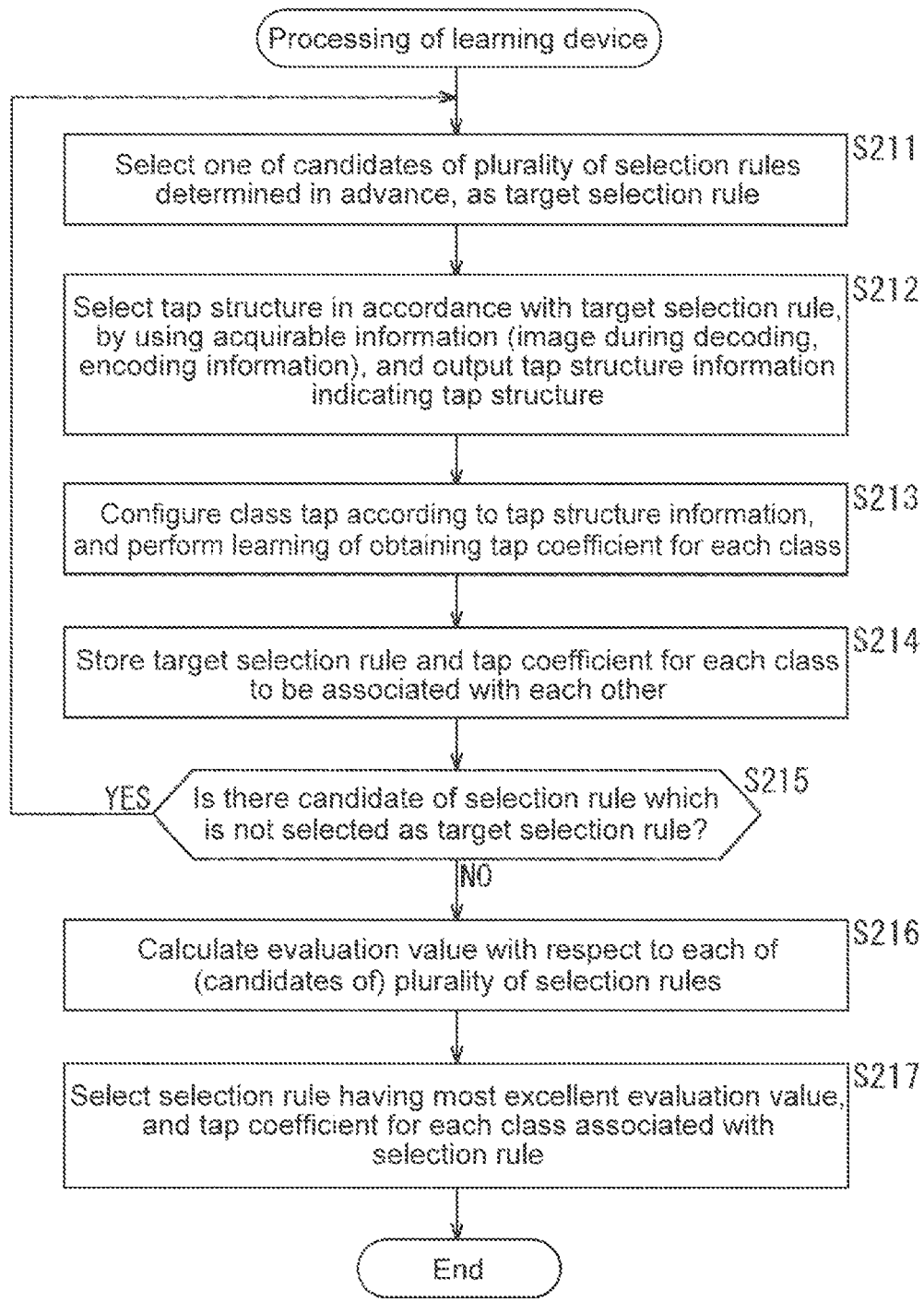
FIG. 33 is a flowchart illustrating an example of processing of the learning device 331.

FIG. 33 is a flowchart illustrating an example of the processing of the learning device 331 of FIG. 31.

In Step S211, the tap structure selection unit 351 selects one of the candidates of the selection rules which is not yet set as the target selection rule, in the candidates of the plurality of selection rules determined in advance, as the target selection rule. Then, the tap structure selection unit 351 supplies (outputs) the selection rule indicating the target selection rule, to the storage unit 353, and the processing proceeds to Step S212 from Step S211.

In Step S212, the tap structure selection unit 351, for example, selects one tap structure from the plurality of tap structures determined in advance, as the target tap structure, in accordance with the target selection rule, by using one or both of the image during decoding and the encoding information, as the acquirable information. Then, the tap structure selection unit 351 supplies (outputs) the tap structure information indicating the target tap structure, to the tap selection unit 162 of the learning unit 152, and the processing proceeds to Step S213 from Step S212.

In Step S213, the learning unit 152 performs the tap coefficient learning by using the image during decoding as the student data and the original image as the teacher data, and by using the encoding information as necessary, and obtains the tap coefficients for each of the classes.

In the tap coefficient learning of the learning unit 152, the class classification is performed by using the class tap of the tap structure selected in accordance with the target selection rule supplied to the tap selection unit 162 from the tap structure selection unit 351, the tap coefficient with respect to the class, obtained by such class classification, is obtained.

The learning unit 152 supplies the tap coefficients for each of the classes with respect to the class, obtained by the class classification using the class tap of the tap structure selected in accordance with the target selection rule, to the storage unit 353, and the processing proceeds to Step S214 from Step S213.

In Step S214, the storage unit 353 stores the target selection rule from the tap structure selection unit 351, and the tap coefficients for each of the classes obtained by the class classification using the class tap of the tap structure selected in accordance with the target selection rule, from the learning unit 152 to be associated with each other, and the processing proceeds to Step S215.

In Step S215, the tap structure selection unit 351 determines whether or not there is a candidate of the selection rule which is not yet set as the target selection rule, in the candidates of the plurality of selection rules determined in advance.

In Step S215, in a case where it is determined that there is a candidate of the selection rule which is not yet set as the target selection rule, in the candidates of the plurality of selection rules determined in advance, the processing returns to Step S211, and hereinafter, the same processing will be repeated.

In addition, in Step S215, in a case where it is determined that there is no candidate of the selection rule which is not yet set as the target selection rule, in the candidates of the plurality of selection rules determined in advance, that is, in a case where the selection rule, and the tap coefficients for each of the classes obtained by the class classification using the class tap of the tap structure selected in accordance with the selection rule, are stored in the storage unit 353 by being associated with each other, with respect to each of (the candidates of) the plurality of selection rules determined in advance, and the processing proceeds to Step S216.

In Step S216, in the evaluation value calculation unit 354, the image conversion unit 371 performs the class classification adaptive processing with respect to the image during decoding as the student data, by using the selection rule, and the tap coefficients for each of the classes associated with the selection rule, with respect to each of the plurality of selection rules stored in the storage unit 353 ((the candidates of) the plurality of selection rules stored in the tap structure selection unit 351), and obtains the corresponding image corresponding to the original image as the teacher data.

Further, in the evaluation value calculation unit 354, the calculation unit 172 obtains a value corresponding to S/N of the corresponding image obtained by using the tap coefficients for each of the classes associated with the selection rule, or the like, as the tap structure evaluation value, with respect to each of the plurality of selection rules, and supplies the value or the like to the selection unit 355.

Then, the processing proceeds to Step S217 from Step S216, and the selection unit 355 selects the selection rule having the most excellent tap structure evaluation value supplied from the calculation unit 172 of the evaluation value calculation unit 354, from the selection rules stored in the storage unit 353, as the optimal selection rule. Further, the selection unit 355 selects the tap coefficients for each of the classes associated with the optimal selection rule, from the tap coefficients for each of the classes stored in the storage unit 353.

The selection unit 355 supplies the optimal selection rule, and the tap coefficients for each of the classes associated with the optimal selection rule, to the filter information generating unit 332, and the processing is ended.

<Configuration Example of Image Conversion Device 333>

Figure 34:
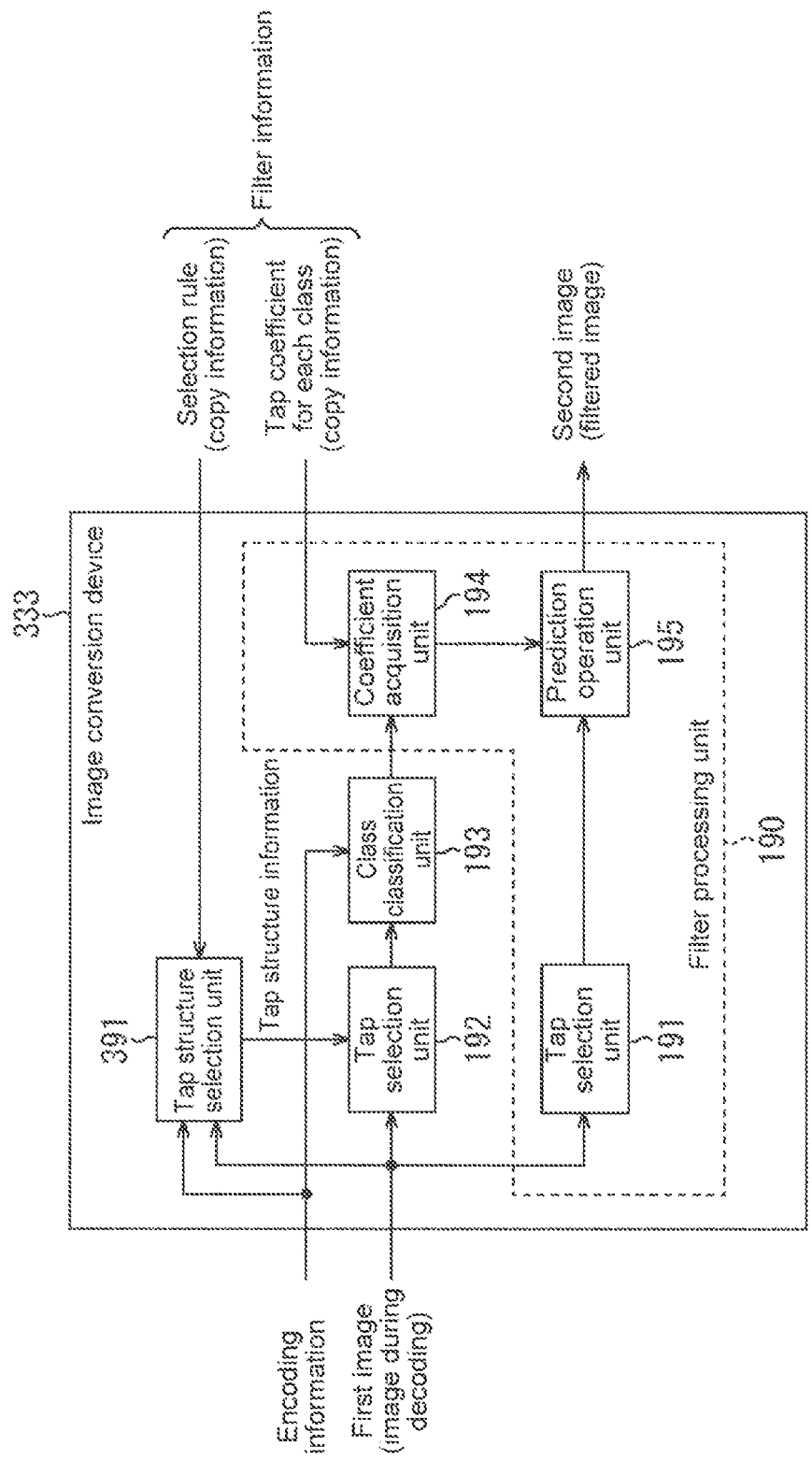
FIG. 34 is a block diagram illustrating a configuration example of an image conversion device 333.

FIG. 34 is a block diagram illustrating a configuration example of the image conversion device 333 of FIG. 29.

Rote that, in the drawings, the same reference numerals will be applied to portions corresponding to those of FIG. 19, and hereinafter, the description thereof will be suitably omitted.

In FIG. 34, the image conversion device 333 includes the tap selection unit 191 to the prediction operation unit 195, and a tap structure selection unit 391.

Therefore, the image conversion device 333 is common to the image conversion device 133 of FIG. 19, in that the tap selection unit 191 to the prediction operation unit 195 are provided.

Here, the image conversion device 333 is different from the image conversion device 133 of FIG. 19, in that the tap structure selection unit 391 is newly provided.

The image during decoding as the first image, and the encoding information are supplied to the image conversion device 333. In the image conversion device 333, the class classification adaptive processing identical to that of the image conversion unit 371 of FIG. 32, is performed by using the image during decoding as the first image, and by using the encoding information as necessary, and the filtered image as the second image corresponding to the original image is obtained.

Here, in the image conversion device 333, the filter information is supplied to the tap structure selection unit 391 and the coefficient acquisition unit 194 from the filter information generating unit 332 (FIG. 29).

As with the tap structure selection unit 351 of FIG. 31 or the tap structure selection unit 381 of FIG. 32, the tap structure selection unit 391 selects the tap structure of the class tap, in accordance with the selection rule (the optimal selection rule) included in the filter information from the filter information generating unit 332, by using one or both of the image during decoding and the encoding information, as the acquirable information, and supplies the tap structure information indicating the tap structure, to the tap selection unit 192.

The tap selection unit 192 configures the class tag of the tap structure indicated by the tap structure information from the tap structure selection unit 391, that is, the class tap of the tap structure selected in accordance with the optimal selection rule.

The coefficient acquisition unit 194 stores the tap coefficients for each of the classes included in the filter information from the filter information generating unit 332, acquires the tap coefficient of the class of the target pixel from the tap coefficients for each of the classes, and supplies the tap coefficient to the prediction operation unit 195.

Note that, as described in FIG. 29, the copy information can be included in the filter information supplied to the image conversion device 333 from the filter information generating unit 332.

In a case where the copy information included in the most recent filter information supplied to the image conversion device 333 from the filter information generating unit 332 does not indicate the copy mode (here, the selection rule and the tap coefficients for each of the classes, identical to those at the time of updating the last-minute selection rule and the tap coefficient, are used as the selection rule and the tap coefficients for each of the classes), the tap selection unit 192 adopts the tap structure selected in accordance with the selection rule included in the most recent filter information, as the tap structure of the class tap, instead of the tap structure selected in accordance with the selection rule included in the previous filter information supplied to the image conversion device 333 from the filter information generating unit 332.

Further, the coefficient acquisition unit 194 stores the tap coefficients for each of the classes included in the most recent filter information in the format of being overwritten on the tap coefficients for each of the classes included in the previous filter information.

On the other hand, in a case where the copy information included in the most recent filter information indicates the copy mode, the tap selection unit 192 adopts the tap structure selected in accordance with the selection rule included in the previous filter information, the tap structure of the class tap, as it is.

Further, the coefficient acquisition unit 194 maintains the storage of the tap coefficients for each of the classes included in the previous filter information.

As described above, in a case where the copy information included in the most recent filter information indicates the copy mode, the last-minute tap structure of the class tap and the tap coefficients for each of the classes are maintained.

<Encoding Processing>

Figure 35:
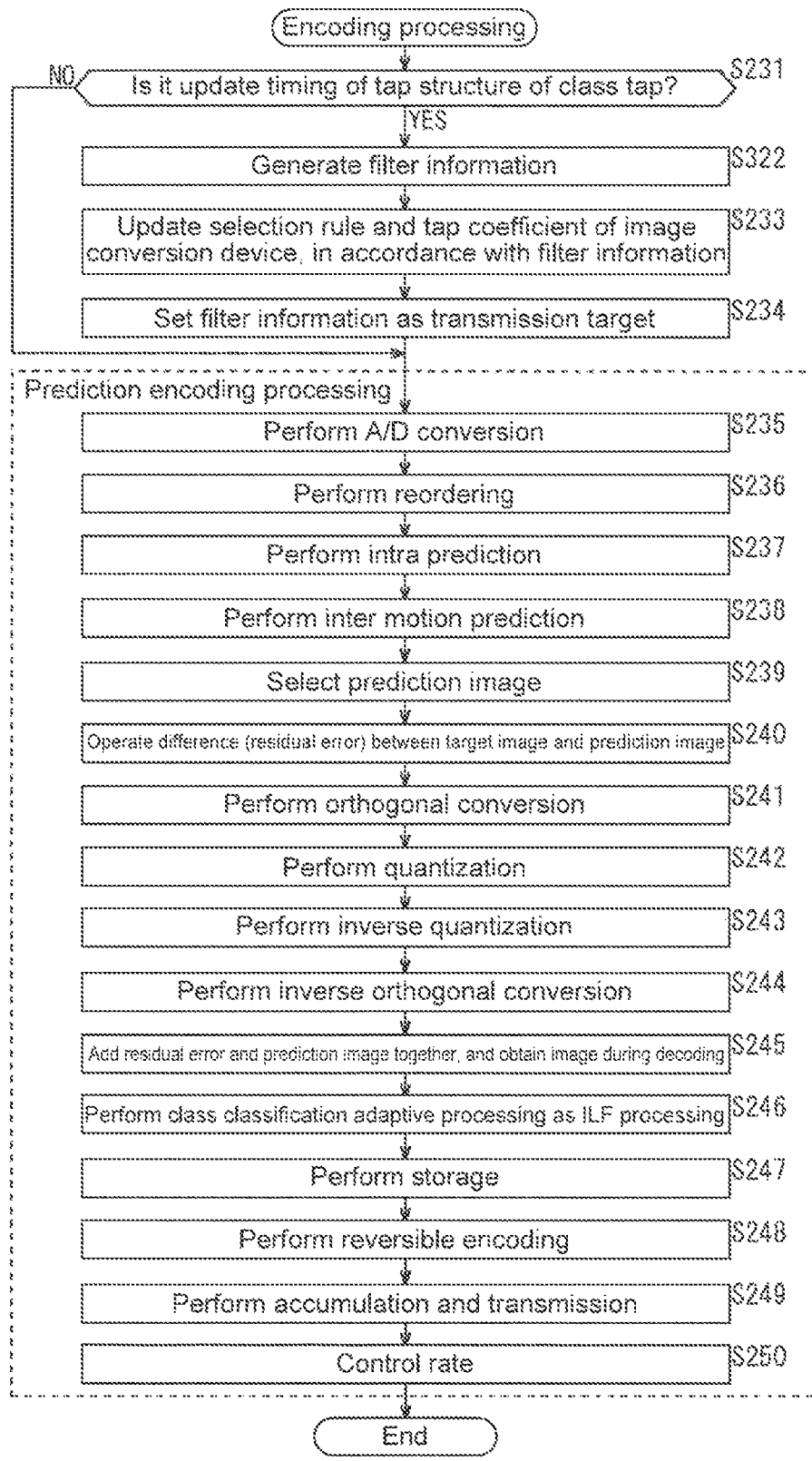
FIG. 35 is a flowchart illustrating an example of the encoding processing of the encoding device 11.

FIG. 35 is a flowchart illustrating an example of the encoding processing of the encoding device 11 of FIG. 28.

In the encoding device 11, as with the learning device 131 of FIG. 10, the learning device 331 (FIG. 29) of the class classification adaptive filter 311, for example, sets the image during decoding in the tap structure update unit such as a plurality of frames, one frame, and a block, as the student data, in the images during decoding to be supplied thereto, sets the original image corresponding to the image during decoding, as the teacher data, and continually performs the tap coefficient learning. Then, in Step S231, as with Step S31 of FIG. 20, the learning device 331 determines whether or not it is the update timing of the tap structure of the class tap.

In Step S231, in a case where it is determined that it is not the update timing of the tap structure of the class tap, the processing proceeds to Step S235 by skipping Steps S232 to S234.

In addition, in Step S231, in a case where it is determined that it is the update timing of the tap structure of the class tap, the processing proceeds to Step S232.

In Step S232, the filter information generating unit 332 (FIG. 29) generates the filter information including the most recent selection rule and the tap coefficients for each of the classes (or the copy information) generated by the learning device 331 in accordance with the tap coefficient learning, that is, the optimal selection rule, and the tap coefficients for each of the classes associated with the optimal selection rule, and supplies the information to the image conversion de vice 333 (FIG. 29) and the reversible encoding unit 106 (FIG. 28), and the processing proceeds to Step S233.

In Step S233, the image conversion device 333 updates the selection rule used in the tap structure selection unit 391, and the tap coefficients for each of the classes stored in the coefficient acquisition unit 194, in accordance with the filter information from the filter information generating unit 332, and the processing proceeds to Step S234.

In Step S234, the reversible encoding unit 106 sets the filter information supplied from the filter information generating unit 332, as the transmission target, and the processing proceeds to Step S235. The filter information set as the transmission target, is transmitted by being included in the encoding data, in Step S248 described below.

Note that, as with Steps S32 to S34 of FIG. 20, the processings of Steps S322 to S324 can be performed at the update timing in a case where the mutual relationship in the time direction of the original image is low.

In Steps S235 to S250, the prediction encoding processing of the original image identical to each of Steps S35 to S50 of FIG. 20, is performed.

Here, in the class classification adaptive processing of Step S246, the tap structure of the class tap is selected in accordance with the selection rule (the optimal selection rule) included in the filter information generated by the filter information generating unit 332. Further, the class classification adaptive processing of Step S246, is performed by using the tap coefficients for each of the classes included in the filter information generated by the filter information generating unit 332.

In addition, in Step S248, as with Step S48 of FIG. 20, the reversible encoding unit 106 encodes the quantization coefficient, the encoding information, and the filter information, and the selection rule and the tap coefficients for each of the classes are included in the filter information.

Therefore, the quantization coefficient, the encoding information, and the selection rule and the tap coefficients for each of the classes as the filter information, are included in the encoding data obtained by the reversible encoding unit 106. Then, in Step S249, as described in Step S49 of FIG. 20, such encoding data is suitably read out and transmitted from the accumulation buffer 107.

Figure 36:
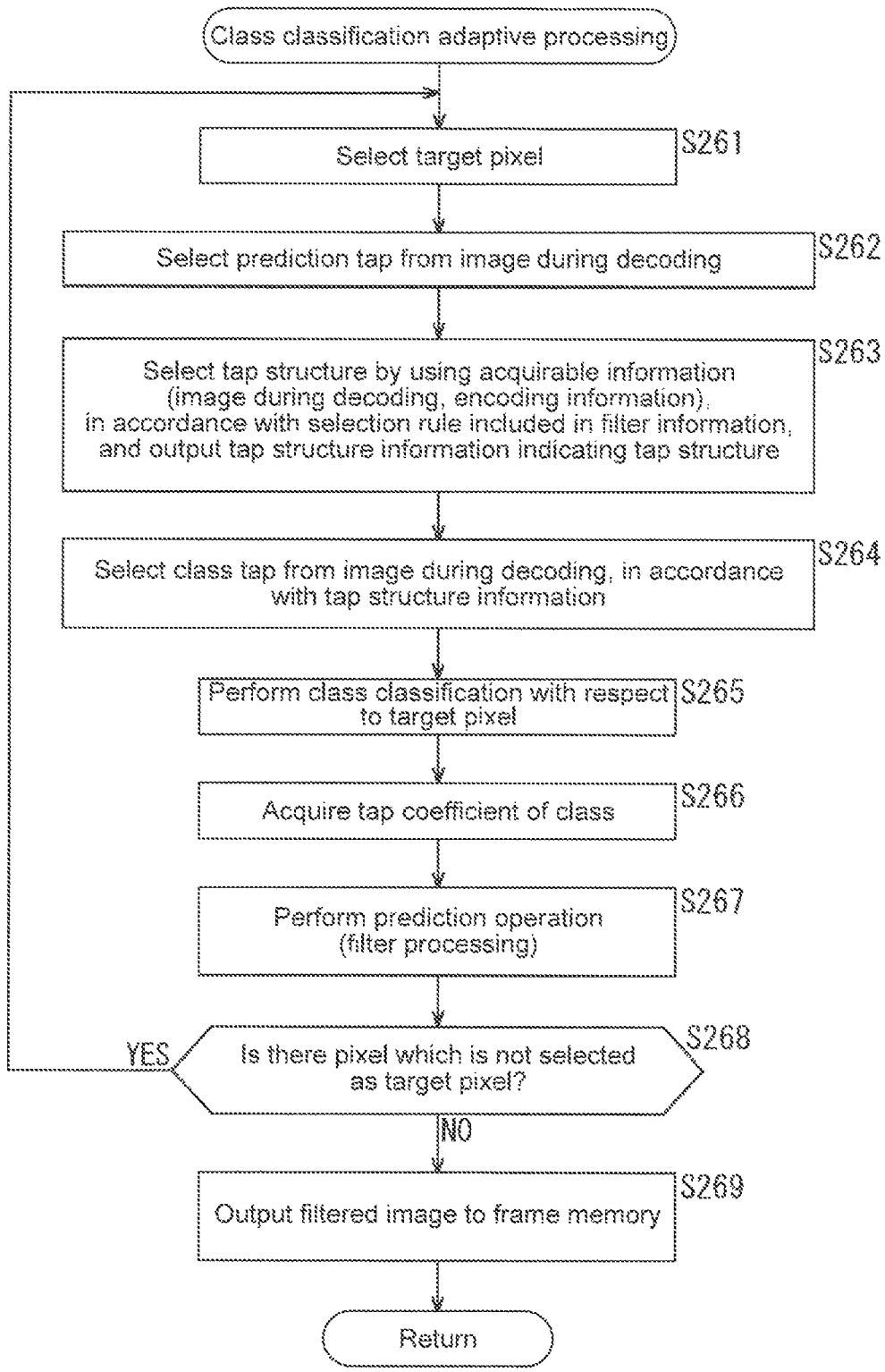
FIG. 36 is a flowchart illustrating an example of the class classification adaptive processing performed in Step S246.

FIG. 36 is a flowchart illustrating an example of the class classification adaptive processing performed in Step S246 of FIG. 35.

In the image conversion device 333 (FIG. 34) of the class classification adaptive filter 311, in Step S261, as with Step S61 of FIG. 21, the tap selection unit 191 selects the target pixel from the image during decoding supplied from the operation unit 110, and the processing proceeds to Step S262.

In Step S262, as with Step S62 of FIG. 21, the tap selection unit 191 selects the pixel to be the prediction tap with respect to the target pixel, from the image during decoding supplied to the operation unit 110, and configures the prediction tap. Then, the tap selection unit 191 supplies the prediction tap to the prediction operation unit 195, and the processing proceeds to Step S263.

In Step S263, the tap structure selection unit 391 selects the tap structure of the class tap, in accordance with the selection rule included in the filter information from the filter information generating unit 332 (FIG. 29), by using the image during decoding supplied from the operation unit 110, or the like, outputs the tap structure information indicating the tap structure to the tap selection unit 192, and the processing proceeds to Step S264.

In Step S264, the tap selection unit 192 configures the class tap of the tap structure indicating the tap structure information, in accordance with the tap structure information from the tap structure selection unit 391. Then, the tap selection unit 192 supplies the class tap to the class classification unit 193.

That is, the selection rule used in the tap structure selection unit 391, is updated in Step S233 of FIG. 35, performed immediately before, and in the tap selection unit 192, the class tap of the tap structure selected in accordance with the selection rule after being updated, is configured, and is supplied to the class classification unit 193.

After that, the processing proceeds to Step S265 from Step S264, and the class classification unit 193 performs the class classification of the target pixel by using the class tap with respect to the target pixel, and by using the encoding information with respect to the target pixel, as necessary. Then, the class classification unit 193 supplies the class of the target pixel obtained by the class classification, to the coefficient acquisition unit 194, and the processing proceeds to Step S266 from Step S265.

The coefficient acquisition unit 194 stores the tap coefficients for each of the classes included in the filter information supplied from the filter information generating unit 332, that is, the tap coefficients for each of the classes associated with the selection rule of selecting the tap structure of the class tap configured by the tap selection unit 192, in accordance with the update of the tap coefficient in Step S233 of FIG. 35, performed immediately before. In Step S266, the coefficient acquisition unit 194 acquires the tap coefficient of the class of the target pixel supplied from the class classification unit 193, from the stored tap coefficients for each of the classes, and supplies the tap coefficient to the prediction operation unit 195, and the processing proceeds to Step S267.

In Steps S267 to S269, the processing identical to each of Steps S66 to S68 of FIG. 21, is performed, and the processing proceeds to Return.

<Second Configuration Example of Decoding Device 12>

Figure 37:
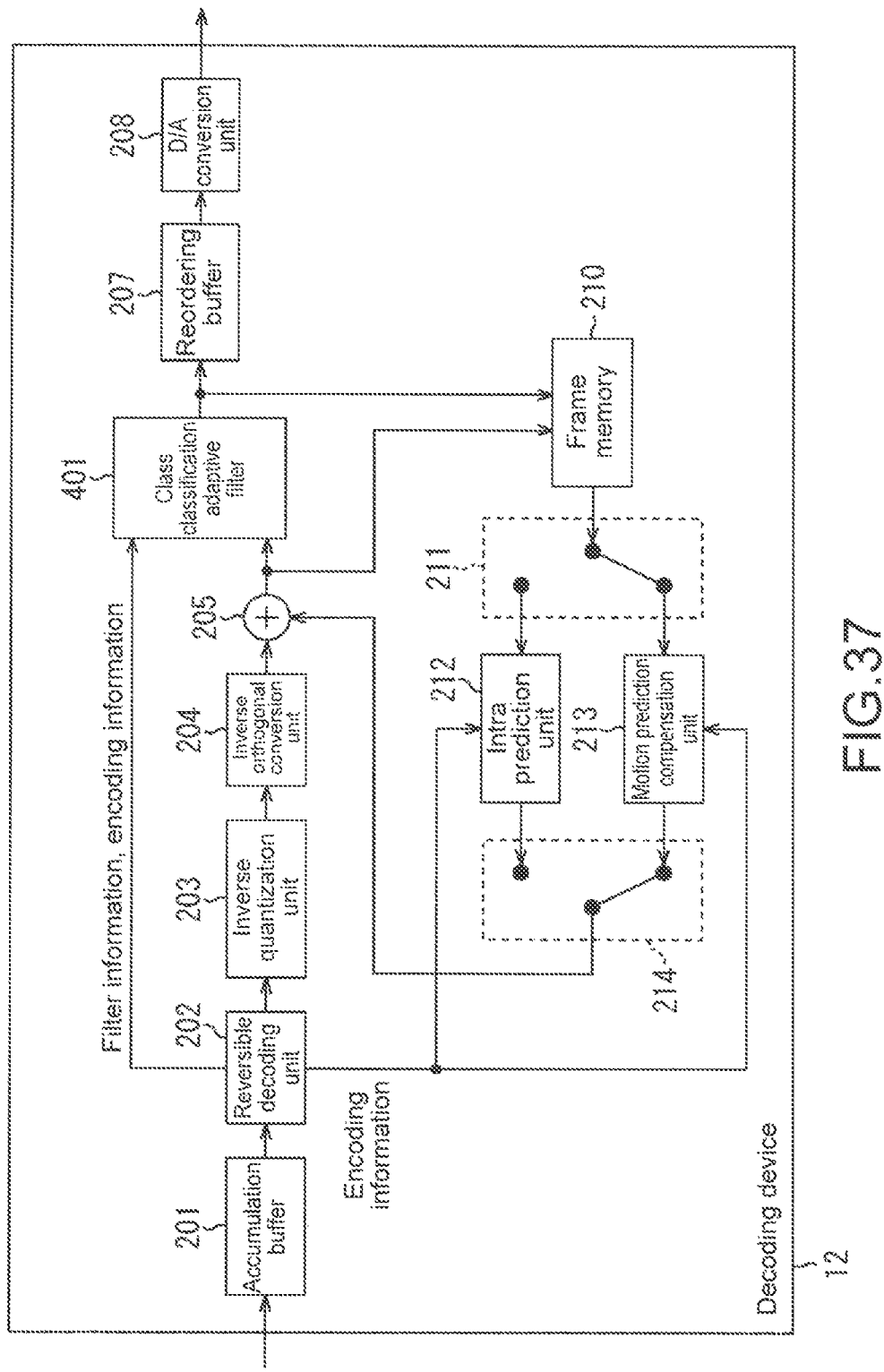
FIG. 37 is a block diagram illustrating a second configuration example of the decoding device 12.

FIG. 37 is a block diagram illustrating a second configuration example of the decoding device 12 of FIG. 1.

Rote that, in the drawings, the same reference numerals will be applied to portions corresponding to those of FIG. 22, and hereinafter, the description thereof will be suitably omitted.

In FIG. 37, the decoding device 12 includes the accumulation buffer 201, the reversible decoding unit 202, the inverse quantization unit 203, the inverse orthogonal conversion unit 204, the operation unit 205, the reordering buffer 207, the D/A conversion unit 208, the frame memory 210, the selection unit 211, the intra prediction unit 212, the motion prediction compensation unit 213, and the selection unit 214. Further, the decoding device 12 includes a class classification adaptive filter 401.

Therefore, the decoding device 12 of FIG. 37 is common to that of FIG. 22, in that the accumulation buffer 201 to the operation unit 205, reordering buffer 207, the D/A conversion unit 208, and the frame memory 210 to the selection unit 214 are provided.

Here, the decoding device 12 of FIG. 37 is different from that of FIG. 22, in that the class classification adaptive filter 401 is provided instead of the class classification adaptive filter 206.

As with the class classification adaptive filter 206, the class classification adaptive filter 401 performs the ILF processing according to the class classification adaptive processing with a filter functioning as the ILF, that is, all of the DF, the SAO, and the ALF.

That is, the class classification adaptive filter 401 sets the image during decoding from the operation unit 205, as the first image, and performs (the image conversion according to) the class classification adaptive processing the tap coefficients for each of the classes included in the filter information from the reversible decoding unit 202, by using the encoding information from the reversible decoding unit 202, as necessary, and thus, converts the image during decoding as the first image into the filtered image as the second image corresponding to the original image (generates the filtered image) to be output.

Note that, in the class classification adaptive processing, the class classification adaptive filter 401 selects the tap structure of the class tap used in the class classification, in accordance with the selection rule included in the filter information from the reversible decoding unit 202, by using the image during decoding from the operation unit 205 as the acquirable information, or the encoding information from the reversible decoding unit 202.

<Configuration Example of Class Classification Adaptive Filter 401>

Figure 38:
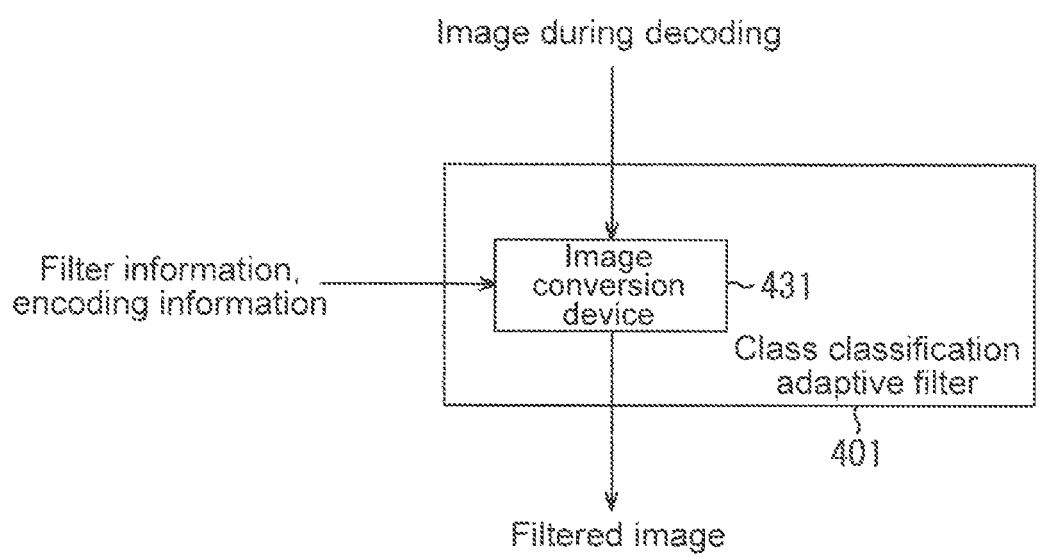
FIG. 38 is a block diagram illustrating a configuration example of a class classification adaptive filter 401.

FIG. 38 is a block diagram illustrating a configuration example of the class classification adaptive filter 401 of FIG. 37.

In FIG. 38, the class classification adaptive filter 401 includes an image conversion device 431.

The image during decoding is supplied to the image conversion device 431 from the operation unit 205 (FIG. 37), and the filter information and the encoding information are supplied to the image conversion device 431 from the reversible decoding unit 202.

As with the image conversion device 333 of FIG. 29, the image conversion device 431 sets the image during decoding as the first image, performs the class classification using the class tap of the tap structure selected in accordance with the selection rule included in the filter information, and performs the image conversion according to the class classification adaptive processing of performing the prediction operation as the filter processing using the tap coefficients for each of the classes included in the filter information, and thus, converts the image during decoding as the first image, into the filtered image as the second image corresponding to the original image (generates the filtered image), and supplies the image to the reordering buffer 207 and the frame memory 210 (FIG. 37).

Note that, as with the image conversion device 333 of FIG. 29, in the class classification adaptive processing, the image conversion device 431 performs the encoding information, by using class classification as necessary.

<Configuration Example of Image Conversion Device 431>

Figure 39:
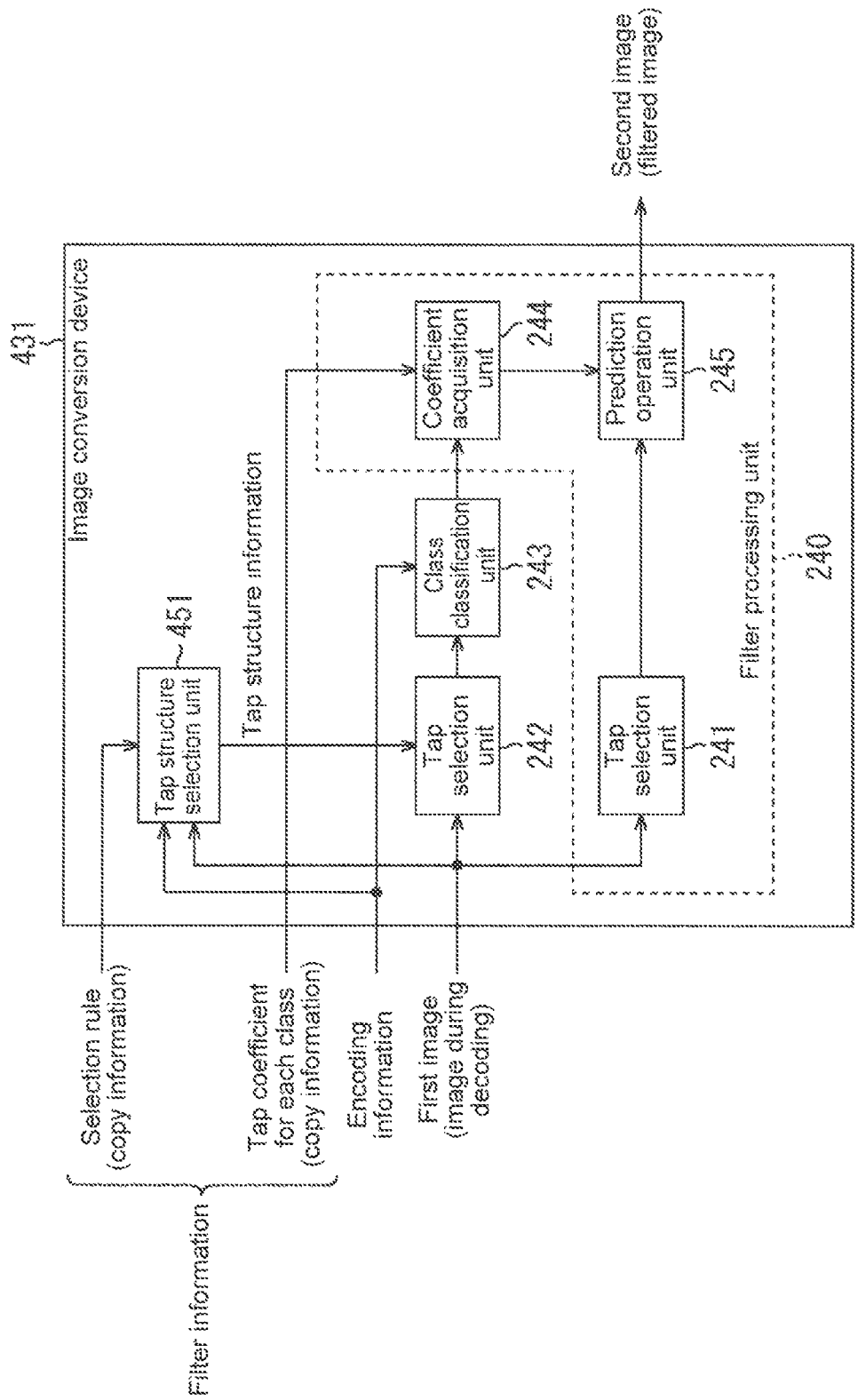
FIG. 39 is a block diagram illustrating a configuration example of an image conversion device 431.

FIG. 39 is a block diagram illustrating a configuration example of the image conversion device 431 of FIG. 38.

Note that, in the drawings, the same reference numerals will be applied to portions corresponding to those of the conversion device 231 of FIG. 24, and hereinafter, the description thereof will be suitably omitted.

In FIG. 39, the image conversion device 431 includes the tap selection unit 241 to the prediction operation unit 245, and a tap structure selection unit 451.

Therefore, the image conversion device 431 is common to the image conversion device 231 of FIG. 24, in that the tap selection unit 241 to the prediction operation unit 245 are provided.

Here, the image conversion device 431 is different from the image conversion device 231 of FIG. 24, in that the tap structure selection unit 451 is newly provided.

The image during decoding as the first image, and the encoding information are supplied to the image conversion device 431 from the reversible decoding unit 202 (FIG. 37). In the image conversion device 431, the class classification adaptive processing identical to that of the image conversion device 333 of FIG. 34 is performed, by using the image during decoding as the first image, and by using the encoding information as necessary, and the filtered image as the second image corresponding to the original image is obtained.

That is, in the image conversion device 431, the filter information is supplied to the tap structure selection unit 451 and the coefficient acquisition unit 244 from the reversible decoding unit 202 (FIG. 37).

As with the tap structure selection unit 391 of FIG. 34, the tap structure selection unit 451 selects the tap structure of the class tap in accordance with the selection rule (the optimal selection rule) included in the filter information from the reversible decoding unit 202, by using one or both of the image during decoding and the encoding information, as the acquirable information, and supplies the tap structure information indicating the tap structure, to the tap selection unit 242.

The tap selection unit 242 configures the class tap of the tap structure indicated by the tap structure information from the tap structure selection unit 451, that is, the class tap of the tap structure selected in accordance with the optimal selection rule.

The coefficient acquisition unit 244 stores the tap coefficients for each of the classes included in the filter information from the reversible decoding unit 202, acquires the tap coefficient of the class of the target pixel from the tap coefficients for each of the classes, and supplies the tap coefficient to the prediction operation unit 195.

Note that, as described FIG. 29, copy information can be included in the filter information supplied to the image conversion device 431 from the reversible decoding unit 202, instead of the tap coefficients for each of the classes and the selection rule, or along with the tap coefficients for each of the classes and the selection rule.

In a case where the copy information included in the most recent filter information supplied to the image conversion device 431 from the reversible decoding unit 202, does not indicate the copy mode, the tap selection unit 242 adopts the tap structure selected in accordance with the selection rule included in the most recent filter information, as the tap structure of the class tap, instead of the tap structure selected in accordance with the selection rule included in the previous filter information supplied to the image conversion device 431 from the reversible decoding unit 202.

Further, the coefficient acquisition unit 244 stores the tap coefficients for each of the classes included in the most recent filter information in the format of being overwritten on the tap coefficients for each of the classes included in the previous filter information.

On the other hand, in a case where the copy information included in the most recent filter information indicates the copy mode, the tap selection unit 242 adopts the tap structure included in the previous filter information, as the tap structure of the class tap, as it is.

Further, the coefficient acquisition unit 244 maintains the storage of the tap coefficients for each of the classes included in the previous filter information, as it is.

<Decoding Processing>

Figure 40:
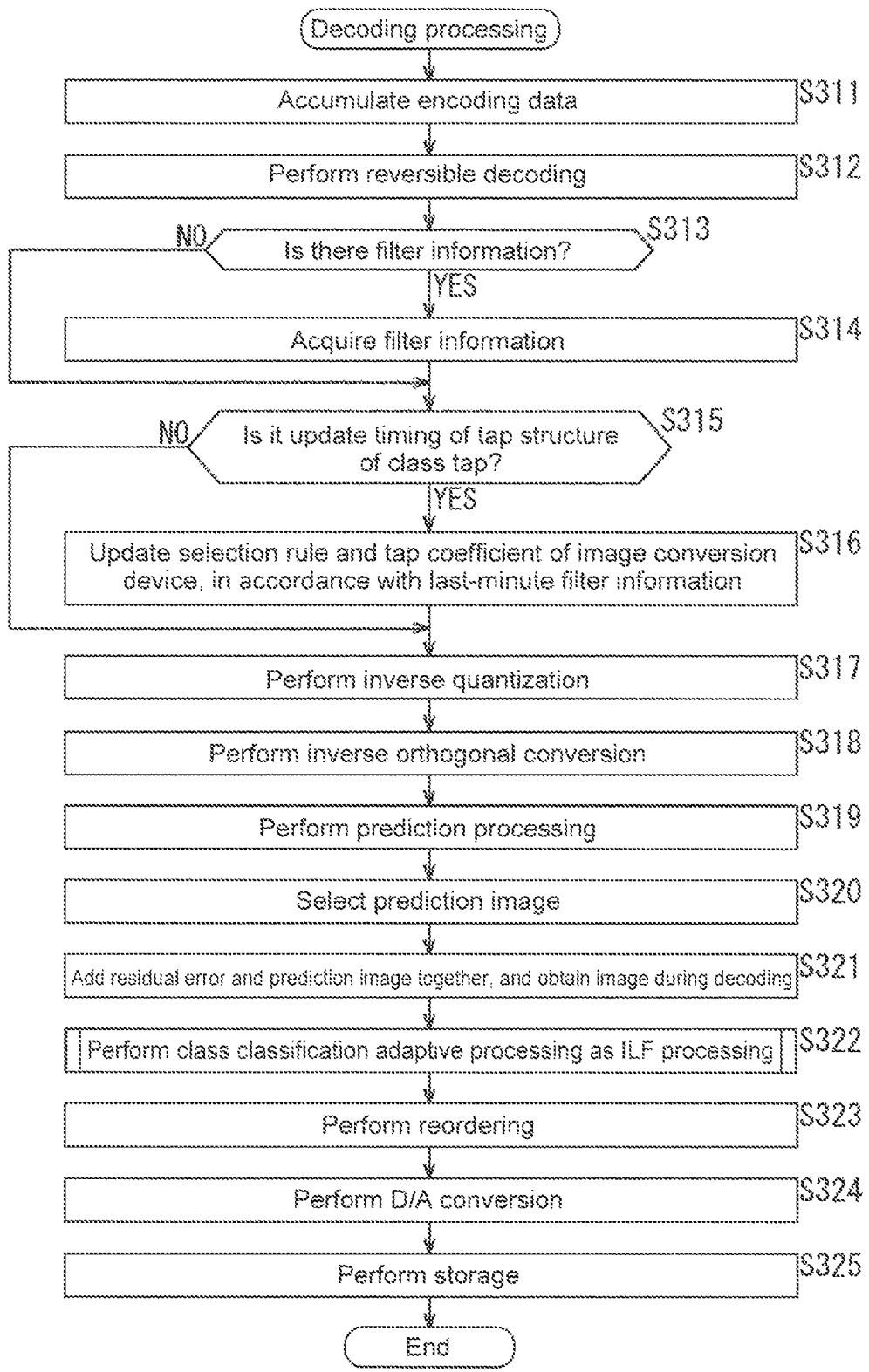
FIG. 40 is a flowchart illustrating an example of the decoding processing of the decoding device 12.

FIG. 40 is a flowchart illustrating an example of the decoding processing of the decoding device 12 of FIG. 37.

In Steps S311 to S315, the processing identical to each of Steps S111 to S115 of FIG. 25, is performed.

Then, in Step S315, in a case where it is determined that it is not the update timing of the tap structure of the class tap, the processing proceeds to Step S317 by skipping Step S316.

In addition, in Step S315, in a case where it is determined that it is the update timing of the tap structure of the class tap, the processing proceeds to Step S316.

In Step S316, the image conversion device 431 updates the selection rule used in the tap structure selection unit 451, and the tap coefficients for each of the classes stored in the coefficient acquisition unit 244, in accordance with the filter information acquired in Step S314 immediately before, and the processing proceeds to Step S317.

In Steps S317 to S325, the processing identical to each of Steps S117 to S125 of FIG. 25, is performed.

Here, in the class classification adaptive processing of Step S322, the tap structure of the class tap is selected in accordance with the selection rule (the optimal selection rule) included in the filter information supplied from the reversible decoding unit 202. Further, the class classification adaptive processing of Step S322, is performed by using the tap coefficients for each of the classes included in the filter information supplied from the reversible decoding unit 202.

Figure 41:
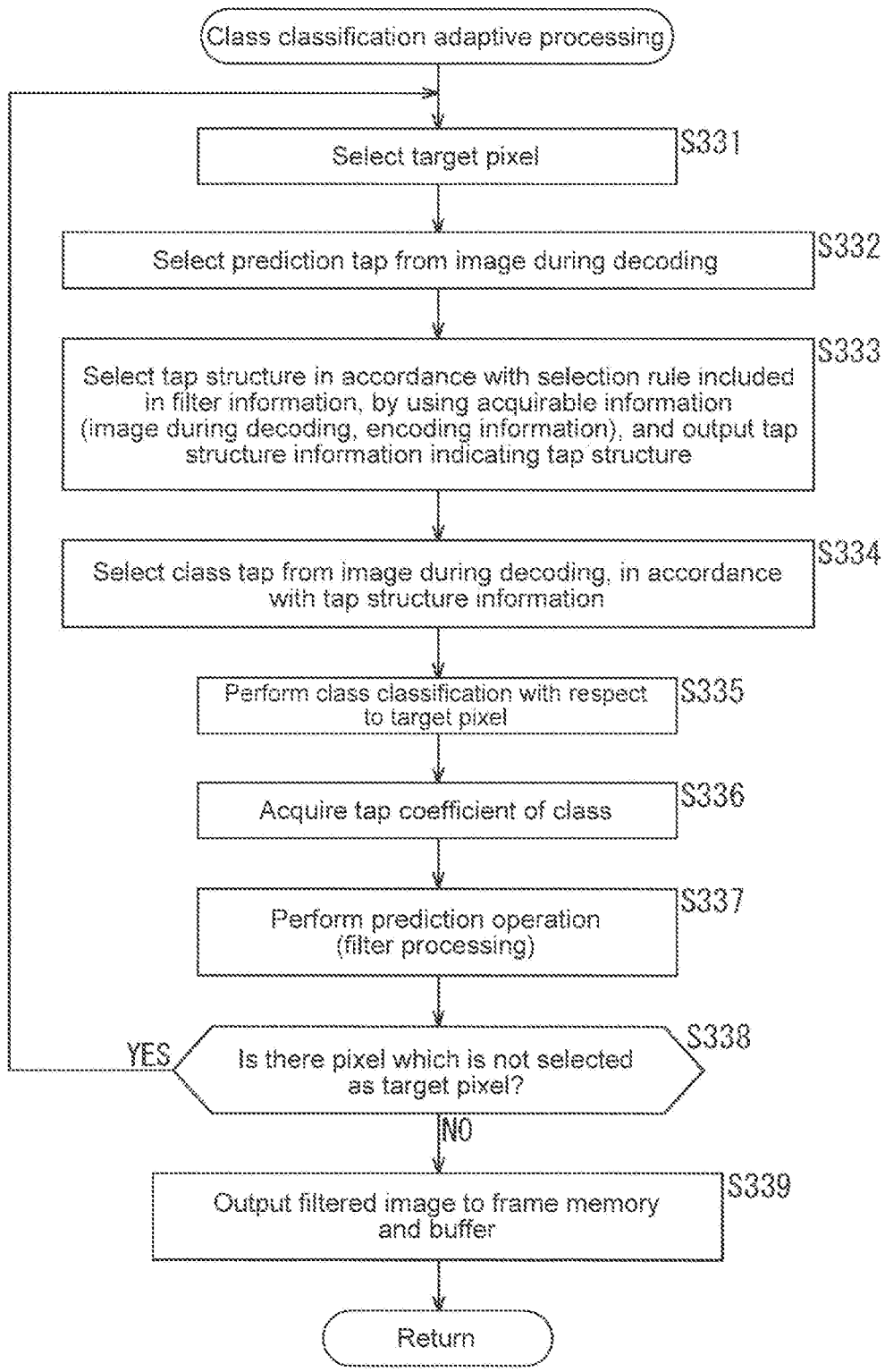
FIG. 41 is a flowchart illustrating an example of the class classification adaptive processing performed in Step S322.

FIG. 41 is a flowchart illustrating an example of the class classification adaptive processing performed in Step S322 of FIG. 40.

In the image conversion device 431 (FIG. 39) of the class classification adaptive filter 401, in Step S331, as with S131 of the FIG. 26, the tap selection unit 241 selects the target pixel from the pixels of (the block as) the image during decoding supplied from the operation unit 205 (FIG. 37), and the processing proceeds to Step S332.

In Step S332, as with Step S132 of FIG. 26, the tap selection unit 241 selects the pixel to be the prediction tap with respect to the target pixel, from the image during decoding supplied from the operation unit 205, and configures the prediction tap. Then, the tap selection unit 241 supplies the prediction tap to the prediction operation unit 245, and the processing proceeds to Step S333 from Step S332.

In Step S333, the tap structure selection unit 451 selects the tap structure of the class tap, in accordance with the selection rule included in the filter information from the reversible decoding unit 202 (FIG. 37), by using the image during decoding supplied from the operation unit 205, or the like. Further, the tap structure selection unit 451 outputs the tap structure information indicating the tap structure of the class tap selected in accordance with the selection rule, to the tap selection unit 242, and the processing proceeds to Step S334.

In Step S334, the tap selection unit 242 selects the pixel to be the class tap with respect to the target pixel, from the image during decoding supplied from the operation unit 205, and thus, configures the class tap of the tap structure indicated by the tap structure information from the tap structure selection unit 451. Then, the tap selection unit 242 supplies the class tap to the class classification unit 243.

That is, the selection rule used in the tap structure selection unit 451, is updated in Step S316 of FIG. 40, performed immediately before, and in the tap selection unit 242, the class tap of the tap structure selected in accordance with the selection rule after being updated, is configured, and is supplied to the class classification unit 243.

After that, the processing proceeds to Step S335 from Step S334, and the class classification unit 243 performs the class classification of the target pixel, by using the class tap with respect to the target pixel, and by using the encoding information with respect to the target pixel, as necessary. Then, the class classification unit 243 supplies the class of the target pixel obtained by the class classification, to the coefficient acquisition unit 244, and the processing proceeds to Step S336 from Step S335.

The coefficient acquisition unit 244 stores the tap coefficients for each of the classes included in the filter information supplied from the reversible decoding unit 202 (FIG. 37), in accordance with the update of the tap coefficient in Step S316 of FIG. 40, performed immediately before. In Step S336, the coefficient acquisition unit 244 acquires the tap coefficient of the class of the target pixel supplied from the class classification unit 243, from the stored tap coefficients for each of the classes, and supplies tap coefficient to the prediction operation unit 245, and the processing proceeds to Step S337.

In Steps S337 to S339, the processing identical to each of Steps S136 to S138 of FIG. 26, is performed, and the processing proceeds to Return.

Here, in the first configuration example of the encoding device 11 of FIG. 9 and the decoding device 12 of FIG. 22, the tap structure of the class tap is controlled such that the tap structure is the tap structure indicated by the tap structure information, in accordance with the tap structure information.

As described above, in the encoding device 11 and the decoding device 12, a control mode of the tap structure of controlling the tap structure of the class tap such that the tap structure is the tap structure indicated by the tap structure information, is set to a mode 1, in accordance with the tap structure information.

In addition, in the second configuration example of the encoding device 11 of FIG. 28 and decoding device 12 of FIG. 37, the tap structure of the class tap is controlled such that the tap structure is the tap structure selected by using the acquirable information, in accordance with the selection rule.

As described above, in the encoding device 11 and the decoding device 12, a control mode of the tap structure of controlling the tap structure of the class tap such that the tap structure is the tap structure selected by using the acquirable information, is set to a mode 2, in accordance with the selection rule.

Mode information indicating the control mode (for example, a flag of one bit, or the like) can be included in the filter information. Further, in the encoding device 11, the control mode can be suitably switched to one of the modes 1 and 2 to the other, and in the decoding device 12, the control mode can be switched in accordance with the control mode included in the filter information.

In addition, in the mode 2 described above, the selection rule having the most excellent tap structure evaluation value in the plurality of selection rules, is included in the filter information, as the optimal selection rule, and is transmitted to the decoding device 12 from the encoding device 11, but the selection rule used in the encoding device 11 and the decoding device 12, can be determined in accordance with a rule fixed in advance. In this case, in the encoding device 11 and the decoding device 12, the tap structure of the class tap is selected in accordance with the selection rule determined in advance, by using the acquirable information. In this case, it is not necessary that the selection rule is transmitted by being included in the filter information.

In addition, in the mode 2, in a case where the selection rule is determined in advance, the tap structure can be selected in accordance with the selection rule, by using the acquirable information, and a timing for updating the tap structure of the class tap can be fixed to a timing determined in advance. In this case, in the encoding device 11 and the decoding device 12, it is sufficient that the tap coefficient is shared in advance, and then, the tap structure of the class tap is updated at the fixed timing determined in advance, in accordance with the fixed selection rule determined in advance, and thus, it is not necessary that the filter information is transmitted to the decoding device 12 from the encoding device 11.

Note that, in the encoding device 11, in a case where the filter information is transmitted, the decoding device 12 is capable of recognizing the update timing of the tap structure of the class tap, as the filter information is received. In this case, the filter information functions as information of notifying the update timing of the tap structure of the class tap. In a case where the update timing is not notified to the decoding device 12 from the encoding device 11, it is not necessary that the update timing is determined in advance at the fixed timing.

In addition, in the above description, the prediction operation in Expression (1) using the tap coefficient of the class of the target pixel, is adopted as the filter processing corresponding to the class of the target pixel obtained by performing the class classification of the target pixel, but arbitrary filter processing other than the predict on operation in Expression (1), can be adopted as the filter processing corresponding to the class of the target pixel. That is, a filter corresponding to each class capable of being classified by the class classification, can be prepared in each of the classes, and filtering according to the filter corresponding to the class of the target pixel, can be performed as the filter processing corresponding to the class of the target pixel.

Note that, in this embodiment, in order to simplify the description, the tap coefficient itself is included in the filter information provided to the decoding device 12 from the encoding device 11, but the type coefficient and the parameter z can be included in the filter information, instead of the tap coefficient itself. The tap coefficient can be obtained from the type coefficient and the parameter z, and thus, the type coefficient and the parameter z are information equivalent to the tap coefficient, and herein, the type coefficient and the parameter z are included in the tap coefficient as the filter information, in addition to the tap coefficient itself. In a case where the type coefficient and the parameter z are adopted as the tap coefficient, for example, the acquirable information can be adopted as the parameter z.

<Application with Respect to Multiple View Image Encoding or Decoding System>

A set of processings described above, can be applied to a multiple view image encoding or decoding system.

Figure 42:
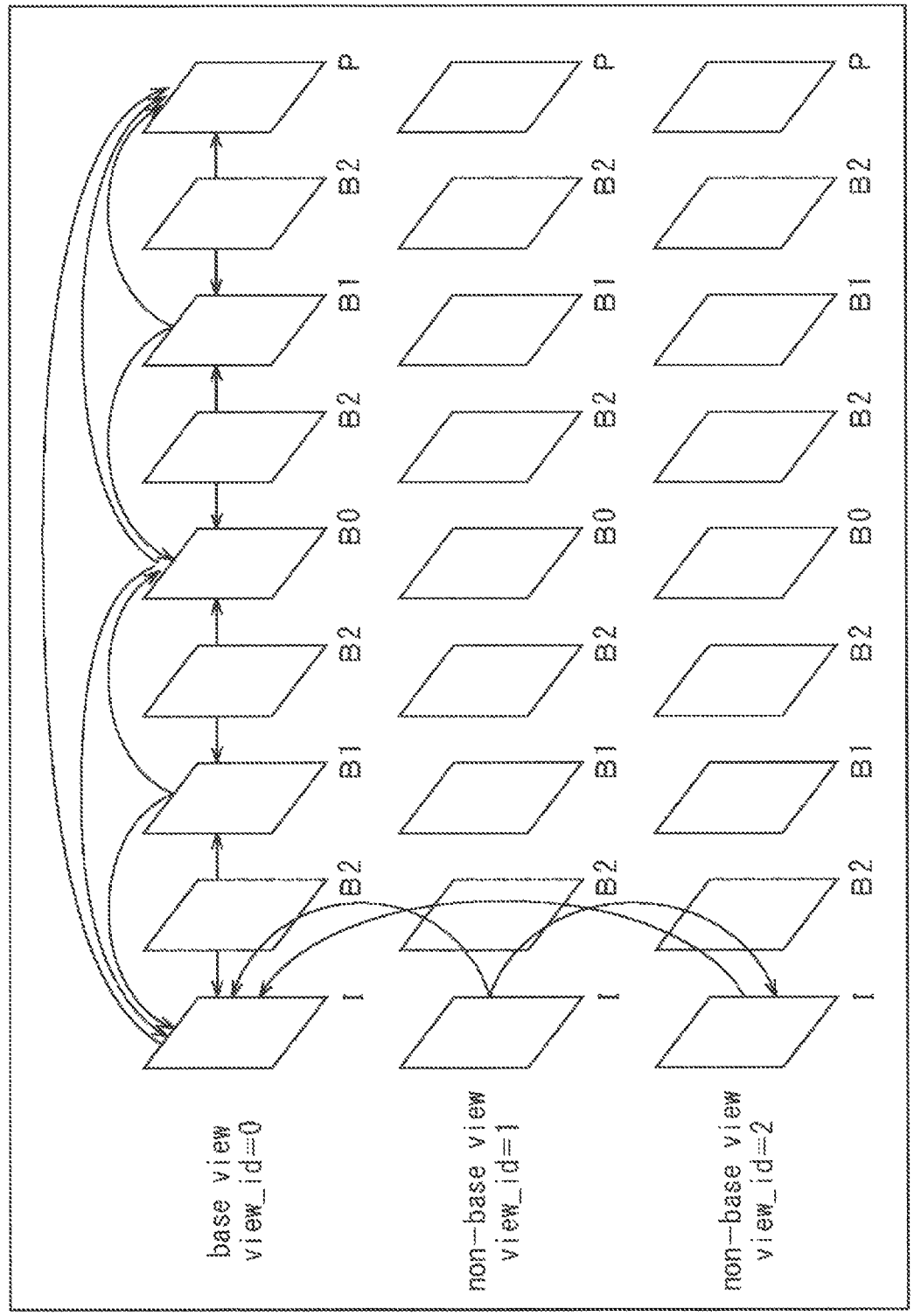
FIG. 42 is a diagram illustrating an example of a multiple view image encoding system.

FIG. 42 is a diagram illustrating an example of a multiple view image encoding system.

As illustrated in FIG. 42, a multiple view image includes images of a plurality of viewpoints (views). The plurality of views of the multiple view image includes a base view of performing encoding and decoding by using only the image of the own view without using information of other views, and a non-base view of performing encoding and decoding by using the information of the other views. The encoding and decoding of the non-base view may be performed by using information of the base view, or may be performed by using information of the non-base view.

In a case of encoding and decoding the multiple view image as illustrated in the example of FIG. 42, the multiple view image is encoded for each of the viewpoints. Then, in a case of decoding encoding data obtained as described above, the encoding data items of each of the viewpoints are respectively decoded (that is, for each of the viewpoints). The method described in the above embodiments, may be applied to the encoding and decoding of each of the viewpoints. Thus, it is possible to greatly improve S/N and the compression efficiency. That is, similarly, it is also possible to greatly improve S/N and the compression efficiency, in the multiple view image.

<Multiple View Image Encoding or Decoding System>

Figure 43:
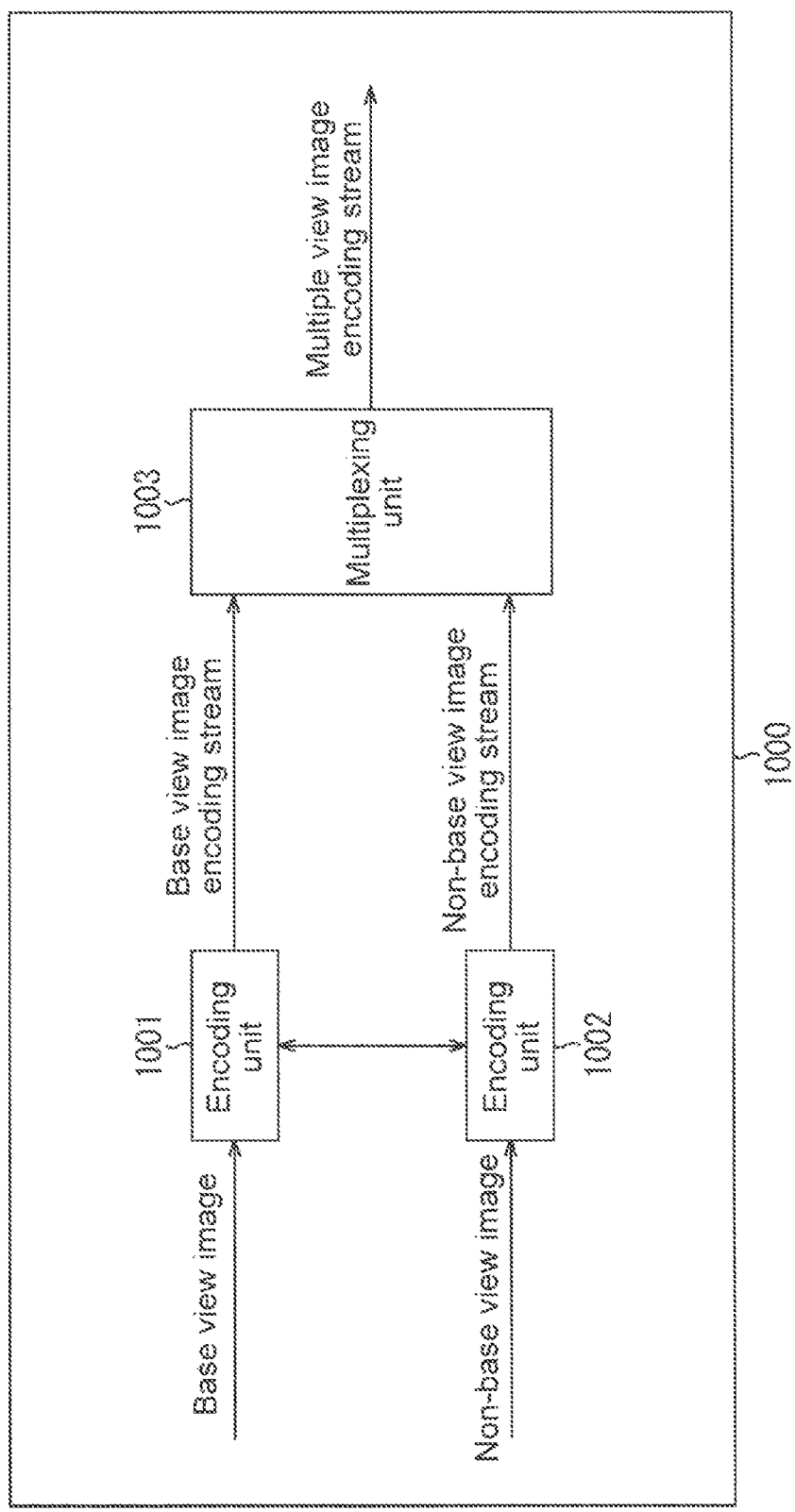
FIG. 43 is a diagram illustrating a main configuration example of a multiple view image encoding device to which the present technology is applied.

FIG. 43 is a diagram illustrating a multiple view image encoding device of the multiple views image encoding or decoding system performing multiple view image encoding and decoding described.

As illustrated in FIG. 13, a multiple view image encoding device 1000 includes an encoding unit 1001, an encoding unit 1002, and a multiplexing unit 1003.

The encoding unit 1001 encodes a base view image, and generates a base view image encoding stream. The encoding unit 1002 encodes a non-base view image, and generates a non-base view image encoding stream. The multiplexing unit 1003 performs multiplexing with respect to the base view image encoding stream generated in the encoding unit 1001, and the non-base view image encoding stream generated in the encoding unit 1002, and generates a multiple view image encoding stream.

Figure 44:
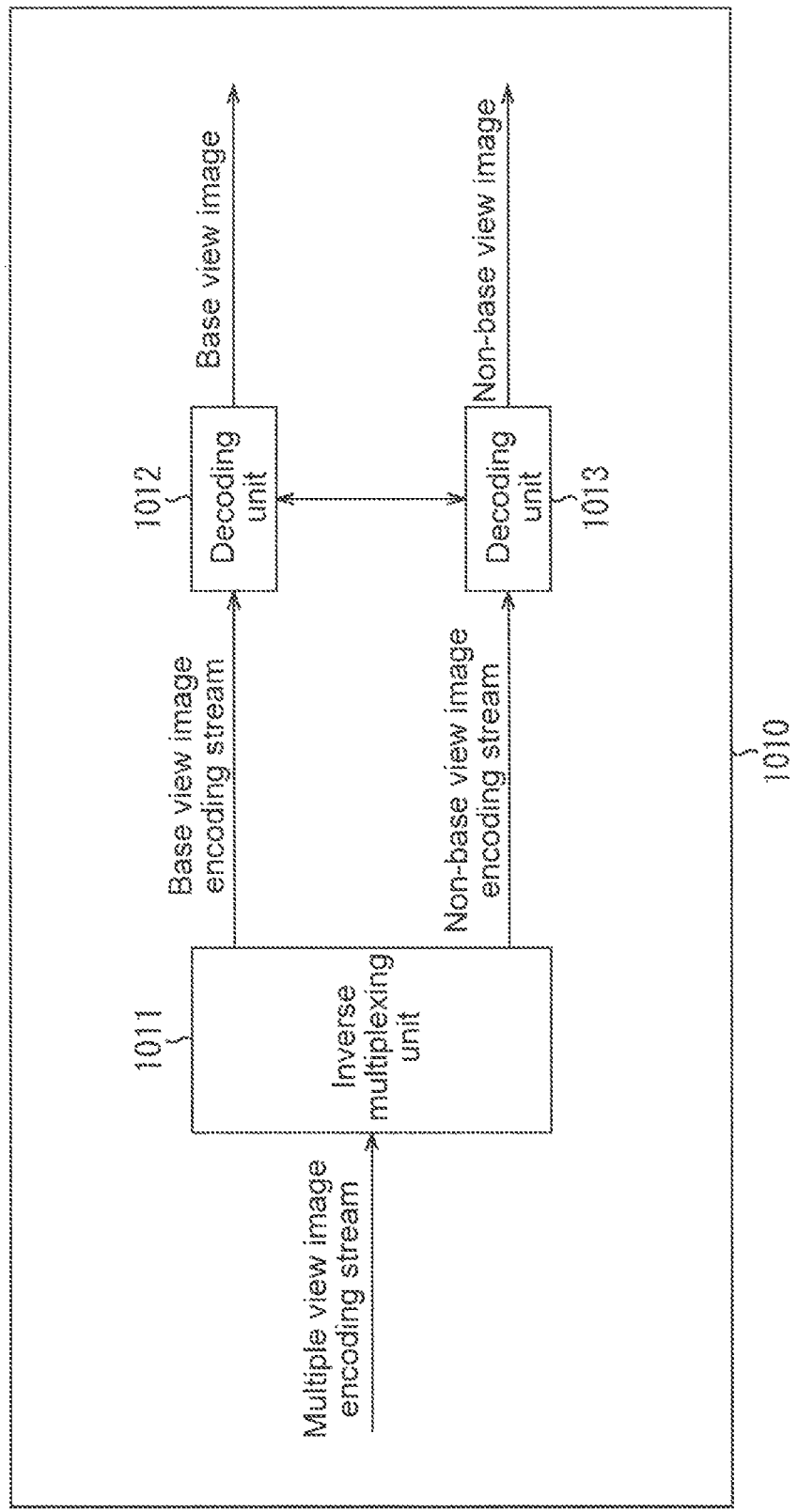
FIG. 44 is a diagram illustrating a main configuration example of a multiple view image decoding device to which the present technology is applied.

FIG. 44 is a diagram illustrating a multiple view image decoding device performing multiple view image decoding described above.

As illustrated in FIG. 44, a multiple view image decoding device 1010 includes an inverse multiplexing unit 1011, a decoding unit 1012, and a decoding unit 1013.

The inverse multiplexing unit 1011 performs inverse multiplexing with respect to the multiple view image encoding stream obtained by performing the multiplexing with respect to the base view image encoding stream and the non-base view image encoding stream, and extracts the base view image encoding stream and the non-base view image encoding stream. The decoding unit 1012 decodes the base view image encoding stream extracted by the inverse multiplexing unit 1011, and obtains the base view image. The decoding unit 1013 decodes the non-base view image encoding stream extracted by the inverse multiplexing unit 1011, and obtains the non-base view image.

For example, in such a multiple view image encoding or decoding system, the encoding device 11 described in the above embodiments, may be applied as the encoding unit 1001 and the encoding unit 1002 of the multiple view image encoding device 1000. Thus, the method described in the above embodiments, can also be applied to the encoding of the multiple view image. That is, it is possible to greatly improve S/N and the compression efficiency. In addition, for example, the decoding device 12 described in the above embodiments, may be applied as the decoding unit 1012 and the decoding unit 1013 of the multiple view image decoding device 1010. Thus, the method described in the above embodiments, can also be applied to the decoding of the encoding data of the multiple view image. That is, it is possible to greatly improve S/N and the compression efficiency.

<Application with Respect to Layer Image Encoding or Decoding System>

In addition, the set of processings described above, can be applied to a layer image encoding (scalable encoding) or decoding system.

Figure 45:
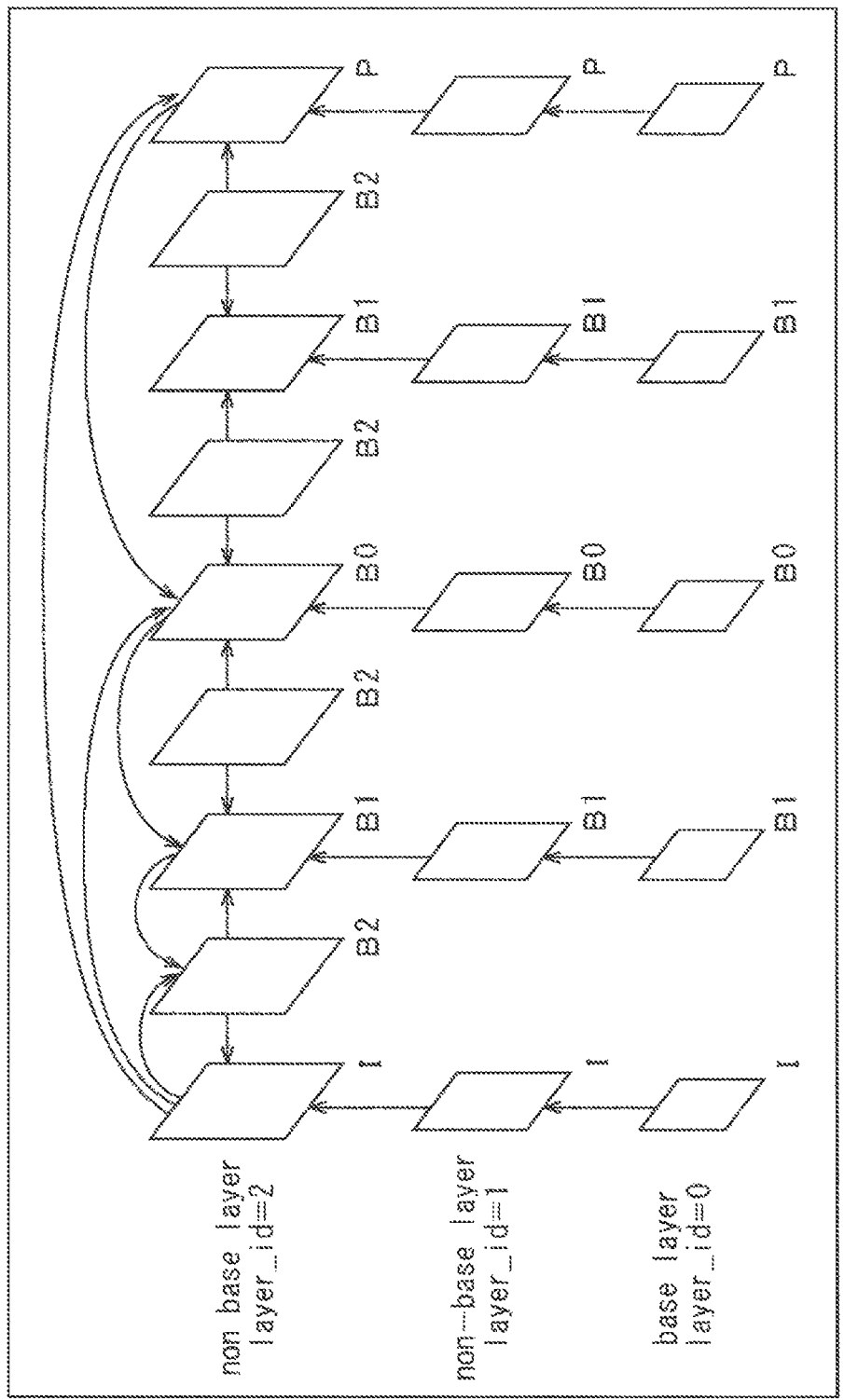
FIG. 45 is a diagram illustrating an example of a layer image encoding system.

FIG. 45 is a diagram illustrating an example of a layer image encoding system.

Layer image encoding (scalable encoding) is encoding in which an image is formed into a plurality of layers such that image data has a scalability function with respect to a predetermined parameter, and is encoded for each of the layers. Layer image decoding (scalable decoding) is decoding corresponding to the layer image encoding.

As illustrated in FIG. 45, in the layering of the image, one image is divided into a plurality of images (layers), on the basis of a predetermined parameter having a scalability function. That is, a layered image (a layer image) includes images of a plurality of layers having predetermined parameter values different from each other. The plurality of layers of the layer image, includes a base layer of performing encoding and decoding by using only the image of the own layer without using images of other layers, and a non-base layer (also referred to as an enhancement layer) of performing encoding and decoding by using the images of the other layers. In the non-base layer, an image of the base layer may be used, or an image of the non-base layer may be used.

In general, the non-base layer includes data of a difference image (difference data) between the own image and the images of the other layers, such that redundancy is reduced. For example, in a case where one image is layered into two layers of the base layer and the non-base layer (also referred to as the enhancement layer), an image having quality lower than that of the original image is obtained by only the data of the base layer, and the data of the base layer and the data of the non-base layer are synthesized, and thus, the original image (that is, a high-quality image) is obtained.

The image is layered as described above, and thus, it is possible to easily obtain images having various qualities, in accordance with a situation. For example, it is possible to transmit image compression information according to the ability of a terminal or a network, from a server, without performing transcode processing in which image compression information of only the base layer is transmitted to a terminal having low processing ability, such as a mobile phone, and a moving image having a low space temporal resolution or poor image quality, is reproduced, and image compression information of the enhancement layer in addition to the base layer, is transmitted to a terminal having high processing ability, such as a television or a personal computer, and a moving image having a high space temporal resolution or high image quality is reproduced.

In a case of encoding and decoding the layer image as illustrated in the example of FIG. 45, the layer image is encoded for each of the layers. Then, in a case of decoding encoding data obtained as described above, the encoding data items of each of the layers are respectively decoded (that is, for each of the layers). The method described in the above embodiments, may be applied to the encoding and decoding of each of the layers. Thus, it is possible to greatly improve S/N and the compression efficiency. That is, similarly, it is also possible to greatly improve S/N and the compression efficiency, in the layer image.

<Scalable Parameter>

In such layer image encoding and layer image decoding (the scalable encoding and the scalable decoding), a parameter having a scalability function is arbitrary. For example, the spatial resolution may be set as the parameter (spatial scalability). In a case of the spatial scalability, an image resolution is different for each of the layers.

In addition, for example, a temporal resolution may be applied as the parameter having such scalability (temporal scalability). In a case of the temporal scalability, a frame rate is different for each of the layers.

Further, for example, a signal to noise ratio (SNR) may be applied as the parameter having such scalability (SNR scalability). In a case of the SNR scalability, an SN ratio is different for each of the layers.

It is obvious that the parameter having the scalability may be others in addition to the examples described above. For example, the parameter having the scalability includes bitdepth scalability in which the base layer is an image of 8 bits, and the enhancement layer is added to the image, and thus, an image of 10 bits, is obtained.

In addition, the parameter having the scalability includes chroma scalability in which the base layer is a component image in the format of 4:2:0, and the enhancement layer is added to the image, and thus, a component image in the format of 4:2:2, is obtained.

<Layer Image Encoding or Decoding System>

Figure 46:
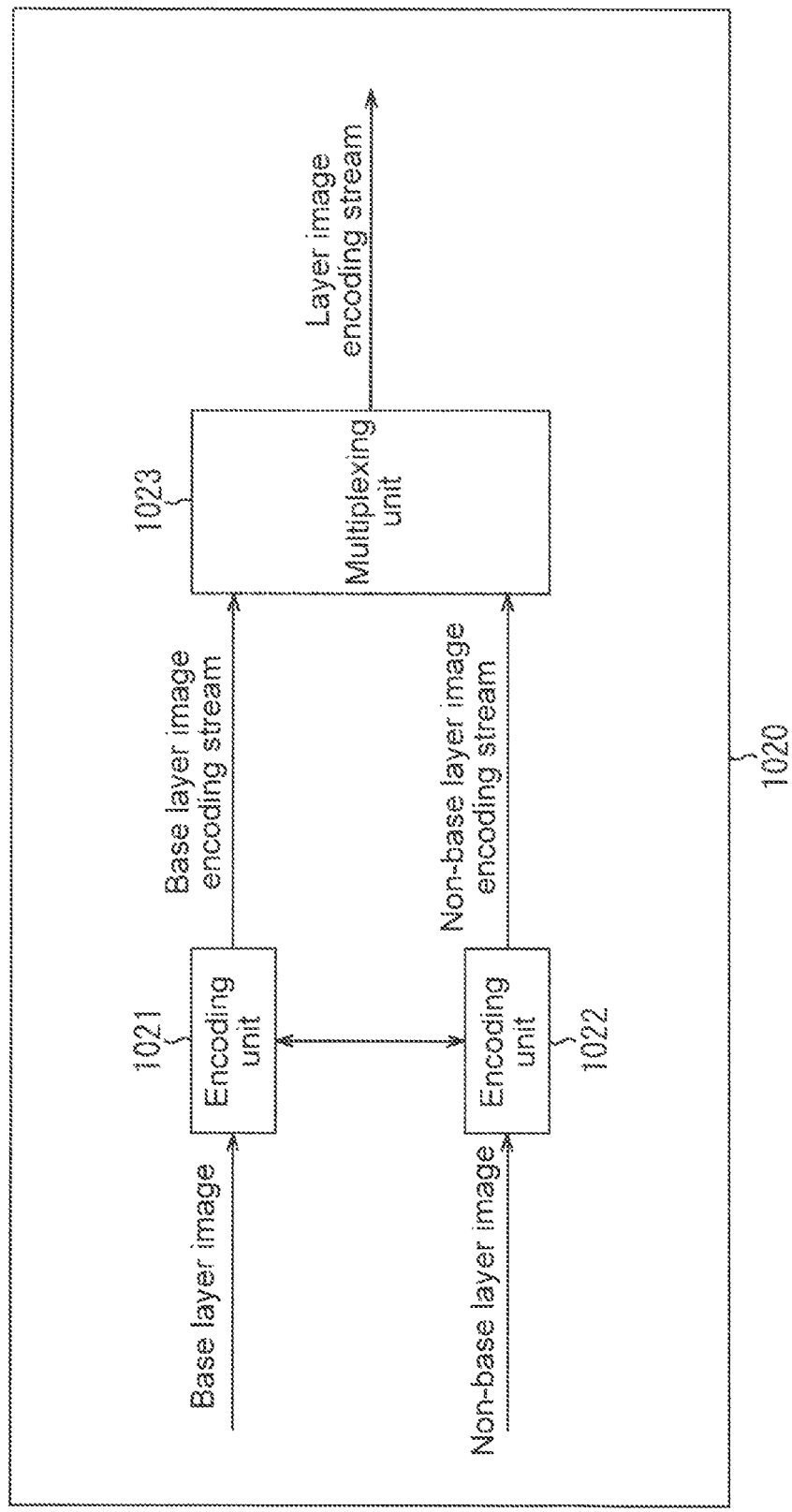
FIG. 46 is a diagram illustrating a main configuration example of a layer image encoding device to which the present technology is applied.

FIG. 46 is a diagram illustrating a layer image encoding device of the layer image encoding or decoding system performing the layer image encoding and decoding described above.

As illustrated in FIG. 46, a layer image encoding device 1020 includes an encoding unit 1021, an encoding unit 1022, and a multiplexing unit 1023.

The encoding unit 1021 encodes a base layer image, and generates a base layer image encoding stream. The encoding unit 1022 encodes a non-base layer image, and generates a non-base layer image encoding stream. The multiplexing unit 1023 performs multiplexing with respect to the base layer image encoding stream generated in the encoding unit 1021, and the non-base layer image encoding stream generated in the encoding unit 1022, and generates a layer image encoding stream.

Figure 47:
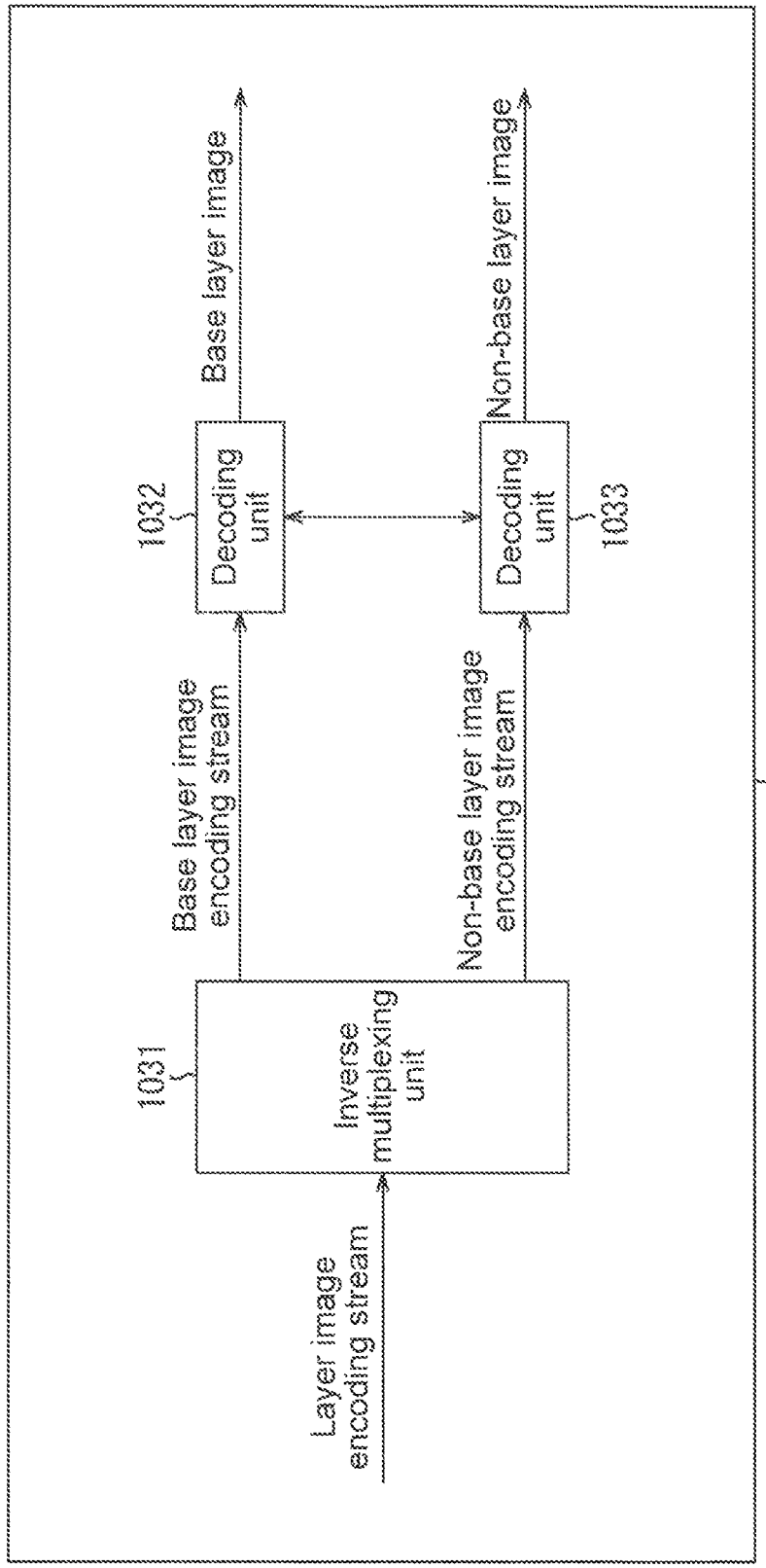
FIG. 47 is a diagram illustrating a main configuration example of a layer image decoding device to which the present technology is applied.

FIG. 47 is a diagram illustrating a layer image decoding device performing the layer image decoding described above.

As illustrated in FIG. 47, a layer image decoding device 1030 includes an inverse multiplexing unit 1031, a decoding unit 1032, and a decoding unit 1033.

The inverse multiplexing unit 1031 performs inverse multiplexing with respect to the layer image encoding stream obtained by performing the multiplexing with respect to the base layer image encoding stream and the non-base layer image encoding stream, and extracts the base layer image encoding stream and the non-base layer image encoding stream. The decoding unit 1032 decodes the base layer image encoding stream extracted by the inverse multiplexing unit 1031, and obtains the base layer image. The decoding unit 1033 decodes the non-base layer image encoding stream extracted by the inverse multiplexing unit 1031, and obtains the non-base layer image.

For example, in such a layer image encoding or decoding system, the encoding device 11 described in the above embodiments, may be applied as the encoding unit 1021 and the encoding unit 1022 of the layer image encoding device 1020. Thus, the method described in the above embodiments, can also be applied to the encoding of the layer image. That is, it is possible to greatly improve S/N and the compression efficiency. In addition, for example, the decoding device 12 described in the above embodiments, may be applied as the decoding unit 1032 and the decoding unit 1033 of the layer image decoding device 1030. Thus, the method described in the above embodiments, can also be applied to the decoding of the encoding data of the layer image. That is, it is possible to greatly improve S/N and the compression efficiency.

<Computer>

The set of processings described above can be executed by hardware, and can be executed by software. In a case where the set of processings are executed by the software, a program configuring the software is installed in a computer. Here, the computer includes a computer built in dedicated hardware, a computer capable of executing various functions by installing various programs, for example, a general-purpose personal computer, and the like.

Figure 48:
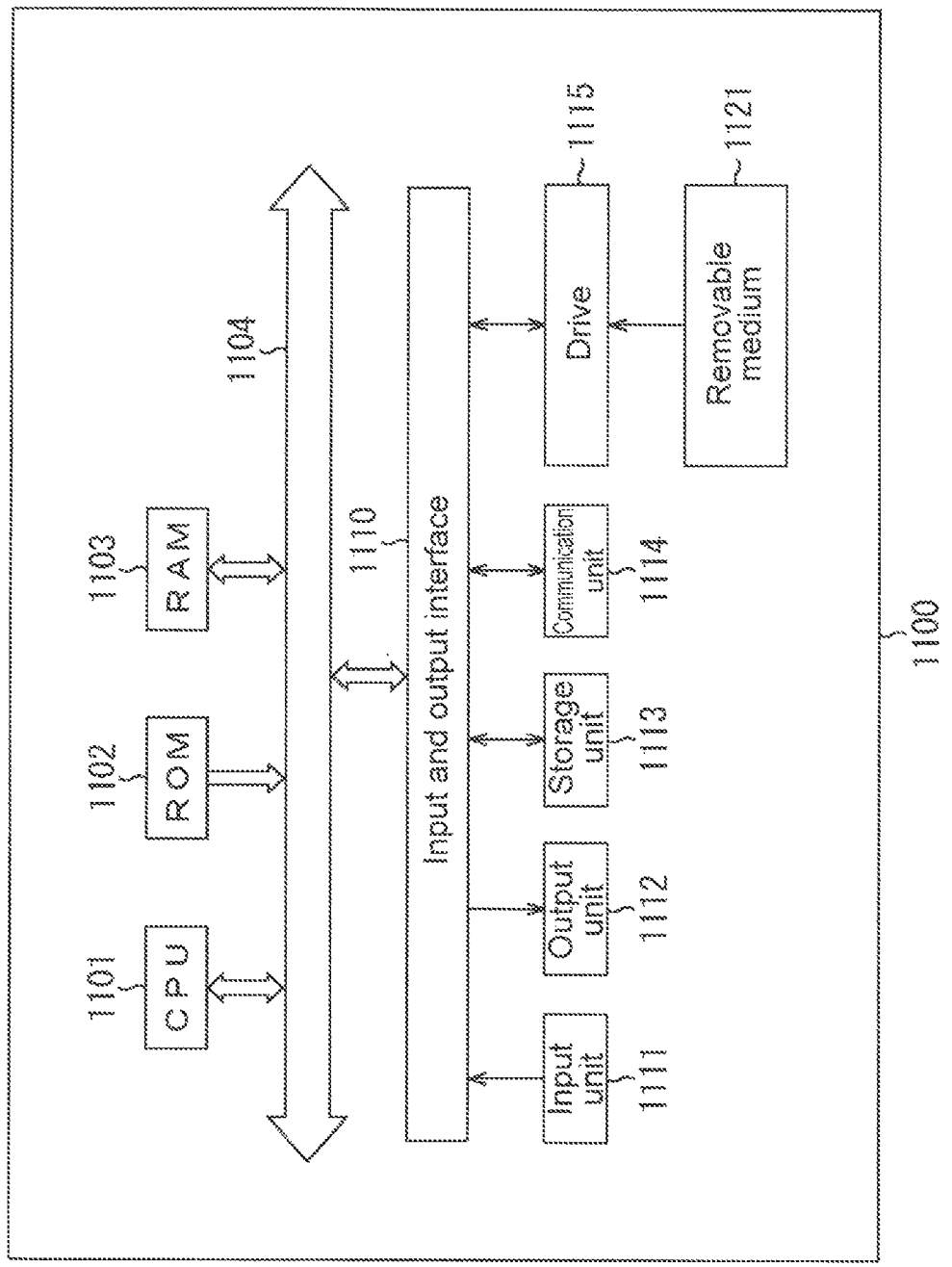
FIG. 48 is a block diagram illustrating a main configuration example of a computer.

FIG. 48 is a block diagram illustrating a configuration example of the hardware of the computer executing the set of processings described above by a program.

In a computer 1100 illustrated in FIG. 48, a central processing unit (CPU) 1101, a read only memory (ROM) 1102, and a random access memory (RAM) 1103 are connected to each other through a bus 1104.

In addition, an input and output interface 1110 is also connected to the bus 1104. An input unit 1111, an output unit 1112, a storage unit 1113, a communication unit 1114, and a drive 1115 are connected to the input and output interface 1110.

The input unit 1111, for example, includes a keyboard, a mouse, a microphone, a touch panel, an input terminal, and the like. The output unit 1112, for example, includes a display, a speaker, an output terminal, and the like. The storage unit 1113, for example, includes a hard disk, an RAM disk, a non-volatile memory, and the like. The communication unit 1114, for example, includes a network interface. The drive 1115 drives a removable medium 821 such as a magnetic disk, an optical disk, a magnetooptical disk, or a semiconductor memory.

In the computer configured as described above, the CPU 1101, for example, loads the program stored in the storage unit 1113, in the RAM 1103 through the input and output interface 1110 and the bus 1104, and executes the program, and thus, performs the set of processings described above. In addition, data or the like, necessary for the CPU 1101 to execute various processings, is also suitably stored in the RAM 1103.

The program executed by the computer (the CPU 1101), for example, can be applied by being recorded in the removable medium 821 as a package medium or the like. In this case, the program can be installed in the storage unit 1113 through the input and output interface 1110, by mounting the removable medium 821 in the drive 1115.

In addition, the program can be provided through a wired or wireless transmission medium such as a local area network, the internet, and digital satellite broadcasting. In this case, the program can be received by the communication unit 1114, and can be installed in the storage unit 1113.

In addition, the program can also be installed in advance in the ROM 1102 or the storage unit 1113.

<Application of Present Technology>

The encoding device 11 or the decoding device 12 according to the embodiments described above, for example, can be applied to various electronic devices such as a transmitter or a receiver in satellite broadcasting, cable broadcasting of a cable TV or the like, delivery on the Internet, and delivery with respect to a terminal in accordance with cellular communication, a recording device recording an image in a medium such as an optical disk, a magnetic disk, and a flash memory, and a reproducing device reproducing an image from a storage medium. Hereinafter, four application examples will be described.

<First Application Example: Television Receiver>

Figure 49:
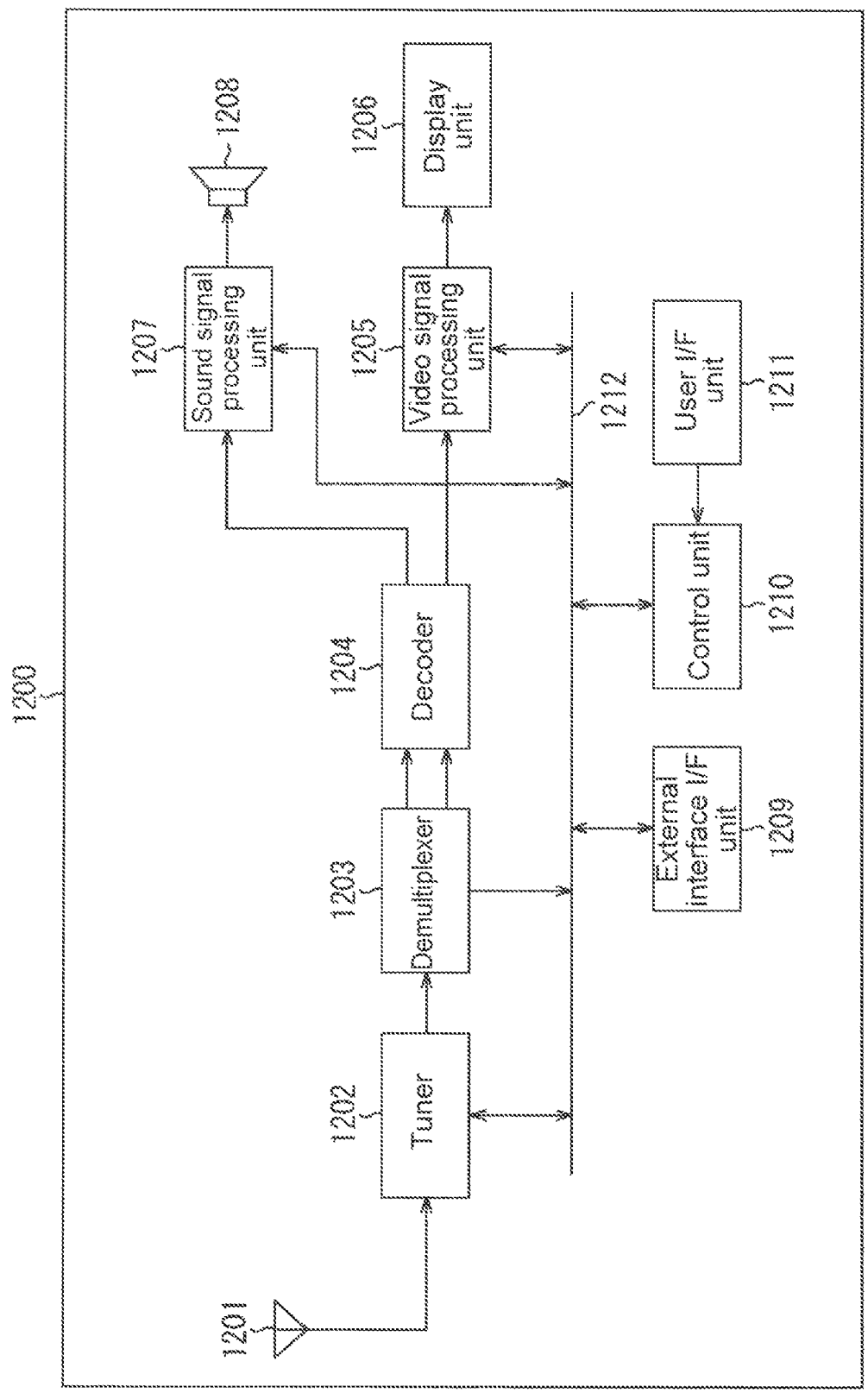
FIG. 49 is a block diagram illustrating an example of a schematic configuration of a television device.

FIG. 49 is a diagram illustrating an example of a schematic configuration of a television device to which the embodiments described above are applied.

A television device 1200 includes an antenna 1201, a tuner 1202, a demultiplexer 1203, a decoder 1204, a video signal processing unit 1205, a display unit 1206, a sound signal processing unit 1207, a speaker 1208, an external interface (I/F) unit 1209, a control unit 1210, a user interface (I/F) unit 1211, and a bus 1212.

The tuner 1202 extracts a signal of a desired channel from a broadcasting signal received through the antenna 1201, and demodulates the extracted signal. Then, the tuner 1202 outputs an encoding bit stream obtained by the demodulation, to the demultiplexer 1203. That is, the tuner 1202 functions as a transmission unit of the television device 1200 which receives an encoding stream in which an image is encoded.

The demultiplexer 1203 separates(a video stream and a sound stream of a broadcast of a viewing target, from the encoding bit stream, and outputs each of the separated streams to the decoder 1204. In addition, the demultiplexer 1203 extracts auxiliary data such as an electronic program guide (EPG), from the encoding bit stream, and supplies the extracted data to the control unit 1210. Note that, in a case where the encoding bit stream is scrambled, the demultiplexer 1203 may descramble the encoding bit stream.

The decoder 1204 decodes the video stream and the sound stream input from the demultiplexer 1203. Then, the decoder 1204 outputs video data generated by the decoding processing, to the video signal processing unit 1205. In addition, the decoder 1204 outputs sound data generated by the decoding processing, to the sound signal processing unit 1207.

The video signal processing unit 1205 reproduces the video data input from the decoder 1204, and displays a video on the display unit 1206. In addition, the video signal processing unit 1205 may display an application screen supplied through a network, on the display unit 1206. In addition, the video signal processing unit 1205, for example, may perform additional processing such as noise removal, with respect to the video data, in accordance with the setting. Further, the video signal processing unit 1205, for example, may generate an image of a graphical user interface (GUI) such as a menu, a button, or a cursor, and may superimpose the generated image on an output image.

The display unit 1206 is driven by a driving signal supplied from the video signal processing unit 1205, and displays the video or the image on a video surface of a display device (for example, a liquid crystal display, a plasma display, or an organic electroluminescence display (an organic EL display (OELD)).

The sound signal processing unit 1207 performs reproducing processing such as D/A conversion and amplification, with respect to the sound data input from the decoder 1204, and outputs the sound from the speaker 1208. In addition, the sound signal processing unit 1207 may perform the additional processing such as the noise removal, with respect to the sound data.

The external interface unit 1209 is an interface for connecting the television device 1200 and an external device or a network to each other. For example, the video stream or the sound stream received through the external interface unit 1209, may be decoded by the decoder 1204. That is, the external interface unit 1209 also as the transmission unit of the television device 1200 which receives the encoding stream in which an image is encoded.

The control unit 1210 includes a processor such as a CPU, and a memory such as a RAM and a ROM. The memory stores a program executed by the CPU, program data, EPG data, data acquired through a network, and the like. The program stored in the memory, for example, is read by the CPU at the time of activating the television device 1200, and is executed. The CPU executes the program, and thus, for example, controls the operation of the television device 1200, in accordance with a manipulation signal input from the user interface unit 1211.

The user interface unit 1211 is connected to the control unit 1210. The user interface unit 1211, for example, includes a button and a switch for a user to manipulate the television device 1200, a receiving unit of a remote control signal, and the like. The user interface unit 1211 detects the manipulation of the user through such constituents, generates the manipulation signal, and outputs the generated manipulation signal to the control unit 1210.

The bus 1212 connects the tuner 1202, the demultiplexer 1203, the decoder 1204, the video signal processing unit 1205, the sound signal processing unit 1207, the external interface unit 1209, and the control unit 1210 to each other.

In the television device 1200 configured as described above, the decoder 1204 may function as the decoding device 12 described above. That is, the decoder 1204 may decode the encoding data, in accordance with the method described in the above embodiments. Thus, the television device 1200 is capable of greatly improving S/N and the compression efficiency.

In addition, in the television device 1200 configured as described above, the video signal processing unit 1205, for example, may encode the image data supplied from the decoder 1204, and may be capable of outputting the obtained encoding data to the outside of the television device 1200 through the external interface unit 1209. Then, the video signal processing unit 1205 may function as the encoding device 11 described above. That is, the video signal processing unit 1205 may encode the image data supplied from the decoder 1204, in accordance with the method described in the above embodiments. Thus, the television device 1200 is capable of greatly improving S/N and the compression efficiency.

<Second Application Example: Mobile Telephone>

Figure 50:
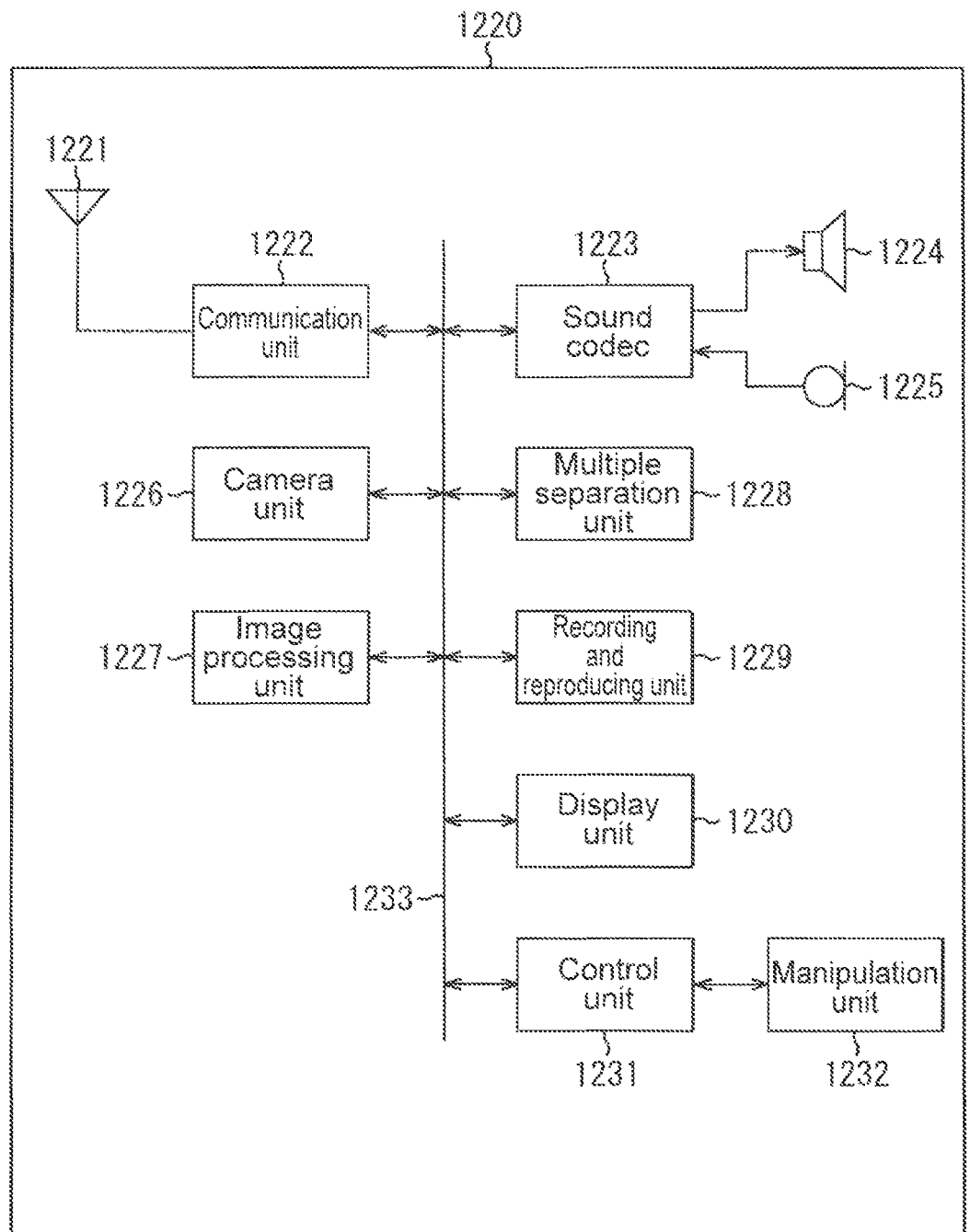
FIG. 50 is a block diagram illustrating an example of a schematic configuration of a mobile telephone.

FIG. 50 is a diagram illustrating an example of a schematic configuration of a mobile telephone to which the embodiments described above are applied.

A mobile telephone 1220 includes an antenna 1221, a communication unit 1222, a sound codec 1223, a speaker 1224, a microphone 1225, a camera unit 1226, an image processing unit 1227, a multiple separation unit 1228, a recording and reproducing unit 1229, a display unit 1230, a control unit 1231, a manipulation unit 1232, and a bus 1233.

The antenna 1221 is connected to the communication unit 1222. The speaker 1224 and the microphone 1225 are connected to the sound codec 1223. The manipulation unit 1232 is connected to the control unit 1231. The bus 1233 connects the communication unit 1222, the sound codec 1223, the camera unit 1226, the image processing unit 1227, the multiple separation unit 1228, the recording and reproducing unit 1229, the display unit 1230, and the control unit 1231 to each other.

The mobile telephone 1220 performs an operation such as the transmission and reception of a sound signal, the transmission and reception or an e-mail or image data, image capturing, and data recording, in various operation modes such as a sound call mode, a data communication mode, a photographing mode, and a television telephone mode.

In the sound call mode, an analog sound signal generated by the microphone 1225, is supplied to the sound codec 1223. The sound codec 1223 converts the analog sound signal into the sound data, performs A/D conversion with respect to the converted sound data, and compresses the sound data. Then, the sound codec 1223 outputs the compressed sound data to the communication unit 1222. The communication unit 1222 encodes and modulates the sound data, and generates a transmission signal. Then, the communication unit 1222 transmits the generated transmission signal to a base station (not illustrated) through the antenna 1221. In addition, the communication unit 1222 performs amplification and frequency conversion with respect to a wireless signal received through the antenna 1221, and acquires a reception signal. Then, the communication unit 1222 demodulates and decodes the reception signal, generates the sound data, and outputs the generated sound data to the sound codec 1223. The sound codec 1223 decompresses the sound data, performs D/A conversion with respect to the sound data, and generates the analog sound signal. Then, the sound codec 1223 supplies the generated sound signal to the speaker 1224, and outputs the sound.

In addition, in the data communication mode, for example, the control unit 1231 generates character data configuring the e-mail, in accordance with the manipulation of the user through the manipulation unit 1232. In addition, the control unit 1231 displays characters on the display unit 1230. In addition, the control unit 1231 generates e-mail data in accordance with a transmission instruction from the user through the manipulation unit 1232, and outputs the generated e-mail data to the communication unit 1222. The communication unit 1222 encodes and modulates the e-mail data, and generates the transmission signal. Then, the communication unit 1222 transmits the generated transmission signal to the base station (not illustrated) through the antenna 1221. In addition, the communication unit 1222 performs amplification and frequency conversion with respect to the wireless signal received through the antenna 1221, and acquires the reception signal. Then, the communication unit 1222 demodulates and decodes the reception signal, restores the e-mail data, and the outputs the restored e-mail data to the control unit 1231. The control unit 1231 displays the contents of the e-mail on the display unit 1230, and supplies the e-mail data to the recording and reproducing unit 1229 to be written in the storage medium.

The recording and reproducing unit 1229 includes a readable and writable arbitrary storage medium. For example, the storage medium may be a built-in storage medium such as a RAM or a flash memory, or may be an externally mounted storage medium such as a hard disk, a magnetic disk, a magnetooptical disk, an optical disk, a universal serial bus (USB) memory, or a memory card.

In addition, in the photographing mode, for example, the camera unit 1226 generates the image data by capturing a subject, and outputs the generated image data to the image processing unit 1227. The image processing unit 1227 encodes the image data input from the camera unit 1226, and supplies the encoding stream to the recording and reproducing unit 1229 to be written in the storage medium.

Further, in the image display mode, the recording and reproducing unit 1229 reads out the encoding stream recorded in the storage medium, and outputs the encoding stream to the image processing unit 1227. The image processing unit 1227 decodes the encoding stream input from the recording and reproducing unit 1229, supplies the image data to the display unit 1230, and displays the image.

In addition, in the television telephone mode, for example, the multiple separation unit 1228 performs multiplexing with respect to the video stream encoded by the image processing unit 1227, and the sound stream input from the sound codec 1223, and outputs the stream subjected to the multiplexing, to the communication unit 1222. The communication unit 1222 encodes and modulates the stream, and generates the transmission signal. Then, the communication unit 1222 transmits the generated transmission signal to the base station (not illustrated) through the antenna 1221. In addition, the communication unit 1222 performs amplification and frequency conversion with respect to the wireless signal received through the antenna 1221, and acquires the reception signal. The encoding bit stream can be included in the transmission signal and the reception signal. Then, the communication unit 1222 demodulates and decodes the reception signal, restores the stream, and outputs the restored stream to the multiple separation unit 1228. The multiple separation unit 1228 separates the video stream and the sound stream from the stream that is input, and outputs the video stream to the image processing unit 1227, and the sound stream to the sound codec 1223. The image processing unit 1227 decodes the video stream, and generates the video data. The video data is supplied to the display unit 1230, and a set, of images are displayed on the display unit 1230. The sound codec 1223 decompresses the sound stream, performs D/A conversion with respect to the sound stream, and generates the analog sound signal Then, the sound codec 1223 supplies the generated sound signal to the speaker 1224, and outputs the sound.

In the mobile telephone 1220 configured as described above, for example, the image processing unit 1227 may function as the encoding device 11 described above. That is, the image processing unit 1227 may encode the image data, in accordance with the method described in the above embodiments. Thus, the mobile telephone 1220 is capable of greatly improving S/N and the compression efficiency.

In addition, in the mobile telephone 1220 configured as described above, for example, the image processing unit 1227 may function as the decoding device 12 described above. That is, the image processing unit 1227 may decode the encoding data, in accordance with the method described in the above embodiments. Thus, the mobile telephone 1220 is capable of greatly improving S/N and the compression efficiency.

<Third Application Example: Recording and Reproducing Device>

Figure 51:
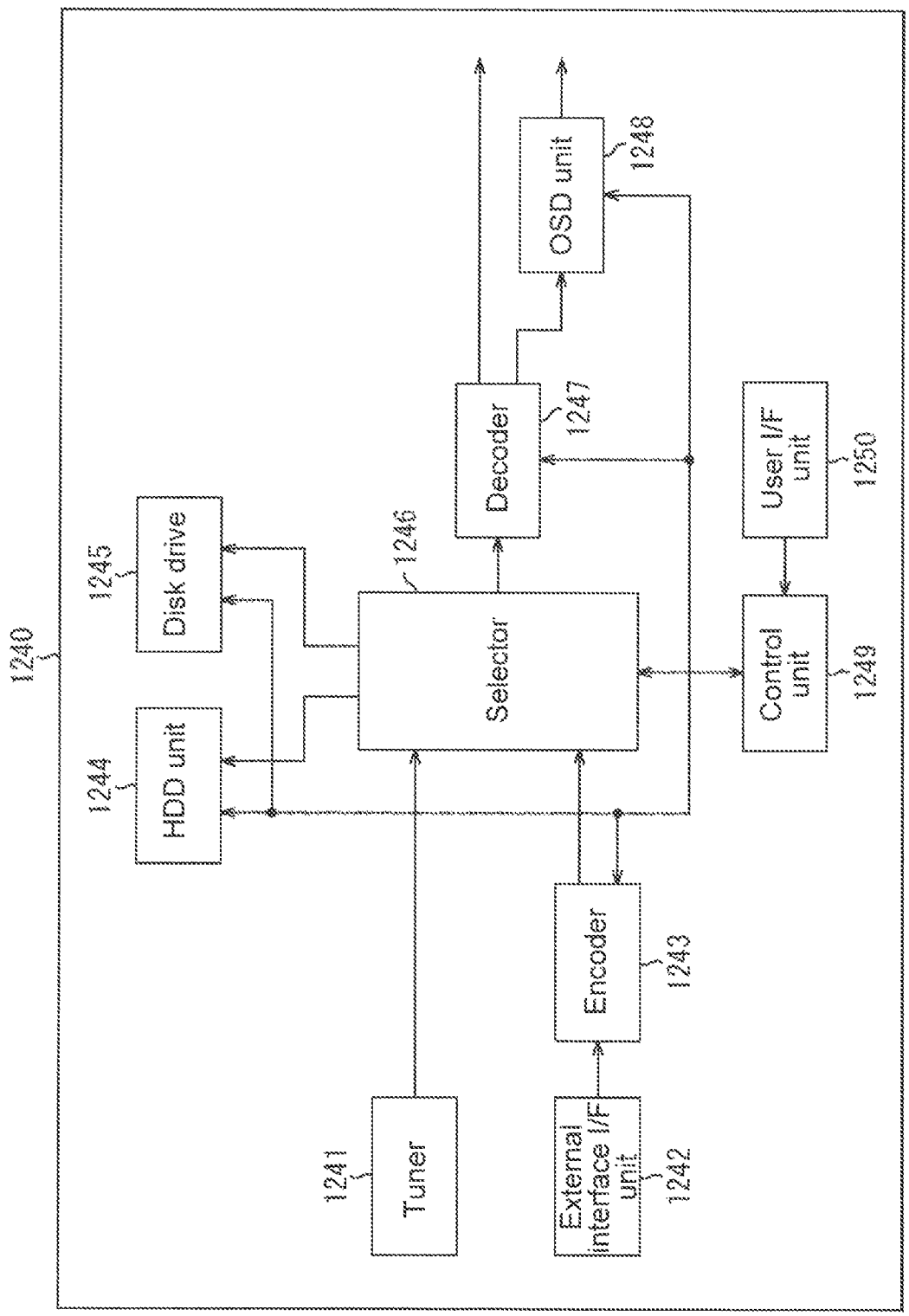
FIG. 51 is a block diagram illustrating an example of a schematic configuration of a recording and reproducing device.

FIG. 51 a diagram illustrating an example of a schematic configuration of the recording and reproducing device to which the embodiments described above are applied.

The recording and reproducing device 1240, for example, encodes the received sound data and video data of the broadcast, and records the data in the recording medium. In addition, the recording and reproducing device 1240, for example, may encode sound data video data acquired from other devices, and may record the data in the recording medium. In addition, the recording and reproducing device 1240, for example, reproduces the data recorded in the recording medium, on a monitor or a speaker, in accordance with the instruction of the user. At this time, the recording and reproducing device 1240 decodes the sound data and the video data.

The recording and reproducing device 1240 includes a tuner 1241, an external interface (I/F) unit 1242, an encoder 1243, a hard disk drive (HDD) unit 1244, a disk drive 1245, a selector 1246, a decoder 1247, an on-screen display (OSD) unit 1248, a control unit 1249, and a user interface (I/F) unit 1250.

The tuner 1241 extracts the signal of the desired channel from the broadcasting signal received through the antenna (not illustrated), and demodulates the extracted signal. Then, the tuner 1241 outputs the encoding bit stream obtained by the demodulation, to the selector 1246. That is, the tuner 1241 functions as a transmission unit of the recording and reproducing device 1240.

The external interface unit 1242 is an interface for connecting the recording and reproducing device 1240 and the external device or the network to each other. The external interface unit 1242, for example, may be an institute of electrical and electronic engineers (IEEE) 1394 interface, a network interface, a USB interface, a flash memory interface, or the like. For example, the video data and the sound data received through the external interface unit 1242, are input into the encoder 1243. That is, the external interface unit 1242 functions as the transmission unit of the recording and reproducing device 1240.

In a case where the video data and the sound data input from the external interface unit 1242, are not encoded, the encoder 1243 encodes the video data and the sound data. Then, the encoder 1243 outputs the encoding bit stream to the selector 1246.

The HDD unit 1244 records the encoding bit stream in which contents data of the video, the sound, and the like, are compressed, various programs, and other data items, in an internal hard disk. In addition, the HDD unit 1244 reads out the data from the hard disk at the time of reproducing the video and the sound.

The disk drive 1245 performs recording and reading of the data with respect to the recording medium mounted thereon. The recording medium mounted on the disk drive 1245, for example, may be a digital versatile disc (DVD) (DVD-video, DVD-random access memory (DVD-RAM), DVD recordable (DVD-R), DVD rewritable (DVD-RW), DVD+recordable (DVD+R), DVD+rewritable (DVD+RW), and the like), a Blu-ray (Registered Trademark) disk, or the like.

The selector 1246 selects the encoding bit stream from the tuner 1241 or the encoder 1243, and outputs the selected encoding bit stream to the HDD 1244 or the disk drive 1245, at the time of recording the video and the sound. In addition, the selector 1246 outputs the encoding bit stream input from the HDD 1244 or the disk drive 1245, to the decoder 1247, at the time of reproducing the video and the sound.

The decoder 1247 decodes the encoding bit stream, and generates the video data and the sound data. Then, the decoder 1247 outputs the generated video data to the OSD unit 1248. In addition, the decoder 1247 outputs the generated sound data to an external speaker.

The OSD unit 1248 reproduces the video data input from the decoder 1247, and displays the video. In addition, the OSD unit 1248 may superimpose, for example, the image of the GUI such as the menu, the button, or the cursor, on the video that is displayed.

The control unit 1249 includes a processor such as a CPU, and a memory such as a RAM and a ROM. The memory stores a program executed by the CPU, program data, and the like. The program stored in the memory, for example, is read by the CPU at the time of activating the recording and reproducing device 1240, and is executed. The CPU executes the program, and thus, for example, controls the operation of the recording and reproducing device 1240, in accordance with a manipulation signal input from the user interface unit 1250.

The user interface unit 1250 is connected to the control unit 1249. The user interface unit 1250, for example, includes a button and a switch for the user to manipulate the recording and reproducing device 1240, a receiving unit of a remote control signal, and the like. The user interface unit 1250 detects the manipulation of the user through such constituents, generates the manipulation signal, and outputs the generated manipulation signal to the control unit 1249.

In the recording and reproducing device 1240 configured as described above, for example, the encoder 1243 may function as the encoding device 11 described above. That is, the encoder 1243 may encode the image data, in accordance with the method described in the above embodiments. Thus, the recording and reproducing device 1240 is capable of greatly improving S/N and the compression efficiency.

In addition, in the recording and reproducing device 1240 configured as described above, for example, the decoder 1247 may function as the decoding device 12 described above. That is, the decoder 1247 may decode the encoding data, in accordance with the method described in the above embodiments. Thus, the recording and reproducing device 1240 is capable of greatly improving S/N and the compression efficiency.

<Fourth Application Example: Capturing Device>

Figure 52:
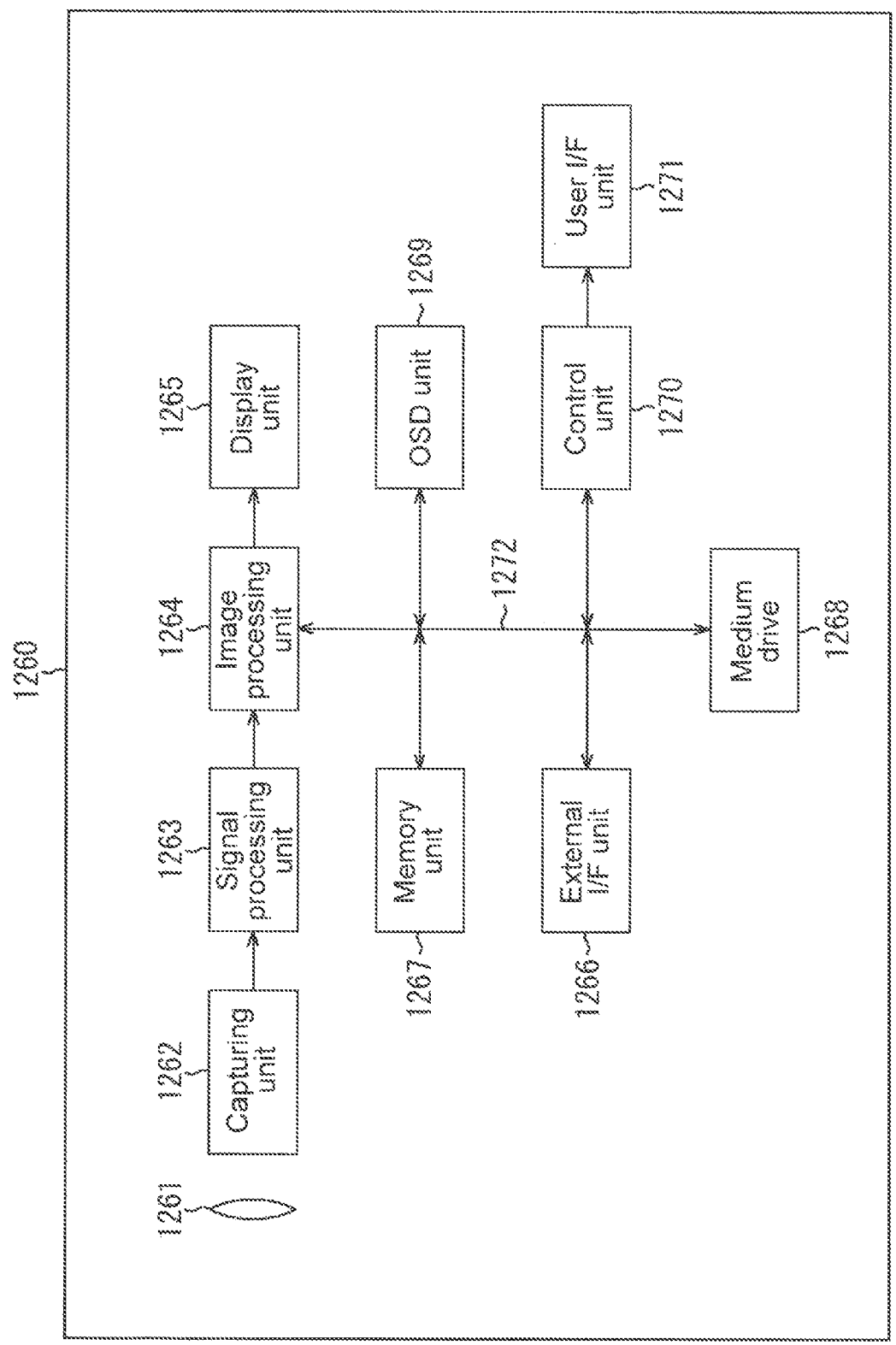
FIG. 52 is a block diagram illustrating an example of a schematic configuration of a capturing device.

FIG. 52 is a diagram illustrating an example of a schematic configuration of the capturing device to which the embodiments described above are applied.

The capturing device 1260 generates the image by capturing the subject, encodes the image data, and records the image data in the recording medium.

The capturing device 1260 includes an optical block 1261, a capturing unit 1262, a signal processing unit 1263, an image processing unit 1264, a display unit 1265, an external interface (I/F) unit 1266, a memory unit 1267, a medium drive 1268, an OSD unit 1269, a control unit 1270, a user interface (I/F) unit 1271, and a bus 1272.

The optical block 1261 is connected to the capturing unit 1262. The capturing unit 1262 is connected to the signal processing unit 1263. The display unit 1265 is connected to the image processing unit 1264. The user interface unit 1271 is connected to the control unit 1270. The bus 1272 connects the image processing unit 1264, the external interface unit 1266, the memory unit 1267, the medium drive 1268, the OSD unit 1269, and the control unit 1270 to each other.

The optical block 1261 includes a focus lens, a diaphragm mechanism, and the like. The optical block 1261 forms an optical image of the subject on a capturing surface of the capturing unit 1262. The capturing unit 1262 includes an image sensor such as a charge coupled device (CCD) or a complementary metal oxide semiconductor (CMOS), performs photoelectric conversion with respect to the optical image formed on the capturing surface, and thus, converts the optical image into an image signal as an electric signal. Then, the capturing unit 1262 outputs the image signal to the signal processing unit 1263.

The signal processing unit 1263 performs various camera signal processings such as knee correction, gamma correction, and color correction, with respect to the image signal input from the capturing unit 1262. The signal processing unit 1263 outputs the image data after the camera signal processing, to the image processing unit 1264.

The image processing unit 1264 encodes the image data input from the signal processing unit 1263, and generates the encoding data. Then, the image processing unit 1264 outputs the generated encoding data to the external interface unit 1266 or the medium drive 1268. In addition, the image processing unit 1264 decodes the encoding data input from the external interface unit 1266 or the medium drive 1268, and generates the image data. Then, the image processing unit 1264 outputs the generated image data to the display unit 1265. In addition, the image processing unit 1264 may output the image data input from the signal processing unit 1263 to the display unit 1265 to be displayed. In addition, the image processing unit 1264 may superimpose display data acquired from the OSD unit 1269, on the image output to the display unit 1265.

The OSD unit 1269, for example, generates the image of the GUI such as the menu, the button, or the cursor, and outputs the generated image to the image processing unit 1264.

The external interface unit 1266, for example, configured as a USB input and output terminal. The external interface unit 1266, for example, connects the capturing device 1260 and a printer to each other, at the time of printing the image. In addition, the drive is connected to the external interface unit 1266, as necessary. For example, a removable medium such as a magnetic disk or an optical disk, can be mounted on the drive, and a program read out from the removable medium, can be installed in the capturing device 1260. Further, the external interface unit 1266 may be configured as a network interface connected to a network such as a LAN or the internet. That is, the external interface unit 1266 functions as a transmission unit of the capturing device 1260.

The recording medium mounted on the medium drive 1268, for example, may be an arbitrary readable and writable removable medium such as a a magnetic disk, a magnetooptical disk, an optical disk, or a semiconductor memory. In addition, the recording medium may be fixedly mounted on the medium drive 1268, and thus, for example, a non-portable storage unit such as a built-in hard disk drive or a solid state drive (SSD) may be configured.

The control unit 1270 includes a processor such as a CPU, and a memory such as a RAM and a ROM. The memory stores a program executed by the CPU, program data, and the like. The program stored in the memory, for example, is read by the CPU at the time of activating the capturing device 1260, and is executed. The CPU executes the program, and thus, for example, controls the operation of the capturing device 1260, in accordance with a manipulation signal input from the user interface unit 1271.

The user interface unit 1271 is connected to the control unit 1270. The user interface unit 1271, for example, includes a button and a switch for the user to manipulate the capturing device 1260. The user interface unit 1271 detects the manipulation of the user through such constituents, generates the manipulation signal, and outputs the generated manipulation signal to the control unit 1270.

In the capturing device 1260 configured as described above, for example, the image processing unit 1264 may function as the encoding device 11 described above. That is, the image processing unit 1264 may encode the image data, in accordance with the method described in the above embodiments. Thus, the capturing device 1260 is capable of greatly improving S/N and the compression efficiency.

In addition, in the capturing device 1260 configured as described above, for example, the image processing unit 1264 may function as the decoding device 12 described above. That is, the image processing unit 1264 may decode the encoding data, in accordance with the method described in the above embodiments. Thus, the capturing device 1260 is capable of greatly improving S/N and the compression efficiency.

<Other Application Examples>

Note that, the present technology, for example, can also be applied to an HTTP streaming such as MPEG DASH using suitable encoding data that is selected from a plurality of encoding data items having resolutions and the like different from each other, prepared in advance, in segment unit. That is, information relevant to encoding or decoding can be shared in the plurality of encoding data items.

In addition, as described above, the examples of the device, the system, or the like to which the present technology is applied, have been described, but the present technology is not limited thereto, and can also be performed as all configurations provided in the device or a device configuring the system, for example, a processor as system large scale integration (LSI) or the like, a module using a plurality of processors or the like, a unit using a plurality of modules or the like, a set in which other functions are further applied to the unit, and the like (that is, a part of the configuration of the device).

<Video Set>

An example in a case where the present technology is carried out as a set, will be described with reference to FIG. 53.

Figure 53:
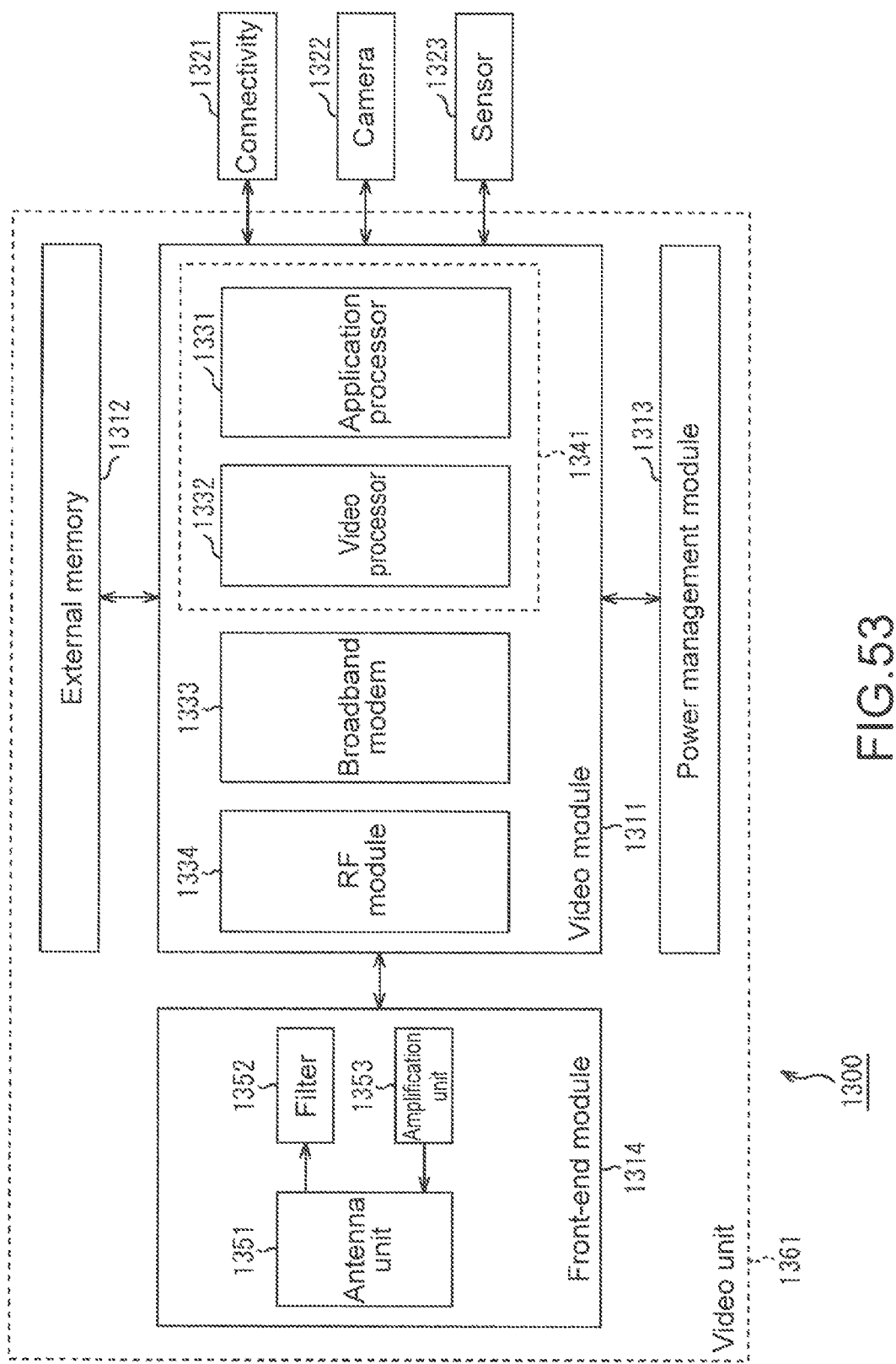
FIG. 53 is a block diagram illustrating an example of a schematic configuration of a video set.

FIG. 53 is a diagram illustrating an example of a schematic configuration of a video set to which the present technology is applied.

Recently, the multifunctionalization of an electronic device has progressed, and in a case of carrying out a part of the configuration of the device as sale or provision, in the development and the manufacturing of the electronic device, there are not only a case where a part of the configuration is carried out as a configuration having one function, but also many cases where a plurality of configurations having associated functions are combined, and are carried out as one set having a plurality of functions.

A video set 1300 illustrated in FIG. 53, has such a multifunctionalized configuration, and is configured by combining a device having a function relevant to the encoding or the decoding (may be any one of the encoding or the decoding, or may be both of the encoding and the decoding) of an image, with a device having other functions associated with the function.

As illustrated in FIG. 53, the video set 1300 includes a module group such as a video module 1311, an external memory 1312, a power management module 1313, and a front-end module 1314, and a device having an associated function, such as a connectivity 1321, a camera 1322, and a sensor 1323.

The module is configured by collecting several component functions associated with each other, and by obtaining a component having a cohesive function. A specific physical configuration is arbitrary, and for example, a configuration is considered in which a plurality of processors respectively having functions, an electronic circuit element such as a resistance or a capacitor, other devices, and the like are integrated by being arranged on a wiring substrate or the like. In addition, a configuration is also considered in which the module is combined with other modules, processors, or the like, and thus, a new module is obtained.

In the example of FIG. 53, the video module 1311 is configured by combining configurations having functions relevant to the image processing, and includes an application processor 1331, a video processor 1332, a broadband modem 1333, and an RF module 1334.

The processor is configured by integrating a configuration having a predetermined function with a semiconductor chip by a system on a chip (SoC), and for example, is also referred to as system large scale integration (LSI) or the like. The configuration having the predetermined function may be a logic circuit (a hardware configuration), may be a CPU, a ROM, a RAM, and a program (a software configuration) executed by the CPU, the ROM, and the RAM, or may be a combination thereof. For example, the processor may include the logic circuit, and the CPU, the ROM, the RAM, and the like, may realize a part of the functions by the logic circuit (the hardware configuration), and may realize other functions by the program (the software configuration) executed by the CPU.

The application processor 1331 of FIG. 53 is a processor executing an application relevant to the image processing. The application executed by the application processor 1331 is capable of not only performing operation processing in order to realize a predetermined function, but also, for example, controlling the configuration inside and outside the video module 1311, such as the video processor 1332, as necessary.

The video processor 1332 is a processor having a function relevant to (one or both of) encoding and decoding of an image.

The broadband modem 1333 converts data (a digital signal) that is transmitted by wired or wireless (or wired and wireless) broadband communication performed through a broadband line such as the internet or a public telephone network, into an analog signal, in accordance with digital modulation, or converts the analog signal received by the broadband communication, into the data (the digital signal), in accordance with demodulation. The broadband modem 1333, for example, performs processing with respect to arbitrary information such as the image data processed by the video processor 1332, a stream in which the image data is encoded, an application program, and setting data.

The RF module 1334 is a module performing frequency conversion, modulation and demodulation, amplification, filter processing, and the like with respect to a radio frequency (RF) signal that is transmitted and received through the antenna. For example, the RF module 1334 performs the frequency conversion or the like with respect to a baseband signal generated by the broadband modem 1333, and generates the RF signal. In addition, for example, the RF module 1334 performs the frequency conversion or the like with respect to the R signal received through the front-end module 1314, and generates the baseband signal.

Note that, as illustrated by a dotted line 1341 in FIG. 53, the application processor 1331 and the video processor 1332 may be integrated, and may be configured as one processor.

The external memory 1312 is a module that is provided outside the video module 1311, and includes a storage device used by the video module 1311. The storage device of the external memory 1312 may be realized by any physical configuration, but in general, there are many cases where the storage device is used in the storage of large-capacity data such as image data in frame unit, and thus, for example, it is desirable that the storage device is realized by a large-capacity semiconductor memory that is comparatively inexpensive, such as a dynamic random access memory (DRAM).

The power management module 1313 manages and controls power supply with respect to video module 1311 (each configuration in the video module 1311).

The front-end module 1314 is a module providing a front-end function (a circuit of a transmitting and receiving terminal on the antenna side) to the RF module 1334. As illustrated in FIG. 53, the front-end module 1314, for example, includes an antenna unit 1351, a filter 1352, and an amplification unit 1353.

The antenna unit 1351 includes an antenna transmitting and receiving the wireless signal, and a configuration in the vicinity of the antenna. The antenna unit 1351 transmits the signal supplied from the amplification unit 1353, as the wireless signal, and supplies the received wireless signal to the filter 1352, as the electric signal (the RF signal). The filter 1352 performs the filter processing or the like with respect, to the RE signal received through the antenna unit 1351, and supplies the RE signal after the processing, to the RE module 1334. The amplification unit 1353 amplifies the RE signal supplied from the RE module 1334, and supplies the RE signal to the antenna unit 1351.

The connectivity 1321 is a module having a function related to the connection with respect to the outside. A physical configuration of the connectivity 1321 is arbitrary. For example, the connectivity 1321 includes a configuration having a communication function other than a communication standard to which the broadband modem 1333 corresponds, an external input and output terminal, and the like.

For example, the connectivity 1321 may include module having a communication function based on a wireless communication standard such as Bluetooth (Registered Trademark), IEEE 802.11 (for example, wireless fidelity (Wi-Fi, Registered Trademark)), near field communication (NFC), and infrared data association (IrDA), an antenna transmitting and receiving a signal based on the standard, and the like. In addition, for example, the connectivity 1321 may include a module having a communication function based on a wired communication standard, such as a universal serial bus (USD), a high-definition multimedia interface (HDMI, Registered Trademark), a terminal based on the standard, and the like. Further, for example, the connectivity 1321 may have other data (signal) transmission functions and the like, such as a analog input and output terminal.

Note that, the connectivity 1321 may include a device that is a transmission destination of data (a signal). For example, the connectivity 1321 may include a drive reading or writing data with respect to a recording medium such as a magnetic disk, an optical disk, a magnetooptical disk, or a semiconductor memory (including not only a drive of a removable medium, but also a hard disk, a solid state drive (SSD), a network attached storage (NAS), and the like). In addition, the connectivity 1321 may include an output device of an image or a sound (a monitor, a speaker, or the like).

The camera 1322 is a module having a function of capturing a subject and of obtaining image data of the subject. The image data obtained by the capturing of the camera 1322, for example, is encoded by being supplied to the video processor 1332.

The sensor 1323, for example, is a module having an arbitrary sensor function, such as a sound sensor, an ultrasonic sensor, an optical sensor, an illuminance sensor, an infrared ray sensor, an image sensor, a rotation sensor, an angular sensor, an angular rate sensor, a rate sensor, an acceleration sensor, a tilt sensor, a magnetic identification sensor, a shock sensor, and a temperature sensor. The data detected by the sensor 1323, for example, is used by an application or the like supplied to the application processor 1331.

In the above description, the configuration described as the module, may be realized as the processor, or on the contrary, the configuration described as the processor, may be realized as the module.

In the video set 1300 having such a configuration, as described below, the present technology can be applied to the video processor 1332. Therefore, the video set 1300 can be carrying as a set to which the present technology is applied.

<Configuration Example of Video Processor>

Figure 54:
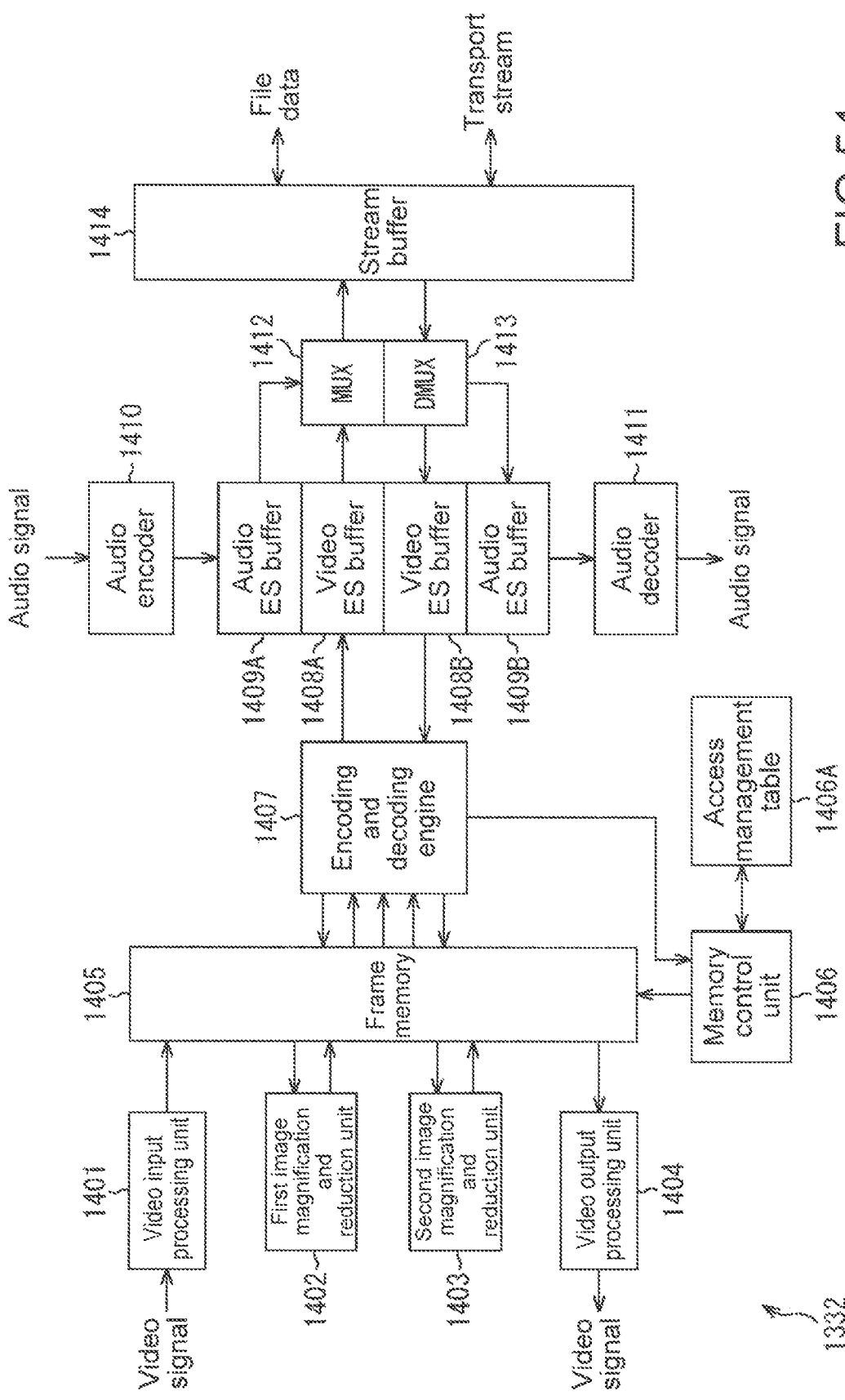
FIG. 54 is a block diagram illustrating an example of a schematic configuration of a video processor.

FIG. 54 is a diagram illustrating an example of a schematic configuration of the video processor 1332 (FIG. 53) to which the present technology is applied.

In the example of FIG. 54, the video processor 1332 has a function of receiving the input of a video signal and an audio signal and of encoding the video data and the audio data, in accordance with a predetermined system, and a function of decoding the encoded video data and audio data, and reproducing and outputting the video signal and the audio signal.

As illustrated in FIG. 54, the video processor 1332 includes a video input processing unit 1401, a first image magnification and reduction unit 1402, a second image magnification and reduction unit 1403, a video output processing unit 1404, a frame memory 1405, and a memory control unit 1406. In addition, the video processor 1332 includes an encoding and decoding engine 1407, video elementary stream (ES) buffers 1408A and 1408B, and audio ES buffers 1409A and 1409B. Further, the video processor 1332 includes an audio encoder 1410, an audio decoder 1411, a multiplexing unit (a multiplexer (MUX)) 1412, an inverse multiplexing unit (a demultiplexer (DMUX)) 1413, and a stream buffer 1414.

The video input processing unit 1401, for example, acquires the video signal input from the connectivity 1321 (FIG. 53) or the like, and converts the video signal into digital image data. The first image magnification and reduction unit 1402 performs format conversion, image magnification and reduction processing, or the like with respect to the image data. The second image magnification and reduction unit 1403 performs the image magnification and reduction processing with respect to the image data, in accordance with a format of a destination to which the image data is output through the video output processing unit 1404, and performs the format conversion, the image magnification and reduction processing, or the like, identical to that of the first image magnification and reduction unit 1402. The video output processing unit 1404 performs the format conversion, the conversion with respect to an analog signal, or the like with respect to the image data, and outputs the image data, for example, to the connectivity 1321 or the like, as the reproduced video signal.

The frame memory 1405 is a memory for image data that is shared by the video input processing unit 1401, the first image magnification and reduction unit 1402, the second image magnification and reduction unit 1403, the video output processing unit 1404, and the encoding and decoding engine 1407. The frame memory 1405, for example, is realized as a semiconductor memory such as a DRAM.

The memory control unit 1406 receives a synchronous signal from the encoding and decoding engine 1407, and controls writing and reading access with respect to the frame memory 1405, in accordance with an access schedule with respect to the frame memory 1405, written in an access management table 1406A. The access management table 1406A is updated by the memory control unit 1406, in accordance with the processing executed by the encoding and decoding engine 1407, the first image magnification and reduction unit 1402, the second image magnification and reduction unit 1403, or the like.

The encoding and decoding engine 1407 performs encoding processing of image data, and decoding processing of a video stream that is data in which the image data is encoded. For example, the encoding and decoding engine 1407 encodes the image data read out from the frame memory 1405, and sequentially writes the image data in the video ES buffer 1408A, as the video stream. In addition, for example, the video stream is sequentially read out from the video ES buffer 1408B, and is decoded, and is sequentially written in the frame memory 1405, as the image data. In the encoding or the decoding, the encoding and decoding engine 1407 uses the frame memory 1405 as a working region. In addition, the encoding and decoding engine 1407, for example, outputs the synchronous signal to the memory control unit 1406, at a timing when processing for each macroblock is started.

The video ES buffer 1408A performs buffering with respect to the video stream generated by the encoding and decoding engine 1407, and supplies the video stream to the multiplexing unit (MUX) 1412. The video ES buffer 1408B performs the buffering with respect to the video stream supplied from the inverse multiplexing unit (DMUX) 1413, and supplies the video stream to the encoding and decoding engine 1407.

The audio ES buffer 1409A performs the buffering with respect to the audio stream generated by the audio encoder 1410, and supplies the audio stream to the multiplexing unit (MUX) 1412. The audio ES buffer 1409B performs the buffering with respect to the audio stream supplied from the inverse multiplexing unit (DMUX) 1413, and supplies the audio stream to the audio decoder 1411.

The audio encoder 1410, for example, performs digital conversion, for example, with respect to the audio signal input from the connectivity 1321, or the like, and for example, encodes the audio signal, in accordance with a predetermined system such as an MPEG audio system or an audiocode number 3 (AC3) system. The audio encoder 1410 sequentially writes the audio stream that is the data in which the audio signal is encoded, in the audio ES buffer 1409A. The audio decoder 1411 decodes the audio stream supplied from the audio ES buffer 1409B, for example, performs the conversion with respect to the analog signal, or the like with respect to the audio stream, and supplies the audio stream, for example, to the connectivity 1321 or the like, as the reproduced audio signal.

The multiplexing unit (MUX) 1412 performs multiplexing with respect to the video stream and the audio stream. A multiplexing method (that is, a format of a bit stream generated by the multiplexing) is arbitrary. In addition, in the multiplexing, the multiplexing unit (MUX) 1412 is capable of applying predetermined header information or the like, to the bit stream. That is, the multiplexing unit (MUX) 1412 is capable of converting the format of the stream by the multiplexing. For example, the multiplexing unit (MUX) 1412 performs the multiplexing with respect to the video stream and the audio stream, and converts the video stream and the audio stream into a transport stream that is a bit stream of a transport format. In addition, for example, the multiplexing unit (MUX) 1412 performs the multiplexing with respect to the video stream and the audio stream, and thus, converts the video stream and the audio stream into file format data (file data) for recording.

The inverse multiplexing unit (DMUX) 1413 performs inverse multiplexing with respect to the bit stream obtained by performing the multiplexing with respect to the video stream and the audio stream, in accordance with a method corresponding to the multiplexing of the multiplexing unit (MUX) 1412. That is, the inverse multiplexing unit (DMUX) 1413 extracts the video stream and the audio stream (separates the video stream and audio stream) from the bit stream read out from the stream buffer 1414. That is, the inverse multiplexing unit (DMUX) 1413 is capable of performing conversion with respect to the format of the stream (inverse conversion of the conversion of the multiplexing unit (MUX) 1412), in accordance with inverse multiplexing. For example, the inverse multiplexing unit (DMUX) 1413, for example, acquires the transport stream supplied from the connectivity 1321, the broadband modem 1333, or the like, through the stream buffer 1414, performs the inverse multiplexing with respect to the transport stream, and thus, is capable of converting the transport stream into the video stream and the audio stream. In addition, for example, the inverse multiplexing unit (DMUX) 1413, for example, acquires the file data read out from various recording media, through the stream buffer 1414 by the connectivity 1321, performs the inverse multiplexing with respect to the file data, and thus, capable of converting the file data into the video stream and the audio stream.

The stream buffer 1414 performs the buffering with respect to the bit stream. For example, the stream buffer 1414 performs the buffering with respect to the transport stream supplied from the multiplexing unit (MUX) 1412, for example, supplies the transport stream to the connectivity 1321, the broadband modem 1333, or the like, at a predetermined timing or on the basis of a request or the like form the outside.

In addition, for example, the stream buffer 1414 performs the buffering with respect to the file data supplied from the multiplexing unit ((MUX 1412, supplies the file data, for example, to the connectivity 1321 or the like, at a predetermined timing or on the basis of a request or the like from the outside, and records the file data in various recording media.

Further, the stream buffer 1414, for example, performs the buffering with respect to the transport stream acquired through the connectivity 1321, the broadband modem 1333, or the like, and supplies the transport stream to the inverse multiplexing unit (DMUX) 1413, at a predetermined timing or on the basis of a request or the like from the outside.

In addition, the stream buffer 1414, for example, performs the buffering with respect to the file data read out from various recording media, by the connectivity 1321 or the like, and supplies the file data to the inverse multiplexing unit (DMUX) 1413, at a predetermined timing or on the basis of a request or the like from the outside.

Next, an example of the operation of the video processor 1332 having such a configuration, will be described. For example, the video signal input into the video processor 1332 from the connectivity 1321 or the like, is converted into the digital image data of a predetermined system such as a 4:2:2 Y/Cb/Cr system, in the video input processing unit 1401, and is sequentially written in the frame memory 1405. The digital image data is read out to the first image magnification and reduction unit 1402 or the second image magnification and reduction unit 1403, is subjected to the format conversion and the magnification and reduction processing with respect to a predetermined system such as a 4:2:0 Y/Cb/Cr system, and is written again in the frame memory 1405. The image data is encoded by the encoding and decoding engine 1407, and is written in the video ES buffer 1408A, as the video stream.

In addition, the audio signal input into the video processor 1332 from the connectivity 1321 or the like, is encoded by the audio encoder 1410, and is written in the audio ES buffer 1409A, as the audio stream.

The video stream of the video ES buffer 1408A and the audio stream of the audio ES buffer 1409A are read out to the multiplexing unit (MUX) 1412, are subjected to the multiplexing, and are converted into the transport stream, the file data, or the like. The transport stream generated by the multiplexing unit (MUX) 1412, is subjected to the buffering by the stream buffer 1414, and then, for example, is output to an external network through the connectivity 1321, the broadband modem 1333, or the like. In addition, the file data generated by the multiplexing unit (MUX) 1412, is subjected to the buffering by the stream buffer 1414, and then, for example, is output to the connectivity 1321 or the like, and is recorded in various recording media.

In addition, for example, the transport stream input into the video processor 1332 from the external network through the connectivity 1321, the broadband modem 1333, or the like is subjected to the buffering by the stream buffer 1414, and then, is subjected to the inverse multiplexing by the inverse multiplexing unit (DMUX) 1413. In addition, for example, in the connectivity 1321 or the like, the data that is read out from various recording media, and is input into the video processor 1332, is subjected to the buffering by the stream buffer 1414, and then, is subjected to the inverse multiplexing by the inverse multiplexing unit (DMUX) 1413. That is, the transport stream or the file data input into the video processor 1332, is separated into the video stream and the audio stream, by the inverse multiplexing unit (DMUX) 1413.

The audio stream is supplied to the audio decoder 1411 through the audio ES buffer 1409B, and is decoded, and thus, the audio signal is reproduced. In addition, the video stream is written in the video ES buffer 1408B, and then, is sequentially read out and decoded by the encoding and decoding engine 1407, and thus, is written in the frame memory 1405. The decoded image data is subjected to the magnification and reduction processing by the second image magnification and reduction unit 1403, and thus, is written in the frame memory 1405. Then, the decoded image data is read out to the video output processing unit 1404, is subjected to the format conversion, in accordance with a predetermined system such as a 4:2:2 Y/Cb/Cr system, and is further converted into the analog signal, and thus, the video signal is reproduced and output.

In a case where the present technology is applied to the video processor 1332 configured as described above, the present technology according to the embodiments described above may be applied to the encoding and decoding engine 1407. That is, for example, the encoding and decoding engine 1407 may have one or both of the function of the encoding device 11 and the function of the decoding device 12 described above. Thus, the video processor 1332 is capable of obtaining effects identical to those of the encoding device 11 or the decoding device 12 of the embodiments described above.

Note that, in the encoding and decoding engine 1407, the present technology (that is, one or both of the function of the encoding device 11 and the function of the decoding device 12) may be realized by hardware such as a logic circuit, may be realized by software such as a built-in program, or may be realized by both of the hardware and the software.

<Other Configuration Examples of Video Processor>

Figure 55:
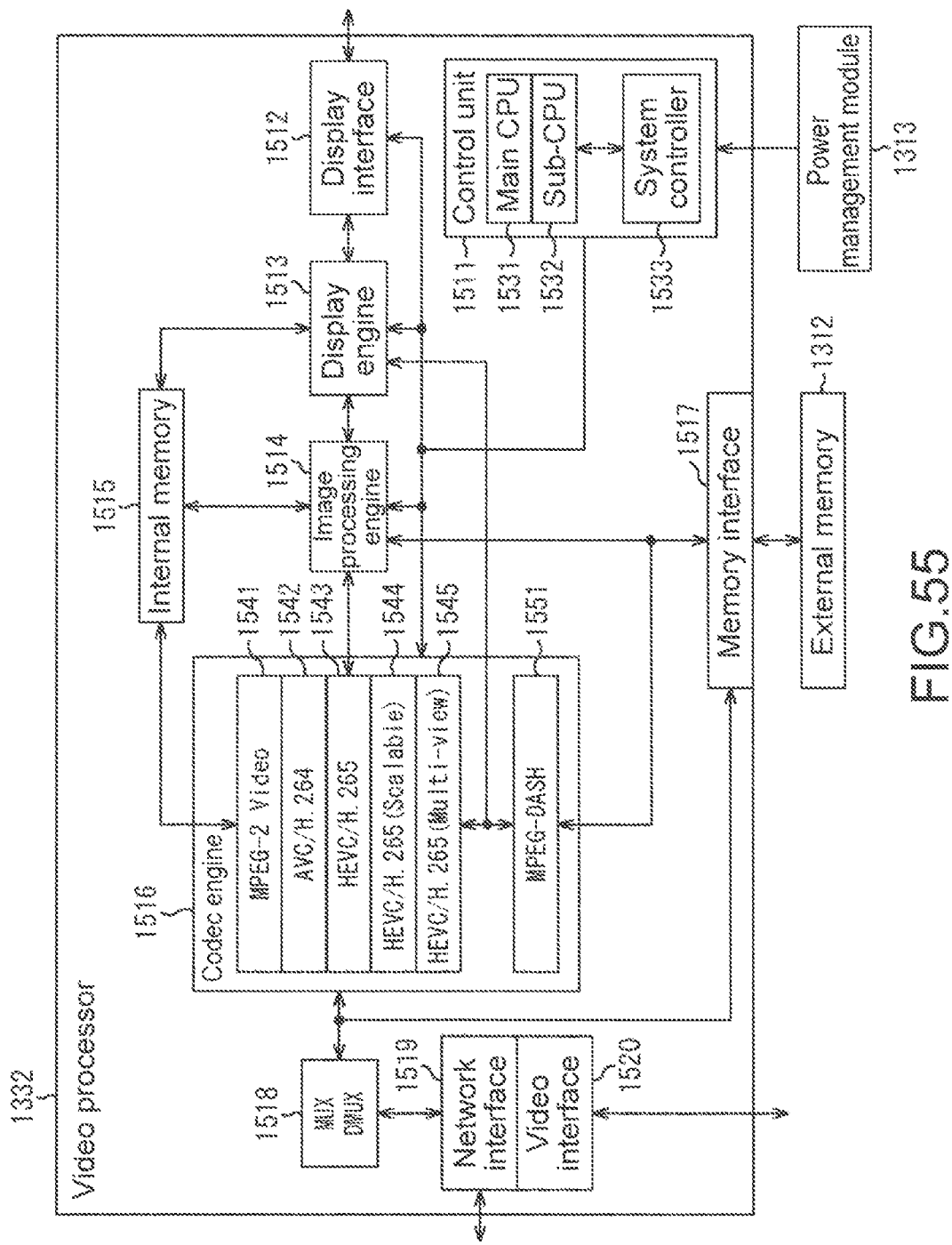
FIG. 55 is a block diagram illustrating another example of the schematic configuration of the video processor.

FIG. 55 is a diagram illustrating another example of the schematic configuration of the video processor 1332 to which the present technology is applied.

In the example of FIG. 55, the video processor 1332 has a function of encoding and decoding the video data, in accordance with a predetermined system.

More specifically, as illustrated in FIG. 55, the video processor 1332 includes a control unit 1511, a display interface 1512, a display engine 1513, an image processing engine 1514, and an internal memory 1515. In addition, the video processor 1332 includes a codec engine 1516, a memory interface 1517, a multiplexing and inverse multiplexing unit (MUM DMUX) 1518, a network interface 1519, and a video interface 1520.

The control unit 1511 controls the operation of each processing unit in the video processor 1332, such as the display interface 1512, the display engine 1513, the image processing engine 1514, and the codec engine 1516.

As illustrated in FIG. 55, the control unit 1511, for example, includes a main CPU 1531, a sub-CPU 1532, and a system controller 1533. The main CPU 1531 executes a program for controlling the operations of each of the processing units in the video processor 1332, or the like. The main CPU 1531 generates a control signal in accordance with the program or the like, and supplies the control signal to each of the processing units (that is, controls the operations of each of the processing units). The sub-CPU 1532 has an auxiliary function of the main CPU 1531. For example, the sub-CPU 1532 executes a child process, a subroutine, or the like of the program that is executed by the main CPU 1531. The system controller 1533 controls the operation of the main CPU 1531 and the sub-CPU 1532, such as designating the program executed by the main CPU 1531 and the sub-CPU 1532.

The display interface 1512 outputs the image data, for example, to the connectivity 1321 or the like, under the control of the control unit 1511. For example, the display interface 1512 converts the image data of the digital data into the analog signal, and outputs the signal to a monitor device of the connectivity 1321, or the like, as the reproduced video signal or as the image data of the digital data as it is.

The display engine 1513 performs various conversion processings such as format conversion, size conversion, and color gamut conversion, such that the image data is matched to a hardware specification of the monitor device or the like, on which the image is displayed, under the control of the control unit 1511.

The image processing engine 1514 performs, for example, predetermined image processing such as filter processing for improving image quality, with respect to the image data, under the control of the control unit 1511.

The internal memory 1515 is a memory that is provided in the video processor 1332, and is shared by the display engine 1513, the image processing engine 1514, and the codec engine 1516. The internal memory 1515, for example, is used in data exchange performed in the display engine 1513, the image processing engine 1514, and the codec engine 1516. For example, the internal memory 1515 stores data supplied from the display engine 1513, the image processing engine 1514, or the codec engine 1516, and supplies the data to the display engine 1513, the image processing engine 1514, or the codec engine 1516, as necessary (for example, in accordance with a request). The internal memory 1515 may be realized by any storage device, but in general, there are many cases where the internal memory 1515 is used for storing small-capacity data such as image data in block unit, or a parameter, and thus, for example, it is desirable that the internal memory 1515 is realized by a semiconductor memory of which the capacity is comparatively small (for example, compared to the external memory 1312), but a response rate is high, such as a static random access memory (SRAM).

The codec engine 1516 performs processing relevant to the encoding or the decoding of the image data. An encoding and decoding system to which the codec engine 1516 corresponds, is arbitrary, and one system may be used, or a plurality of systems may be used. For example, the codec engine 1516 may have codec functions of a plurality of encoding or decoding systems, the encoding of the image data or the decoding of encoding data may be performed in accordance with a system selected from the plurality of encoding or decoding systems.

In the example illustrated in FIG. 55, the codec engine 1516, for example, includes MPEG-2 video 1541, AVC/H.264 1542, HEVC/H.265 1543, HEVC/H.265 (scalable) 1544, HEVC/H.265 (multi-view) 1545, and MPEG-DASH 1551, as a functional block of processing relevant to the codec.

The MPEG-2 video 1541 is a functional block performing encoding or decoding with respect to the image data in accordance with an MPEG-2 system. The AVC/H.264 1542 is a functional block performing encoding or decoding with respect to the image data in accordance with an AVC system. The HEVC/H.265 1543 is a functional block performing encoding or decoding with respect to the image data in accordance with an HEVC system. The HEVC/H.265 (scalable) 1544 is a functional block performing scalable encoding or scalable decoding with respect to the image data in accordance with the HEVC system. The HEVC/H.265 (multi-view) 1545 is a functional block performing multiple view encoding or multiple view decoding with respect to the image data in accordance with the HEVC system.

The MPEG-DASH 1551 is a functional block transmitting and receiving the image data in accordance with an MPEG-dynamic adaptive streaming over HTTP (MPEG-DASH) system. The MPEG-DASH is a technology of performing video streaming by using a hypertext transfer protocol (HTTP), and one of the features of the MPEG-DASH is to select suitable encoding data from a plurality of encoding data items having resolutions and the like different from each other, prepared in advance, in segment unit, and to transmit the encoding data. The MPEG-DASH 1551 performs the generation of a stream based on a standard, transmission control of the stream, and the like, and uses the MPEG-2 video 1541 to the HEVC/H.265 (multi-view) 1545 described above, in the encoding and decoding of the image data.

The memory interface 1517 is an interface for the external memory 1312. The data supplied from the image processing engine 1514 or the codec engine 1516, is supplied to the external memory 1312 through the memory interface 1517. In addition, the data read out from the external memory 1312, is supplied to the video processor 1332 (the image processing engine 1514 or the codec engine 1516) through the memory interface 1517.

The multiplexing and inverse multiplexing unit (MUX DMUX) 1518 performs the multiplexing or the inverse multiplexing of various data items relevant to an image, such as the bit stream of the encoding data, the image data, and the video signal. A multiplexing and inverse multiplexing method is arbitrary. For example, in the multiplexing, the multiplexing and inverse multiplexing unit (MUX DMUX) 1518 is capable of not only combining a plurality of data items into one data item, but also applying predetermined header information or the like to the data. In addition, in the inverse multiplexing, the multiplexing and inverse multiplexing unit (MUX DMUX) 1518 is capable of not only dividing one data item into a plurality of data items, but also apply ng predetermined header information or the like to each of the divided data items. That is, the multiplexing and inverse multiplexing unit (MUX DMUX) 1518 is capable of converting the format of the data in accordance with the multiplexing and inverse multiplexing. For example, the multiplexing and inverse multiplexing unit (MUX DMUX) 1518 performs the multiplexing with respect to the bit stream, and thus, is capable of converting the bit stream into the transport stream that is the bit stream of the transport format, or the file format data (the file data) for recording. It is obvious that the inverse conversion can also be performed in accordance with the inverse multiplexing.

The network interface 1519, for example, is an interface for the broadband modem 1333, the connectivity 1321, or the like. The video interface 1520, for example, is an interface for the connectivity 1321, the camera 1322, or the like.

Next, an example of the operation of the video processor 1332 will be described. For example, in a case where the transport stream is received from the external network through the connectivity 1321, the broadband modem 1333, or the like, the transport stream is supplied to the multiplexing and inverse multiplexing unit (MUX DMUX) 1518 through the network interface 1519, is subjected to the inverse multiplexing, and is decoded by the codec engine 1516. The image data obtained by the decoding of the codec engine 1516, for example, is subjected to predetermined image processing by the image processing engine 1514, is subjected to predetermined conversion by the display engine 1513, and is supplied, for example, to the connectivity 1321 or the like through the display interface 1512, and the image is displayed on the monitor. In addition, for example, the image data obtained by the decoding of the codec engine 1516, is encoded again by the codec engine 1516, is subjected to the multiplexing by the multiplexing and inverse multiplexing unit (MUX DMUX) 1518, is converted into the file data, is output, for example, to the connectivity 1321 or the like through the video interface 1520, and is recorded in various recording media.

Further, for example, the file data of the encoding data in which the image data read out from the recording medium (not illustrated) by the connectivity 1321 or the like, is encoded, is supplied to the multiplexing and inverse multiplexing unit (MUX DMUX) 1518 through the video interface 1520, is subjected to the inverse multiplexing, and is decoded by the codec engine 1516. The image data obtained by the decoding of the codec engine 1516, is subjected to predetermined image processing by the image processing engine 1514, is subjected to predetermined conversion by the display engine 1513, and is supplied, for example, to the connectivity 1321 or the like through the display interface 1512, and the image is displayed on the monitor. In addition, for example, the image data obtained by the decoding of the codec engine 1516, is encoded again by the codec engine 1516, is subjected to the multiplexing by the multiplexing and inverse multiplexing unit (MUX DMUX) 1518, is converted into the transport stream, is supplied, for example, to the connectivity 1321, the broadband modem 1333, or the like through the network interface 1519, and is transmitted to the other device (not illustrated).

Note that, the exchange of the image data or other data items in each of the processing units of the video processor 1332, for example, is performed by using the internal memory 1515 or the external memory 1312. In addition, the power management module 1313, for example, controls the power supply with respect to the control unit 1511.

In a case where the present technology is applied to the video processor 1332 configured as described above, the present technology according to the embodiments described above may be applied to the codec engine 1516. That is, for example, the codec engine 1516 may have one or both of the function of the encoding device 11 and the function or the decoding device 12 described above. Thus, the video processor 1332 is capable of obtaining effects identical to those of the encoding device 11 or the decoding device 12, described above.

Note that, in the codec engine 1516, the present technology (that is, the function of the encoding device 11 or the decoding device 12) may be realized by hardware such as a logic circuit, may be realized by software such as a built-in program, or may be realized by both of the hardware and the software.

In the above description, two examples of the configuration of the video processor 1332 have been described, but the configuration of the video processor 1332 is arbitrary, and may be configurations other than two examples described above. In addition, the video processor 1332 may be configured as one semiconductor chip, or may be configured as a plurality of semiconductor chips. For example, the video processor 1332 may be configured as three-dimensionally laminated LSI in which a plurality of semiconductors is laminated. In addition, the video processor 1332 may be realized by plurality of LSIs.

<Application Example with Respect to Device>

The video set 1300 can be built in various devices processing the image data. For example, the video set 1300 can be built in the television device 1200 (FIG. 49), the mobile telephone 1220 (FIG. 50), the recording and reproducing device 1240 (FIG. 51), the capturing device 1260 (FIG. 52), and the like. The video set 1300 is built in a device, and thus, the device is capable of obtaining effects identical to those of the encoding device 11 or the decoding device 12 described above.

Note that, even a part of each of the configurations of the video set 1300 described above, can be carried out as the configuration to which the present technology is applied, insofar as the video processor 1332 is provided. For example, only the video processor 1332 can be carried out as the video processor to which the present technology is applied. In addition, for example, as described above, the processor illustrated by the dotted line 1341, the video module 1311, or the like, can be carried out as the processor, the module, or the like to which the present technology is applied. Further, for example, the video module 1311, the external memory 1312, the power management module 1313, and the front-end module 1314 can be combined to be carried out as the video unit 1361 to which the present technology is applied. In any configuration, it is possible to obtain effects identical to those of the encoding device 11 or the decoding device 12 described above.

That is, in any configuration, as with the video set 1300, the video processor 1332 can be built in various devices processing the image data, insofar as the video processor 1332 is provided. For example, the video processor 1332, the processor illustrated by the dotted line 1341, the video module 1311, or the video unit 1361 can be built in the television device 1200 (FIG. 49), the mobile telephone 1220 (FIG. 50), the recording and reproducing device 1240 (FIG. 51), the capturing device 1260 (FIG. 52), and the like. Then, any configuration to which the present technology is applied, is built in a device, and thus, as with the video set 1300, the device is capable of obtaining effects identical to those of the encoding device 11 or the decoding device 12 described above.

<Others>

Note that, herein, an example has been described in which various information items are subjected to the multiplexing into the encoding data (the bit stream), and are transmitted to a decoding side from an encoding side, but a method of transmitting the information is not limited thereto. For example, the information may be transmitted or recorded as separate data associated with the encoding data, without being subjected to the multiplexing into the encoding data. Here, the term of "associating", for example, indicates that an image included in the encoding data (may be a part of an image, such as a slice or a block) can be linked to information corresponding to the image at the time of performing decoding. That is, information associated with the encoding data (the image) may be transmitted on a transmission path different from that of the encoding data (the image). In addition, the information associated with the encoding data (the image), may be recorded in a recording medium different from that of the encoding data (the image) (or in a different recording area of the same recording medium). Further, the image and the information corresponding to the image, for example, may be associated with each other in arbitrary unit such as a plurality of frames, one frame, and a part in a frame.

In addition, the term of "synthesizing", "multiplexing", "applying", "integrating", "including", "storing", "engaging", "plugging", "inserting", or the like, for example, indicates that a plurality of objects in which flag information and the encoding data of the information relevant to the image are combined into one data item, is combined into one object, and indicates one method of "associating" described above.

In addition, the embodiments of the present technology are not limited to the embodiments described above, and can be variously changed within a range not departing from the gist of the present technology.

For example, herein, the system indicates a class of a plurality of constituents (a device, module (a component), and the like), and ail of the constituents may not be in the same housing. Therefore, both of a plurality of devices that are contained in separate housings, and are connected to each other through a network, and one device in which a plurality of modules is contained in one housing, are the system.

In addition, for example, the configuration described as one device (or processing unit), may be divided, and may be configured as a plurality of devices (or processing units). On the contrary, in the above description, the configurations described as a plurality of devices (or processing units), may be combined, and may be configured as one device (or processing unit). In addition, it is obvious that a configuration other than the configurations described above may be applied to the configuration of each device (or each processing unit). Further, a part of the configuration of a certain device (or processing unit) may be included in the configuration of the other device (or the other processing unit), insofar as the configuration or the operation as the entire system is substantially the same.

In addition, for example, the present technology is capable of having a cloud computing configuration in which one function is processed by being divided and shared in a plurality of devices through a network.

In addition, for example, the program described above, can be executed by as arbitrary device. In this case, the device may have a necessary function (a functional block or the like), and may be capable of obtaining necessary information.

In addition, for example, each step in the flowchart described above, can be executed by one device, and can be executed by being divided in a plurality of devices. Further, in a case where a plurality of processings is included in one step, the plurality of processings included in one step, can be executed by one device, and can be executed by being divided in a plurality of devices.

Note that, in the program executed by the computer, the processing of the step of describing the program, herein, may be executed in chronological order in accordance with a describing sequence, or may be executed in parallel or individually at a necessary timing such as at the time of being called. That is unless there is any contradiction, the processing of each step may be executed in a sequence different from the sequence described above. Further, the processing of the step of describing the program, may be executed in parallel with the processing of the other program, or may be executed by being combined with the processing of the other program.

Note that, herein, unless there is any contradiction, a plurality of present technologies described above, can be independently carried out. It is obvious that an arbitrary plurality of present technologies can be carried out in combination. For example, the present technology described in any embodiment, can be carried out by being combined with the present technology described in the other embodiment. In addition, an arbitrary present technology described above, can also be carried out along with the other technology that is not described above.

In addition, the effects described herein are merely examples, and are not limited, and other effects may be obtained.

Note that, the present technology can be configured as follows.

<1>
An image processing apparatus, including: a class tap selection unit configuring a class tap by selecting a pixel that is the class tap used in class classification of classifying a pixel to be processed of a first image obtained by adding a residual error of prediction encoding and a prediction image together, into any one class of a plurality of classes, from the first image; a class classification unit performing the class classification of the pixel to be processed by using the class tap; and a filter processing unit performing filter processing corresponding to a class of the pixel to be processed, with respect to the first image, to generate a second image used in prediction of the prediction image, in which the class tap selection unit updates a tap structure of the class tap to a tap structure selected from a plurality of tap structures.

<2>
The image processing apparatus according to <1>, further including: a transmission unit transmitting filter information relevant to the filter processing.

<3>
The image processing apparatus according to <2>, in which the filter processing unit includes a prediction tap selection unit configuring a prediction tap by selecting a pixel that is the prediction tap used in prediction operation of obtaining a pixel value of a corresponding pixel of the second image corresponding to the pixel to be processed of the first image, from the first image, a tap coefficient acquisition unit acquiring a tap coefficient of the class of the pixel to be processed, in tap coefficients for each of the classes, used in the prediction operation, the tap coefficients being obtained by learning using a student image corresponding to the first image, and a teacher image corresponding to an original image that corresponds to the first image, and an operation unit obtaining the pixel value of the corresponding pixel by performing the prediction operation using the tap coefficient of the class of the pixel to be processed, and the prediction tap of the pixel to be processed.

<4>
The image processing apparatus according to <3>, in which the filter information includes the tap coefficients for each of the classes.

<5>
The image processing apparatus according to any one of <2> to <4>, in which the filter information includes tap structure information indicating the tap structure selected from the plurality of tap structures.

<6>
The image processing apparatus according to any one of <2> to <5>, further including: a selection unit selecting the tap structure of the class tap from the plurality of tap structures, in accordance with a tap structure evaluation value indicating adequateness of using each of the plurality of tap structures in the class classification.

<7>

The image processing apparatus according to any one of <2> to <5>, further including: a tap structure selection unit selecting the tap structure of the class tap from the plurality of tap structures, in accordance with a selection rule of selecting the tap structure of the class tap from the plurality of tap structures, by using acquirable information that is capable of being acquired from encoding data obtained by the prediction encoding.

<8>

The image processing apparatus according to <7>, in which the filter information includes the selection rule.

<9>

The image processing apparatus according to <7> or <8>, in which the acquirable information is one or both of an image feature amount obtained from the first image and encoding information relevant to the prediction encoding of the pixel to be processed.

<10>

The image processing apparatus according to any one of <2> to <9>, in which the filter information includes copy information indicating whether or not to use a tap structure identical to a tap structure when a last-minute tap structure is updated, as the tap structure of the class tap.

<11>

The image processing apparatus according to <1>, further including: an exception unit accepting filter information relevant to the filter processing.

<12>

The image processing apparatus according to <11>, in which the filter processing unit includes a prediction tap selection unit configuring a prediction tap by selecting a pixel that is the prediction tap used in prediction operation of obtaining a pixel value of a corresponding pixel of the second image corresponding to the pixel to be processed of the first image, from the first image, a tap coefficient acquisition unit acquiring a tap coefficient of the class of the pixel to be processed, in tap coefficients for each of the classes, used in the prediction operation, the tap coefficients being obtained by learning using a student image corresponding to the first image, and a teacher image corresponding to an original image that corresponds to the first image, and an operation unit obtaining the pixel value of the corresponding pixel by performing the prediction operation using the tap coefficient of the class of the pixel to be processed, and the prediction tap of the pixel to be processed.

<13>

The image processing apparatus according to <12>, in which the filter information includes the tap coefficients for each of the classes, and the tap coefficient acquisition unit acquires the tap coefficient of the class of the pixel to be processed from the tap coefficients for each of the classes, included in the filter information.

<14>

The image processing apparatus according to any one of <11> to <13>, in which the filter information includes tap structure information indicating the tap structure selected from the plurality of tap structures, and the class tap selection unit updates the tap structure of the class tap to the tap structure indicated by the tap structure information included in the filter information.

<15>

The image processing apparatus according to any one of <11> to <13>, in which the filter information includes a selection rule of selecting the tap structure of the class tap from the plurality of tap structures, and the image processing apparatus further includes: a tap structure selection unit selecting the tap structure of the class tap from the plurality of tap structures, in accordance with the selection rule, by using acquirable information that is capable of being acquired from encoding data obtained by the prediction encoding.

<16>

The image processing apparatus according to <15>, in which the acquirable information is one or both of an image feature amount obtained from the first image, and encoding information relevant to the prediction encoding of the pixel to be processed.

<17>

The image processing apparatus according to any one of <11> to <16>, in which the filter information includes copy information indicating whether or not to use a tap structure identical to a tap structure when a last-minute tap structure is updated, as the tap structure of the class tap, and the class tap selection unit selects the tap structure identical to the tap structure when the last-minute tap structure is updated, as the tap structure of the class tap, in accordance with the copy information included in the filter information.

<18>

The image processing apparatus according to any one of <1> to <17>, in which the filter processing unit functions as one or more of a deblocking filter (DF), a sample adaptive offset (SAO), and an adaptive loop filter configuring an in loop filter (ILF).

<19>

An image processing method, including: configuring a class tap by selecting a pixel that is the class tap used in class classification of classifying a pixel to be processed of a first image obtained by adding a residual error of prediction encoding and a prediction image together, into any one class of a plurality of classes, from the first image; performing the class classification of the pixel to be processed by using the class tap; and performing filter processing corresponding to a class of the pixel to be processed, with respect to the first image, to generate a second image used in prediction of the prediction image, in which a tap structure of the class tap is updated to a tap structure selected from a plurality of tap structures.

REFERENCE SIGNS LIST 11 encoding device
12 decoding device
21, 22 tap selection unit
23 class classification unit
24 coefficient acquisition unit
25 prediction operation unit
30 learning device
31 teacher data generating unit
32 student data generating unit
33 learning unit
41, 42 tap selection unit
43 class classification unit
44 addition unit
45 coefficient calculation unit
61 parameter generating unit
62 student data generating unit
63 learning unit
71 addition unit 72 coefficient calculation unit
81, 82 addition unit
83 coefficient calculation unit
101 A/D conversion unit
102 reordering buffer
103 operation unit
104 orthogonal conversion unit
105 quantization unit
106 reversible encoding unit
107 accumulation buffer
108 inverse quantization unit
109 inverse orthogonal conversion unit
110 operation unit
111 class classification adaptive filter
112 frame memory
113 selection unit
114 intra prediction unit
115 motion prediction compensation unit
116 prediction image selection unit
117 rate control unit
131 learning device
132 filter information generating unit
133 image conversion device
151 tap structure selection unit
152 learning unit
153 storage unit
154 evaluation value calculation unit
155 selection unit
161, 162 tap selection unit
163 class classification unit
164 addition unit
165 coefficient calculation unit
171 image conversion unit
172 calculation unit
180 filter processing unit
181, 182 tap selection unit
183 class classification unit
184 coefficient acquisition unit
185 prediction operation unit
190 filter processing unit
191, 192 tap selection unit
193 class classification unit
194 coefficient acquisition unit
195 prediction operation unit
201 accumulation buffer
202 reversible decoding unit
203 inverse quantization unit
204 inverse orthogonal conversion unit
205 operation unit
206 class classification adaptive filter
207 reordering buffer
208 D/A conversion unit
210 frame memory
211 selection unit
212 intra prediction unit
213 motion prediction compensation unit
214 selection unit
231 image conversion device
240 filter processing unit
241, 242 tap selection unit
243 class classification unit
244 coefficient acquisition unit
245 prediction operation unit
311 class classification adaptive filter
331 learning device
332 filter information generating unit
333 image conversion device
351 tap structure selection unit
353 storage unit
354 evaluation value calculation unit
355 selection unit
371 image conversion unit
381, 391 tap structure selection unit
401 class classification adaptive filter
431 image conversion device
451 tap structure selection unit

The invention claimed is:

1. An image processing apparatus, comprising:
a class tap selection unit configured to select at least one pixel that is configured as a class tap used in class classification of classifying each respective pixel to be processed of a first image obtained by adding a residual error of prediction encoding and a prediction image together, into a respective class of a plurality of classes, from the first image;
a class classification unit configured to perform the class classification of the respective pixel to be processed by using the class tap; and
a filter processing unit configured to perform filter processing corresponding to the respective class of the respective pixel to be processed, with respect to the first image, to generate a second image used in prediction of the prediction image,
wherein the class tap selection unit is further configured to update a tap structure of the class tap at a predetermined timing to another tap structure selected from among a plurality of tap structures,
wherein each tap structure of the plurality of tap structures has a different position than other tap structures of the plurality of tap structures, and
wherein the class tap selection unit, the class classification unit, and the filter processing unit are each implemented via at least one processor.

2. The image processing apparatus according to claim 1, further comprising:
a transmission unit configured to transmit filter information relevant to the filter processing,
wherein the transmission unit is implemented via at least one processor.

3. The image processing apparatus according to claim 2, wherein the filter processing unit includes
a prediction tap selection unit configuring a prediction tap by selecting a pixel that is the prediction tap used in prediction operation of obtaining a pixel value of a corresponding pixel of the second image corresponding to the pixel to be processed of the first image, from the first image,
a tap coefficient acquisition unit acquiring a tap coefficient of the class of the pixel to be processed, in tap coefficients for each of the classes, used in the prediction operation, the tap coefficients being obtained by learning using a student image corresponding to the first image, and a teacher image corresponding to an original image that corresponds to the first image, and
an operation unit obtaining the pixel value of the corresponding pixel by performing the prediction operation using the tap coefficient of the class of the pixel to be processed, and the prediction tap of the pixel to be processed.

4. The image processing apparatus according to claim 3, wherein
the filter information includes the tap coefficients for each of the classes.

5. The image processing apparatus according to claim 2, wherein
the filter information includes tap structure information indicating the tap structure selected from the plurality of tap structures.

6. The image processing apparatus according to claim 2, further comprising:
a selection unit configured to select the tap structure of the class tap from the plurality of tap structures, in accordance with a tap structure evaluation value indicating adequateness of using each of the plurality of tap structures in the class classification,
wherein the selection unit is implemented via at least one processor.

7. The image processing apparatus according to claim 2, further comprising:
a tap structure selection unit configured to select the tap structure of the class tap from the plurality of tap structures, in accordance with a selection rule of selecting the tap structure of the class tap from the plurality of tap structures, by using acquirable information that is capable of being acquired from encoding data obtained by the prediction encoding,
wherein the tap structure selection unit is implemented via at least one processor.

8. The image processing apparatus according to claim 7, wherein
the filter information includes the selection rule.

9. The image processing apparatus according to claim 7, wherein
the acquirable information is one or both of an image feature amount obtained from the first image and encoding information relevant to the prediction encoding of the pixel to be processed.

10. The image processing apparatus according to claim 2, wherein
the filter information includes copy information indicating whether or not to use a tap structure identical to a tap structure when a last-minute tap structure is updated, as the tap structure of the class tap.

11. The image processing apparatus according to claim 1, further comprising:
an accepting unit configured to accept filter information relevant to the filter processing,
wherein the accepting unit is implemented via at least one processor.

12. The image processing apparatus according to claim 11,
wherein the filter processing unit includes
a prediction tap selection unit configuring a prediction tap by selecting a pixel that is the prediction tap used in prediction operation of obtaining a pixel value of a corresponding pixel of the second image corresponding to the pixel to be processed of the first image, from the first image,
a tap coefficient acquisition unit acquiring a tap coefficient of the class of the pixel to be processed, in tap coefficients for each of the classes, used in the prediction operation, the tap coefficients being obtained by learning using a student image corresponding to the first image, and a teacher image corresponding to an original image that corresponds to the first image, and
an operation unit obtaining the pixel value of the corresponding pixel by performing the prediction operation using the tap coefficient of the class of the pixel to be processed, and the prediction tap of the pixel to be processed.

13. The image processing apparatus according to claim 12, wherein
the filter information includes the tap coefficients for each of the classes, and
the tap coefficient acquisition unit acquires the tap coefficient of the class of the pixel to be processed from the tap coefficients for each of the classes, included in the filter information.

14. The image processing apparatus according to claim 11, wherein
the filter information includes tap structure information indicating the tap structure selected from the plurality of tap structures, and
the class tap selection unit updates the tap structure of the class tap to the tap structure indicated by the tap structure information included in the filter information.

15. The image processing apparatus according to claim 11, wherein
the filter information includes a selection rule of selecting the tap structure of the class tap from the plurality of tap structures, and
the image processing apparatus further comprises:
a tap structure selection unit selecting the tap structure of the class tap from the plurality of tap structures, in accordance with the selection rule, by using acquirable information that is capable of being acquired from encoding data obtained by the prediction encoding.

16. The image processing apparatus according to claim 15, wherein
the acquirable information is one or both of an image feature amount obtained from the first image, and encoding information relevant to the prediction encoding of the pixel to be processed.

17. The image processing apparatus according to claim 11, wherein
the filter information includes copy information indicating whether or not to use a tap structure identical to a tap structure when a last-minute tap structure is updated, as the tap structure of the class tap, and
the class tap selection unit selects the tap structure identical to the tap structure when the last-minute tap structure is updated, as the tap structure of the class tap, in accordance with the copy information included in the filter information.

18. The image processing apparatus according to claim 1, wherein
the filter processing unit functions as one or more of a deblocking filter (DF), a sample adaptive offset (SAO), and an adaptive loop filter (ALF), configuring an in loop filter (ILF).

19. An image processing method, comprising:
selecting at least one pixel that is configured as a class tap used in class classification of classifying each respective pixel to be processed of a first image obtained by adding a residual error of prediction encoding and a prediction image together, into a respective class of a plurality of classes, from the first image;
performing the class classification of the pixel to be processed by using the class tap; and
performing filter processing corresponding to the respective class of the respective pixel to be processed, with respect to the first image, to generate a second image used in prediction of the prediction image, wherein a tap structure of the class tap is updated at a predetermined timing to another tap structure selected from among a plurality of tap structures, and wherein each tap structure of the plurality of tap structures has a different position than other tap structures of the plurality of tap structures.

20. The image processing apparatus according to claim 1, wherein each tap structure of the plurality of tap structures has a same shape as the other tap structures of the plurality of tap structures.

* * * * *